(12) United States Patent
Eyuboglu

(10) Patent No.: US 11,140,695 B1
(45) Date of Patent: Oct. 5, 2021

(54) WIRELESS MESH NETWORK

(71) Applicant: VERANA NETWORKS, INC., Weston, MA (US)

(72) Inventor: Vedat Eyuboglu, Weston, MA (US)

(73) Assignee: VERANA NETWORKS, INC., Weston, MA (US)

( * ) Notice: Subject to any disclaimer, the term of this patent is extended or adjusted under 35 U.S.C. 154(b) by 49 days.

(21) Appl. No.: 16/183,219

(22) Filed: Nov. 7, 2018

Related U.S. Application Data

(60) Provisional application No. 62/741,050, filed on Oct. 4, 2018, provisional application No. 62/672,903, filed on May 17, 2018, provisional application No. 62/656,597, filed on Apr. 12, 2018, provisional application No. 62/619,470, filed on Jan. 19, 2018, provisional application No. 62/583,838, filed on Nov. 9, 2017.

(51) Int. Cl.
*H04W 72/00* (2009.01)
*H04W 72/12* (2009.01)
*H04W 72/04* (2009.01)
*H04L 5/14* (2006.01)
*H04W 56/00* (2009.01)
*H04W 84/18* (2009.01)

(52) U.S. Cl.
CPC ....... *H04W 72/1257* (2013.01); *H04L 5/1469* (2013.01); *H04W 56/009* (2013.01); *H04W 56/0045* (2013.01); *H04W 72/0433* (2013.01); *H04W 84/18* (2013.01)

(58) Field of Classification Search
CPC ......... H04W 72/1257; H04W 72/0433; H04W 56/0045; H04W 56/009; H04W 84/18; H04L 5/1469
See application file for complete search history.

(56) References Cited

U.S. PATENT DOCUMENTS

| | | | |
|---|---|---|---|
| 10,595,354 | B1 | 3/2020 | Zhou et al. |
| 10,602,409 | B1 | 3/2020 | Oroskar et al. |
| 10,735,949 | B1 | 8/2020 | Reeves et al. |
| 10,880,895 | B2 | 12/2020 | Gordaychik |
| 2008/0069029 | A1 | 3/2008 | Chow |
| 2008/0232256 | A1 | 9/2008 | Douglas et al. |
| 2009/0180407 | A1 | 7/2009 | Sabat et al. |
| 2010/0232345 | A1 | 9/2010 | Tsai et al. |
| 2010/0260109 | A1 | 10/2010 | Ulupinar et al. |
| 2010/0316092 | A1 | 12/2010 | Hannan et al. |
| 2011/0159802 | A1 | 6/2011 | Binti Harum et al. |
| 2012/0015603 | A1 | 1/2012 | Proctor, Jr. et al. |
| 2013/0072110 | A1 | 3/2013 | Gunnarsson et al. |
| 2013/0279435 | A1 | 10/2013 | Dinan |
| 2014/0226481 | A1 | 8/2014 | Dahod et al. |
| 2015/0131578 | A1 | 5/2015 | Baek et al. |
| 2015/0365880 | A1 | 12/2015 | Malladi et al. |

(Continued)

FOREIGN PATENT DOCUMENTS

WO 2018/175817 A1 9/2018

OTHER PUBLICATIONS

3GGP TSG RAN WG1 NR Ad Hoc Meeting #4, R1-1899289, Vancouver, Canada, Jan. 22-26, 2018 (6 pages).

(Continued)

*Primary Examiner* — Melvin C Marcelo
(74) *Attorney, Agent, or Firm* — Volpe Koenig

(57) ABSTRACT

Among other things, aspects, features, and implementations of wireless mesh networks and wireless mesh network devices are described.

19 Claims, 109 Drawing Sheets

(56) References Cited

U.S. PATENT DOCUMENTS

| | | | |
|---|---|---|---|
| 2018/0063827 | A1 | 3/2018 | Soysal et al. |
| 2018/0367288 | A1 | 12/2018 | Vrzic et al. |
| 2019/0021062 | A1 | 1/2019 | Abedini et al. |
| 2019/0075023 | A1 | 3/2019 | Sirotkin |
| 2019/0103910 | A1 | 4/2019 | Alford et al. |
| 2019/0115972 | A1 | 4/2019 | Braun et al. |
| 2019/0181940 | A1 | 6/2019 | Liang et al. |
| 2020/0007223 | A1 | 1/2020 | Zhu et al. |
| 2020/0119797 | A1 | 4/2020 | Wang et al. |
| 2020/0145093 | A1 | 5/2020 | Cheng et al. |
| 2020/0280409 | A1 | 9/2020 | Grant et al. |
| 2020/0366363 | A1 | 11/2020 | Li et al. |
| 2020/0403689 | A1 | 12/2020 | Rofougaran et al. |

OTHER PUBLICATIONS

3GGP TSG RAN WG1 Meeting #92bis, R1-1803695, Sanya, China, Apr. 16-20, 2018 (6 pages).
3GGP TSG RAN WG1 Meeting #92bis, R1-1804624, Sanya, P.R. China, Apr. 16-20, 2018 (5 pages).
3GGP TSG RAN WG1 Meeting 93, R1-1806664, Busan, Korea, May 21-15m, 2018 (5 pages).
3GPP TSG RAN WG1 Meeting #93, R1-1807396, Busan, Korea, May 21-25, 2018 (9 pages).
3GPP TSG RAN WG1 Meeting #94, R1-1808087, Gothenburg, Sweden, Aug. 20-24, 2018 (8 pages).
3GPP TSG RAN WG1 Meeting #94, R1-1808514, Gothenburg, Sweden, Aug. 20-24, 2018 (12 pages).
3GPP TSG RAN WG1 Meeting #94, R1-1808551, Gothenburg, Sweden, Aug. 20-24, 2018 (3 pages).
3GPP TSG RAN WG1 Meeting #94, R1-1808582, Gothenburg, Sweden, Aug. 20-24, 2018 (5 pages).
3GPP TSG RAN WG1 Meeting #94, R1-1809233, Gothenburg, Sweden, Aug. 20-24, 2018 (3 pages).
3GPP TSG RAN WG1 Meeting #94, R1-1809250, Gothenburg, Sweden, Aug. 20-24, 2018 (4 pages).
3GPP TSG RAN WG1 Meeting #94, R1-1809444, Gothenburg, Sweden, Aug. 20-24, 2018 (6 pages).
3GPP TSG RAN WG1 Meeting #94, R1-1809445, Gothenburg, Sweden, Aug. 20-24, 2018 (6 pages).
3GPP TSG RAN WG1 Meeting #94bis, R1-1810133, Chengdu, China, Oct. 8-12, 2018 (10 pages).
3GPP TSG RAN WG1 Meeting #94bis, R1-1810678, Chengdu, China, Oct. 8-12, 2018 (4 pages).
3GPP TSG RAN WG1 Meeting #94bis, R1-1811258, Chengdu, China, Oct. 8-12, 2018 (8 pages).
3GPP TSG RAN WG1 Meeting #94b, R1-1811259, Chengdu, China, Oct. 8-12, 2018 (8 pages).
3GPP TSG RAN WG1 Meeting #94bis, R1-1811513, Chengdu, China, Oct. 8-12, 2018 (11 pages).
3GPP TSG RAN WG1 Meeting #94bis, R1-1811554, Chengdu, China, Oct. 8-12, 2018 (7 pages).
3GPP TSG RAN WG1 Meeting #95, R1-1812201, Spokane, USA, Nov. 12-16, 2018 (5 pages).
3GPP TSG RAN WG1 Meeting #95, R1-1812202, Spokane, USA, Nov. 12-16, 2018 (7 pages).
3GPP TSG RAN WG1 Meeting #95, R1-1812703, Spokane, WA, USA, Nov. 12-16, 2018 (4 pages).
3GPP TSG RAN WG1 Meeting #95, R1-1812786, Spokane, WA, USA, Nov. 12-16, 2018 (4 pages).
3GPP TSG RAN WG1 Meeting #95, R1-1813419, Spokane, USA, Nov. 12-16, 2018 (7 pages).
3GPP TSG RAN WG1 Meeting #95, R1-1813420, Spokane, USA, Nov. 12-16, 2018 (9 pages).
3GPP TSGA RAN WG1 Meeting #95, R1-1813566, Spokane, U.S., Nov. 12-16, 2018 (6 pages).
3GPP TSG RAN WG1 Meeting #95, R1-1813568, Spokane U.S., Nov. 12-16, 2018 (4 pages).
3GPP TSG-RAN WG2 NR Ad hoc 0118, R2-1800181, Vancouver, Canada, Jan. 22-26, 2018 (3 pages).
3GPP TSG-RAN WG2 NR Ad hoc 1801, R2-1800412, Vancouver, Canada, Jan. 22-26, 2018 (5 pages).
3GPP TSG-RAN WG2 NR Ad hoc 1801, R2-1800413, Vancouver, Canada, Jan. 22-26, 2018 (4 pages).
3GPP TSG-RAN WG2 NR Ad hoc 1801, R2-1800414, Vancouver, Canada, Jan. 22-26, 2018 (3 pages).
3GPP TSG-RAN WG2 NR Ad hoc, R2-1801131, Vancouver, Canada, Jan. 22-26, 2018 (5 pages).
3GPP TSG-RAN WG2 NR Ad hoc 0118, R2-1801348, Vancouver, Canada, Jan. 22-26, 2018 (4 pages).
3GPP TSG-RAN2 NR AH#3, R2-1801428, Vancouver, Canada, Jan. 22-26, 2018 (3 pages).
3GPP TSG-RAN WG2 NR Meeting #102, R2-1807374, Busan, Korea, May 21-25, 2018 (2 pages).
3GPP TSG-RAN WG2 Meeting #102, R2-1807395, Busan, Korea, May 21-25, 2018 (5 pages).
3GPP TSG-RAN WG2 Meeting #102, R2-1807396, Busan, Korea, May 21-25, 2018 (6 pages).
3GPP TSG-RAN WG2 Meeting #102, R2-1807556, Busan, Korea, May 21-25, 2018 (3 pages).
3GPP TSG-RAN WG2 Meeting #102, R2-1807783, Busan, Korea, May 21-25, 2018 (3 pages).
3GPP TSG-RAN WG2 Meeting #102, R2-1808006, Busan, Korea, May 21-25, 2018 (3 pages).
3GPP TSG-RAN WG2 NR AdHoc 1807, R2-1810208, Montreal, Canada, Jul. 2-6, 2018 (4 pages).
3GPP TSG-RAN WG2#NR AH1807, R2-1810451, Montreal, Canada, Jul. 2-6, 2018 (4 pages).
3GPP TSG-RAN WG2 Meeting #103, R2-1812217, Gothenburg, Sweden, Aug. 20-24, 2018 (7 pages).
3GPP TSG-RAN WG3-AH-1801, R3-180831, Athens, Greece, Feb. 26-Mar. 2, 2018 (5 pages).
3GPP TSG-RAN WG3 Meeting #99bis, R3-181945, Sanya, China, Apr. 16-20, 2018 (7 pages).
3GPP TSG-RAN WG3 Meeting #99bis, R3-181946, Sanya, China, Apr. 16-20, 2018 (5 pages).
3GPP TSG-RAN WG3 Meeting #99bis, R3-182076, Sanya, China, Apr. 16-20, 2018 (4 pages).
3GPP TSG-RAN WG3 Meeting #99bis, R3-182247, Sanya, China, Apr. 16-20, 2018 (6 pages).
3GPP TSG-RAN WG3 Meeting #99bis, R3-182272, Sanya, China, Apr. 16-20, 2018 (6 pages).
3GPP TSG-RAN WG3 Meeting #100, R3-182585, Busan, Korea, May 21-25, 2018 (3 pages).
3GPP TSG-RAN WG3 Meeting #100, R3-182806, Busan, Korea, May 21-25, 2018 (3 pages).
3GPP TSG-RAN WG3 Meeting #100, R3-183016, Busan, Korea, May 21-25, 2018 (9 pages).
3GPP TR 38.874, Vs.0.0.1, "Technical Specification Group Radio Access Network; Study on Integrated Access and Backhaul; Release 15", Jan. 2018 (7 pages).
3GPP TR 38.874, Vs.0.0.2, "Technical Specification Group Radio Access Network; Study on Integrated Access and Backhaul; Release 15", Feb. 2018 (11 pages).
3GPP TR 38.874, V0.1.0, "Technical Specification Group Radio Access Network; Study on Integrated Access and Backhaul; Release 15", Feb. 2018 (11 pages).
3GPP TR 38.874, V0.1.1, "Technical Specification Group Radio Access Network; Study on Integrated Access and Backhaul; Release 15", Mar. 2018 (12 pages).
3GPP TR 38.874, V0.2.1, "Technical Specification Group Radio Access Network; Study on Integrated Access and Backhaul; Release 15", May 2018 (19 pages).
3GPP TR 38.874, V0.3.2, "Technical Specification Group Radio Access Network; Study on Integrated Access and Backhaul; Release 15", Jun. 2018 (39 pages)>.
3GPP TR 38.874, V0.5.0, "Technical Specification Group Radio Access Network; Study on Integrated Access and Backhaul; Release 15", Oct. 2018 (70 pages).

(56) References Cited

OTHER PUBLICATIONS

3GPP TR 38.874, V0.6.1, "Technical Specification Group Radio Access Network; Study on Integrated Access and Backhaul; Release 15", Nov. 2018 (90 pages).
3GPP TR 38.874, V0.6.2, "Technical Specification Group Radio Access Network; Study on Integrated Access and Backhaul; Release 15", Nov. 2018 (91 pages).
U.S. Appl. No. 62/583,838, filed Nov. 9, 2017, Expired.
U.S. Appl. No. 62/619,470, filed Jan. 19, 2018, Pending.
U.S. Appl. No. 62/656,597, filed Apr. 12, 2018, Pending.
U.S. Appl. No. 62/672,903, filed May 17, 2018, Pending.
U.S. Appl. No. 62/741,050, filed Oct. 4, 2018, Pending.
U.S. Appl. No. 16/183,219, filed Nov. 7, 2018, Pending.
U.S. Appl. No. 16/249,033, filed Jan. 16, 2019, Pending.
U.S. Appl. No. 16/378,317, filed Apr. 8, 2019, Pending.
U.S. Appl. No. 16/543,436, filed Aug. 16, 2019, Pending.
USPTO transaction history for U.S. Appl. No. 16/249,033.
USPTO transaction history for U.S. Appl. No. 16/378,317.
USPTO transaction history for U.S. Appl. No. 16/543,436.

720

721
Report Configuration #1
Semi-Persistent CRI/RSRP
Reporting Time Occasion: A
PUCCH Resource: #1
PUCCH Spatial Rel: NZP-CSI-RS #1

CSI Resource Config 1
Semi-Persistent

Resource Set #1

NZP-CSI-RS #1
NZP-CSI-RS #2

722
Report Configuration #2
Semi-Persistent CRI/RSRP
Reporting Time Occasion: B
PUCCH Resource: #2
PUCCH Spatial Rel: NZP-CSI-RS #2

CSI Resource Config 1
Semi-Persistent

Resource Set #1

NZP-CSI-RS #1
NZP-CSI-RS #2

723
Report Configuration #3
Semi-Persistent CRI/RSRP
Reporting Time Occasion: A
PUCCH Resource: #1
PUCCH Spatial Rel: NZP-CSI-RS #1

CSI Resource Config 2
Semi-Persistent

Resource Set #2

NZP-CSI-RS #3
NZP-CSI-RS #4

724
Report Configuration #4
Semi-Persistent CRI/RSRP
Reporting Time Occasion: B
PUCCH Resource: #2
PUCCH Spatial Rel: NZP-CSI-RS #2

CSI Resource Config 2
Semi-Persistent

Resource Set #2

NZP-CSI-RS #3
NZP-CSI-RS #4

725

726
Report Configuration #5
Semi-Persistent CRI/CQI/PMI/RI
Reporting Time Occasion: A
PUCCH Resource: #3
PUCCH Spatial Rel: NZP-CSI-RS #1

CSI Resource Config 1
Semi-Persistent

Resource Set #1

NZP-CSI-RS #1
NZP-CSI-RS #2

727
Report Configuration #6
Semi-Persistent CRI/CQI/PMI/RI
Reporting Time Occasion: B
PUCCH Resource: #4
PUCCH Spatial Rel: NZP-CSI-RS #2

CSI Resource Config 1
Semi-Persistent

Resource Set #1

NZP-CSI-RS #1
NZP-CSI-RS #2

Figure 72

| 4 | 1 | 0 | 3 | 2 | 4 | 1 | 0 |
|---|---|---|---|---|---|---|---|
| 3 | 2 | 4 | 1 | 0 | 3 | 2 | 4 |
| 1 | 0 | 3 | 2 | 4 | 1 | 0 | 3 |
| 2 | 4 | 1 | 0 | 3 | 2 | 4 | 1 |
| 0 | 3 | 2 | 4 | 1 | 0 | 3 | 2 |
| 4 | 1 | 0 | 3 | 2 | 4 | 1 | 0 |
| 3 | 2 | 4 | 1 | 0 | 3 | 2 | 4 |
| 1 | 0 | 3 | 2 | 4 | 1 | 0 | 3 |

Figure 74

MP Transmits or Receives on each Antenna Panel

WIRELESS MESH NETWORK

This application is entitled to the benefit of the priority of the filing dates of U.S. patent application Ser. 62/583,838, filed Nov. 9, 2017, U.S. patent application Ser. 62/619,470, filed Jan. 19, 2018, U.S. patent application Ser. 62/656,597, filed Apr. 12, 2018, U.S. patent application Ser. 62/672,903, filed May 17, 2018, and U.S. patent application Ser. 62/741,050 filed Oct. 4, 2018, all incorporated here by reference.

BACKGROUND

This description relates to wireless mesh networks.

Fifth Generation New Radio (5G NR) is an emerging wireless access standard currently being developed by the $3^{rd}$ Generation Partnership Project (3GPP). 5G NR will significantly expand the capabilities of the Fourth Generation (4G) wireless access standard known as Long Term Evolution (LTE) by enabling new applications and providing higher speeds and capacity. 5G NR will support operation in high frequency bands above 6 GHz, including millimeter wave (mm wave) bands, which offer large swaths of unused spectrum. The first release of the 5G NR specifications (3GPP Release 15), expected in 2018, will support operation in wider channel bandwidths (up to 400 MHz) that are 20 times larger than the widest bandwidth supported in LTE, and support operation at frequencies up to about 40 GHz. Future releases of 5G NR (3GPP Release 16 and beyond) are expected to support even wider bandwidths and higher frequency bands.

In these high frequency bands, RF signals encounter high path loss, which is sometimes further exacerbated by atmospheric effects such as rain attenuation or blockage due to buildings, trees or even people located between the transmitter and receiver. To overcome such high loss, 5G NR will include massive MIMO (Multiple Input Multiple Output) capabilities where large antenna arrays with tens and possibly hundreds of antenna elements are used to create narrow high-gain antenna beams (pencil beams) at the transmitter (Tx) and receiver (Rx). The small radio wavelengths at these high frequencies reduce the physical size of these antenna arrays and make it feasible to fit them into a small form factor. Massive MIMO using pencil beams also reduces interference to other users and allows multiple simultaneous transmissions and receptions; i.e., Multi-User MIMO.

Even with massive MIMO, 5G NR systems when deployed at frequencies above 6 GHz require a very dense deployment of Base Stations (BSs), herein referred to as Access Points (APs), or fiber-fed Radio Nodes (RNs). The susceptibility of these systems to blockage will also require over-building of APs/RNs in order to provide RF link redundancy. In outdoor high-density population centers where such systems will find high demand, deployment of APs or RNs in every street corner is difficult and costly. Site acquisition and backhaul are probably the most significant contributors to cost. Therefore, there is a need for a new wireless system that can enable the deployment of wireless networks at a low cost and low complexity.

Wireless mesh networking is an increasingly popular method for residential WiFi networks that operate on unlicensed spectrum using a carrier-sense multiple access (CSMA) protocol. By using wireless links to carry (backhaul) traffic between APs, WiFi mesh networks improve WiFi coverage in homes without requiring new equipment or new cabling. In the past mesh networking has not found much use in cellular networks, which operate on licensed spectrum and use scheduler-based multiple access, because usable licensed spectrum has been very scarce and mesh networks based on earlier wireless technologies were spectrally inefficient.

Here we describe novel mesh network systems and methods for cellular networks that are spectrally efficient and can be deployed easily in higher frequency bands (e.g., mm wave frequency bands).

SUMMARY

In general, in an aspect, a wireless mesh network includes a first mesh node, a first user device, a second user device, and a mesh gateway facility. The gateway facility, the first mesh node, and the first and second user devices include processors and storage for instructions executable by the processors to (a) establish a first wireless backhaul link between the first mesh node and the gateway facility, a wireless access link between the first user device and the gateway facility, and a wireless access link between the second user device and the first mesh node, (b) enable the gateway facility to schedule transmissions between the gateway facility and the first user device and between the gateway facility and the first mesh node, (c) upon scheduling transmissions in a time interval up to time t, to send a first control message to the first mesh node at a time t≤t, and enable the first mesh node to schedule transmissions between the first mesh node and the second user device, and (d) upon receiving the control message from the gateway facility, to schedule transmissions in a time interval up to time t.

Implementations may include one or a combination of two or more of the following features. The gateway facility includes a mesh gateway. The first mesh node includes a first mesh point. The first user device and the second user device are user equipments. The control message sent by the processor of the gateway facility includes information about wireless link resources allocated by the scheduling. The wireless link resources include airlink resources. The first mesh node schedules transmissions to avoid interference in transmissions with the gateway facility. The mesh network of claim includes a second mesh node having a processor and storage for instructions executable by the processor to establish a second wireless backhaul link with the first mesh node. The second mesh node includes a mesh point. The mesh network includes a third user device having a processor and storage for instructions executable by the processor to establish a wireless access link with the second mesh node. The first mesh node schedules transmissions to and from the second mesh node on a second backhaul link. The second mesh node schedules transmissions to and from the third user device. Upon scheduling transmissions in a time interval up to time t, the first mesh node sends a control message to the second mesh node at a time t≤t. Upon receiving the control message from the first mesh node, the second mesh node schedules transmissions in a time interval up to time t.

In general, in an aspect, a wireless mesh network includes a first mesh node having a first coverage area, and a gateway to an operator core network that is configured for handling user plane data. The gateway and the first mesh node include processors and storage for instructions executable by the processors to establish: a wireless backhaul link from the first mesh node to the gateway, a wireless access link from a first user device in the first coverage area to the first mesh node, a set of airlink protocol layers executed by the user device and by the mesh network for communication on the wireless access link, processing the airlink protocol layers partially in the first mesh node and partially in the gateway, tunneling facilities to carry partially processed user plane data between the first device through the first mesh node to the gateway.

Implementations may include one or a combination of two or more of the following features. The instructions are executable to cause the first mesh node to establish the backhaul link, the first user device to establish the wireless access link, and the first mesh node to establish the tunnel to the gateway, and the gateway to establish the corresponding tunnel to the core network. The first mesh node includes a first mesh point, the second mesh node includes a second mesh point, and the gateway includes a mesh point gateway. A second mesh node has a second coverage area and a second user device in the second coverage area. The second mesh node and the second device have processors and storage for instructions executable to establish: a wireless backhaul link with the first mesh node, a wireless access link with the second mesh node, processing the airlink protocol layers partially in the first mesh node and partially in the gateway, and tunneling facilities to carry partially processed user plane data between the second device through the second mesh node to the gateway. A second mesh node has a second coverage area and a second user device in the second coverage area, the second mesh node and the second device having processors and storage for instructions executable to establish: a wireless backhaul link with the first mesh node, a wireless access link with the second mesh node, processing the airlink protocol layers partially in the first mesh node and partially in the gateway, and tunneling facilities to carry partially processed user plane data between the second device through the second mesh node to the first mesh node. The instructions are executable to cause the second mesh node to establish the backhaul link, the second user device to establish the wireless access link, the second mesh node to establish the tunnel to the first mesh node, and the gateway to establish the corresponding tunnel to the core network. A third mesh node has a third coverage area, a processor, and storage for instructions, the stored instructions executable by the processors to: establish a wireless backhaul link of the third mesh node with the gateway, initiate a handover procedure by the first mesh node with the gateway when the first user device moves from the coverage area of the first mesh node to the coverage area of the third mesh point, update the tunneling facilities to carry the user plane data of the first user device from the third mesh node to the gateway, and cause the first user device to continue to send and receive user plane data to and from the core network using the tunneling facilities between the gateway and the core network.

In general, in an aspect, a wireless mesh network includes a gateway and a first mesh node having processors and storage for instructions executable by the processors to establish a wireless backhaul link of the first mesh node with the gateway, establish a direct Internet Protocol link of the first mesh node with an end-user device, implement a user device emulator of the first mesh node to translate the IP packets of the end-user device into a format consistent with a packet format used by the first mesh node and to send the translated IP packets to the gateway.

Implementations may include one or a combination of two or more of the following features. The first mesh node includes a first mesh point and the gateway includes a second mesh point gateway. The direct Internet protocol link is established by the first mesh node. The user device emulator is implemented to translate user plane data of the end-user device received from the gateway into IP packets and forward them to the end user device over the IP link. The user device emulator includes a client to connect to a base station for dual connectivity. The client includes an LTE client and the base station includes an LTE base station. The user device emulator generates Non-Access Stratum (NAS) messages to communicate with a control node in a core network. The wireless mesh network includes a USIM module.

In general, in an aspect, a wireless mesh network includes a gateway and a first mesh node having processors and storage for instructions executable by the processors to: establish a wireless backhaul link of the first mesh node with the gateway, establish a wireless access link of a first user device with the first mesh node, cause the first mesh node simultaneously to receive downlink transmissions from the gateway on the wireless backhaul link and to receive uplink transmissions from the first user device, send a timing advance message to the first user device to align a timing phase of a signal received from the user device to a timing phase of the downlink transmission, simultaneously send uplink transmissions to the gateway and send downlink transmissions to the user device, adjust a timing phase of a signal sent to the gateway based on a timing advance received from the gateway, align a timing phase of the downlink signal sent to the user device to a timing phase of the uplink transmission to the gateway.

In general, in an aspect, a wireless mesh network includes a gateway, a first mesh node, and a mesh network manager having processors and storage for instructions executable by the processors to: establish a communication link of the first mesh node with the mesh network manager, enable the mesh node to transmit to and receive from the gateway and to transmit to and receive from one or more user devices, the transmission occurring on two or more spatial beams, and cause the mesh node and the mesh network manager to communicate with respect to the use by the mesh node of the spatial beams.

Implementations may include one or a combination of two or more of the following features. The communication link is established by the first mesh node. The instructions are executable to cause the mesh node to send control information to the mesh network manager, and for the mesh node to receive instructions from the mesh network manager. The instructions are executable to cause the mesh network manager to instruct the mesh node to turn off all transmissions on the mesh network.

In general, in an aspect, a wireless mesh network includes a gateway, a first mesh node inside a vehicle and a mesh network manager having processors and storage for instructions executable by the processors to: establish a communication link of the mesh node with the mesh network manager, establish a backhaul link of the mesh node with the gateway, cause the mesh node to collect navigation information from the vehicle about one or more of its location, speed, and direction, and to report the navigation information to the mesh network manager, cause the mesh network manager to use the navigation information to determine instructions to send to the mesh node.

Implementations may include one or a combination of two or more of the following features. The instructions determined by the mesh network manager are instructions to control the operational state of the mesh node. The communication link is established by the mesh node, the backhaul link is established by the mesh node the navigation information is collected by the mesh node, and the reporting is done by the mesh node.

In general, in an aspect, a wireless mesh network includes a first mesh node, a second mesh node and a mesh gateway facility, the gateway facility, the first mesh node, and the second mesh node includes processors and storage for instructions executable by the processors to broadcast from the gateway facility, the first mesh point, and the second mesh point hop-distance information, second mesh point selects the node to connect based on the hop-distance information.

Implementations may include one or a combination of two or more of the following features. The broadcast uses the G Master Information Block (MIB). The broadcast uses the G System Information Block (SIB).

In general, in an aspect, a wireless mesh network includes a first mesh node having a first coverage area, a second mesh point having a second coverage area, and a gateway to an operator core network that is configured for handling user plane data. The gateway and the first mesh node include processors and storage for instructions executable by the processors to establish: a first wireless backhaul link from the first mesh node to the gateway, a second wireless backhaul link from the second mesh node to the first mesh node, a wireless access link from a first user device in the second coverage area to the second mesh node, tunneling facilities to carry user plane data between the first device and the operator core network through a first tunnel between the second mesh node and the gateway and a second tunnel between the gateway and core network.

Implementations may include one or a combination of two or more of the following features. The first tunnel is an IP tunnel and the first mesh node performs IP routing.

In general, in an aspect, a wireless mesh network includes a mesh network controller connected to a core network, a radio node linked to the controller, and a mesh node linked to the controller through the radio node, the controller, the radio node, and the mesh node including processors and storage for instructions executable by the processors to establish: airlink protocol layers executed by a user device and by the mesh network for communication on a wireless access link, the airlink protocol layers being processed partially in the mesh node and partially in the controller, and tunneling facilities to carry partially processed data between the user device and the controller through the mesh node and through the radio node.

Implementations may include one or a combination of two or more of the following features. The wireless communication between the mesh node and the radio node occurs on the same frequency channel as the wireless communication on an access link between the user device and the mesh node. The airlink protocol layers partially processed by the mesh node include the physical layer, the medium access control layer, and the radio link layer. The airlink protocol layers partially processed by the mesh node include the physical layer, the medium access control layer and the lower sublayer of the radio link control protocol. The airlink protocols partially processed by the controller include the Packet Data Convergence Protocol. The airlink protocols partially processed by the controller include the upper sublayer of the radio link layer. The lower sublayer of the radio link layer protocol includes RLC SDU segmentation in downlink transmissions. The upper sublayer of the radio link layer protocol includes ARQ retransmissions. The upper sublayer of the radio link layer protocol includes reassembly of RLC SDUs in uplink transmissions. The controller tunnels a first RLC PDU for the user device to the mesh node and the mesh node modifies the RLC PDU by segmenting the payload and updating the RLC PDU header before transmitting the new RLC PDU to the user device. The airlink protocol layers for the wireless communication between the mesh node and the radio node are partially processed by the radio node and partially processed by the controller. The tunneling facilities in the mesh node tunnel packets of the user device to the controller using a link between the mesh node and the controller. The mesh node processes the Packet Data Convergence Protocol airlink protocol layer for the wireless link to the radio node. The Packet Data Convergence Protocol processing includes ciphering for the wireless link to the radio node. The mesh node uses the wireless link to tunnel partially processed data of the user device, and the ciphering for the wireless link to the radio node is applied only to tunnel headers added by the mesh node. The ciphering is not applied to the partially processed data of the user device. The processing in the controller includes Packet Data Convergence Protocol processing for the user device and Packet Data Convergence Protocol processing for the mesh node. The Packet Data Convergence Protocol processing for the mesh node includes ciphering for the link to the mesh node. The ciphering is applied only to the tunnel header. The ciphering is not applied to the partially processed data of the user device. The Packet Data Convergence Protocol processing in the controller includes Header Compression. A second mesh node has a second coverage area and a fronthaul link to the controller, and the first and second mesh nodes advertise different Physical Cell Identifiers. When the user device moves from a coverage area of the first mesh node to a coverage area of the second mesh node, the controller performs a handover of the user device from the first mesh node to the second mesh node, without requiring any control communications with the core network. The instructions are executable by the processors to cause the controller to receive RRC measurement reports from the user device via the first mesh node and the radio node, establish a user device context in the second mesh node, terminate the tunneling of partially processed data of the user device to the first mesh node, start the tunneling of partially processed data of the user device to the second mesh node, and reconfigure the user device via the first mesh node to prepare for transmission to and reception from the second mesh node. A second radio node has a second coverage area, and the first and second radio nodes advertise different Physical Cell Identifiers. When the first mesh node moves from the coverage area of the first radio node to the coverage area of the second radio node, the instructions are executable by the processors to cause the controller to receive RRC measurement reports from the mesh node via the first radio node, establish a mesh node context in the second radio node, terminate the tunneling of partially processed data of the mesh node to the first radio node, start the tunneling of partially processed data of the mesh node to the second radio node, reconfigure the mesh node via the first radio node to prepare for transmission to and reception from the second radio node, and continue the tunneling of partially processed data of the user device to the mesh node without requiring any RRC reconfiguration of the user device. A second mesh node has a second coverage area and a second link to the controller, the first and second mesh nodes advertise the same Physical Cell Identifiers, and the airlink protocol layers processed by the first and second mesh nodes include the medium access control layer. The medium access control layer includes the scheduling and Hybrid ARQ functions. The airlink protocol layers partially processed by the first mesh node also include the physical layer and the lower sublayer of the radio link control layer. When the user device moves from the coverage area of the first mesh node to the coverage area of the second mesh node, the mesh network performs a handover of the user device from the first mesh node to the second mesh node without requiring any RRC reconfiguration of the user device. The instructions are executable to cause the controller to receive physical layer measurement reports, transfer the context of the user device from the first mesh node to the second mesh node, terminate the tunneling of partially processed data of the user device to the first mesh node, start the tunneling of partially processed data of the user device to the second mesh node, and in which the first user device transmits to and receives from the second mesh node in the same cell without requiring any RRC reconfiguration. The physical layer measurement reports are measurement reports received from the user device based on CSI-RS or SSB. The physical layer measurement reports include measurement reports received from the mesh nodes based on Sounding Reference Signals sent by the user device. A second radio node has a second coverage area, the first and second radio node advertise the same Physical Cell Identifiers as the mesh nodes, and when the first mesh node moves from the coverage area of the first radio node to the coverage area of the second radio node, the instructions are executable to cause the controller to receive physical layer measurement reports, transfer a mesh node context from the first radio node to the second radio node, terminate the tunneling of partially processed data of the mesh node to the first radio node, start the tunneling of partially processed data of the mesh node to the second radio node, and in which the mesh node transmits to and receive from the second mesh node without requiring any RRC reconfiguration. The physical layer measurements include measurement reports sent by the mesh node based on CSI-RS. The physical layer measurements are measurement reports sent by the radio nodes based on Sounding Reference Signals sent by the mesh node.

In general, in an aspect, a wireless mesh network includes a mesh network controller connected to a core network, radio nodes, and mesh nodes. The mesh nodes and radio nodes broadcast signals that carry information to enable user devices to connect to the mesh network, a link is present from each mesh node to the controller through a radio node, the signals that the mesh nodes and radio nodes broadcast carry the same information, a user device listens to the broadcast information and determines parameters for accessing the mesh network using a random access channel, a user device sends a random access preamble to the mesh network, one or more mesh nodes and radio nodes receive the preamble and forward an identifier of the preamble along with reception quality to the controller using the link, for each distinct preamble identifier received from the mesh node, the controller selects the one with a highest reception quality and sends a random access response indication to the selected mesh node, and the mesh node that receives the RAR indication forms a Random Access Response and transmits it to the user device.

In general, in an aspect, a wireless network includes a mesh network controller connected to a core network and a first and second radio node linked to the controller. The first and second radio nodes advertise the same Physical Cell Identifiers. The controller, the first and second radio node include processors and storage for instructions executable by the processors to establish: airlink protocol layers executed by a user device and by the wireless network for communication on a wireless access link, the airlink protocol layers being processed partially in the radio nodes and partially in the controller, where the airlink protocol layers processed by the first and second radio nodes include the medium access control layer tunneling facilities to carry partially processed data between the user device and the controller through the radio node.

Implementations may include one or a combination of two or more of the following features. The medium access control layer includes the scheduling and Hybrid ARQ functions. The airlink protocol layers partially processed by the first radio node also include the physical layer and the lower sublayer of the radio link control layer. When the user device moves from the coverage area of the first radio node to the coverage area of the second radio node, the mesh network performs a handover of the user device from the first radio node to the second radio node without requiring any RRC reconfiguration of the user device. The instructions are executable to cause the controller to receive physical layer measurement reports, transfer the context of the user device from the first radio node to the second radio node, terminate the tunneling of partially processed data of the user device to the first radio node, start the tunneling of partially processed data of the user device to the second radio node, and in which the first user device transmits to and receives from the second radio node in the same cell without requiring any RRC reconfiguration. The physical layer measurement reports are measurement reports received from the user device based on CSI-RS or SSB. The physical layer measurement reports include measurement reports received from the radio nodes based on Sounding Reference Signals sent by the user device. The controller triggers the handover based on the difference in the hop distance of the mesh nodes. The controller triggers the handover based on the difference in the hop distance of the radio nodes.

In general, in an aspect, a wireless mesh network includes a mesh network controller connected to a core network, a radio node linked to the controller, a first mesh node linked to the controller through the radio node, and a second mesh node linked to the controller through the first mesh node and through the radio node. The controller, the radio node, and the mesh nodes include processors and storage for instructions executable by the processors to establish: protocol layers executed by a user device and by the mesh network for communication on a wireless access link to the second mesh node, the protocol layers including airlink protocol layers processed partially in the second mesh node and partially in the controller, and tunneling facilities to carry partially processed data between the user device and the controller through the mesh nodes and through the radio node.

Implementations may include one or a combination of two or more of the following features. The protocol layers executed in the first mesh node and the controller for the tunneling facilities are suppressed. The suppressed airlink protocol layers executed in the first mesh node include GTP-U, UDP, IP and PDCP. The first mesh node routes a packet received from the radio node to the second mesh node based on an address of the second mesh node included in the received packet. The address of the second mesh node is based on the GTP-U TEID of the suppressed GTP-U protocol. The first mesh node maintains a mapping between an address of the second mesh node and the second mesh node's C-RNTI. The first and second mesh node advertise the same PCI, and the protocol layers executed in the first mesh node and the controller for the tunneling facilities are suppressed. The suppressed protocol layers include GTP-U, UDP, IP, PDCP and an upper-layer of the radio link layer. The first mesh node routes a packet received from the radio node to the second mesh node based on an address of the second mesh node included in the received packet. The address of the second mesh node is based on the GTP-U TEID of the suppressed GTP-U protocol. The first mesh node maintains a mapping between an address of the second mesh node and the second mesh node's C-RNTI.

In general, in an aspect, a wireless mesh network includes a mesh network controller connected to a core network, a radio node linked to the controller, a first mesh node linked to the controller through the radio node, and a second mesh node linked to the controller through the first mesh node and through the radio node. The controller, the radio node, and the mesh nodes include processors and storage for instructions executable by the processors to establish: the radio node and the mesh nodes as schedulers to schedule transmissions on their access links and downstream links, and the MNC as sending a time-division frame format to the radio nodes and mesh nodes to coordinate the operation of the schedulers.

Implementations may include one or a combination of two or more of the following features. The time-division frame format sent by the MNC allows the mesh nodes to schedule transmissions on their access links in one group of OFDM symbols. The time-division frame format sent by the MNC instructs the first mesh node to not schedule any transmissions on its backhaul link in one group of time slots or instructs the second mesh node to not schedule any transmissions in a second group of time slots different from the first group or both. The time-division frame format sent by the MNC allows the mesh nodes to schedule transmissions on their access links in a group of OFDM symbols, and instructs the first mesh node to not schedule any transmissions on its backhaul link to the second mesh node in one group of time slots or instructs the second mesh node to not schedule any transmissions on its access link on any OFDM not included in the group of OFDM symbols in a second group of time slots different from the first group of time slots or both. The MNC determines the time-division frame format based on data demand measurements collected by the MNC and radio nodes and updates the time-division frame format dynamically. The MNC updates the time-division frame format based on feedback received from the mesh nodes. The MNC determines the time-division frame format based on information provided by a neural network processing engine. The information provided by the neural network processing engine includes a probability vector. The MNC neural network processing engine uses a recurrent neural network algorithm. The recurrent neural network algorithm uses long-short-term-memory cells. The time-division frame format determined by the MNC allocates some time slots to schedulers in even-hop nodes, allocates some time slots to schedulers in odd-hop nodes, and leaves some time slots as flexible. All time slots are left as flexible. The radio node and the mesh nodes use pipelined scheduling.

In general, in an aspect, a wireless mesh network includes a mesh network controller connected to a core network, a radio node linked to the controller, a first mesh node linked to the controller through the radio node, and a second mesh node linked to the controller through the first mesh node and through the radio node. The controller, the radio node, and the mesh nodes including processors and storage for instructions executable by the processors to cause: the radio node and the mesh nodes to advertise the same PCI and to transmit periodic reference signals on their access links in the same OFDM symbols.

Implementations may include one or a combination of two or more of the following features. The radio node and mesh nodes are configured by the mesh network controller and the periodic reference signals include CSI reference signals. The periodic reference signals are transmitted by the first and second mesh node using transmit beams with little coverage overlap. The mesh network controller configures the user device to receive the periodic reference signal transmitted by a mesh node. The controller configures the user device to transmit a sounding reference signal using a transmit beam based on a specific CSI reference signal. The controller configures the first mesh node to receive an aperiodic CSI reference signal from the radio node and configures the second mesh node to receive another aperiodic CSI reference signal from the first mesh node, and the transmissions of the two reference signals are time-division multiplexed. The two reference signals are time-division multiplexed based on a TDM frame format provided by the controller. The two reference signals are time-division multiplexed using pipelined scheduling. The controller determines a beam index of the CSI reference signals based on information provided by a neural network processing engine. The information provided by the neural network processing engine includes a probability vector. The neural network processing engine uses a recurrent neural network to compute the probability vector. The controller uses statistical guidance received from the neural network processing engine to select a subset of available beam indices. The subset of available beam indices is used to configure a user device. The subset of the available beam indices is used to configure a mesh node.

In general, in an aspect, a wireless mesh network includes a mesh network controller connected to a core network, a radio node linked to the controller, a first mesh node linked to the controller through the radio node, and a second mesh node linked to the controller through the first mesh node and through the radio node. The controller, the radio node, and the mesh nodes including processors and storage for instructions executable by the processors to apply information provided by deep learning in operation of the either or both of the mesh nodes or the radio node to control flow of packets in the mesh network.

Implementations may include one or a combination of two or more of the following features. The operation to control flow of packets in the mesh network includes beam management based on information provided by the deep learning. The operation to control flow of packets in the mesh network includes scheduler coordination. The deep learning includes artificial intelligence algorithms. The deep learning includes neural network algorithms. The deep learning includes prediction of data demand. The deep learning is based on measurements of transmission power.

In general, in an aspect, a wireless mesh network includes a radio node coupled to a core network. One or more mesh nodes are linked to the radio node. The radio node and the one or more mesh nodes include processors and storage for instructions executable by the processors to: (a) establish a wireless access link of a first user device with the first mesh node, (b) cause the first mesh node simultaneously to receive downlink transmissions from the radio node and to receive uplink transmissions from the first user device, (c) simultaneously send uplink transmissions to the radio node and send downlink transmissions to the user device, (d) align a timing phase of uplink transmissions received from the user device or one or more of the mesh nodes to a timing phase of the downlink transmissions received from the radio node, (e) adjust a timing phase of uplink transmissions sent to the radio node, and (f) align a timing phase of the downlink transmissions sent to the user device to a timing phase of the uplink transmissions to the radio node.

Implementations may include one or a combination of two or more of the following features. The instructions are executable by the processors to align the timing phase of the uplink transmissions received from the user device or the one or more of the mesh nodes based on a first timing advance message. The instructions are executable by the processors to adjust the timing phase of the uplink transmissions sent to the radio node based on a second timing advance received from the radio node. The second timing advance is the sum of a fixed value and a variable value. The variable value corresponds to a round-trip delay between the mesh node and the radio node. The fixed value is chosen to provide guard time during transitions from transmitting to receiving or from receiving to transmitting or both. The fixed value is chosen to reduce a timing offset between DL transmissions of the radio node and the DL transmissions of the one or more mesh nodes. The one or more mesh nodes include a second mesh node linked through the first mesh node to the radio node. The downlink transmissions are received by a first mesh node from the radio node on a first wireless backhaul link and the uplink transmissions are received from a second mesh node on a second wireless backhaul link. The timing phase of the uplink transmissions received from the second mesh node are aligned to the timing phase of the downlink transmissions. The second timing advance is the sum of a fixed value and a variable value. The variable value corresponds to round-trip delay between the mesh node and the radio node. The fixed value is chosen to provide guard time during transitions from transmitting to receiving and from receiving to transmitting. The fixed value is chosen to reduce the timing offset between DL transmissions of the radio node and the DL transmissions of the mesh nodes.

In general, in an aspect, a wireless mesh network includes a first radio node and a second radio node coupled to the core network. The first mesh node and a second mesh node are linked respectively to the first radio node and the second radio node. The first mesh node and the second mesh node schedule DL or UL transmissions respectively to a first user device and a second user device. At least the first mesh node selectively schedules DL or UL transmissions respectively on designated time resources for DL or UL transmissions.

Implementations may include one or a combination of two or more of the following features. The designated time resources are free of cross-link interference with the second mesh node. The first mesh node determines when to schedule transmissions on cross-link interference-free time resources based on beam measurements with the second mesh node. The first mesh node determines when to schedule transmissions on cross-link interference-free time resources based on HARQ feedback received from the first user device. The first mesh node determines when to schedule transmissions on cross-link interference-free time resources based on DL or UL load information received from the controller. The first mesh node determines when to schedule transmissions on cross-link interference-free time resources based on an estimate of the location of the first user device. The first and second mesh nodes schedule DL transmissions on a first set of frequency resources and schedule UL transmissions on a second set of frequency resources.

In general, in an aspect, a wireless mesh network includes a radio node coupled to a core network. A mesh node includes antenna panels linked to the radio node, and a self-interference measurement module configured to simultaneously receive a transmission from the radio node on one panel and transmit to a user device on another panel based on an output of the self-interference measurement module.

Implementations may include one or a combination of two or more of the following features. The mesh node cancels self-interference only in the digital domain. The self-interference measurement module measures the self-interference when one of the antenna panels transmits on a transmitter antenna beam and another of the antenna panels receives on a receiver antenna beam. The mesh node maintains a table of prohibited beam pairs. The prohibited beam pairs correspond to transmitter and receiver beams on different antenna panels. The mesh node schedules a transmission and a reception on different antenna panels using different time resources when the table of prohibited beam pairs includes an entry corresponding to the transmitter and receiver beams of the transmission and reception. The mesh node schedules a transmission from one antenna panel using a transmitter beam and the self-interference measurement module measures the self-interference in other antenna panels using selected receiver beams. The mesh node further establishes: airlink protocol layers executed by the mesh node and the mesh network to carry backhaul traffic between the mesh node and the controller. The airlink protocol layers include a physical layer, a medium access layer and a radio link control layer being processed in the radio node. Relaying, facilities forward RLC SDUs of the mesh node to the next hop using an address field in the RLC SDU. The radio link control layer uses the Unacknowledged Mode. The tunneling facilities include a GTP/UDP/IP tunnel. The address field in inserted by the controller.

In general, in an aspect, a wireless network includes radio nodes linked to a network controller connected to a core network and transmitting Synchronization Signal Blocks (SSB) burst sets including two or more SSB transmissions at corresponding SSB time occasions. All radio nodes transmit the same SSB on each time occasion. The radio nodes use respective spatial transmit filters to transmit the SSBs in an SSB burst set. The radio nodes select the spatial transmit filters to reduce the probability that a user device can strongly receive more than one SSB transmission at each time occasion.

Implementations may include one or a combination of two or more of the following features. A mesh node is linked to the controller through a radio node and transmits the same SSB on the same time occasions as the radio nodes. The radio nodes apply a fixed offset to the beam angle of spatial transmit filters used for the SSB transmissions relative to spatial transmit filters used by neighbor RADIO nodes. The radio nodes determine the offset based on information received from the controller. The radio nodes further include orientation sensors to determine an orientation of the radio node. Each of the radio nodes further includes a GPS receiver to determine its position. The controller determines the information based on side information received from the radio nodes. The side information includes at least one of an orientation and GPS coordinates of the radio node.

In general, in an aspect, a wireless network includes radio nodes linked to a network controller connected to a core network and transmitting Synchronization Signal Blocks (SSB) burst sets including two or more SSB transmissions at corresponding SSB time occasions divided into groups. Each radio node is assigned to a group and transmits SSBs only at time occasions of its assigned group. The wireless network of claim further including a mesh node linked to the controller through a radio node, also assigned to a group, and transmitting SSBs only at time occasions of its assigned group. The radio nodes are assigned to a group based on information received from the controller. The controller determines the group assignment based on signal measurements received from radio nodes.

In general, in an aspect, a wireless network includes multiple radio nodes linked to a network controller, and transmits Synchronization Signal Blocks (SSB) burst sets. Upon receiving a PRACH from a user device, the radio node sends the user device a random access response message without exchanging any control messages with the controller.

Implementations may include one or a combination of two or more of the following features. The random access response message includes a temporary C-RNTI selected from a C-RNTI pool assigned to the radio node by the controller.

In general, in an aspect, a wireless network includes multiple radio nodes linked to a network controller connected to a core network and transmitting Synchronization Signal Blocks (SSB) burst sets. Upon receiving a Connection Request from a user device, the radio node sends the user device a ConnectionSetup message without exchanging any control messages with the controller.

Implementations may include one or a combination of two or more of the following features. The ConnectionSetup message is generated by an RRC proxy in the radio node.

In general, in an aspect, a wireless network includes a first radio node and a second radio node linked to a network controller connected to a core network. First Synchronization Signal Blocks (SSB) burst sets are transmitted having the same first Physical Cell Identifier (PCI). One or more other radio nodes transmit second Synchronization Signal Blocks (SSB) burst sets having different Physical Cell Identifiers than the first PCI. A user device is configured to report RRC measurements based on the second SSB burst sets and is configured to be served by the wireless network based on the first SSB burst sets.

Implementations may include one or a combination of two or more of the following features. The radio nodes advertise the same PCI by transmitting SSB burst sets. A user device is configured by the controller to transmit a sounding reference signal set at one or more time occasions. Each transmitted sounding reference signal in the set uses as a reference a different one of the SSB transmissions.

In general, in an aspect, a wireless network includes a first radio node and a second radio node linked to a mesh network controller and configured to advertise the same Physical Cell Identifiers. A user device receives downlink user data from the first radio node, and is configured to measure reference signals transmitted by the first and the second radio node and transmit CSI reports to the first radio. The first radio node sends a beam switch request to the controller to cause a beam switch to the second radio node based on CSI reports received from the user device. The controller sends a beam switch request to the second radio node. The first radio node sends a copy of the user device MAC state to the second radio node. The second radio node transmits to the user device a beam associated with one of the reference signals reported by the user device. The reference signals include NZP-CSI-RS. The user device is configured with two semi-persistent reporting configurations to report the same reporting quantity. The configured PUCCH resource in the first semi-persistent reporting configuration is linked to a NZP-CSI-RS transmitted by the first radio node. The configured PUCCH resource for the second semi-persistent reporting configuration is linked to a NZP-CSI-RS transmitted by the second radio node. The first reporting configuration is activated and the second reporting is deactivated when the first radio node is receiving user data from the user device, and the first reporting configuration is deactivated and the second reporting configuration is activated when the second radio node is receiving user data from the user device. The second user device is configured to have a semi-persistent reporting configuration to report CSI to the first radio node in the same time occasions as the first user device reports CSI to the first radio node. The first radio node receives the CSI reports using the same spatial receive filter.

In general, in an aspect, a wireless network includes user devices configured to send Scheduling Requests to a radio node at time occasions. When user devices are configured to use the same time occasions to send the Scheduling Request, their transmissions can be received by the radio node using the same transceiver.

In general, in an aspect, a wireless mesh network includes one or more radio nodes linked to a mesh network controller connected to a core network. One or more half-duplex mesh nodes are linked to the controller through one of the radio nodes. The mesh nodes and the radio nodes are configured to transmit reference signals. Each of the mesh nodes is configured to measure reference signals transmitted by other mesh nodes or radio nodes. There is a set of time occasions for the mesh nodes to transmit reference signals. Each radio node is assigned to a set of time occasions to transmit its reference signals such that the radio nodes can be configured to measure the strongest reference signals of other radio nodes on non-overlapping time occasions.

Implementations may include one or a combination of two or more of the following features. The reference signals include NZP-CSI-RS. The reference signals include SRS. The assigned time occasions are determined by the controller. The time occasions are divided into K groups and each radio node transmits its reference signals in one of the groups. Radio nodes assigned to the same group are kept far from each other.

In general, in an aspect, a wireless radio network includes a first radio node and a second radio node linked to a mesh network controller connected to a core network. The first radio node and the second radio node being configured to advertise the same Physical Cell Identifiers. The first radio node is configured to transmit downlink data to the user device using a first set of HARQ processes. The second radio node is configured to transmit downlink data to the user device using a second set of HARQ processes. The user device sends HARQ feedback for a HARQ transmission from the first radio node to the first radio node. The user device sends HARQ feedback for a HARQ transmission from a second radio node to the second radio node. The user data sent to the user device by the first radio and user data sent to the user device by the second radio node belong to different data radio bearers. The user device is configured to send a scheduling request for a logical channel associated with a first data radio bearer to the first radio node and to send a scheduling request for a logical channel associated with a second data radio bearer to the second radio node.

In general, in an aspect, a wireless network includes a first radio node and a second radio node linked to a mesh network controller connected to a core network. The first radio node the and second radio node are configured to advertise the same Physical Cell Identifiers. The controller and the radio nodes include processors and storage for instructions executable by the processors to establish: airlink protocol layers executed by a user device and by the mesh network for communication on a wireless access link. The airlink protocol layers are processed partially in the mesh node and partially in the controller. The airlink protocol layers partially processed by the mesh node include a physical layer, a medium access control layer, and a lower sublayer of a radio link layer. The user device has two MAC entities and one MAC entity is configured to communicate with a MAC entity in the first radio node and the second MAC entity is configured to communicate with a MAC entity in the second radio node. The link between the controller and the radio nodes carries RLC SDUs or RLC SDU segments of the user device. The user device is configured to send one segment of an RLC SDU to the first radio node and to send a second RLC SDU to the second radio node. The user device is configured to send CRI/RSRP beam management reports to both radio nodes. The user device is configured to report a Channel Quality Indicator to the first radio node based on a channel measurement performed on a NZP-CSI-RS transmitted by the first RF node and an interference measurement performed on a NZP-CSI-IM transmitted by the second RF node. The user device is also configured to report a Channel Quality Indicator to the second radio node based on a channel measurement performed on a NZP-CSI-RS transmitted by the second radio node and an interference measurement performed on a NZP-CSI-IM transmitted by the first radio node.

In general, in an aspect, a wireless mesh network includes a radio node coupled to a core network, and one or more mesh nodes linked to the radio node. The radio node and the one or more mesh nodes include processors and storage for instructions executable by the processors to: align in a first mesh node a timing phase of uplink transmissions to the radio node to a timing phase of downlink transmissions to a first user device or to a first downstream mesh node based on a timing advance message sent from the radio node to the first mesh node.

Implementations may include one or a combination of two or more of the following features. The timing advance is selected by the radio node to align the timing phase of downlink symbol transmissions of the radio node with the uplink symbol transmissions of the first mesh node based on an estimate of the round-trip propagation delay between the radio node and the first mesh node. The instructions are executable by the processors to: align in a second mesh node a timing phase of uplink transmissions to the radio node to a timing phase of downlink transmissions to a second user device or second downstream mesh node based on a timing advance message sent from the radio node to the second mesh node, enable the second mesh node to transmit on the uplink to the radio node and on the downlink to the third user device or to the second downstream mesh node synchronously on the same frequency channel, select the timing advance to align the timing phase of uplink symbol transmissions of the second mesh node with the downlink symbol transmissions of the radio node based on an estimate of the round-trip propagation delay between the radio node and the second mesh node, and schedule uplink transmissions from the first and second mesh node based on a measured timing phase of uplink transmissions at the radio node. The radio node schedules uplink transmissions from the first and second mesh node on the same symbol when the uplink transmissions arrive at the radio node within a time window not longer than a cyclic prefix length. The radio node schedules uplink transmissions from the first and second mesh node on different symbols and adds zero or more guard symbols between the transmissions based on the measured timing phases. The radio node sends a timing advance value to a third user device to cause the uplink transmissions of the second user device and the uplink transmissions of the first mesh node to arrive at the radio node within a time window not longer than a cyclic prefix length. The radio node schedules an uplink transmission on one or more symbols starting with symbol index t1 and sends a control message to the first mesh node on a symbol index t0≤t1, and the first mesh node schedules a downlink transmission from the mesh node to the first user device or the first downstream mesh node based on the control message received from the radio node. The uplink and downlink transmissions occur on at least one common symbol, the control message sent by the radio node includes information about the resource blocks to be used in the uplink transmission, and the first mesh node schedules the downlink transmission on resource blocks that are different from the resource blocks to be used in the uplink transmission. The downlink and uplink transmissions occur on at least one common symbol, the control message sent by the radio node includes information about the spatial beam to be used to receive the uplink transmission, and the first mesh node schedules the downlink transmission on a spatial transmit beam with low interference to the spatial beam used to receive the uplink reception. The radio node schedules an uplink transmission to the radio node on one or more symbols, the first mesh node schedules a downlink transmission to the first user device or to the downstream mesh node on a same symbol without knowledge of the airlink resources scheduled for the uplink transmission, the radio node and the first mesh node coordinate their scheduling based on beam measurements to estimate the effect of interference from the downlink transmission to the uplink transmission.

In general, in an aspect, a wireless mesh network includes a radio node coupled to a core network, and one or more mesh nodes linked to the radio node. The radio node and the one or more mesh nodes include processors and storage for instructions executable by the processors to: align in a first mesh node a timing phase of uplink receptions from a first user device or from a first downstream mesh node to a timing phase of downlink receptions from the radio node based on a timing advance message sent from the first mesh node to the first user device or downstream mesh node, enable the first mesh node to receive on the downlink from the radio node and on the uplink from the first user device or from the downstream mesh node synchronously on the same frequency channel.

Implementations may include one or a combination of two or more of the following features. The radio node schedules a downlink transmission on one or more symbols starting with symbol index t1 and sends a control message to the first mesh node on a symbol index t0≤t1, and the first mesh node schedules an uplink transmission based on the control message received from the radio node. The downlink and uplink transmissions occur on at least one common symbol, the control message sent by the radio node includes information about the resource blocks to be used in the downlink transmission, and the first mesh node schedules the uplink transmission on resource blocks that are different from the resource blocks to be used in the downlink transmission. The downlink and uplink transmissions occur on at least one common symbol, the control message sent by the radio node includes information about the spatial beam to be used in the downlink transmission, and the first mesh node schedules the uplink transmission to receive on a spatial beam with low interference from the spatial beam to be used in the downlink transmission.

In general, in an aspect, a wireless mesh network includes a radio node coupled to a core network, a first mesh node linked to the radio node, and a second mesh node linked to the first radio node through the first mesh node. The radio node and the mesh nodes include processors and storage for instructions executable by the processors to: establish a time-division multiplexing frame with a first and second set of time resources that correspond to different groups of symbols, cause the radio node to schedule a downlink transmission to the first mesh node on the first set of time resources, cause the second mesh node to schedule an uplink reception on the first set of time resources.

In general, in an aspect, a wireless mesh network includes a mesh network controller connected to a core network, a radio node linked to the controller, a first mesh node wirelessly linked to the radio node, and a second mesh node wirelessly linked to the first mesh node. The controller, the radio node and the mesh nodes include processors and storage for instructions executable by the processors to establish: airlink protocol layers executed by a user device and by the mesh network for communication on a wireless access link, the airlink protocol layers being processed partially in the second mesh node and partially in the controller, the airlink protocol layers partially processed by the second mesh node include the physical layer and the medium access control layer, and the airlink protocol layers partially processed by the controller include the packet data convergence protocol, tunneling facilities to carry partially processed data of the user device in user data tunnel packets between the controller and the second mesh node, and routing facilities in the first mesh node to route the user data tunnel packets to the second mesh node.

Implementations may include one or a combination of two or more of the following features. The tunneling facilities between the second mesh node and the controller use the GTP/UDP/IP protocol and a tunnel endpoint identifier in the user data tunnel packet header identifies the user device. The sequence numbers are used by the mesh network to control the flow of user data tunnel packets sent by the controller to the second mesh node. Ciphering is applied on user data payload only in the user device and in the controller. Ciphering is applied on a user data tunnel packet header only in the second mesh node and in the controller. The tunneling facilities include header compression to reduce the user data tunnel packet header overhead. The lower sublayer of the radio link control protocol of the user device is processed in the second mesh node and the upper sublayer of the radio link control protocol of the user device is processed in the controller.

The upper sublayer of the radio link control protocol includes the automatic repeat request function and the lower sublayer of the radio link control protocol includes the packet segmentation function. The controller retransmits user data payload in the radio link control protocol based on status reports sent by the user device. The airlink protocol layers executed by the first mesh node and the radio node to carry user data tunnel packets include the physical layer, the medium access layer and the radio link control protocol, and the radio link control protocol operates in the unacknowledged mode. All wireless links operate on the same frequency channel. The routing facilities in the first mesh node route the user data tunnel packets received from the radio node to the second mesh node based on an address of the second mesh node. The address includes an IP address. The address includes a GTP terminal end-point identifier.

In general, in an aspect, a wireless mesh network includes a mesh network controller connected to a core network, a radio node linked to the controller, and a mesh node wirelessly linked to the radio node. The controller, the radio node, and the mesh node include processors and storage for instructions executable by the processors to: establish airlink protocol layers executed by a user device and by the mesh network for communication on a wireless access link, establish an Internet Protocol link of the first mesh node with a directly connected end-user device, and emulate a user device in the mesh node to cause the end-user device appear to the rest of the mesh network as another user device connected to the mesh node on a wireless access link.

Implementations may include one or a combination of two or more of the following features. The user device emulation includes sending and receiving Non-Access Stratum and Radio Resource Control messages consistent with the operation of a user device connected to the mesh node on a wireless access link. The user device emulation includes an authentication using a USIM module.

In general, in an aspect, a wireless mesh network includes a controller, one or more radio nodes, one or more mesh nodes, and a mesh network manager having processors and storage for instructions executable by the processors to: enable the mesh nodes and radio nodes to connect one or more user devices to the controller using spatial beams for transmissions from radio nodes and mesh nodes, establish communication links between the mesh nodes and the mesh network manager, cause the mesh nodes to send control information to the mesh network manager, enable the mesh network manager to process the received control information and send to the mesh nodes for each spatial beam a corresponding power level, and cause the mesh nodes to apply the received power level to each spatial beam.

Implementations may include one or a combination of two or more of the following features. The control information sent to the mesh network manager include radio measurements collected by the mesh node about the signal strength of transmissions from other mesh nodes on different spatial beams. The control information sent by a mesh node includes position, speed and direction of the mesh node. The mesh network controller deactivates a mesh node.

In general, in an aspect, a wireless mesh network includes a radio node coupled to a core network, and a mesh node linked to the radio node, the radio node and the mesh node includes processors and storage for instructions executable by the processors to: establish a time-division multiplexing frame for communication in the mesh network, and designate time resources in the frame for uplink reception by the radio node and uplink and downlink transmissions by the mesh node, and estimate the interference from a downlink transmission on a selected transmit beam in the mesh node to an uplink reception on a selected receive beam in the radio node, and based on the estimated interference, schedule in the radio node an uplink reception on the selected receive beam in a designated time resource and independently schedule in the mesh node a downlink transmission on the selected transmit beam in an overlapping time resource.

Implementations may include one or a combination of two or more of the following features. The interference is estimated based on measurements on SSB or CSI-RS reference signals. The wireless mesh network in which based on the estimated interference the radio node schedules the uplink reception and sends a control message to the mesh node and cause the mesh node to schedule a downlink transmission on a non-overlapping time or frequency resource.

In general, in an aspect, a wireless mesh network includes a radio node coupled to a core network, and a mesh node linked to the radio node, the radio node and the mesh node includes processors and storage for instructions executable by the processors to: establish a time-division multiplexing frame for communication in the mesh network, designate time resources in the frame for downlink transmission by the radio node and downlink and uplink receptions by the mesh node, estimate the interference from a downlink transmission on a selected transmit beam in the radio node to an uplink reception on a selected receive beam in the mesh node, and based on the estimated interference, schedule in the radio node a downlink transmission on the selected transmit beam in a designated time resource and independently schedule in the mesh node an uplink reception on the selected receive beam in an overlapping time resource.

Implementations may include one or a combination of two or more of the following features. The interference is estimated based on measurements on SSB or CSI-RS reference signals. Based on the estimated interference the radio node schedules the downlink transmission and sends a control message to the mesh node and causes the mesh node to schedule the uplink reception on a non-overlapping time or frequency resource.

These and other aspects, features, and implementations can be expressed as methods, apparatus, systems, components, program products, methods of doing business, means or steps for performing a function, and in other ways.

Other features, objects, and advantages of the disclosure will be apparent from the description and drawings, and from the claims.

DESCRIPTION

FIGS. 1-6, 13, 16, 21-27, 34, 38-39, 41-44, 47, 52, 57, 61-62, 64-65, 68-71, 74-76, 79-81 and 88-109 are schematic block diagrams.

FIGS. 72, 73 and 78 are diagrams of tables.

MESH NETWORK TOPOLOGY

Figure 1:
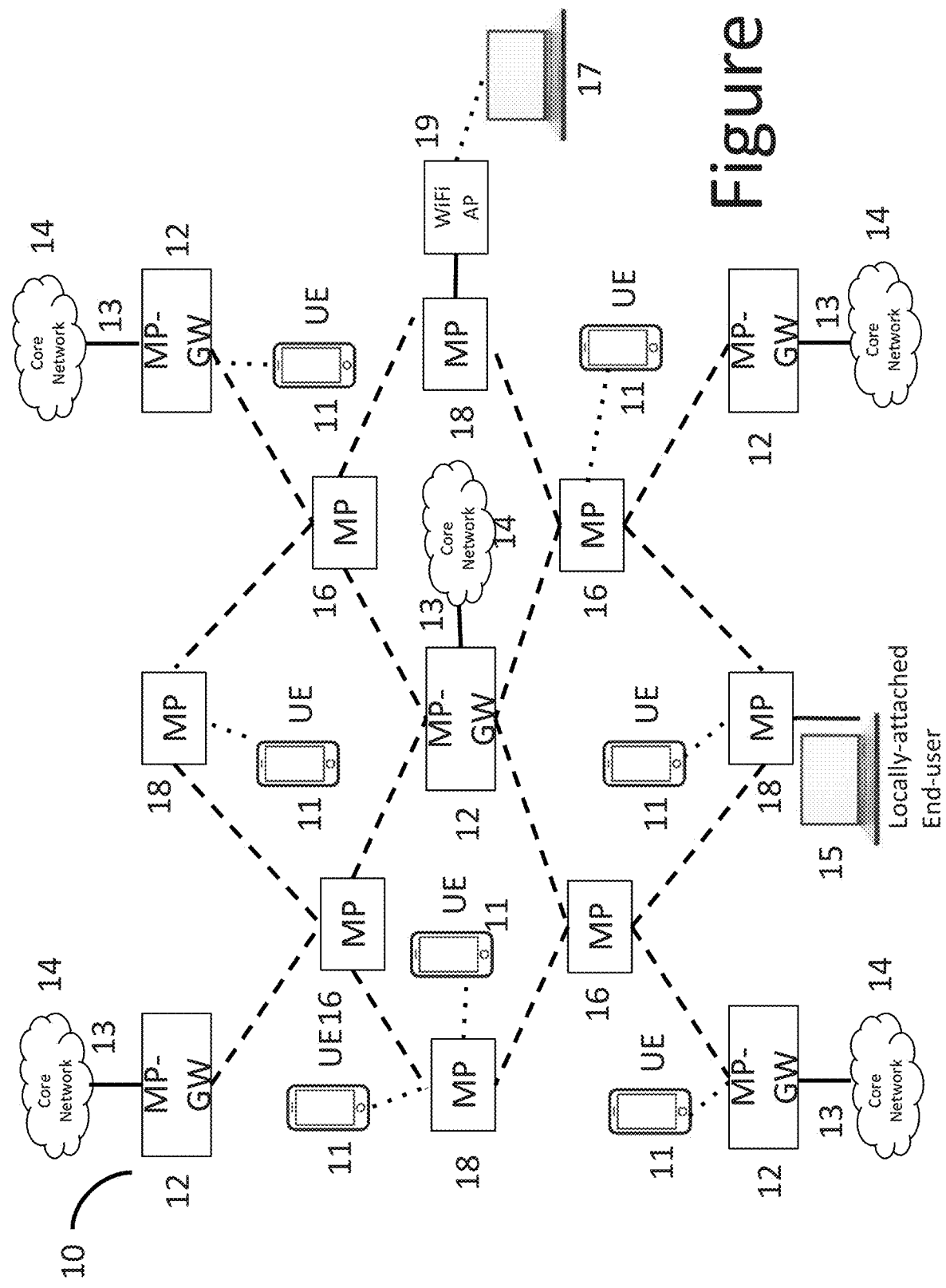

FIG. 1 shows an in-band cellular wireless mesh network 10 that provides wireless network services to one or more User Equipment (UE) 11. A UE may be fixed (e.g., a fixed wireless terminal) or it may be mobile (e.g., a smartphone or a tablet). A Mesh Point Gateway (MP-GW) 12 is a network node that has a connection 13 to a core network 14; e.g., a public Internet, an operator core network, a private core network, etc. The connection 13 is often provided by fixed links (e.g., public/private Ethernet services running over fiber) or by out-of-band wireless links (e.g., microwave or other out-of-band fixed wireless or cellular backhaul links). Operating like a standard AP, an MP-GW wirelessly transmits/receives information to/from UEs (e.g., smartphones, tablets, etc.) on access links, indicated in FIG. 1 by dotted lines, in a manner compatible with the 5G NR standard as will be specified in 3GPP Release 15 and beyond. MP-GWs also wirelessly transmit/receive information to/from other Mesh Points (MPs) in the mesh network on backhaul links indicated by dashed lines in FIG. 1. In an in-band mesh network, access links and backhaul links operate on the same RF channel. We sometimes use the term Mesh Points (MPs) to refer to examples of mesh nodes.

The mesh network can be deployed in dense urban areas, such as downtown areas, to deliver more capacity, and also in suburban or rural areas to improve RF coverage. For example, the MP-GWs and MPs may be installed on the roadside or on the top or side of buildings or homes, on streetlights or traffic lights or even alongside of highways. MPs may also be installed inside vehicles, such as cars, buses and trains. In some embodiments, an MP may be an aerial node carried by a drone. Such an MP/drone may be solar powered. An MP-GW may be a terrestrial node. An MP-GW may also be an aerial mobile node. It may be incorporated into an aerial drone with an out-of-band wireless link to the core network.

Like an MP-GW, an MP 16, 18 wirelessly transmits/receives information to/from UEs (e.g., smartphones, tablets, etc.) on its access links according to the 5G NR standard, but an MP communicates with the core network only through an MP-GW and reaches that MP-GW using in-band wireless backhaul links, possibly via other MPs. Among other benefits of this arrangement, since MPs don't need direct backhaul connectivity to the core network, a mesh network is deployed more easily and provides RF coverage more economically than traditional cellular networks. Since MP-GWs and neighboring MPs need to be in RF range of each other to support the backhaul links, the MPs in a mesh network need to be deployed more densely than traditional APs with fixed backhaul. This makes it even more important that MPs are low-cost and easy to deploy. An MP is a fixed node, which has a fixed position, or it is a mobile (moving) node. In what follows, sometimes we will refer to an MP or an MP-GW as an RF node.

An MP 16 that is directly attached to an MP-GW via a wireless backhaul link is referred to as a 1-hop MP. An MP 18 that can reach an MP-GW via one other MP is referred to as a 2-hop MP, and so on. An N-hop MP has a hop distance of N to an MP-GW. We use the phrase "hop distance" to refer to the number of hops from MP to MP ultimately ending in a hop to an MP-GW.

In some examples, an MP is deployed on the roof or attached to a wall on the side of a building, and in addition to serving as a mesh network node that carries backhaul traffic between other MPs and the MP-GW, it provides Internet access to one or more local devices 15, 17 located in the building. A local device 15 connects to the MP directly or a local device 17 first connects to a WiFi network and a WiFi AP/router 19 then connects the local device to the MP, for example using an Ethernet interface. Providing local users access to the operator core network and ultimately to the Internet through the mesh network further increases the utility of the wireless mesh network.

In some embodiments, when the MP is deployed inside a vehicle, such as a car, bus or train, it can provide wireless Internet access services to local devices inside the vehicle, for example using a WiFi AP, while at the same time providing wireless backhaul services to a mesh network.

In this specification we say MP A is an upstream MP for another MP, called MP B, and MP B is a downstream MP for an MP A, if MP B has a wireless backhaul connection to MP A, either directly or via other MPs. MP A has a lower hop distance than MP B.

In the mesh network, an MP joins (becomes active in) the mesh network for the first time by attaching to a particular upstream MP or MP-GW, for example, like a UE. Once it has attached to an MP or MP-GW, the MP obtains an IP address and establishes connectivity to the core network. Subsequently, an MP may select the MP or MP-GW for attachment based on attachment quality. Attachment quality is considered high, for example, when the hop distance and airlink utilization (load) of the MP to which the joining MP is to be attached is low and backhaul link signal quality is above a certain threshold. An MP can accept attachment from two or more downstream MPs. This allows multiple MPs to reach an MP-GW via the same intermediate MP.

For identification in a 5G NR network, MPs and MP-GWs transmit a sequence of synchronization signals (SS) that carry a cell identifier (Cell ID) along with a short master information block (MIB); the MIB transmission is carried on the physical broadcast channel (PBCH). SS/PBCH signals are transmitted on certain pre-determined airlink resources. Other MPs nearby can use SS to detect the MP or MP-GW, learn its Cell ID and measure the received signal quality. To facilitate MP or MP-GW selection (that is the choice made by a joining MP of which upstream MP to attach to), all MP-GWs and all active MPs advertise their hop distance, where an MP is considered active if it has a backhaul path to an MP-GW and it is ready to accept attachment requests from UEs and other MPs. MPs may transmit their hop distance and airlink load information in the MIB or in the more detailed system information block (SIB), which is transmitted on the Physical Downlink Shared Data Channel (PDSCH). Each MP-GW and MP broadcasts SIBs periodically. Transmitting the hop distance in the MIB allows the neighboring MPs to measure and report the hop distance of the MP without reading any SIBs.

To attach to another MP or to an MP-GW, an MP initiates a random access procedure to establish a connection for the backhaul link. During the connection set-up procedure, the MP can identify itself as an MP and indicate its Cell ID and other parameters to the upstream MP.

When radio or load conditions on its upstream backhaul link deteriorate an MP will detach and re-attach to a new MP by executing an MP handover procedure. In other words, the organization of the MPs within the mesh network can change, and this may occur frequently when MPs are mobile. When the hop distance of an MP changes, the hop distances of its downstream MPs will also change.

Figure 2:
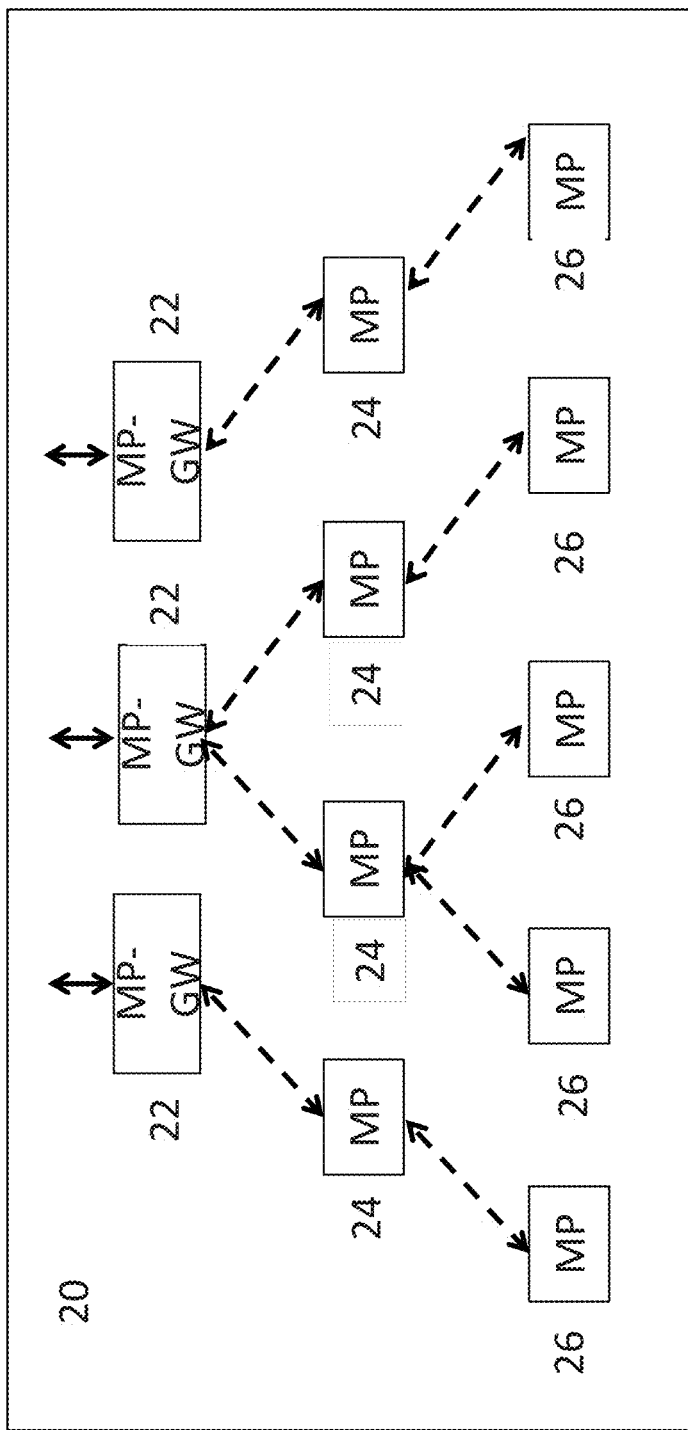

A tree-structured mesh network 20, shown in FIG. 2, is a special mesh network where an MP can attach to only one upstream MP. In many cases, a tree-structured mesh network delivers most of the benefits of a more general mesh network without the complexity of handling multi-attached MPs (see below). One or more trees form a tree-structured mesh network with an MP-GW 22 at the top of each tree. The trees are disjoint; i.e., do not intersect. In FIG. 2, there are three trees. The middle tree has two 1-hop MPs 24 and three 2-hop MPs 26. The left-most and the right-most trees have one 1-hop MP 24 and one 2-hop MPs 26. In a tree-structured mesh network, when the hop distance of an active MP decreases (increases) by L, the hop distances of all its downstream MPs also decrease (increase) by L. In an example tree-structured mesh network, a currently active N-hop MP will detach and re-attach to an M-hop MP "closer" to an MP-GW, where M<N−1, if the M-hop MP has signal quality above a certain minimum threshold, and the N-hop MP will re-attach to an alternative MP of the same hop distance, if the alternative MP offers a backhaul link having a better attachment quality.

Figure 3:
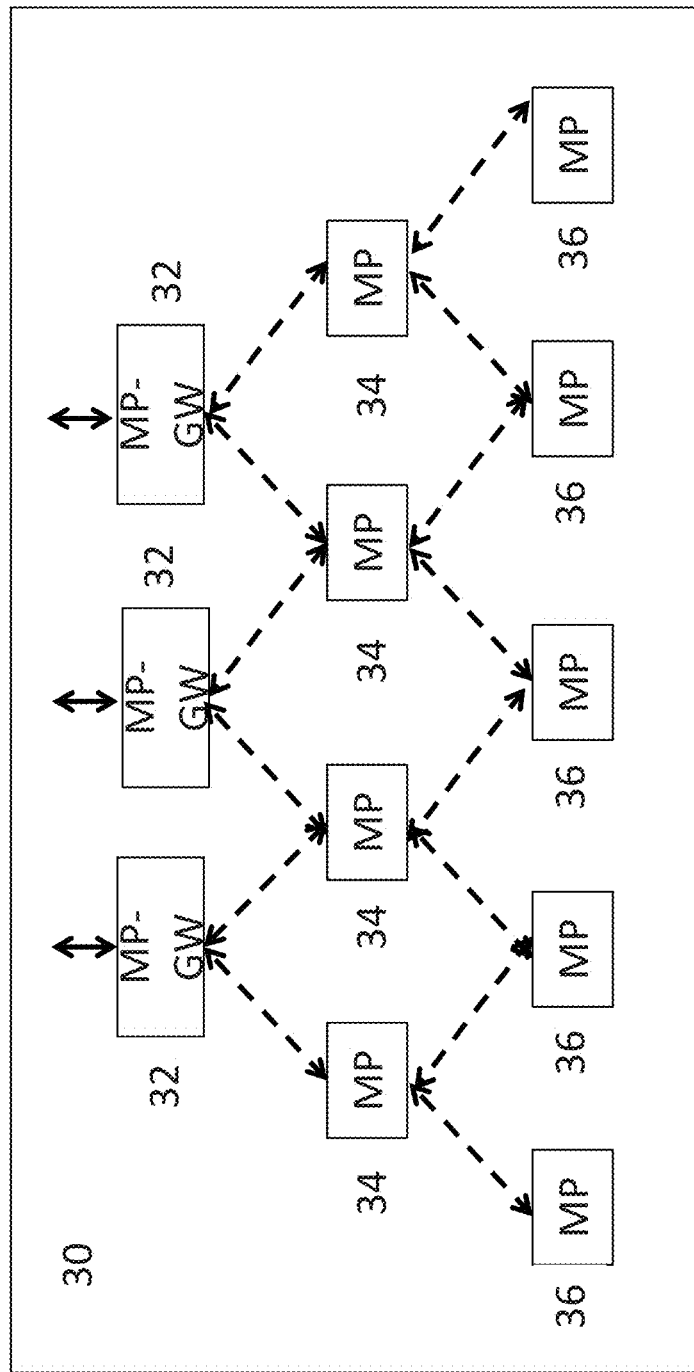

A structured mesh network is more general than a tree-structured mesh network. In a structured mesh network, an MP may attach to two or more upstream MPs of the same hop distance; such a downstream MP is referred to as a multi-attached MP. In some applications, one of the attached MPs of a multi-attached MP will assume the role of a primary upstream MP. Among the advantages of permitting multi-attached MPs are that a multi-attached MP can load balance its backhaul traffic across multiple links through its upstream MPs. Multi-attached MPs can also benefit from faster handovers when RF conditions on a backhaul link deteriorate rapidly. Multi-attached MPs may also transmit and receive the same data over multiple paths, and this will increase reliability. The wireless mesh network shown in FIG. 1 is a structured mesh network. FIG. 3 shows a logical representation of the topology of a structured mesh network with three MP-GWs 34, four 1-hop MPs 36 and five 2-hop MPs 38.

MP Transmitter/Receiver

Most commercial wireless systems use half-duplex communications. In half-duplex systems, a duplexing method is used to separate transmissions from receptions.

Figure 4:
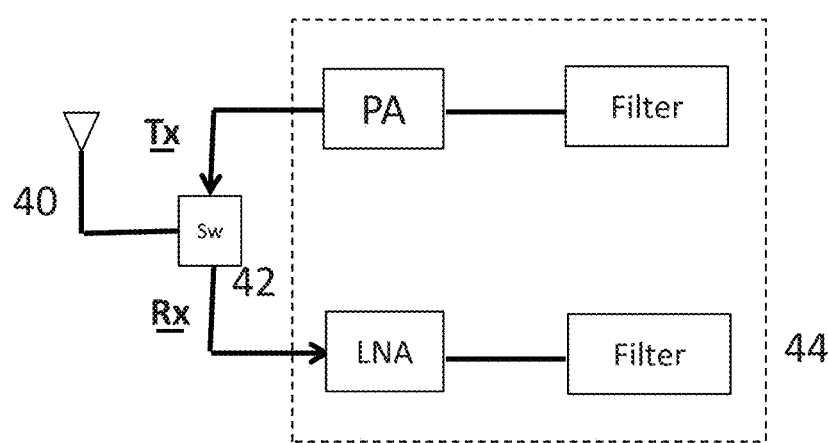

High frequency spectrum above 6 GHz is by regulation often unpaired. On unpaired spectrum, Time-Division Duplex (TDD) is used as the duplexing method. Although we describe the technology as using TDD as the duplexing method, the technology can be implemented with other duplexing methods, for example, Frequency Division Duplex (FDD). Referring to FIG. 4, in TDD, an MP will transmit and receive on the same frequency channel, but not at the same time. Since RF signals generated by a transmitter can overwhelm the much weaker received RF signal, in a TDD system transmissions and receptions are time-division multiplexed and the direction of transmission is switched using a TDD switch 42 that typically sits between the antenna elements 40 and the RF front end 44 of the transmitter and receiver. A TDD switch may introduce a short switching delay (of the order of 1-3 μsec) and the timing of the switching is controlled by other hardware logic and software. Since transmissions and receptions occur on the same RF channel, in TDD systems an MP-GW or MP can learn the detailed characteristics of the RF channel for transmissions based on measurements performed on received signals. This property known as reciprocity greatly simplifies the operation of advanced antenna systems as will be discussed further later.

Both TDD and FDD are half-duplex systems. In more advanced full-duplex systems, analog, digital or hybrid analog/digital self-interference cancellation techniques are used to substantially reduce the interference from a transmitter to a local receiver, thereby allowing simultaneous transmissions to occur in both directions on the same channel without a substantial increase in effective noise levels. Although it is typically used on unpaired spectrum, full-duplex wireless communication is also applicable to paired spectrum, when regulations allow it. Full-duplex technology is still in early stages of development, but it is expected to be commercialized in the near future and will enable more efficient use of frequency spectrum.

Figure 5:
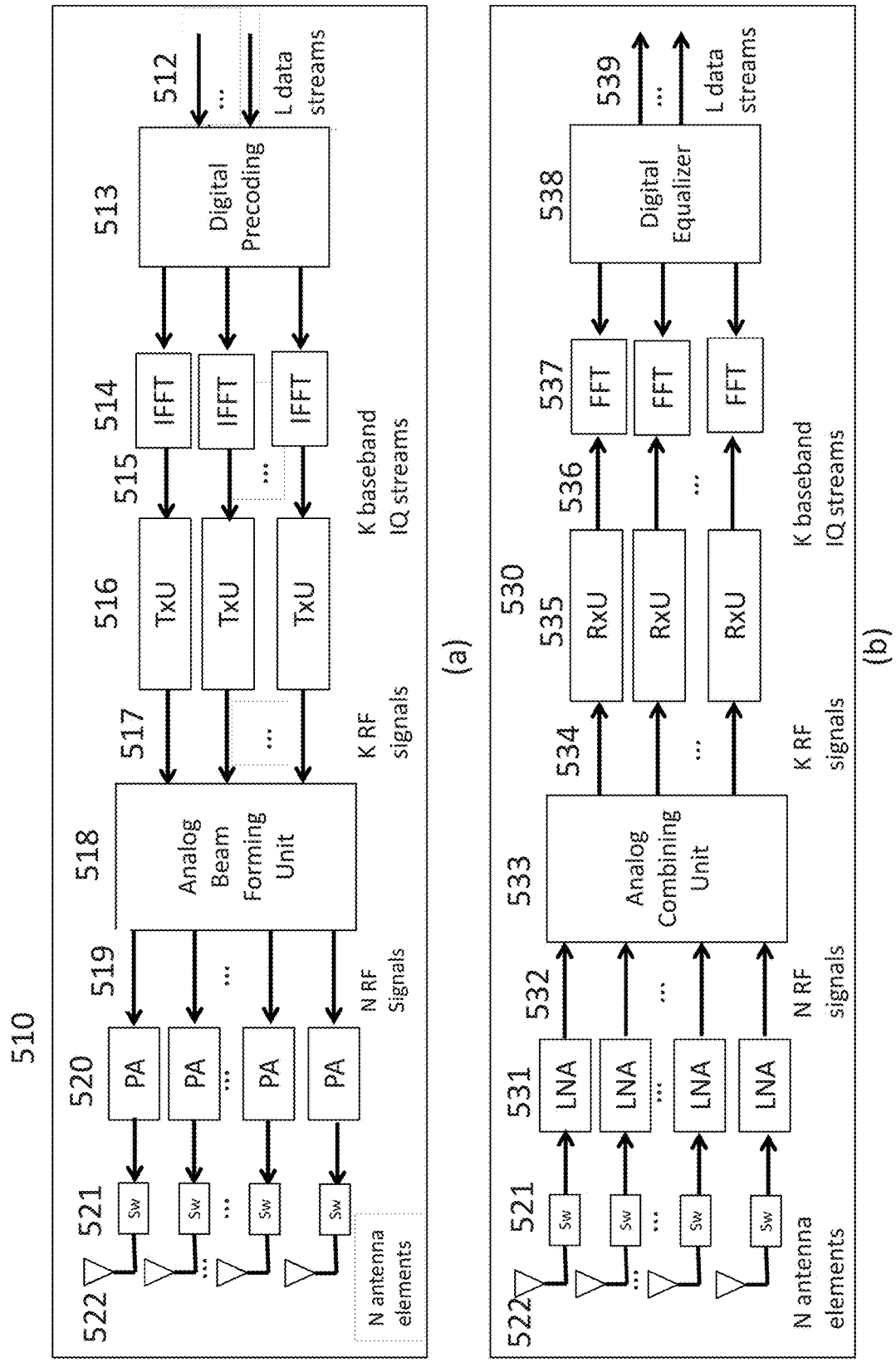

When operating in mm wave frequency bands, MP-GWs and MPs use massive MIMO beamforming in the transmitter and combining in the receiver in order to overcome the high path loss. In mm wave massive MIMO systems, beam forming and combining operations are often performed, at least partially, in the analog RF domain. FIG. 5a shows a representative massive MIMO Orthogonal Frequency Division Multiplexing (OFDM) transmitter 510 as it may be implemented in an MP-GW or MP. Here L baseband binary data streams 512 that represent encoded user data from one or more UEs are first mapped to a number K≥L of baseband complex in-phase and quadrature (IQ) streams 515 using digital precoding 513 and Inverse Fast Fourier Transform (IFFT) 514 processing. These time-domain IQ streams are further processed by K Transmitter Units (TxU) 516 to produce K RF signals 517. A TxU includes a digital-to-analog (D/A) converter, a frequency up-converter, and filters. The output 517 of a TxU is fed into an analog beam-forming unit 518 that generates N≥K RF signals 519, which are then each amplified by a power amplifier (PA) 520 and fed into N antenna elements 522. The antenna elements may form a linear (1D) array, a planar (2D) array or they may form sub-array antenna structures that comprises multiple (1D) or (2D) antenna panels. The antenna elements may use a single (e.g., vertical) polarization or they may use dual (vertical and horizontal) polarization. In some implementations the PA is also part of the TxU and the beam forming is performed after power amplification. In some examples, the beam-forming unit is fully connected; i.e., the output of each TxU is mapped to all antenna elements. In some examples, the beam-forming unit uses a sub-array structure where the output of each TxU is mapped to a subset of the antenna elements.

In some embodiments more suitable for sub-6 GHz frequency bands, when K=N, the analog beam-forming unit is bypassed; in this case, the transmitter in FIG. 5*a* becomes fully digital. The beam-forming unit adjusts the gain and phase of the input RF signals and combines them in different ways to map them onto the antenna elements. By properly choosing the gains and phases of the beam-forming unit, different antenna beams can be produced. An MP or MN-RN with K TxUs can transmit up to K data streams from up to K different users on up to K different beams simultaneously. (As will be described in more detail later, the implementation of an MP-GW may use a split architecture comprising a controller and two or more Mesh Network Radio Nodes (MN-RNs). MN-RNs and MP-GWs are both RF nodes that perform Physical (PHY) layer communications, and in what follows, when discussing PHY layer matters, we may use the terms MN-RN or MP-GW interchangeably.) We sometimes use the term Mesh Network Radio Nodes (MN-RNs) to refer to examples of radio nodes.

FIG. 5*b* shows an example implementation of a corresponding massive MIMO receiver 530 in an MP-GW or MP. The receiver uses the same antenna array 521 as the transmitter. In half-duplex TDD systems switches 521 separate the reception from transmission. In full-duplex systems, an RF circulator (not shown) replaces the switches and analog and digital cancellers (not shown) are added to remove linear and non-linear components of the self-interference, as well as any broadband radio noise generated by the power amplifiers and phase noise generated by oscillators. RF signals received at the N antenna elements 522 are first amplified using low-noise amplifiers (LNAs) 331 to produce N amplified RF signals 532 and then processed by an analog combining unit 533, which produces up to K RF signals 534 that are fed into K Receiver Units (RxU) 535. In some embodiments more suitable for sub-6 GHz frequency bands, when K=N, the analog combiner may be bypassed and then the receiver in FIG. 5*b* becomes fully digital. An RxU will include filters, a frequency down-converter, analog gain control (AGC) and an analog-to-digital (A/D) converter. In some implementations the LNA may also be part of the RxU and combining can be performed prior to LNA. The outputs of the RxUs are K complex baseband IQ signals 536 in time-domain, which are then digitally processed by performing Fast Fourier Transform (FFT) 537 and equalizer operations 538 to produce L received data streams 539.

In a typical implementation, N may be 64 and K=4, and up to 4 different streams can be carried in different spatial beams simultaneously, for example in the same OFDM symbol interval.

When K=1, the transmitter and receivers shown in FIGS. 5*a* and 5*b* can carry only L=1 stream over a single beam per OFDM symbol. In some examples, N may be 256 and K=16, and up to 16 users can be served at the same time on different beams. The antenna array may be a cross-polarized (horizontal and vertical) planar (2D) array organized as a 16×8 grid.

Performing beamforming and combining in the analog domain reduces the number of transmit/receive units (TXRUs) required. This reduces cost and power consumption, especially by eliminating the A/D converters in the RxUs. In every symbol interval, each TxU (RxU) is associated with a Tx (Rx) beam. User data that is mapped to a TxU is carried on a corresponding beam generated by the beam-forming unit. Since analog beam forming in the transmitter and analog combining in the receiver are performed in the time domain, they affect equally all subcarriers of an OFDM symbol that is fed into a TXRU. Therefore, in massive MIMO systems with analog beam forming or combining, available frequency resources (subcarriers) in an OFDM symbol associated with a TXRU can be assigned only to UEs that use the same Tx or Rx beam.

In FIG. 5*a*, available TxUs can be used in different ways to map data from one or more UEs onto individual beams. For example, data from a single user can be mapped to two or more data streams and then precoded to produce two or more baseband IQ streams where each IQ stream is carried in one spatial beam. This is often referred to as single-user spatial multiplexing. Alternatively, data from a single user can be mapped to a single data stream, which is then transformed by a digital precoder into two or more baseband IQ streams and carried on corresponding (typically) adjacent spatial beams. This is useful when the UE falls in-between two spatial beams and is best served by multiple such beams simultaneously. In another use case, end-user data of multiple users are mapped onto different data streams that are carried on different (isolated) spatial beams. This is referred to as multi-user spatial multiplexing.

In FIG. 5*b*, available RxUs can be used to receive transmissions from one or more users. In the example of single-user spatial multiplexing, transmissions are received from a single user on two or more Rx beams and mapped to two or more IQ streams by the combiner. The multi-antenna digital equalizer then recovers the data streams of the same user. In some examples, transmissions are received from two or more users on two or more Rx beams and mapped to two or more IQ streams by the combiner. The multi-antenna digital equalizer then recovers the data streams for two or more users.

5G New Radio (NR)

This section provides an overview of some aspects of the 5G NR physical layer standard that are relevant in this specification. Since the 5G NR specifications are not yet finalized, the description below is based on the decisions made to date by 3GPP committees.

Modern cellular wireless communication systems like the emerging 5G NR use Orthogonal Frequency Division Multiple Access (OFDMA) to multiplex multiple transmissions inside a single radio channel in time and frequency. In 5G NR OFDMA, OFDM symbol intervals and subcarriers are used to form a time/frequency grid. In each symbol interval, there are up to 3300 subcarriers where each subcarrier represents a Resource Element (RE), and 12 contiguous REs in an OFDM symbol make up a Resource Block (RBs). There are up to 275 RBs and they are allocated to users for data transmissions and receptions. In OFDMA multiple users receive from an AP on non-overlapping RBs in the same OFDM symbol without experiencing any significant interference and an AP receives from multiple users on different non-overlapping RBs in the same OFDM symbol as long as the UEs (when needed) adjust their transmission times to compensate for differences in propagation delay and channel delay spread such that all transmissions arrive at the receive antenna of the AP within the cyclic prefix length of the OFDM system.

In this description, we use the terminology "airlink resource" to refer to a combination of time intervals, frequency blocks and angular spatial beams that is used by an AP or a UE for communications. In traditional cellular networks UEs receive wireless service from APs. Each AP serves a cell, an area that represents the wireless coverage of the AP. When APs transmit to UEs on the downlink (DL), a scheduler in the AP allocates available airlink resources to one or more UEs, determines the modulation format to use for each UE and then indicates the assigned resources and the selected modulation parameters to UEs in Downlink Control Indication (DCI) messages. Similarly for transmissions from UEs to the AP on the uplink (UL), the scheduler in the AP allocates airlink resources and selects the modulation format for UEs based on control information (e.g., Buffer Status Reports (BSRs), Scheduling Requests (SRs), Hybrid ARQ ACK/NAK, etc.) and reference signals (e.g., Sounding Reference Signal (SRS), etc.) received from UEs and indicates the assigned resources and selected modulation parameters to UEs in separate DCI messages sent on the DL control channel. UEs send UL control information on UL control channels, which use semi-statically configured airlink resources.

In 3GPP Release 15, 5G NR supports a nominal channel bandwidth of up to 396 MHz. It uses a flexible frame structure and an OFDM numerology (i.e., variable OFDM subcarrier spacing and cyclic prefix length), which depends on the channel bandwidth. In Release 15, NR supports a subcarrier spacing of $2^\mu \times 15$ kHz, where $\mu=0, 1, \ldots, 4$. A different subcarrier spacing may be used in different OFDM symbols. Also, different subcarrier spacing may be used in different RBs of the same OFDM symbol. Time is divided into 10 ms radio frames and each radio frame is divided into ten 1 ms subframes. Each subframe is further divided into 2 slots and each slot consists of 14 OFDM symbol intervals. Nominally the AP sends DL control information to UEs using a few symbols of a slot and UEs use a few symbols of the slot to send UL control information and UL reference signals, such as SRS, to the AP. Unused RBs in OFDM symbols that are nominally used for control are also available for data transmission. In some slots, OFDM symbols can be semi-statically or dynamically configured to carry DL or UL data transmissions with a silence gap between them to give the TDD switch enough time to change Tx/Rx direction. Certain OFDM symbols that are configured in a semi-static manner as "flexible" can be configured dynamically as DL or UL and the actual direction can be indicated to UEs in a DCI.

In 5G NR, the scheduler allocates airlink resources over a single slot, multiple slots or mini-slots. In slot-based scheduling, there is at most one TDD transition in a slot from DL to UL transmission and UE's are allocated resources in all OFDM symbols in the slot, separately for DL and UL. When the scheduler allocates airlink resources to a UE for use in a single slot n, it indicates the allocation parameters in a Downlink Control Indication (DCI) sent to the UE in one or more OFDM symbols typically in the beginning of the same or an earlier slot $m \leq n$. The allocation parameters include the slot number n and the OFDM symbol positions (time) and RBs (frequency) in which the data transmission will occur. Allocation parameters may also indicate the UL control resources that the UE will use to send Hybrid ARQ ACK/NAK. When DCI is sent one or more slots before the actual transmission, UE has more time to prepare for the transmission or reception of the user data. In a multi-slot allocation, with a single DCI sent in time slot n, the scheduler can allocate resources to a UE in multiple consecutive slots n, n+1, . . . , n+k. The scheduler can also allocate resources to a UE in a mini-slot, which occupies a small number of consecutive symbols (for example 2, 4 or 7) in a slot. In this case, the DCI that carries the allocation parameters (e.g., the OFDM symbol positions and RBs for the allocation) is sent typically at the beginning of a slot as in slot-based scheduling, or it may be sent in other symbol positions in a slot, though the latter will require the UE to look for DCIs more frequently and this may increase power consumption in the UE.

5G NR, at least when operating in mm wave frequency bands, will heavily rely upon massive MIMO beamforming and combining. In these systems, mini-slot based scheduling is especially useful, because it allows scheduling a UE on very few OFDM symbols, allowing the scheduler to serve different users in a TDM manner on different analog beams in different symbols.

One important signal that all 5G NR APs typically transmit is the SS/PBCH block (SSB). UEs use SSB in cell selection and beam management, among other things. As explained further below, an SSB is transmitted periodically in 4 consecutive OFDM symbols in certain time slots in certain 5 ms half frames. SSB occupies 127 subcarriers in the first and third OFDM symbols to send the synchronization signals PSS (Primary Synchronization Signal) and SSS (Secondary Synchronization Signal), respectively. It uses 240 subcarriers (20 RBs) in the second and fourth OFDM symbol to send PBCH (Physical Broadcast Channel) and DM-RS (Demodulation Reference Signals). When operating in frequencies above 6 GHz, 5G NR APs will use (for SSBs) a subcarrier spacing of 120 or 240 kHz. In these frequencies, APs transmit SSBs by sweeping across all active beams in designated symbol positions in selected (at least one out every 4) 5 ms half-frames. The period of SSB transmissions can be longer than one half-frame. In some implementations beam sweeping is implemented by varying the weights used in the beam-forming unit in FIG. 5a. At 120 kHz subcarrier spacing, there are 40 slots (560 OFDM symbols) in every half-frame. SSB transmissions can start at OFDM symbol positions {4, 8, 16, 20}+28n, where n=0, 1, 2, 3, 5, 6, 7, 8, 10, 11, 12, 13, 15, 16, 17, 18, in the half-frame. There are 64 possible starting symbol positions. When an AP has multiple TXRUs, it can transmit the same SSB on multiple beams simultaneously and thus reduce the number of OFDM symbols needed for the beam sweep, but in this case the UE cannot resolve these beams based on SSB alone, and additional measurements are required to identify the preferred beam(s), as described further below.

To determine the DL Tx beam for a specific UE, the AP uses a beam management procedure. An idle UE first uses the SSBs to select the DL Tx/Rx beam pair that produces the highest signal quality. By using a PRACH (Physical Random Access Channel) preamble that corresponds to the selected DL Tx beam, the UE indirectly indicates the preferred Tx beam to the AP. After the UE attaches to the AP, the UE is configured with a Channel State Information Reference Signal (CSI-RS). The AP transmits CSI-RS on one or more digital antenna ports via one or more Tx beams over one or more OFDM symbol intervals, allowing the UE to measure the beam strength on candidate beams. For each DL Tx beam, UE also determines the best combiner weights, which represent its corresponding Rx beam. UE reports the most strongly received DL Tx beam(s) in CSI Resource Indications (CRIs), which identify the strongest Tx beam(s) and their strength. Alternatively, UE sends Sounding Reference Signals (SRS) using the best Rx beam for different CSI-RS as its Tx beam. UEs use CSI-RS also to determine the channel quality (CQI), the digital precoder matrix (PMI) and the rank (RI) on the preferred DL Tx beam(s). This information is also sent to the AP, along with CRI, as CSI feedback using the UL control channel or the shared data channel. The AP can configure UE to send CSI periodically, semi-persistently or upon demand.

On the UL, when channel reciprocity is used (e.g., when operating on unpaired spectrum), the AP can determine the best Rx beam(s) for the UL based on the best Tx beam(s) reported by the UE for the DL or based on SRS measurements. Likewise, the UE can determine the best Tx beam(s) for the UL based on the best Rx beam(s) it determined for the DL. When channel reciprocity is not available or cannot be used (e.g., when operating on paired spectrum), UEs can be configured to send SRS with a beam sweep to allow the AP determine the best UL Tx/Rx beam(s) for the UE. Beam measurement result can be indicated to the UE in a DCI sent at the time of UL resource allocation.

OFDMA in a Wireless Mesh Network

Figure 6:
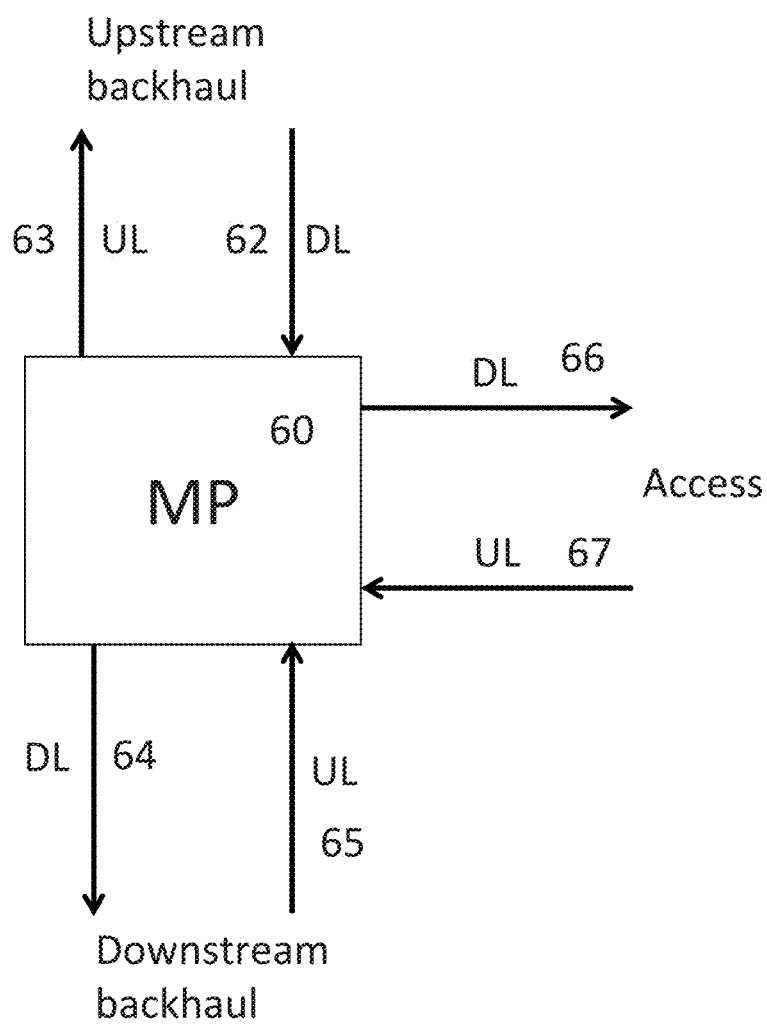

Now we describe the operation of the mesh network. FIG. 6 shows an MP 60 with 3 types of links: 1) upstream DL/UL links 62, 63 to carry backhaul traffic between the MP and an MN-RN or an upstream MP, 2) downstream DL/UL links 64, 65 to carry backhaul traffic between the MP and a downstream MP, 3) DL/UL access links 66, 67 to communicate with UEs.

An MP services all these links on the same 5G NR channel at the same time. Frequency and multi-user spatial multiplexing are used to transmit on one or more DL access links 66, one or more DL downstream backhaul links 64 and even an UL upstream backhaul link 63 in the same OFDM symbol on up to K simultaneous Tx beams, where K>2 is the number of TxUs in the MP. Likewise, MP can receive one or more signals on the UL access links 67, one or more signals on the UL downstream backhaul links 65 and even a signal on the DL upstream backhaul link 62 in the same OFDM symbol on up to K simultaneous Rx beams. To use OFDMA across different types of links requires phase alignment of transmissions or receptions. 5G NR supports two UL modulation schemes. To maintain compatibility with DL transmissions that occur in the same OFDM symbol, UL transmissions must use OFDMA with a cyclic prefix, the same modulation scheme used in the 5G NR DL.

In a half-duplex mesh network, an MP cannot transmit and receive on the same channel at the same time. In FIG. 6, when MP 60 is receiving on its upstream DL backhaul link 62 in a time interval, it cannot transmit on the DL access link 64 or the downstream DL backhaul link 66 or the UL upstream backhaul link 63 in the same time interval. Also, when it is transmitting on the upstream UL backhaul link 63 in a time interval, the MP cannot receive on the DL upstream backhaul link 62, on the UL access link 67 or on the downstream UL backhaul link 65 in the same time interval.

Timing Phase Alignment in Mesh Networks

Figure 7:
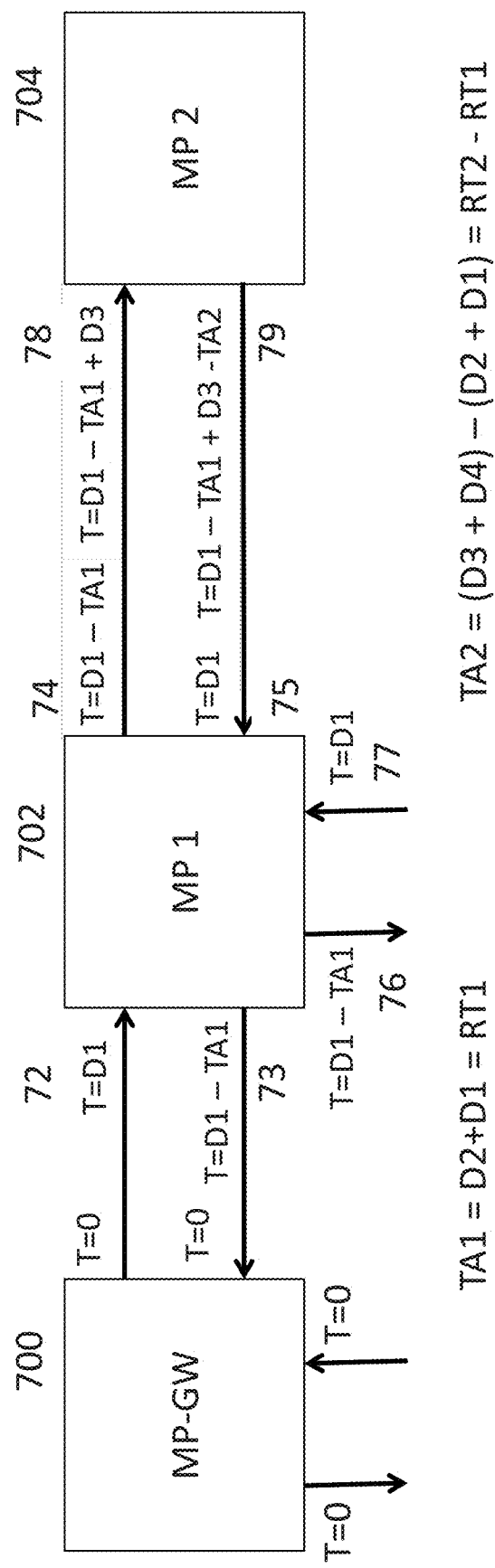
FIGS. 7-11 and 12 are timing diagrams.

In order for an MP to transmit (or receive) DL and UL signals in the same OFDM symbol, it is necessary to achieve frame timing phase alignment between DL and UL signals in transmission (or reception), as shown in FIG. 7.

First the transmissions and receptions in the MP-GW (or MN-RN) 700 are time aligned to some universal time reference, such as GPS. All MPs synchronize their timing and frequency to that of their upstream MP using the DL backhaul signal received from the upstream MP. As shown in FIG. 7, MP1 702 first aligns the timing phase of UL receptions on the access link 77 and the downstream UL backhaul link 75 to the timing phase of signals received on the DL backhaul link 72. If we denote the timing phase at the MP-GW (or MN-RN) as T=0, the timing phase at the receiver of MP is T=D1, where D1 is approximately equal to the DL delay between MP-GW (or MN-RN) and MP1. MP1 controls the timing phase of the signals received on its access and downstream backhaul links by properly setting the timing advance in UEs and the downstream MPs. The timing phase T=D1−TA1 of UL transmissions by MP1 on the upstream UL backhaul link 73 are determined by the MP-GW (or MN-RN) according to the timing advance procedure. The timing advance TA1 is nominally equal to the round-trip delay RT1 between MP-GW (or MN-RN) and MP1, but may also include a fixed time offset. In this technology, to transmit on the DL and UL at the same time, MP1 aligns the timing phase of DL downstream backhaul links 74 and DL access links 76 to the timing phase of transmissions on the upstream UL backhaul link 73, so that all transmissions by MP1 are time aligned to T=D1−TA1=D1−RT1. In FIG. 7, the downstream MP MP2 704 also aligns its timing in the same manner. The timing advance used by MP2 is given by TA2=RT2−RT1, which can be a negative number (i.e., a timing delay).

In this procedure, the timing phase of transmissions and receptions are perfectly aligned at the MN-RN, but at the MPs there is a timing offset between transmissions and receptions, which is nominally equal to their timing advance. When the MP switches from receiving to transmitting and vice versa a brief delay may occur in the TDD switch. A short silence gap of one or more OFDM symbols is introduced between DL-to-UL transitions to give the TDD switch enough time to switch and also make room for any small misalignment between the transmitter and receiver frame timing.

We will next explain in more detail the time alignment procedure described above. In the MN-RN, a total guard time, herein referred to as GAP in seconds, is needed to ensure that MN-RN and all downstream RF nodes and UEs will have enough time to switch from transmitting (Tx) to receiving (Rx) and also from Rx to Tx without experiencing significant self-interference. In many applications, the guard time GAP corresponds to an integer number L of OFDM symbol intervals. Since no data transmission occurs during the guard interval, it is important to keep the value of L as small as possible. In general, L depends on the required TDD switching times in the RF nodes and in the UEs, the round-trip propagation delays on backhaul links between RF nodes, the round-trip delays between RF nodes and their UEs and the length of the OFDM symbol interval, which is inversely proportional to the subcarrier spacing.

All MPs and UEs served by MN-RN advance the timing phase of their UL transmissions by a timing advance (TA) value relative to the timing phase of their DL receptions. The TA value is given by RT+c, where RT is the actual round-trip delay between the UL transmitter and the corresponding receiver and c is a constant common to all UEs and MPs. Sometimes the constant c is referred to as the fixed part (or fixed value) of the TA and RT is referred to as the variable part (or variable value), as the latter may vary among MPs and UEs served by the MN-RN. The timing advance procedure equalizes the different round-trip delays at the MN-RN and ensures that all UL transmissions from UEs and downstream MPs are received at the same time. As long as these transmissions are received by the MN-RN within the cyclic prefix of the OFDM symbol, no inter-subcarrier interference occurs, allowing different UEs and MPs to transmit on different RBs on the same OFDM symbol. The TA values are determined by the MN-RN and indicated to the served UE or MP during the initial attachment procedure. The TA value is also continuously updated by the MN-RN by sending TA update messages during the RRC connection.

Figure 8:
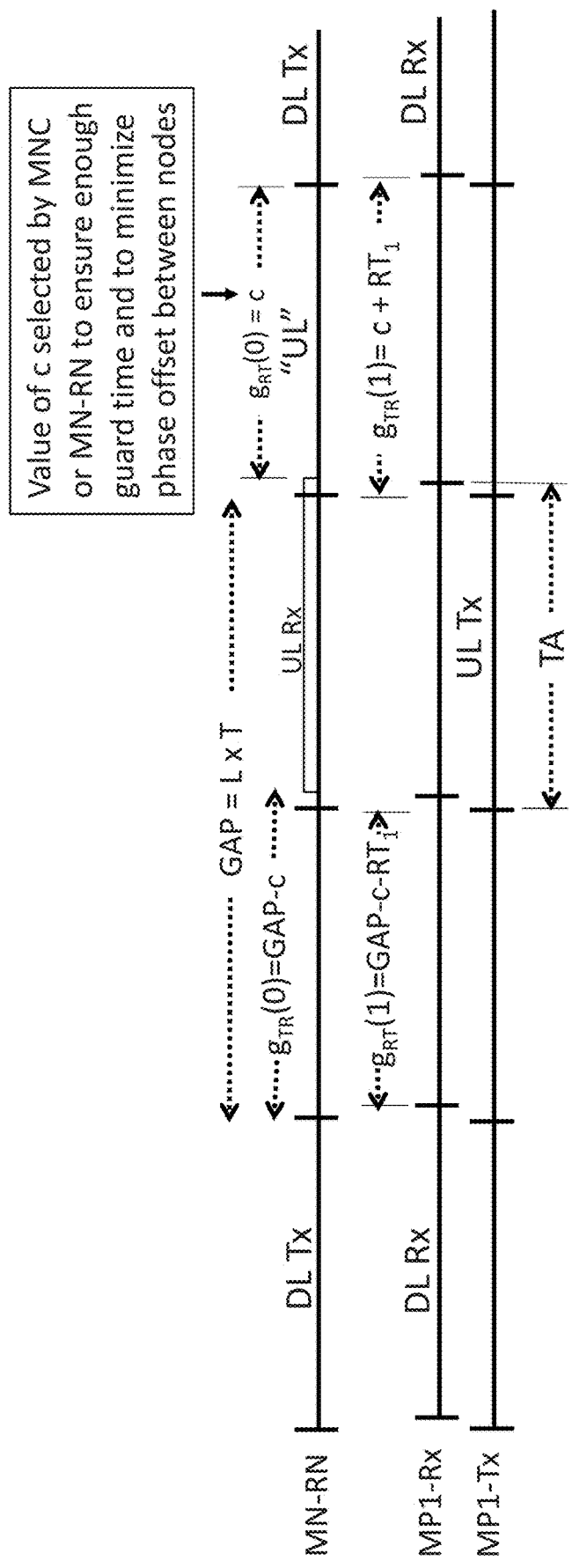

With the timing advance procedure described above, and as shown in FIG. 8, the effective guard time in the MN-RN during a Tx-to-Rx transition is equal to $g_{TR}(0)=GAP-c$. That is, from the end of the DL transmission of an OFDM symbol to the start of reception of the first UL transmission, the MN-RN has GAP–c seconds to switch the direction of communication from transmitting to receiving and avoid any interference from the transmitted signal into the receiver. As shown in FIG. 8, during the Rx-to-Tx transition, the available guard time is $g_{RT}(0)=c$. The total guard time available for both transitions is GAP=L×T, where in FIG. 8, L=2. As long as $c \geq T_{sw-tr}$ and GAP–$c \geq T_{sw-rt}$, where $T_{sw-tr}$ and $T_{sw-rt}$ are the minimum required guard times at the MN-RN for Tx-to-Rx and Rx-to-Tx transitions, respectively, no self-interference will occur.

As illustrated in FIG. 8, in MP1 the effective guard intervals for Tx-to-Rx and Rx-to-Tx transitions are given by $g_{TR}(1)=g_{RT}(0)+RT_1=c+RT_1$ and $g_{RT}(1)=g_{TR}(0)-RT_1=L\times T-c-RT_1$, respectively, where $RT_1$ is the round-trip delay between MN-RN and MP. It can be seen that the available guard interval in MP1 (and in the UEs served by MN-RN) for a Tx-to-Rx transition corresponds to the available guard interval $g_{RT}(0)$ in the MN-RN during an Rx-to-Tx transition plus the round-trip delay $RT_1$. Similarly, the available guard interval in MP1 for an Rx-to-Tx transition corresponds to the available guard interval $g_{TR}(0)$ available in the MN-RN during a Tx-to-Rx transition minus the round-trip delay $RT_1$. The total guard interval in MP1 is equal to $g_{TR}(1)+g_{RT}(1)=GAP$, the same as in the MN-RN.

As described earlier, all MPs in the mesh network align the timing phase of their DL transmissions (UL receptions) to the timing phase of their own UL transmissions (DL receptions). This is done to allow the MPs to schedule DL transmissions (or UL receptions) at the same time as UL (or DL) backhaul transmissions scheduled by their upstream RF nodes. The relationship that we described above between the guard times in MP1 and MN-RN can be generalized to show that for an n-hop MP (MPn), the available guard intervals can be described recursively as follows $$g_{TR}(n)=g_{RT}(n-1)+RT_n,$$

and $$g_{RT}(n)=g_{TR}(n-1)-RT_n.$$

The UL timing advance that is applied by an n-hop MP is equal to the sum of the available guard time $g_{RT}(n-1)$ during a Rx-to-Tx switch in its serving (n−1)-hop RF node plus the round-trip delay $RT_n$, which corresponds to the available guard time the n-hop MP will have during a Tx-to-Rx switch:

$$TA(n)=g_{RT}(n-1)+RT_n=g_{TR}(n).$$

These formulas can also be used to determine the available guard time in a UE. In 5G NR specification 38.133, the TA value used by a UE consists of an offset term $TA_{offset}$ (currently specified as $13792\times T_c$, where $T_c=10^6/(4096\times 480)$ ns is the chip interval) and a UE-specific term $TA_{UE-sp}$, which is indicated to the UE by the serving gNB. The TA value applied by the UE is the sum of these two terms; i.e., $TA_{UE}=TA_{offset}+TA_{UE-sp}$. In our formulation above, the fixed term c may differ from the term $TA_{offset}$ that is specified by 3GPP for Release 15 UEs, and the serving RF node (in what follows, we use the term serving RF node to refer to the upstream MP-GW, MN-RN or other MP to which an MP is attached to) will make up for the difference by including it in the variable term $TA_{UE-sp}$. The table below shows the available guard times and the TA values in a 3-hop mesh network link. These formulas can also be used to determine the available guard times and TA values for a UE. The available guard times $g_{TR,n}(UE)$ and $g_{RT,n}(UE)$ for a UE attached to an n-hop MP can be determined by applying the formula for the (n+1)-hop MP, using the round-trip delay $RT_{UE,n}$ between the UE and the n-hop MP. The TA value for the same UE can be derived from the value $g_{TR,n}(UE)$; i.e., $TA_n(UE)=g_{TR,n}(UE)$.

|  | MN-RN | MP1 | MP2 | MP3 |
| --- | --- | --- | --- | --- |
| Tx -> Rx | LxT − c | c + RT$_1$ | LxT − c − RT$_1$ + RT$_2$ | C + RT$_1$ − RT$_2$ + RT$_3$ |
| Rx -> Tx | c | LxT − c − RT$_1$ | c + RT$_1$ − RT$_2$ | LxT − c − RT$_1$ + RT$_2$ − RT3 |
| Total Guard Time | LxT | LxT | LxT | LxT |
| TA | 0 | c + RT$_1$ | LxT − c − RT$_1$ + RT$_1$ | C + RT$_1$ − RT$_2$ + RT$_3$ |

We note that in a mesh network where RF nodes align their UL and DL transmissions, the total gap interval required does not increase with the hop count. However, the MN-RN has to choose the value of the constant c and the total guard interval GAP in such a way that all nodes and UEs have enough guard time between transmissions and receptions.

In what follows, to simplify the description, we will assume that all RF nodes and UEs need the same minimum switching guard time $T_{sw}$ for both Tx-to-Rx and Rx-to-Tx transitions. The methods described below can be readily extended to use cases where these required guard times are all different. In a zero-hop network, where all UEs are served by an MN-RN, to ensure that MN-RN and all its UEs have sufficient guard intervals for any round-trip delay $RT_{UE,0}$, the MN-RN needs to choose L and c such that $c \geq T_{sw}$ and $L\times T-c-RT_{UE,0} \geq T_{sw}$, where $RT_{max-UE,0}$ is the maximum supported round-trip delay between the MN-RN and its served UEs. Both of these conditions can be satisfied by choosing $c=T_{sw}$ and $L\times T \geq 2\times T_{sw}+RT_{max-UE,0}$. In a 1-hop mesh network, to ensure that MP1 and the UEs it serves on its access link also have sufficient guard intervals, MN-RN needs to choose c such that $c \geq T_{sw}+RT_{max-UE,1}$, where $RT_{max-UE,1}$ is the maximum supported round-trip delay between MP1 and its served UEs. This condition can be satisfied by choosing, $c=T_{sw}+RT_{max-UE,1}$ and $L\times T \geq 2\times T_{sw}+2\times RT_{max-UE}$, where we assumed that maximum supported round-trip delay is the same for UEs attached to MN-RN or MP1. It can be seen that when no a priori information is available about the round-trip delays, introducing MP1 may cause the MN-RN to increase the total gap interval L. This result can be generalized to multi-hop mesh networks. For example, when we assume that all maximum supported round-trip delays for UEs and MPs are the same; i.e., $RT_{max-MP}=RT_{max-UE}=RT_{max}$ and $K_{hop-max}$ is the maximum number of hops supported in the mesh network, to ensure that all RF nodes and UEs have sufficient guard intervals without any a priori information on round-trip values, the MN-RN needs to choose $L\times T\ 2\times T_{sw}+K_{hop-max}\times RT_{max}$. It can be seen that the total guard time required can grow approximately linearly with the number of hops. In applications where $RT_{max} \ll T_{sw}$ and the maximum number of hops is small, the total guard interval may not increase. However, in other applications where these conditions don't hold, the increase in the GAP overhead can be significant. In these applications, to reduce the overhead, the technology of this specification uses a dynamic technique where sufficient TDD switching time is provided by the RF nodes based on the actual round-trip delay values they observe. Instead of using a fixed GAP=L×T value where the number of symbols L is fixed, the RF nodes can dynamically adjust the GAP interval by selecting the number of guard OFDM symbols between DL and UL transmissions and between the UL and DL transmissions at the time of scheduling, based on actual round-trip delay values. RF nodes can estimate the round-trip delays to their served UEs and downstream MPs based on the initial TA value they determine during connection establishment, as well as the TA adjustments they determine during the RRC connection. Dynamic optimization of the guard interval starts at the MN-RN. MN-RN selects the value of L and c, at the time of scheduling, to ensure sufficient guard time in Tx-to-Rx and Rx-to-Tx transitions in the MN-RN and in the scheduled MPs and UEs, with a balanced guard time headroom for all transitions. Downstream MPs can adjust the values of L and c when scheduling transmissions for their own served MPs and UEs based on their own round-trip delay estimates. Increasing (or decreasing) the guard interval between the last DL symbol and the first UL symbol by an integer number of OFDM symbols while holding the TA value constant, increases (or decreases) the available guard interval during the Tx-to-Rx transition in the MN-RN and during the Rx-to-Tx transition in the scheduled MP or UE by the same amount. Likewise, increasing (or decreasing) the guard interval between the last symbol of the UL transmission and the first symbol of the DL transmission (nominally equal to 0) by an integer number of OFDM symbols increases (or decreases) the available guard interval during an Rx-to-Tx transition in the MN-RN and during the Tx-to-Rx transition in the scheduled MP or UE. In a similar manner, adjusting the guard intervals by adjusting the number of guard symbols at each hop based on estimates of round-trip delays available at each RF node minimizes the number of OFDM symbols used in guard intervals.

Another important aspect of the technology of this specification is the timing phase offset between RF nodes of the mesh network. In TDD systems, 3GPP specification 38.133 requires that the timing phase offset between RF nodes in different cells with overlapping RF coverage be less than 3 usec. When RF nodes belong to the same cell and they are transmitting the same information (e.g., SSB MIB, SIB, etc.) simultaneously, in some applications it may be desirable that the timing offset be less than the cyclic prefix length. According to the table shown above, when MP1 aligns the phase of its DL and UL transmissions, the normalized timing phase offset between the DL OFDM symbol transmissions of MP1 and the DL OFDM symbol transmissions of MN-RN will be $$\Delta_1 = RT_1/2 - TA(1)(\text{mod } T) = RT_1/2 - RT_1 - c(\text{mod } T) = -RT_1/2 - c(\text{mod } T),$$

where x (mod T)=$x + k_{mod} \times T$ is a value in the interval [−T/2, T/2) and $k_{mod}$ is an integer. Similarly, the timing phase offset between the DL OFDM symbol transmissions of MP2 and MP1 will be $$\Delta_2 = RT_2/2 - TA(2)(\text{mod } T) = c + RT_1 - RT_2/2 (\text{mod } T).$$

More generally, for the n'th RF node MPn, the DL timing offset from its upstream RF node can be written as $$\Delta_n = RT_n/2 - TA(n)(\text{modulo } T) = c + RT_1 - RT_2 + RT_3 \ldots -RT_n/2 (\text{mod } T), \text{ for } n=\text{even}$$

$$\Delta_n = RT_n/2 - TA(n)(\text{modulo } T) = -RT_1 + RT_2 - RT_3 \ldots -RT_n/2 - c(\text{mod } T), \text{ for } n=\text{odd}.$$

The timing offset between the n'th RF node and the MN-RN is given by $$\delta_n = RT_1/2 - RT_2/2 + RT_3/2 \ldots -RT_n/2 (\text{mod } T), \text{ for } n=\text{even}$$

$$\delta_n = -c - RT_1/2 + RT_2/2 - RT_3/2 \ldots -RT_n/2 (\text{mod } T), \text{ for } n=\text{odd}$$

When the propagation delays between directly attached RF nodes are approximately equal to a nominal value RT/2, the worst case timing offset between an RF node and the MN-RN occurs in odd-numbered RF nodes and is equal to −(c+RT/2) (mod T). By choosing c+RT/2 (mod T) equal to the nominal OFDM symbol interval T, the timing offset can be forced to zero. This shows that when the propagation delays between RF nodes in a mesh link are the same and the propagation delay is known at the MNC or MN-RN, the timing phases of DL transmissions at all RF nodes can be aligned perfectly by choosing the constant c based on the one-way propagation delay and the subcarrier spacing. Aligning the timing phases as described above still leaves enough guard period during Tx-to-Rx or Rx-to-Tx switching at the MPs. At 120 kHz subcarrier spacing, T=8.93 usec, and assuming $T_{sw}$=7 usec and RT/2=0.3 usec is fixed, choosing c=8.63 usec provides perfect DL phase alignment. Using a two-symbol total guard interval of GAP=2×8.93 usec, all RF nodes will have a sufficient guard interval to serve their UEs. As we described above, RF nodes can dynamically choose the number of OFDM guard symbols to ensure that all UEs and MPs have sufficient time to complete their Tx-to-Rx and Rx-to-Tx transitions.

In other applications, when the propagation delays between directly attached RF nodes are random and, for example uniformly distributed between $RT_{min}$=0.2 usec and $RT_{max}$=0.6 usec, the maximum possible timing offset is minimized by choosing c such that $c+RT_{max}/2+(RT_{max}-RT_{min})*(k_{hop-max}-1)/4=0$ (mod T), or $c=T-RT_{max}-(RT_{max}-RT_{min})*(k_{hop-max}-1)/4=8.43$ usec, where $k_{hop-max}$ is the maximum number of hops supported in the mesh network. When $k_{hop-max}$=3, the worst-case timing phase offset between an MP and its serving RF node is then given by $(RT_{max}-RT_{min})*(k_{hop-max}-1)/4=0.2$ usec. This is well within the length of the cyclic prefix.

Figure 9:
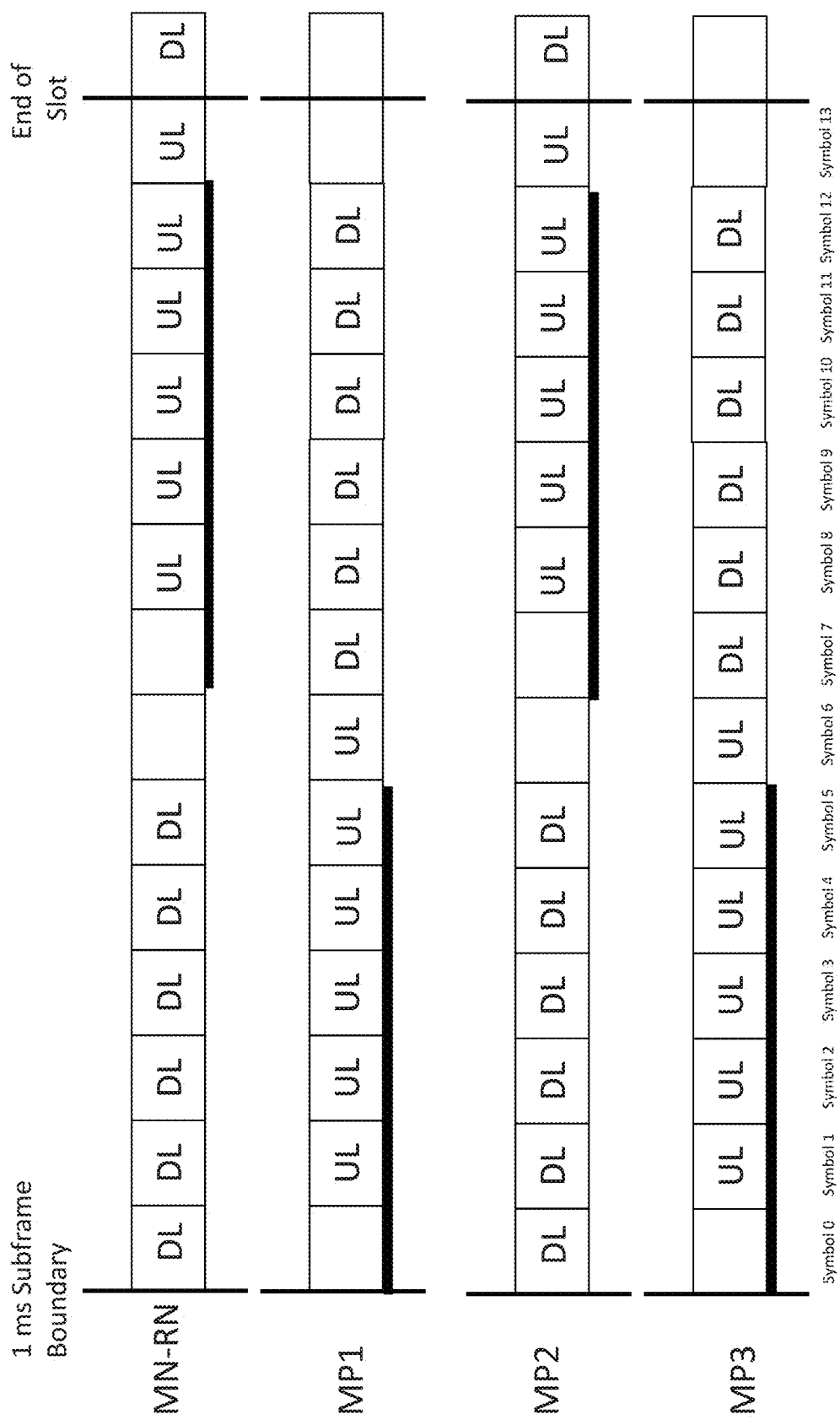

As described above, in the technology of this specification, it is possible for MPs in a mesh network to align their UL and DL transmissions (and receptions) and also maintain a sufficiently small timing phase offset between neighboring RF nodes by selecting the timing advance offset value c based on the maximum number of hops, the subcarrier spacing, and the inter-nodal round-trip delays supported in the mesh network. FIG. 9 illustrates the slot format in a 3-hop mesh network assuming a 2-symbol (L=2) guard interval, all allocated to the DL-to-UL transition. To simplify the diagram, we assumed that all propagation delays are very small relative to the symbol interval and the constant c is chosen equal to the nominal symbol interval T. In this example, DL transmissions of all RF nodes are phase-aligned. In the MN-RN, symbols 0-5 are designated as DL symbols. On these symbols, MN-RN may transmit to MP1 and to its UEs. The timing advance TA(1) used by MP1 is equal to T, the OFDM symbol interval; therefore, MN-RN will start receiving UL transmissions from MP1 or from its UEs in symbol 7, one symbol earlier than the UL symbol indicated in FIG. 9. MP1 starts DL transmissions to MP2 or to its UEs also in symbol 7. This allows MP to multiplex DL and UL transmissions either spatially or in the frequency domain. MP1 starts receiving UL transmissions from MP2 or from its UEs in symbol 0. In the same symbol, MP1 can also receive DL transmissions from MN-RN. Likewise, MP2 starts transmitting to MP3 and to its UEs in the same symbol, and so on. It can be observed that when even-hop RF nodes are transmitting, the odd-hop RF nodes are receiving, and vice versa. When propagation delays are not zero, the timing diagram will look similar, except there will be a slight phase misalignment between the RF nodes.

Figure 10:
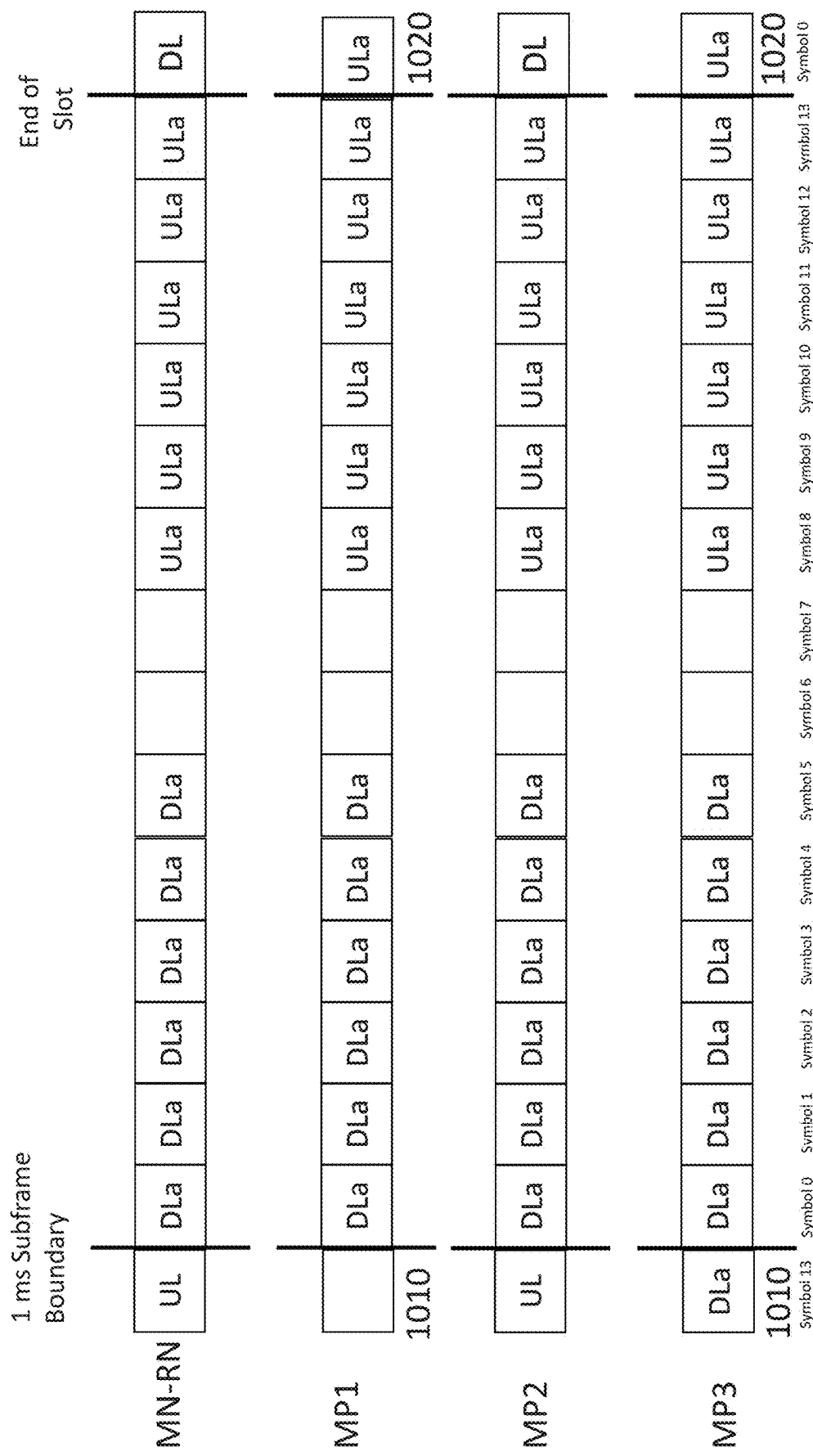

FIG. 10 shows another slot configuration, where all RF nodes transmit or receive simultaneously on their access links. In this case, the even-hop RF nodes switch from UL to DL transmission in the beginning of the slot, whereas odd-hop MPs switch from DL transmission on both access and backhaul links to DL transmission on the access links only. Since odd-hop MPs don't switch the direction of transmission, they can transmit on the DL on their access links in the last symbol 1010 of the previous slot, but to give downstream even-hop MPs sufficient guard time to switch from receiving to transmitting, odd-hop MPs should not transmit on the backhaul links in the last symbol 1010 of the previous slot. Similarly, at the end of the slot, even-hop RF nodes switch from UL transmission on access links to DL transmissions on both backhaul and access links, whereas odd-hop MPs switch from DL transmission on access links to DL transmission on both backhaul and access links. Odd-hop MPs can now receive on the UL on their access links in the first symbol of the next slot 1020, but to avoid self-interference, they should not transmit on the backhaul links to downstream MPs in the first symbol 1020 of the next slot.

Figure 11:
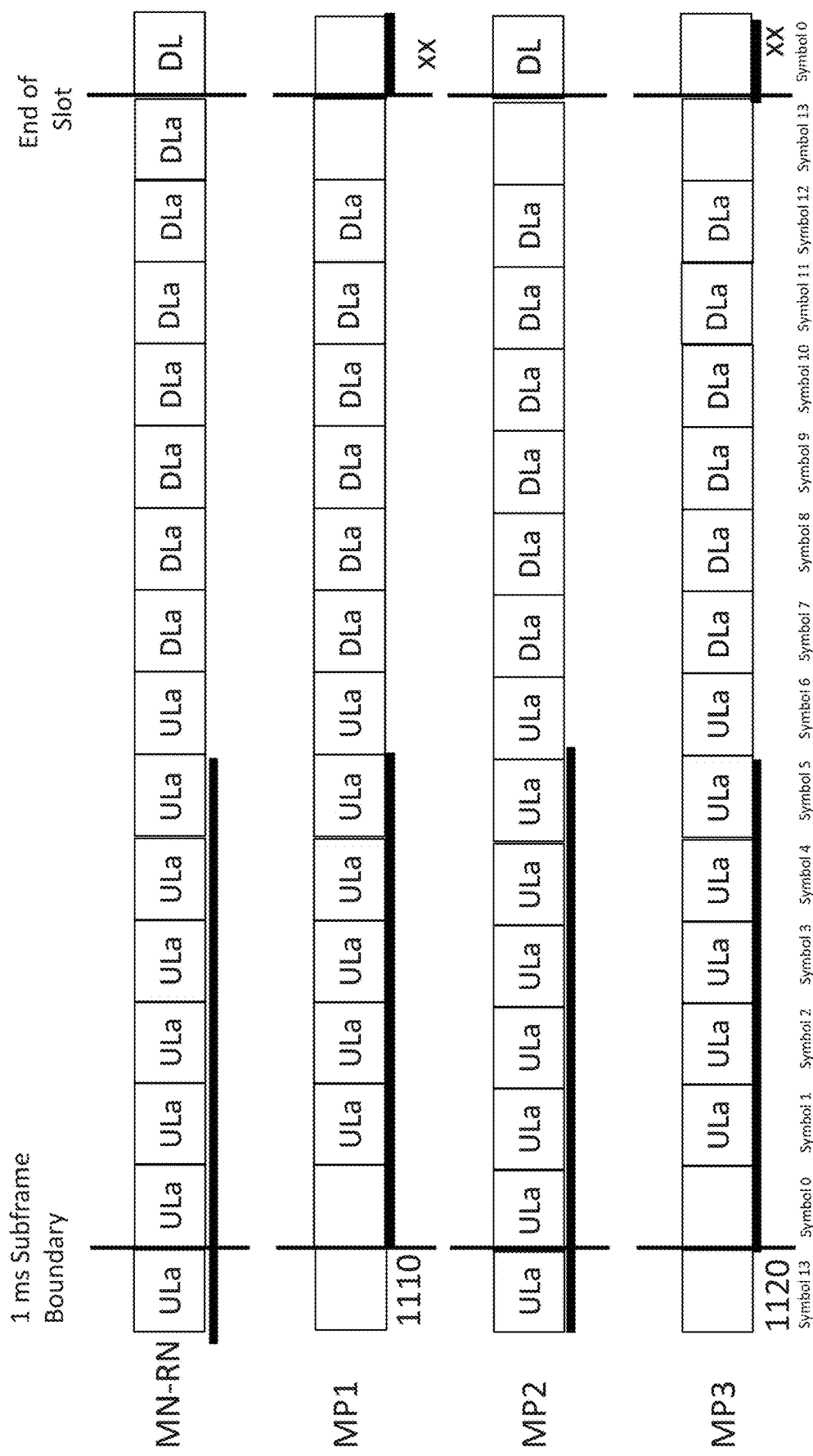

The frame structures described above can be extended to other switching scenarios. For example, the even-hop RF nodes may switch from DL transmission on backhaul and access links to DL transmission on only access links, while the odd-hop MPs switch from UL reception on backhaul and access links to DL transmission on only access links, before switching back to transmitting on both access and backhaul links in the next slot. In this case, illustrated in FIG. 11, the even-hop RF nodes have two extra symbols where they can transmit on their access links, but not on backhaul links. The transitions may occur on any symbol boundary, not just on slot boundaries. In some time resources, only DL transmissions scheduled by even-hop RF nodes may be allowed, and in other time resources, only UL transmissions scheduled by even-hop RF nodes may be allowed. In other time resources, only DL transmissions scheduled by odd-hop MPs may be allowed, and in other time resources only UL transmissions scheduled by odd-hop MPs may be allowed. In all cases, all half-duplex RF nodes need enough guard time when switching from transmitting to receiving and from receiving to transmitting. In multi-panel full-duplex RF nodes, described later in this specification, guard times are managed on a per panel basis, since one panel may be transmitting when another panel is receiving.

Figure 12:
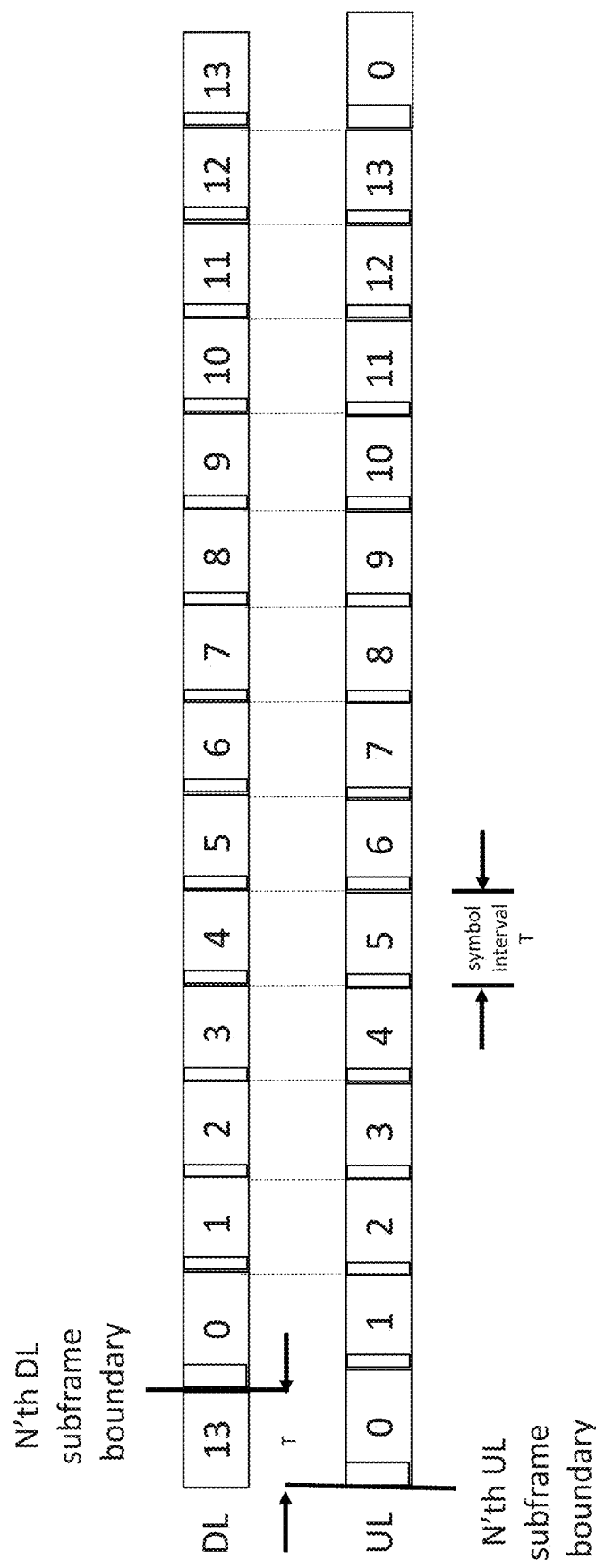

In the technology described in this specification, in some applications MPs align the timing phase of their DL symbol transmissions to the timing phase of their UL symbol transmissions. In other applications, MPs may also align the timing phase of their DL symbol receptions to the timing phase of their UL symbol receptions. However, in some implementations that are compatible with 3GPP 5G NR standard, UL and DL transmitted (or received) radio frames or subframes may have a fixed offset between them of one or more OFDM symbol intervals T. In some of the examples we described in this specification, the first symbol of an UL subframe or radio frame occurs 1 symbol interval before the first symbol of the corresponding DL subframe or radio frame. 3GPP R15 specification 38.211 specifies that the cyclic prefix used in the first symbol of every N'th slot in a subframe is longer than the nominal cyclic prefix used in the remaining symbols. For example, for a subcarrier spacing of 120 kHz, the first symbol of every $4^{th}$ slot uses a longer cyclic prefix. Therefore, as shown in FIG. 12, the first DL and UL symbols of every $4^{th}$ subframe will be slightly longer and create a misalignment between symbol 13 of a DL subframe and symbol 0 of the next UL subframe and between symbol 0 of a DL subframe and symbol 1 of the corresponding UL subframe. If DL and UL transmissions (or receptions) were both scheduled to occur on these symbols, inter-subcarrier and intersymbol interference may occur. In the technology of this specification, when UL and DL frames or subframes have a fixed offset of 1 or more symbol intervals, the scheduler in the MP and the scheduler in its serving RF node coordinate their transmissions and receptions, either dynamically or semi-statically, and avoid simultaneous DL and UL transmission (or reception) in these symbols.

In some implementations, it is preferred to align the timing phase of DL transmissions of an MP to the timing phase of DL transmissions of its serving RF node. In this case, it is not possible for the MP to align its DL and UL transmissions and also align their DL and UL receptions. In some implementations, an MP aligns its DL and UL transmissions, as described earlier, and leaves its DL and UL receptions not aligned. This prevents the MP from using OFDMA across DL and UL when receiving on the DL and UL at the same time, but an important advantage of only aligning the DL and UL symbol transmissions and further aligning them to the DL frame transmissions of the serving RF node is that it ensures that when the propagation delay between an MP and its serving RF node changes, the timing phase of transmissions and receptions in downstream MPs or UEs are not affected. In mesh networks in which the DL and UL receptions are time-aligned, when an MP experiences a change in the propagation delay of its upstream backhaul link due to mobility or due to a change in its serving RF node, all downstream MPs and UEs need to adjust the timing phase of their UL transmissions.

When an MP, MP1, aligns its DL transmission to that of its serving RF node at the radio frame level, and also aligns the timing phase of its UL symbol transmissions to the timing phase of its DL symbol transmissions, MP1 will start the transmission of the first symbol of its UL radio frame substantially at time $t_{UL-TX}=RT_1/2-TA$, where $RT_1$ is the round-trip delay between MP1 and its serving RF node and TA is a timing advance. Here the timing advance TA can be represented as $TA=(L-1) \times T+RT_1/2$, where T is the nominal OFDM symbol interval, L is a positive integer, and $t_{UL-TX}$ is nominally equal to $-(L-1) \times T$. The time $t_{UL-TX}$ is measured relative to the time the serving RF node starts the transmission of the first symbol in its corresponding DL radio frame. The radio frame for UL transmissions is advanced by L−1 symbol intervals relative to the radio frame of its serving RF node for DL transmissions. In some implementations, L may be chosen as L=1. Then, $t_{UL-TX}=0$ and the radio frames of UL transmissions of MP1 are then aligned with the radio frames of DL transmissions of its serving RF node.

When MP1 first attaches to the mesh network, its serving RF node estimates $RT_1$ based on MP1's PRACH transmission and indicates to MP1 the TA value, for example by sending a quantized version of its estimate of RT/2. Once MP1 applies the received TA value, the serving RF node will receive the first symbol in MP1's UL radio frame starting at time tax, which can be represented nominally as $t_{RX}=-(L-1)T+RT_1/2$. When L=1, $t_{RX}=RT_1/2$. Once its UL transmissions are synchronized as described above, MP1 aligns the start time of its own DL transmissions based nominally on the following formula $t_{DL-TX}=t_{UL-TX}+(L-1)T=0$. This aligns the DL transmissions of MP1 with the DL transmissions of its serving RF node at the radio frame level.

It can be seen that the arrival time of MP1's UL transmission at its serving RF node depends on the one-way delay $RT_1/2$. When the one-way propagation delay $RT_1/2$ changes by $\Delta$, MP1 has to update its TA value by the same amount. The serving RF node can determine A by first computing the increase (or decrease) in the arrival time of MP1's UL transmissions and then send MP a quantized version of one-half of the computed increase (or decrease) to update MP1's TA value. For example, when the arrival time of the UL transmission changes by M chip intervals, $M \times T_c$, the TA adjustments can be quantized to multiples of 128 chip intervals, and the serving RF node may send an index that represents the nearest quantized value for $(M/2) \times T_c$.

Since the arrival time of an MP's UL transmission depends on the one-way delay between the MP and its serving RF node, when an RF node is serving two or more MPs with different propagation delays, their simultaneous UL transmissions may arrive at the serving RF node with a slightly different time offset. When the arrival times differ by more than the cyclic prefix of the OFDM system such simultaneous transmissions may suffer from inter-subcarrier interference. In the technology of this specification, serving RF nodes avoid such mutual interference by scheduling such MP's UL transmissions on different OFDM symbols, and include guard symbols in between as needed. Stated in another way, the serving RF node keeps track of the arrival time of each one of its served MPs and maintains a copy of this information at its scheduler. The scheduler then opportunistically allows the scheduling of two MPs in the same OFDM symbol when the difference between the arrival times of their UL transmissions is below a threshold. In some applications, the threshold may correspond to the cyclic prefix length used in OFDM modulation. Then when the arrival times of their UL transmissions differ by more than the cyclic prefix, the scheduler allocates UL resources to the MPs on different OFDM symbols, even when the MPs UL transmissions can otherwise be received by the serving RF node using the same spatial Rx beam. For example, when the serving RF node is serving two MPs, MP1 and MP2, and their UL transmissions arrive with a time delay of $RT_1/2$ and $RT_2/2$, respectively, and $RT_1-RT_2>2\times$Cyclic Prefix Length, the serving RF node may schedule MP1 and MP2 in different UL symbols.

The serving RF node computes the UL timing advance for UEs on its access links using known methods that are compatible with the 3GPP R15 specifications, for example 38.133. At the time of initial attachment, the serving RF node provides the UE an initial TA value, which can be represented nominally as $TA=c+RT_{UE}$, where c is a constant value and $RT_{UE}$ is the round-trip propagation delay between the serving RF node and the UE. This aims to align the receptions of UL radio frames from all served UEs to start c seconds before the corresponding DL radio frame, and thereby gives the serving RF node the flexibility to schedule UL transmissions from two or more UEs in the same OFDM symbol using the same cyclic prefix. When the arrival time of a UE's UL transmission and the arrival time of an MP's UL transmission are separated by less than the common cyclic prefix, the serving RF node may schedule these UL UE and UL MP transmissions to occur in the same symbol.

To increase the likelihood of simultaneous UL transmissions by UEs and MPs, in some applications the mesh network uses the value $c=K \times T-RT_{MP-rep}/2$, where $RT_{MP-rep}$ is a pre-determined value representative of the round-trip propagation delay values expected between the serving RF node and its served MPs, K is a positive integer and T is the nominal symbol interval. When the round-trip delay between an MP and its serving RF node is equal to the representative value $RT_{MP-rep}$, UL transmissions by the MP and by UEs will arrive at the serving RF node with a radio frame offset given by $(K-L-1) \times T$. When K=L-1, the radio frame offset is zero, and the UL reception from the MP and the UE are then aligned at the radio frame level. Otherwise, as we explained earlier, they are aligned at the symbol level, except for a few symbol positions in each subframe that use a longer cyclic prefix, as explained earlier in this specification. Outside of these symbol positions, the serving RF node may schedule the MP and the UE to transmit on the UL at the same time.

As described earlier, according to the 3GPP specification 38.133, the initial timing advance value applied by a UE is represented by $TA_{UE}=TA_{offset}+TA_{UE-sp}$, where $TA_{offset}$ is approximately equal to 7 usec for mm-wave frequencies and $TA_{UE-sp}$ is a non-negative UE-specific value. The serving RF node computes the value of $TA_{UE-sp}$ according to $$TA_{UE-sp}=-TA_{offset}+K \times T-RT_{MP-est}/2+RT_{UE}.$$

This produces the desired timing advance value $$TA_{UE} = TA_{offset} + TA_{UE-sp} = K \times T - RT_{MP-est}/2 + RT_{UE}.$$
$$= c + RT_{UE}.$$

When $RT_{MP-est}/2 \leq K \times T-TA_{offset}$, the value of $TA_{UE-sp}$ will be non-negative as required by the 3GPP R15 specification 38.213. At subcarrier spacing of 120 kHz, T is approximately equal to 8.9 usec. Then for K=1, this condition will be satisfied when $RT_{MP-est}/2 \leq 1.9$ usec. This upper limit corresponds to a link distance between an MP and its serving RF node of about 570 meters, which is well above the expected inter-node distance in a mm-wave mesh network.

In contrast to OFDM systems used in practice, in the technology described above, UL transmissions from UEs and from different MPs will arrive at the serving RF node at different times. Therefore, the serving RF node dynamically updates its UL receive symbol timing based on the expected timing phase of scheduled UL transmissions. For example, after receiving an UL transmission from a UE, the serving RF node may adjust (advance or retard) the timing phase of its UL receiver when it is expecting to receive a scheduled UL transmission from an MP and the current receiver timing phase of MP's UL transmissions differs from that of the UE. To simplify the adjusting of the timing phase of its UL receiver, in some implementations the serving RF node may use DL and/or UL transmissions in between UL receptions from two MPs that cannot be served in the same symbol, in order to allow its receiver to advance or retard its timing phase when the serving node is transmitting.

The minimum required guard time between DL and UL transmissions and receptions can be determined based on the system description provided above. For example, for an MP, MP1, attached to a serving RF node, and assuming L=1, the first table below shows the minimum number of guard symbols needed when transitioning from the mode shown in the row (DL Rx, UL Tx, DL Tx or UL Rx) to the mode shown in the column. Sufficient guard symbols (for example, 0, 1 or 2 guard symbols) need to be inserted for various transitions in order to avoid mutual interference. An MP may transmit on the UL and DL on the same symbol; this is indicated in the table as "N/A."

| GAP Symbols Required | | | | |
|---|---|---|---|---|
| | DL Rx | UL Tx | DL Tx | UL Rx |
| DL Rx | 0 | 1 | 1 | 1 or 0 |
| UL Tx | 1 | 0 | N/A | 1 |
| DL Tx | 1 | N/A | 0 | 1 |
| UL Rx | 0 or 1 | 1 | 1 | 0 |

The second table below shows the available guard intervals assuming the number of guard symbols shown in the table above. Here $RT_1$ is the round-trip delay between MP and its serving RF node and $RT_2$ is the round-trip delay between MP and its served MP, MP2. It can be seen sufficient guard time is available to perform the transitions.

| | DL Rx | UL Tx | DL Tx | UL Rx |
|---|---|---|---|---|
| DL Rx | 0 | T − RT1/2 > Tsw | T − RT1/2 > Tsw | (T or 0) − RT1/2 + RT2/2 > 0 |
| UL Tx | T + RT1/2 > Tsw | 0 | N/A | T + RT2/2 > Tsw |
| DL Tx | T + RT1/2 > Tsw | N/A | 0 | T + RT2/2 > Tsw |
| UL Rx | (0 or T) + RT1/2 − RT2/2 > 0 | T − RT2/2 > Tsw | T − RT2/2 > Tsw | 0 |

When transitioning from receiving on the UL to receiving on the DL, or when transitioning from receiving on the DL to receiving on the UL, the number of guard symbols (0 or 1) needed depends on the round-trip delays $RT_1$ and $RT_2$. In the technology of this specification, unnecessary guard symbols are avoided by using dynamic guard time determination based on these round-trip delays. For example, when $RT_1 \geq RT_2$, MP1 can receive an UL transmission from MP2 that ends on symbol n and start receiving from MN-RN on the DL on symbol n+1 without any guard symbols in between. When the DL reception ends on symbol m≥n+1, MP1 can start receiving an UL transmission starting in symbol m+2, with 1 guard symbol in between. When $RT_2 > RT_1$, MP1 can receive an UL transmission from MP2 that ends in symbol n and start receiving a DL transmission from MN-RN in symbol n+2, with 1 guard symbol in between.

When the DL transmission ends in DL symbol m≥n+2, MP1 can start receiving an UL transmission from MP2 starting in UL symbol m+1, without any guard symbols in between.

When $|RT_1 − RT_2| < CP\_Length$, using the pipelined scheduling technology of this specification, it is also possible for MP1 to schedule an UL transmission by MP2 in the same symbol it is scheduled to receive a DL transmission from MN-RN.

Figure 13:
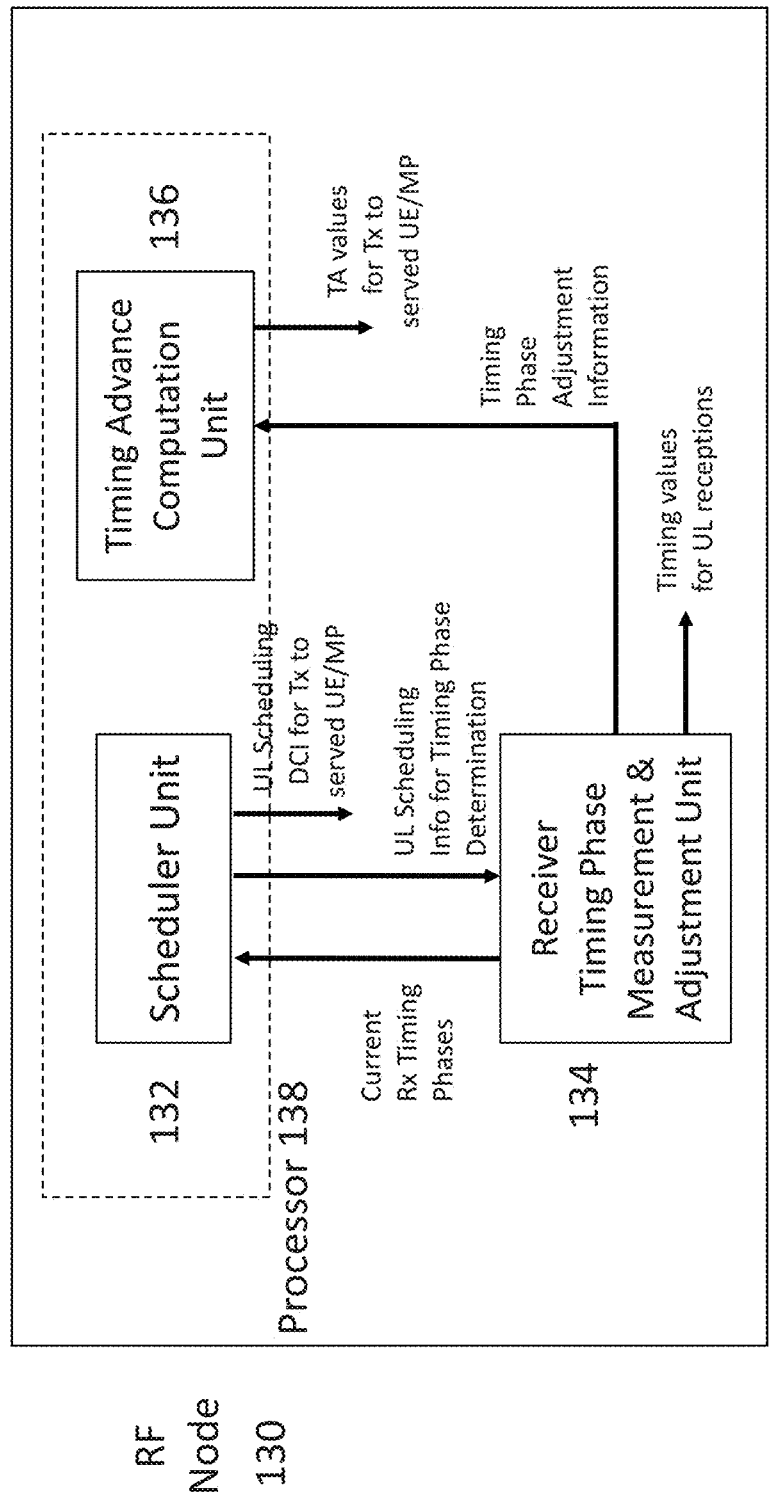

FIG. 13 shows in more detail the implementation of the methods used in an RF node 130. Receiver Timing Phase Measurement and Adjustment Unit (RTPMAU) 134 measures the timing phase of received UL transmissions from the served MPs and stores a current receiver timing phase for each served MP. When the measured receiver timing phase is different from the stored receiver timing phase, the uplink receiver timing phase measurement and adjustment unit sends to the timing advance unit 136 timing phase adjustment information and updates the stored UL receiver timing phase for the served MP to the most recent measured value. The timing advance unit 136 calculates the TA adjustment value for transmission to the MP, for example using a MAC Control Element (CE). The scheduler unit 132 allocates resources to served UEs and MPs for DL and UL transmissions. When scheduling UL transmissions by two or more MPs or by one or more MPs and one or more UEs, the scheduler uses the information obtained from the RTPMAU 134 on the current receiver timing of these MPs, to decide when they can be scheduled on the same symbol(s). When the scheduler allocates UL resources to an MP or UE, it sends a scheduling indication to the RTPMAU 134, for it to prepare the receiver to apply the correct timing phase for receiving the scheduled UL transmission. When the RF node is an MP, in some implementations the RTPMAU 134 also measures the timing phase of the DL signal received on the upstream backhaul link and provides the measured DL timing phase to the scheduler. The scheduler 132 uses this information when scheduling UL transmissions by a served MP to determine the symbols that can be allocated without causing interference to expected DL receptions on the upstream backhaul link, as described earlier in the specification.

In some implementations, in order to reduce implementation complexity in MPs, the method described above is used only in 1-hop MPs that are served by an MN-RN. Remaining MPs with higher hop count align their DL transmissions to that of their serving RF node but leave their own DL and UL transmissions (or receptions) unaligned. Since spectral efficiency is most critical in 1-hop MPs, in some implementations this may be seen as a good trade-off between overall spectral efficiency and complexity. In this case, all UL receptions from downstream MPs will arrive at the serving RF node nominally at the same time, eliminating the need for a dynamic timing phase receiver for the MP. The tables for guard symbols and guard intervals for MP1 and MP2 will be somewhat different in this case. However, they can be readily computed based on the description provided above.

Mesh Network Architectures

In the technology that we describe here, alternative architectures (Architecture A or Architecture B) are used by MPs and MP-GWs to terminate the air interface to UEs and to connect them to an operator's core network. The core network can be a 4G core network (Evolved Packet Core, or EPC) where a Mobility Management Entity (MME) terminates the control plane and a Serving Gateway (S-GW) terminates the user plane, or a 5G core network (5G-CN) where an Access and Mobility Management Function (AMF) and a Session Management Function (SMF) terminates the control plane and a User Plane Function (UPF) terminates the user plane. In the 5G NR standard the user plane protocol stack includes a Service Data Adaptation Protocol (SDAP). SDAPs primary responsibility is to map QoS flows in the core network to Data Radio Bearers (DRBs) on the airlink. In this specification, when we show user plane protocol stacks, we sometimes omit the SDAP stack in order to simplify the protocol diagrams.

Architecture A

Figure 14:
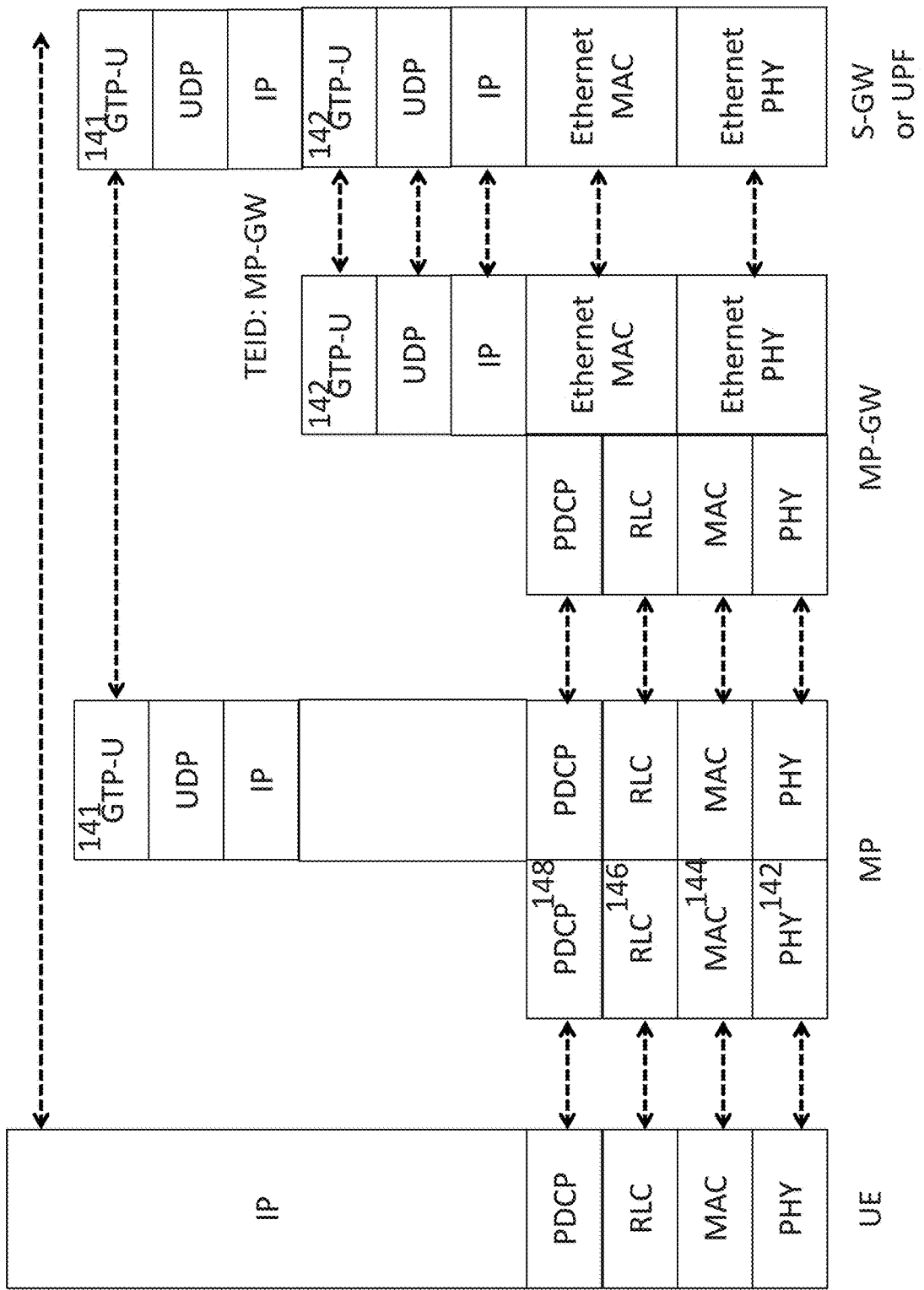
FIGS. 14-15, 17-20, 28-33, 35-37, 40, 45-46, 53-56, 59-60 and 82-87 are protocol stack diagrams.
Figure 15:
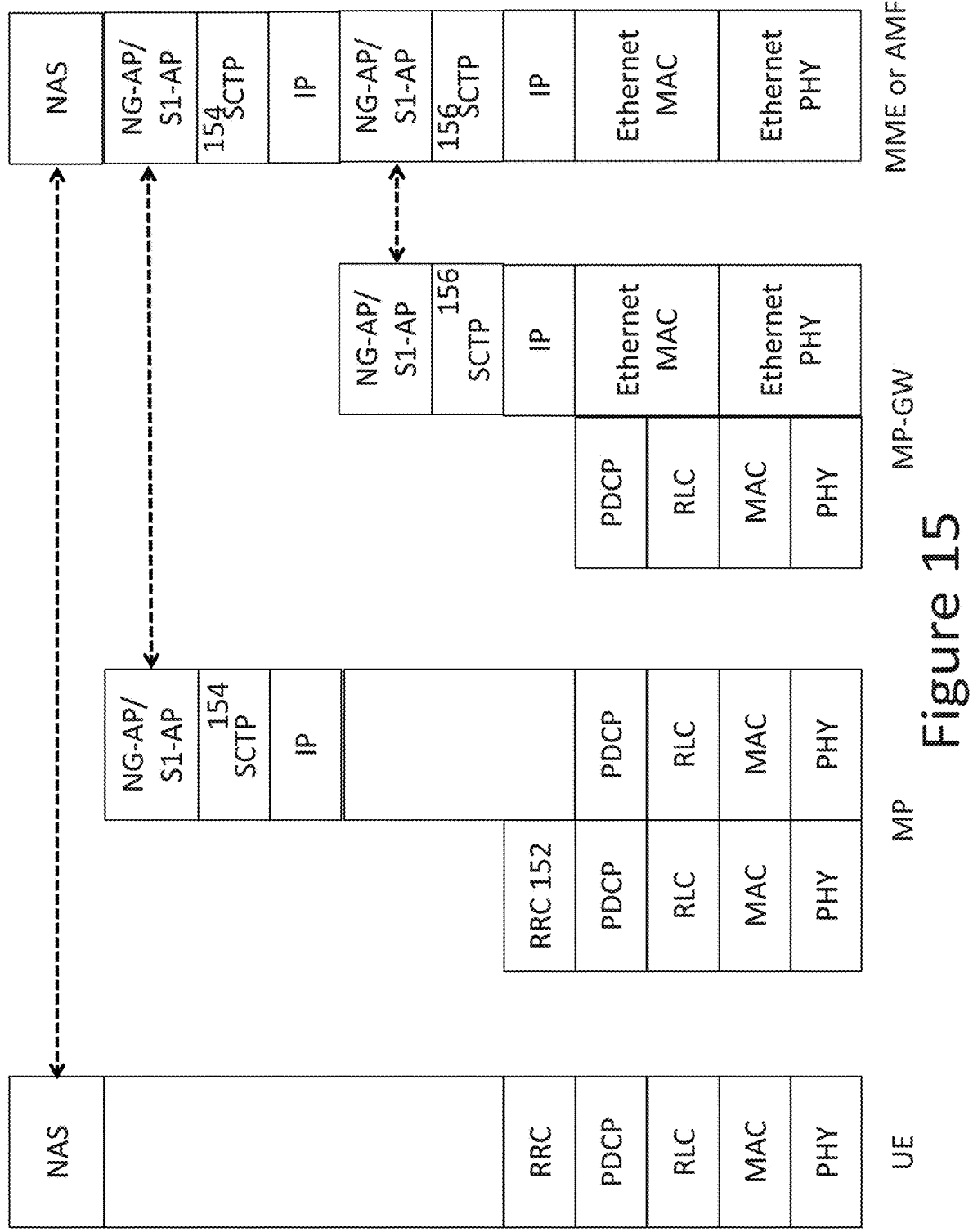

In architecture A, when a UE connects to an MP, the MP terminates the entire 5G NR airlink and performs all 5G NR airlink user data and control processing as illustrated by the protocol stack diagrams shown in FIGS. 14 and 15 for the user plane and the control plane, respectively. In the user plane, the protocol processing in the MP includes the Physical (PHY) Layer 142, the Medium Access Control (MAC) Layer 144, the Radio Link Control (RLC) Layer 146 and the Packet Data Convergence (PDCP) Layer 148. In the control plane, the Radio Resource Control (RRC) 152 protocol is also terminated in the MP and the UE session context is maintained in the MP.

In architecture A, S or NG protocols are used to connect MPs and MP-GWs to the 4G or 5G core network nodes, respectively. In the user plane, UE Internet Protocol (IP) packets are carried between the MP (or MP-GW) and the core network nodes S-GW/P-GW or UPF using the GPRS Tunneling Protocol (GTP-U) 141, 142 running over UDP/IP. In the control plane, S1-AP or NG-AP control messages are carried in IP packets between the MP and the core network nodes MME or AMF/SMF using the SCTP protocol 154, 156.

Figure 16:
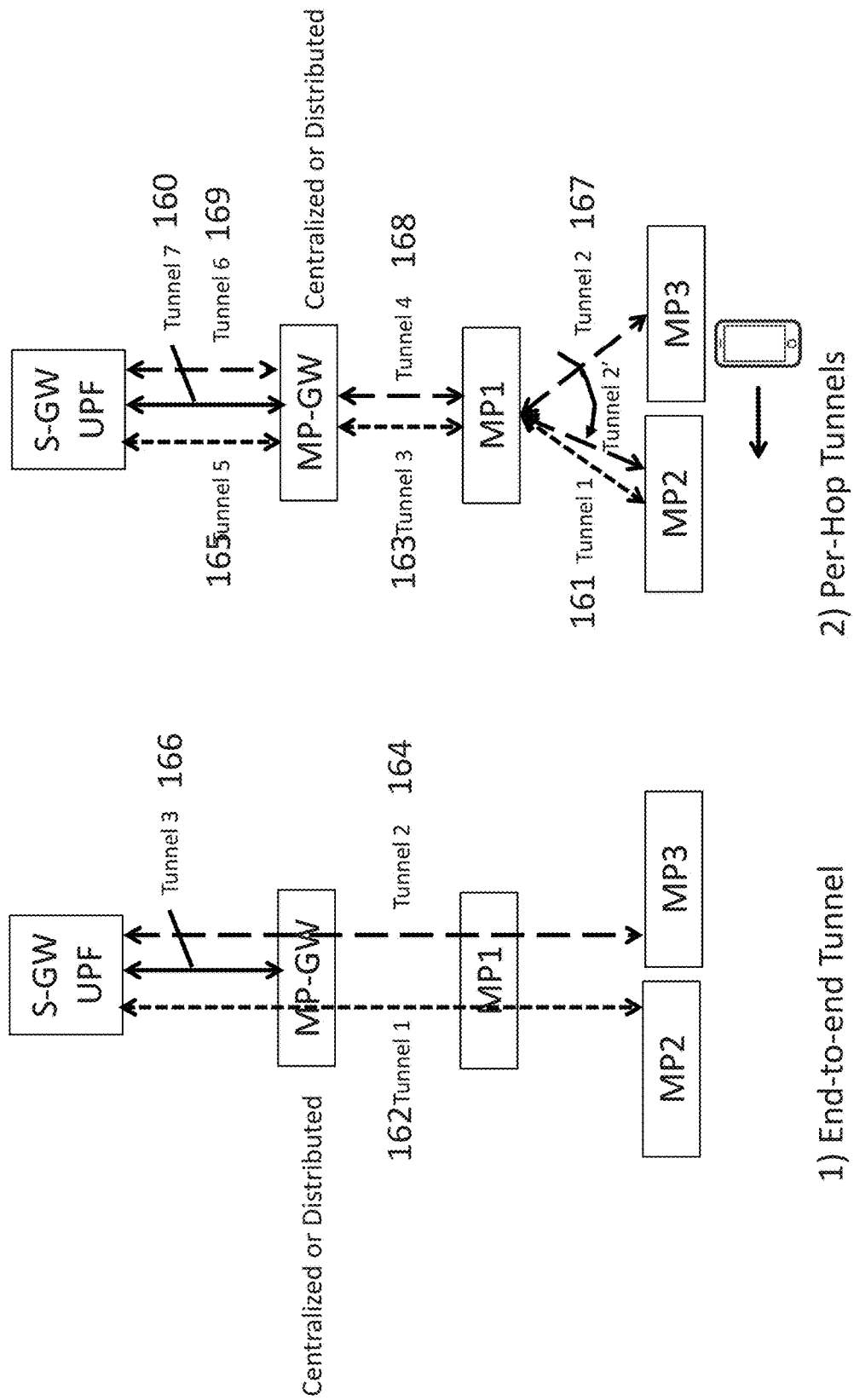

Two alternative methods are used to form the GTP and SCTP links between the MP and the core network nodes, as shown in FIG. 16. In method A1, to carry S1-AP or NG-AP control messages between an MP and the core network an end-to-end SCTP link is established between the MP and the MMF/AMF/SMF. MP-GW learns the IP address of the MME using a Domain Name Server (DNS) or other known techniques, and MPs learn the IP address of the MME/AMF from their MP-GW, possibly via other upstream MPs. For each UE connected to an MP and for each EPC Radio Access Bearer (E-RAB) of the UE, an end-to-end GTP-U tunnel 162, 164, 166 is used between the MP and the S-GW/UPF. In method A1, the protocol stacks are shown in FIGS. 14 and 15. S-AP control packets are also carried in data bearers over wireless backhaul links. Differentiated Service Code Points (DSCP) in the IP header can be used to assist intermediate nodes in mapping IP packets to radio bearers on wireless links. For example, as illustrated in FIG. 16, for a UE/E-RAB served by MP2 a single end-to-end GTP-U tunnel #1 162 is used between MP2 and S-GW/UPF, and for a UE/E-RAB served by MP3 a single end-to-end GTP-U tunnel #2 164 is used between MP3 and S-GW/UPF. Intermediate nodes between the MP and the core network; i.e., upstream MPs and MP-GW, are also plain IP routers that route IP packets in a transparent manner. In Architecture A, Method 1 has, as one disadvantage, that when a UE changes its attachment from one MP to another (neighboring) MP, the end-to-end S1-AP/NG-AP interface needs to be updated and this will produce signaling traffic in the core network. In Architecture A, Method 1 has, as one advantage, that the end-to-end S1 or NG links will survive any changes in the backhaul links connecting the MP to core network nodes. We will touch on this topic again, when we describe handovers for UEs and for mobile MPs.

Figure 17:
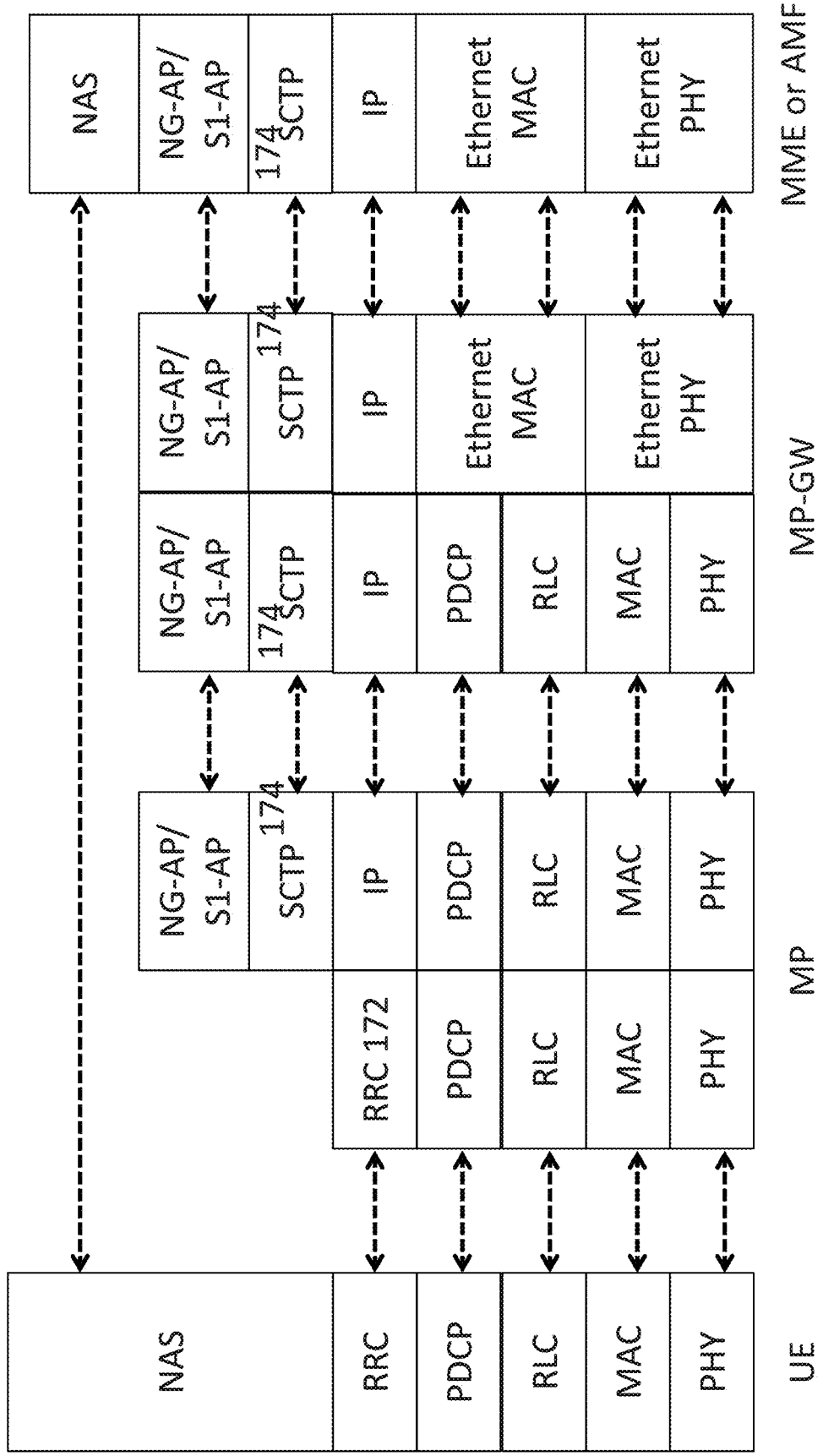
Figure 18:
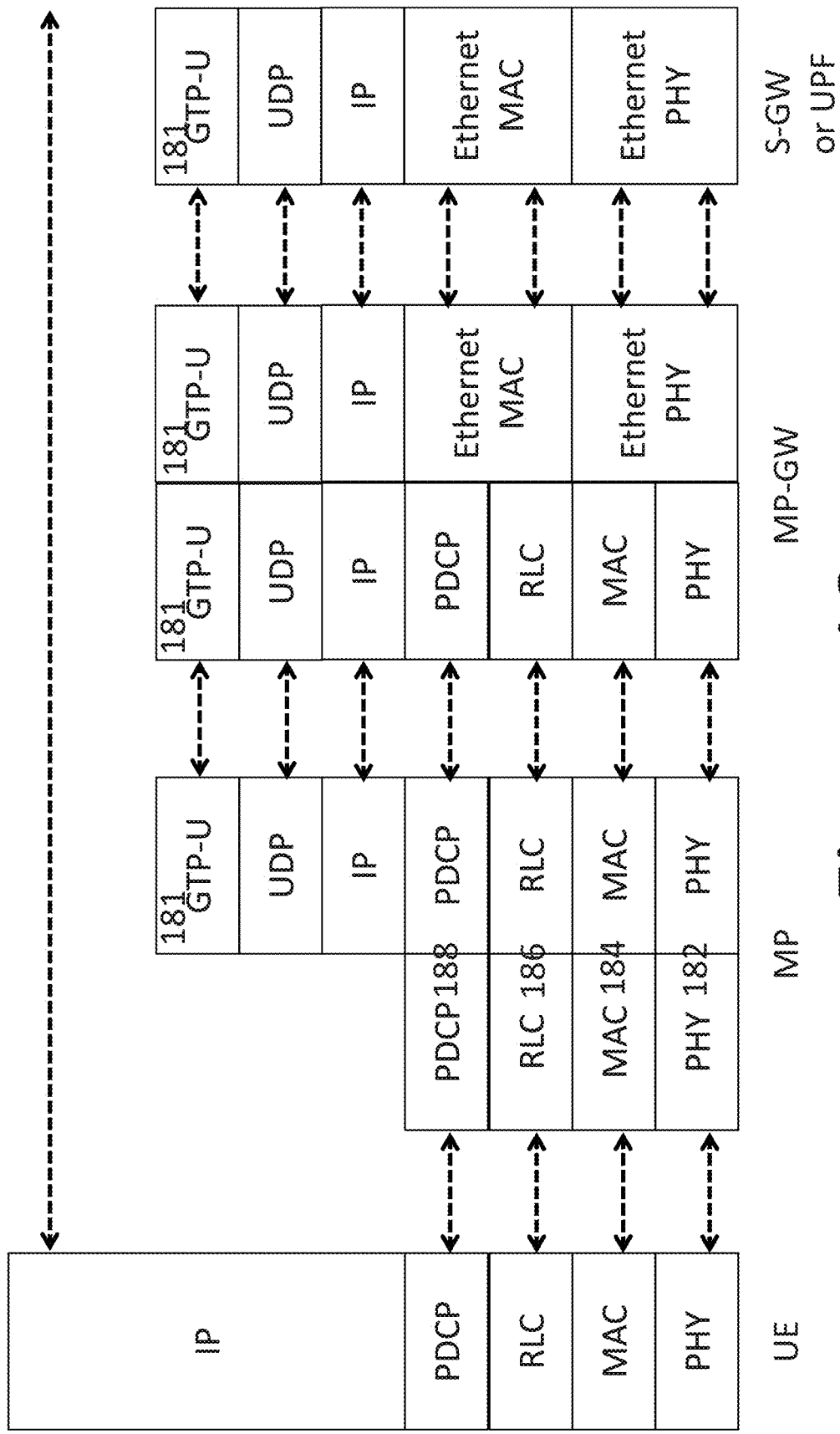

In method A2, in the control plane, as illustrated in the protocol diagram shown in FIG. 17 individual S1-AP/NG-AP links are established between the nodes along the path between the MP and the MME/AMF, and each intermediate node maps UE-associated packets arriving on an incoming S1-AP/NG-AP link running over SCTP to a corresponding outgoing S-AP/NG-AP link using table look-up based on S1-AP UE IDs. Intermediate nodes do not terminate the UE-associated packets of S1-AP/NG-AP protocols and only relay the traffic. In the user plane, as illustrated in the protocol diagram shown in FIG. 18, for each UE/E-RAB, individual GTP-U tunnels 181 are established between the nodes along the path that connects the MP to the S-GW/UPF, and each intermediate node maps packets arriving on an incoming tunnel to a corresponding outgoing tunnel using table look-up based on GTP tunnel identifiers. For example, as shown on the right side of FIG. 16, a UE served by MP2 uses GTP-U tunnel #1 161 between MP2 and MP1, GTP-U tunnel #3 163 between MP and MP-GW and GTP-U tunnel #5 165 between MP-GW and S-GW/UPF. Mapping tables are maintained at intermediate nodes to map packets arriving on a downstream (an upstream) backhaul link to a corresponding upstream (downstream) backhaul link. For example, MP1 maintains a table to route packets arriving from MP2 on tunnel #1 161 to tunnel #3 163 to the MP-GW. This is further illustrated in the protocol diagram shown in FIG. 18. In Architecture A, Method 2 has, as one advantage, that when a UE in a handover changes its attachment from one MP to another MP, when the two MPs have a common upstream MP or MP-GW, the per-hop S1-AP/NG-AP links only need to be modified up to that upstream MP or MP-GW and therefore the handover can be hidden from the upstream MPs and the core network. In Architecture A, Method 2 has, as one disadvantage, that the end-to-end S1 or NG links will not survive any changes to the backhaul links connecting the MP to the core network. We will touch on this topic again, when we describe handovers for UEs and for mobile MPs.

In some embodiments, Methods A1 and A2 are combined. Instead of forming hop-by-hop S1/NG links, as in Method 2, one can form a single end-to-end S1/NG link between the MP and the MP-GW, and then extend it with a second link between the MP-GW and the core network. In this case, there is a single SCTP link between the MP and the MP-GW, and another SCTP link between the MP-GW and the MME/AMF. Also, for each connected UE/E-RAB there is a single GTP-U tunnel between the MP and the MP-GW, and another GTP-U tunnel between the MP-GW and the S-GW/UPF.

In some embodiments, an MP-GW Aggregation Node (AN) is introduced between two or more MP-GWs and the core network nodes and the S1/NG link between the MP-GWs and the core network nodes is broken into two S1/NG links. The AN presents a single S1/NG interface to the core network nodes and presents individual S1/NG interfaces to the MP-GWs. The AN has, as one advantage, that it hides mobility events between MP-GWs from the core network nodes.

Architecture A has the advantage, among others, that it places low extra processing burden on the MP-GW beyond the functionality of an AP.

Architecture B

Figure 19:
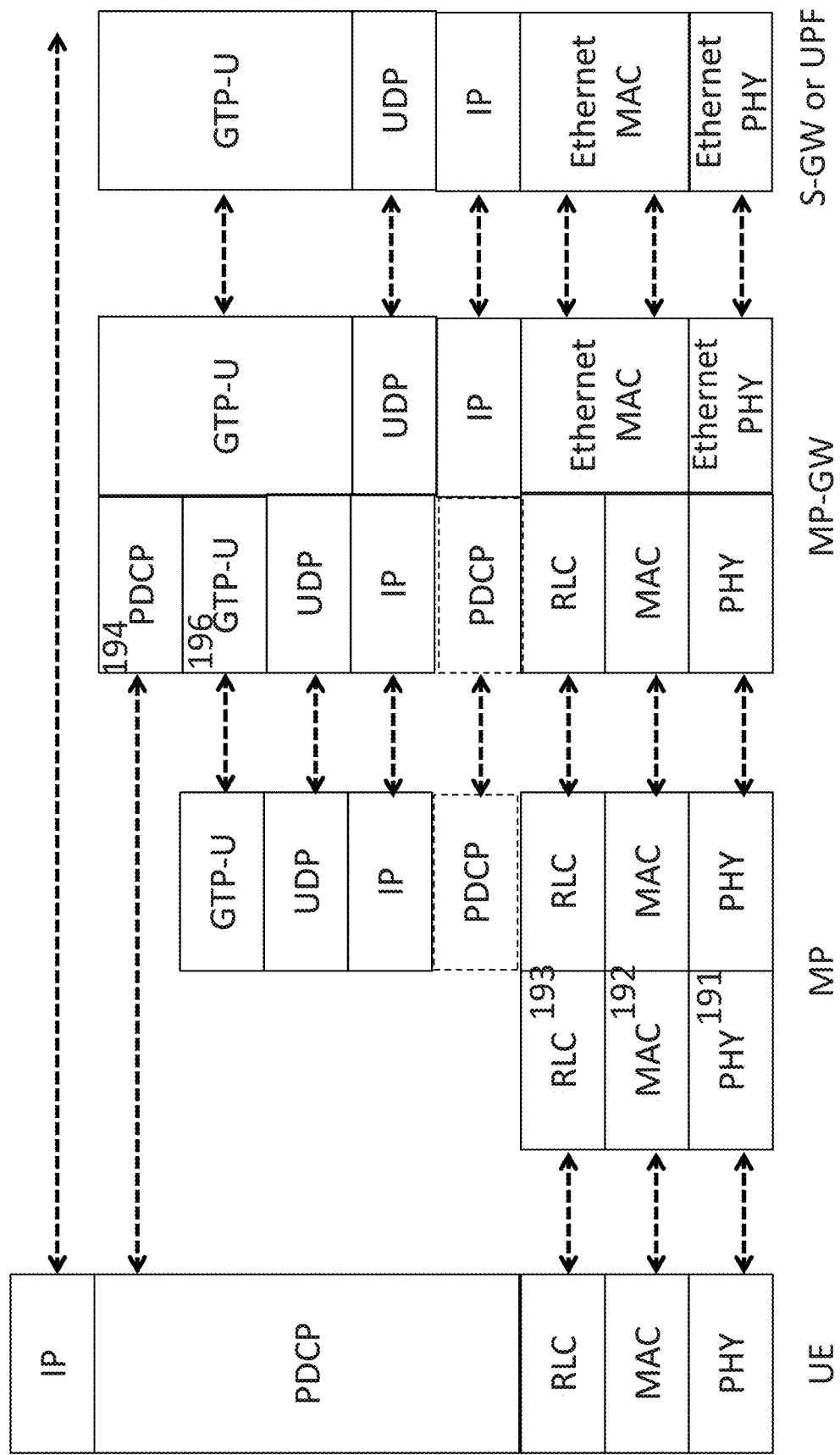
Figure 20:
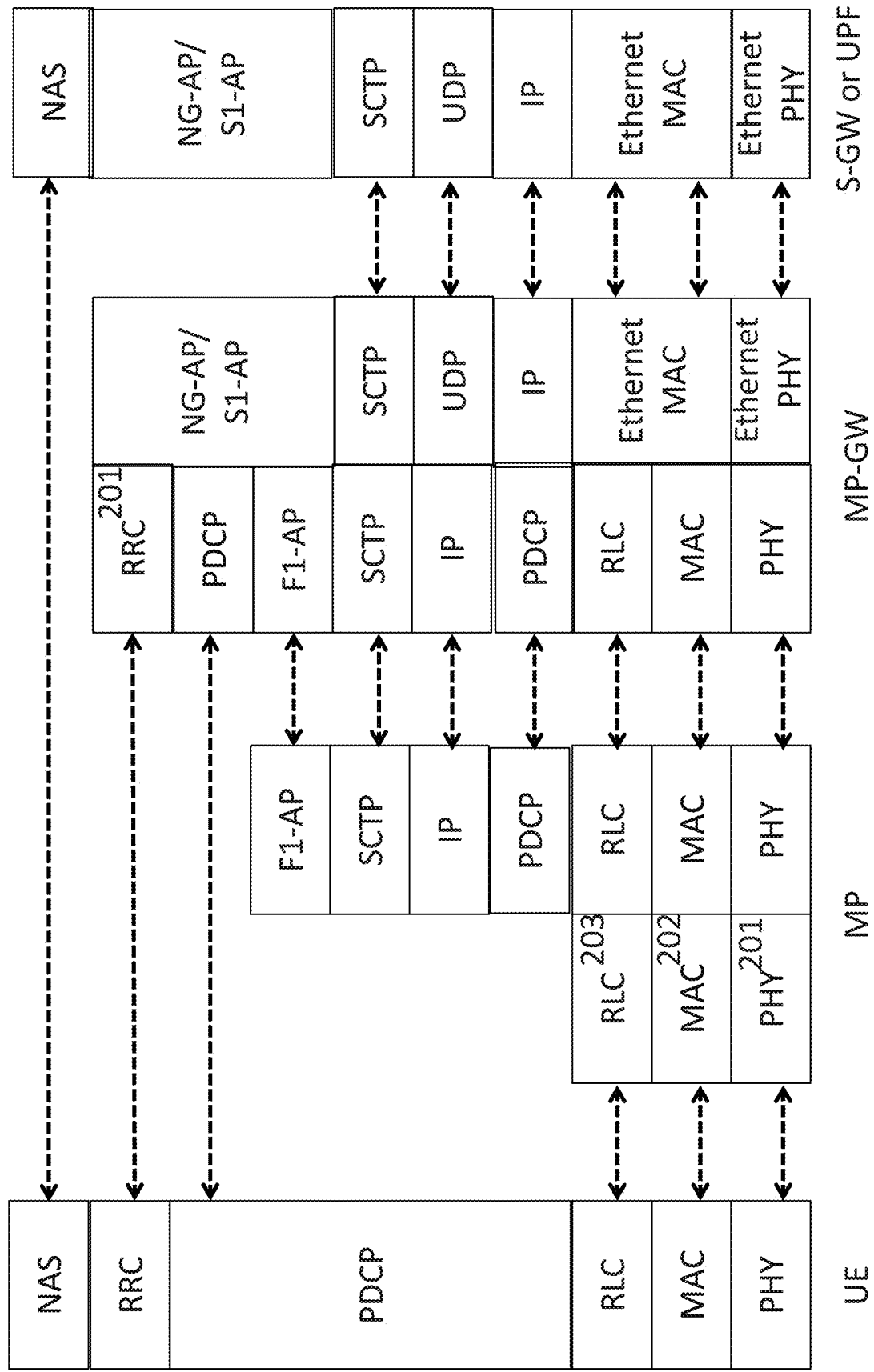

In Architecture B illustrated by the user-plane and control plane protocol stacks shown in FIGS. 19 and 20, respectively, MP terminates only the PHY 191, MAC 192 and RLC 193 layers of the airlink connection; PDCP 194 is terminated in the MP-GW. In the user plane, on the downlink (DL), IP packets destined for a UE served by the MP are received by the MP-GW, which performs the PDCP processing 194, and sends PDCP PDUs (Packet Data Units) to the MP. On the uplink (UL), the MP forwards UE's PDCP PDUs to the MP-GW, which performs the PDCP processing to extract the IP packets. The MP-GW also maintains the radio network context for the UEs served by the MP and terminates the RRC protocol 201, as shown in FIG. 20. RRC messages are also carried in PDCP PDUs between the MP-GW and the MP. Core network interfaces SING-AP are terminated at the MP-GW.

In this architecture, an interface protocol currently being developed by 3GPP, called the F1 protocol, can be used between the MP and the MP-GW. In the F1 user plane, PDCP PDUs are carried between the MP and the MP-GW in per-user/E-RAB GTP-U 196 tunnels running over UDP/IP. In the F1 control plane, F1-AP control messages and RRC messages are carried between the MP and the MP-GW using the SCTP protocol running over IP.

Two alternative methods are used to form the connection between the MP and the MP-GW. In method B1, in the user plane, for each UE/E-RAB served by the MP, an end-to-end GTP-U tunnel is established between the MP and the MP-GW to carry the user plane PDCP PDUs. An end-to-end tunnel is illustrated on the left side of FIG. 21. In the control plane, F1-AP control messages and RRC messages are carried in PDCP PDUs using an end-to-end SCTP link between the MP and the MP-GW. Method B1 has the advantage, among others, that the end-to-end F1 links will survive any changes in the intermediate backhaul links connecting the MP to the MP-GW, provided the routers in intermediate nodes update their routing tables and route packets through the new links.

In method B2, individual per-hop F1 links are established between each pair of nodes, even though intermediate nodes do not terminate the UE-associated aspects of the F1-AP protocol and only relay traffic. At intermediate nodes packets arriving on a downstream (an upstream) backhaul link are mapped to an upstream (a downstream) backhaul link by table look-up, as described previously for Architecture A. The resulting per-link tunneling is illustrated on the right side of FIG. 21.

Architecture B increases the processing burden on the MP-GW, but it simplifies the processing in the MP, especially by shifting some of the computationally intensive PDCP processing to the MP-GW.

Figure 21:
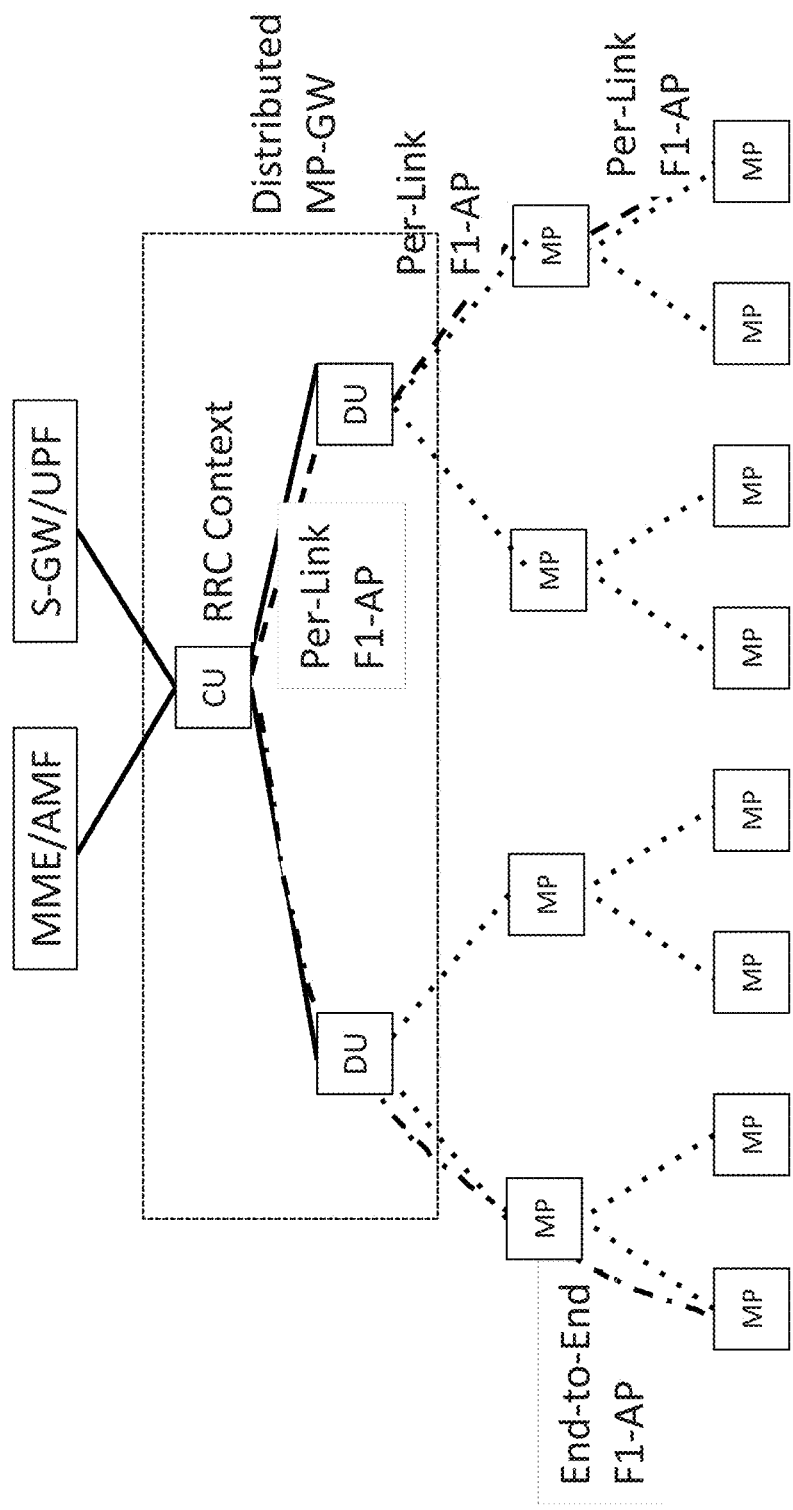

In either architecture A or architecture B, the MP-GWs can be implemented using a distributed base station architecture, where a central Control Unit (CU) handles airlink PDCP data and RRC control processing for two or more MP-GWs and maintains the session context for a large number of UEs in the mesh network, thus further centralizing the airlink processing; a Distributed Unit (DU) handles the lower protocol layers for the MP-GW. This is illustrated in FIG. 21. The CU, which has no RF interface, is implemented in a virtualized software environment running on off-the-shelf server hardware. We will describe the implementation of Architecture B with a centralized controller in detail later.

Figure 22:
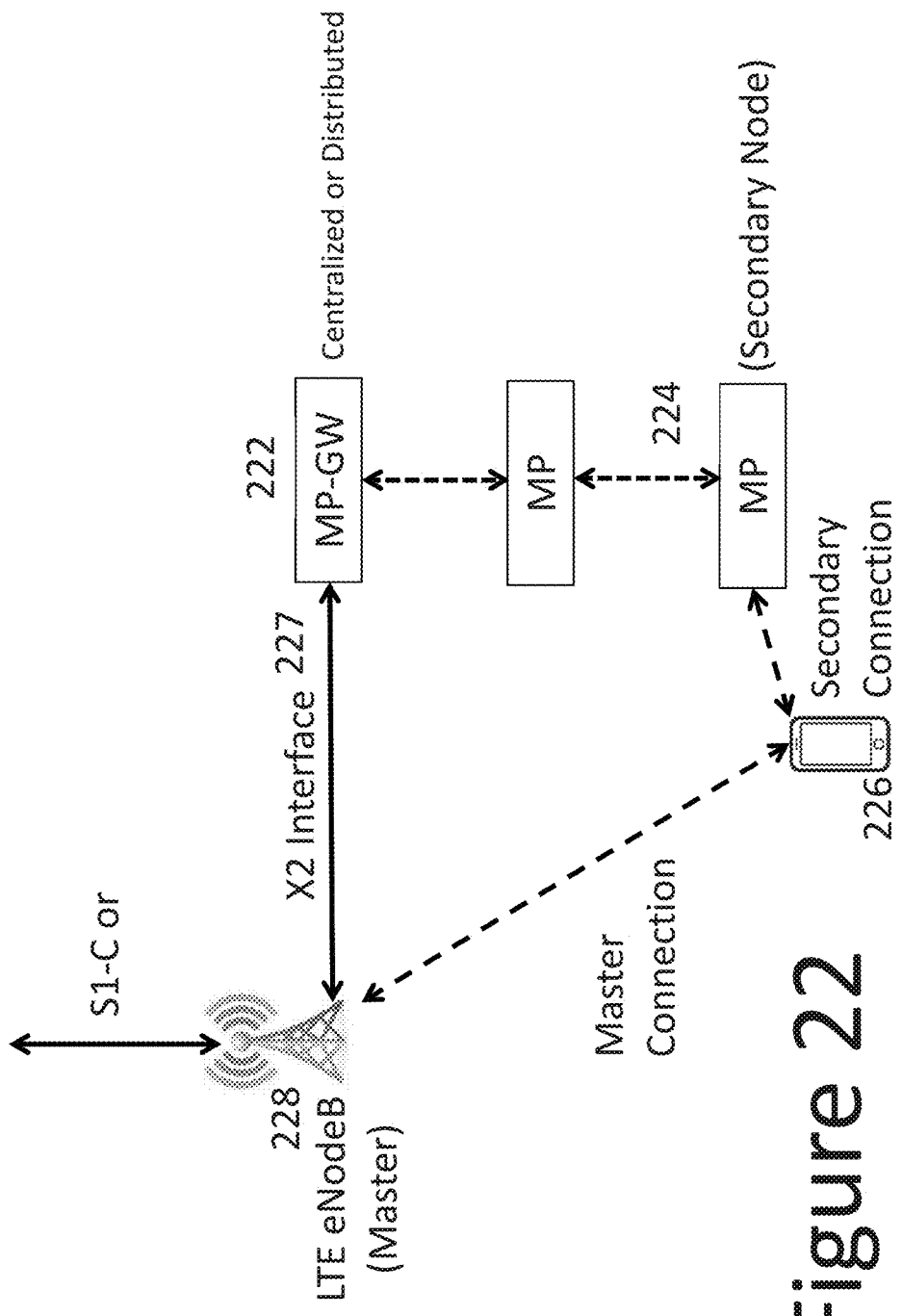

In some embodiments of the technology that we are describing, Dual Connectivity (DC) is used. In DC a UE, in addition to receiving service from the mesh network, also receives service from an LTE base station or eNodeB, as shown in FIG. 22. LTE eNodeB 228 has an X2/Xn interface 227 to the MP 224 that is serving the UE or to the MP-GW 222 to carry X2/Xn control messages and user plane data between the nodes. As for the S1/NG interfaces, two alternative methods can be used for the X2/Xn interface. In the first method, an end-to-end X2/Xn interface can be established between the eNodeB and the M. In the second method, the MP-GW (or in the case of a distributed MP-GW its CU) terminates the X2/Xn interface first to hide downstream mobility from the LTE eNodeB, and a second X2/Xn interface is established between the MP and the MP-GW. The LTE eNodeB acts as the master node and the serving MP acts as the secondary node of dual connectivity. In DC, LTE and 5G NR operate on different channels. For example, 5G NR operates on a wide channel in the mm wave band and 4G LTE operates on a narrower channel in the cellular LTE band. There is an RRC entity in the LTE eNodeB and also in the mesh network, but the RRC connection state of the UE is based on the RRC entity in the LTE eNodeB. LTE eNodeB provides the control interface (S1-C or NG-C) to the core network for the DC UE. The RRC entity in the 5G NR mesh network exchanges RRC messages with the UE directly without involving the LTE eNodeB. The RRC entity in the LTE eNodeB exchanges RRC messages with the UE either directly or via the 5G NR mesh network. User data is carried either via the master LTE eNodeB or the 5G NR mesh network, either split at the radio bearer level or at the packet level (split bearer). For radio bearers that are carried via the mesh network, either Architecture A or Architecture B is used. For radio bearers that are carried by the LTE network, S1-U or NG-U interface terminates at the LTE eNodeB.

In 4G/5G dual connectivity, a UE first connects to the LTE eNodeB. UE then reports the nearest MP or MP-GW on the 5G NR mesh network. LTE eNodeB uses the X2/Xn interface to the 5G NR MP-GW to add the MP-GW or MP as the secondary DC node. The UE performs the standard 5G NR (contention-free) random access procedures to attach to the MP.

In some embodiments, in Architecture A an MP may have two or more upstream paths to reach the core network. One of these paths is designated as the primary path and is used to carry the S1/NG-AP control plane packets between the MP and the MME/AMF. The primary path and the secondary paths carry user plane packets between the MP and the S-GW/UPF. For example, some radio bearers are carried using the primary path, and other radio bearers are carried using the secondary path. There is a single S1-C/NG-C interface between the MP and MMF/AMF, and multiple S1/NG-U interfaces between the MP and S-GW/UPF. In some approaches, there is a single S1/NG-U interface to a CU (distributed MP-GW architecture) or to an AN (stand-alone MP-GW architecture) that carries all user plane data for a UE, but it is then split into multiple paths at the CU, at the aggregator or at one of the downstream MPs.

In Architecture B, when multiple upstream paths are used, one path is designated as the primary path and the MP-GW on that path terminates the F1-AP interface. The secondary paths are used only to carry user plane data for the F1 interface. The PDCP processing may be split between MP-GWs, for example, based on radio bearers. Alternatively, fixed or wireless backhaul links may be used between MP-GW, and all PDCP processing may be performed by the MP-GW on the primary path.

UE Handovers

Figure 23:
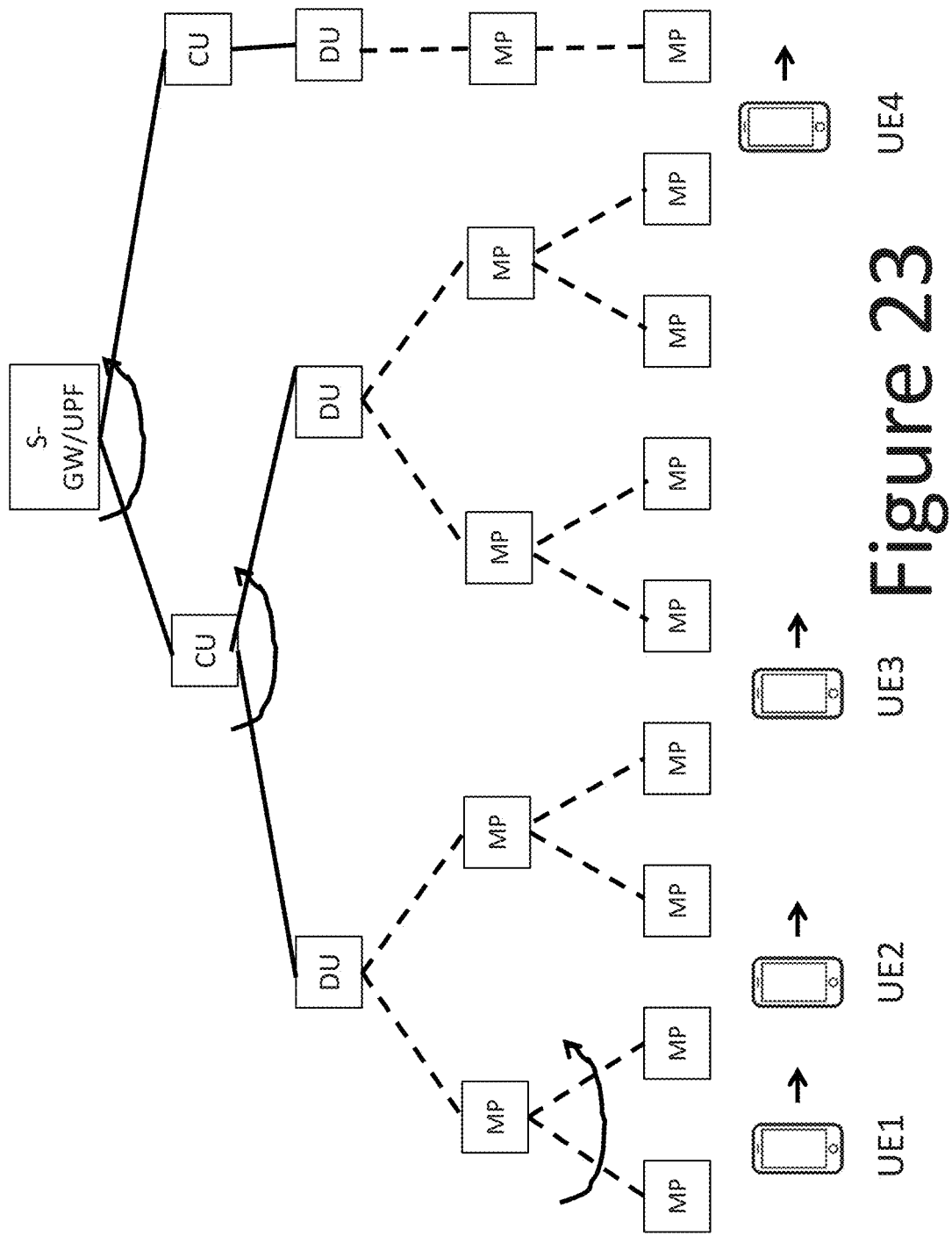

In the mesh network UE handovers are supported using an enhanced X2/Xn interface between neighboring nodes. In Architecture A, neighboring MPs and MP-GWs use the X2/Xn interface to exchange X2/Xn control messages to execute the handover and to forward DL data from the source MP to the target MP. For example, when a UE moves from the coverage area of an MP, MP1, to the coverage area of a neighboring MP, MP2, the source MP (MP1) detects the need for a handover based on Neighbor Reports received from the UE and sends a Handover Request message to the target MP (MP2) over the X2/Xn interface to start the handover procedure. The Handover Request message includes information about the UE context and its radio bearers. The target MP (MP2) performs admission control and if it is able to accept the handover, it responds to MP1 by sending a Handover Request_ACK message, which includes an RRC reconfiguration message for the UE. Source MP (MP1) forwards the reconfiguration message to the UE and stops transmitting any DL data to the UE. Upon receiving the reconfiguration message, the UE stops transmitting any UL data to MP1 and starts the procedure to establish a connection to MP2 using the contention-free access information included in the reconfiguration message. To prevent any packet loss, MP1 uses the X2/Xn link to forward to MP2 DL PDCP SDUs that are either not yet transmitted or transmitted but not yet acknowledged and UL PDCP SDUs that are received, but not forwarded to S-GW/UPF. In addition, MP1 also sends to MP2 the sequence number of the most recent UL PDCP SDU it correctly received from the UE as well as the sequence number of any earlier missing UL PDCP SDUs it has not yet received. Once the UE connects to the target MP (MP2), MP2 sends a Path Switch Request message upstream towards the MME/AMF using the S1-C/NG-C interface. When an end-to-end S1-AP link is used between MP2 and the core network (Method A1), this message travels up to the MME/AMF and the path switch is performed at the S-GW/UPF by changing the end-point of the GTP-U tunnel from MP1 to MP2. When individual per-link tunnels are used on the backhaul links of the mesh network (Method A2), if MP1 and MP2 belong to the same tree, the path switch is performed at the upstream MP or MP-GW (or the CU part of an MP-GW) that is common to both MP1 and MP2, and then the S-GW/UPF and the MPs or MP-GW further upstream are not affected by the path switch. For example in the handover shown in FIG. 23 for UE1, the path switch message travels to the next-hop upstream MP where the switch is performed, and the MP-GW or the core network are not impacted. In the same figure, in the handovers for UE2 or UE3, the path switch message travels to the MP-GW (or the CU) where the path switch is performed. It can be seen that Method A2, has an advantage, that handovers can be hidden from the core network and from upstream nodes in the mesh network, when they are common to the source and target MPs in the handover.

The control plane of the X2/Xn interface, known as X2/Xn-C, runs over SCTP/IP and is used to exchange control messages during the handover between the RF neighbor MPs or MP-GWs. X2/Xn-C interface is set-up as soon as the RF neighbor MPs discover each other. As we described earlier for the S1/NG interface between an MP and the core network, the X2/Xn-C interface can be set-up as an end-to-end SCTP link between the neighbor nodes, or it may be broken up into individual SCTP links, one on each hop. In the former case, standard IP routing is used to route packets in the mesh network. During a UE handover, X2/Xn-C interface is used to carry the handover messages, and per E-RAB GTP-U tunnels are established to carry the user plane data from the source MP (or MP-GW) to the target MP (or MP-GW). As we saw before in the S1/NG interface, this GTP-U tunnel can also be set-up as an end-to-end tunnel between the neighbor nodes, or when the nodes don't have a direct link, it may be broken up into multiple individual GTP-U tunnels, one per hop.

To perform the procedure described above, MPs and MP-GWs need to discover their RF neighbors. This is done first by listening to SS block transmissions of neighbor MPs and MP-GWs. When an MP attaches to a neighbor MP or MP-GW and establishes a backhaul link, the backhaul link can be used to carry the X2/Xn traffic between the RF neighbor nodes. For other neighboring MPs or MP-GWs, with whom the MP or MP-GW does not have a backhaul link, a sidelink is established to carry the X2/Xn traffic. A sidelink refers to a direct device-to-device communication link between two UEs, possibly without involving any other nodes. A sidelink protocol was defined by 3GPP for the 4G LTE standard to allow smartphones and other handheld devices to communicate with each other. A sidelink protocol will be specified in the future for 5G NR.

In the technology described here, sidelink communication is used to allow neighboring nodes exchange X2 control plane messages and user plane data directly without involving other nodes in the mesh network. In sidelink communications, MPs and MP-GWs don't need to establish an airlink connection. Shared airlink resources can be allocated by the MNM to MPs and MP-GWs for sidelink communications. Since airlink resources are shared, transmissions may occasionally clash. For reliable communications, Hybrid ARQ with blind retransmissions are used for error recovery. Retransmissions are also employed at the application layer.

In a mesh network, MPs and MP-GWs discover RF neighbors that they cannot directly hear based on Neighbor Reports received from the UEs and attached neighbor MPs. In this case, it is not possible to use a direct wireless link to perform the handover, and an X2/Xn connection is established. In the discovery phase, MPs and MP-GWs learn the Physical Cell ID (and possibly the Global Cell Identifier) of the neighbors from the UE reports. MPs and MP-GWs can then learn the IP address of the neighbor based on information provided by the MME or the MNM.

Using direct wireless links between neighboring nodes for X2/Xn links to perform the handovers will reduce handover delays.

In Architecture A, handovers can also be performed using the S1/NG interface into the core network. In this case there is no need to establish X2/Xn links between the RF nodes. Instead, S1/NG-C messages are used between the RF nodes and the MME/AMF to perform the path switch. A drawback of S1/NG handovers is that they may generate significant signaling activity in the core network and may increase delays. The Aggregation Node (AN) can be used to present the mesh network as a single eNodeB towards the core network and to hide the handovers from the core network.

In Architecture B, RRC and mobility management are handled by the MP-GW. When a UE moves from the coverage area of an MP, MP1, to the coverage area of an RF neighbor MP, MP2, UE's Neighbor Reports are received by the MP-GW (or the CU of the MP-GW), and when MP1 and MP2 belong to the same MP-GW (or the same CU), the handover is handled by the MP-GW locally and the handover is performed over the F1-AP interface, by switching the endpoint of the GTP-U tunnel. When MP1 and MP2 belong to different MP-GWs (or CUs), then the handover is performed using an X2/Xn interface between the MP-GWs (or CUs). In this architecture, there is no need for MPs to communicate with each other directly, instead they use existing backhaul links to reach the MP-GW, and when the handover occurs inside the tree underneath the MP-GW, the MP-GW then performs the path switch locally using the F1-AP interface without involving the core network.

Mesh Point Handovers

Figure 24:
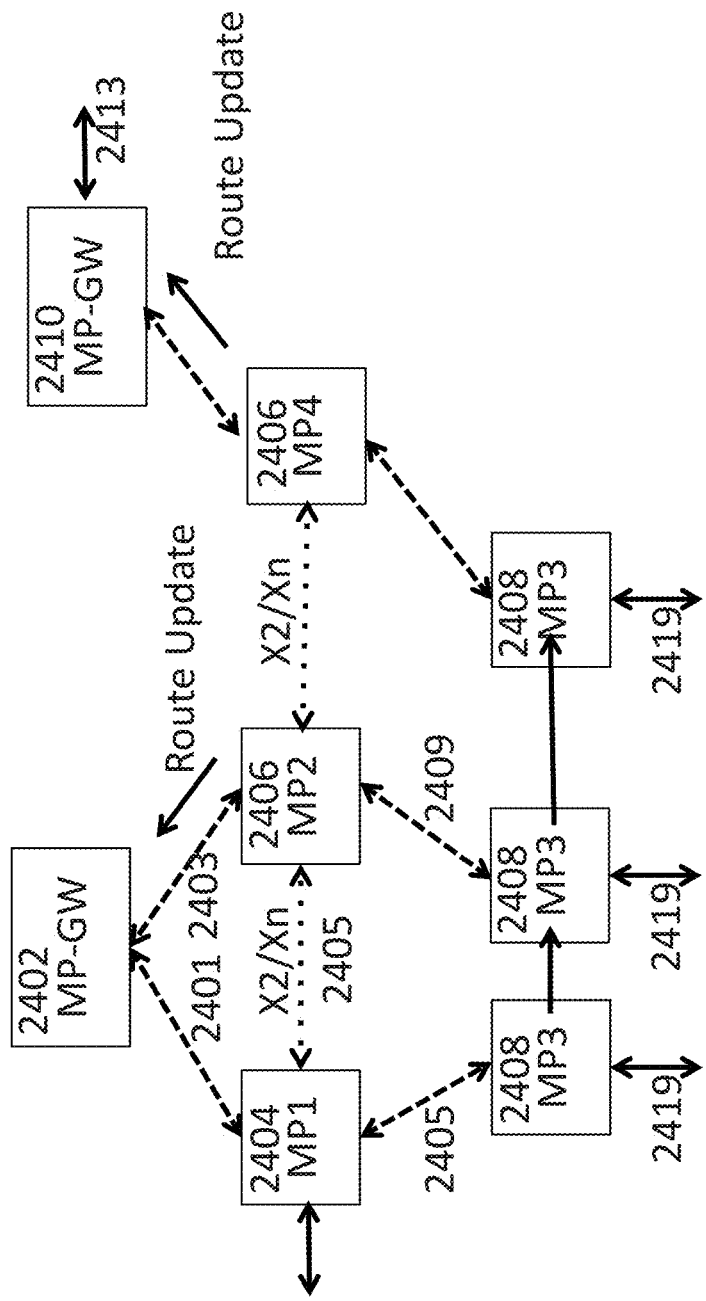

When MPs are mobile, they also need to perform handovers. For example, as shown in FIG. 24, an MP, MP3 2408, is attached to an upstream MP, MP1 2404, but is moving towards the coverage of MP2 2406. Based on Neighbor Reports sent by MP3, MP1 triggers a handover of MP3 to MP1. The handover can be implemented using an X2/Xn interface 2405 between MP1 and MP2. When MP1 and MP2 have a direct wireless link, they may use sidelink transmissions to exchange X2/Xn messages. MP1 also uses the user plane of the X2/Xn interface to forward to MP2 packets it has received for MP3, but not yet delivered. In Architecture A, when MP3 has end-to-end SCTP and GTP-U links for the S1-C/NG-C and S1-U/NG-U interfaces as in Method 1, changing MP3's upstream backhaul link from MP1 to MP2 does not impact the end-to-end S1/NG interface, but the IP routing tables in upstream nodes (in this example, MP-GW 2402) need to be updated, so that all packets destined for MP3 can now be routed via MP2, instead of MP1. To change the routes, after MP3 has attached to MP2, MP2 sends a route update message to its upstream MP using the backhaul link 2403, in this example to MP-GW 2402, to indicate that it is now the next-hop for all IP packets destined for MP3. Since MP-GW is also attached to MP1, no further route updates are needed.

Later on, when MP3 moves into the coverage area of another MP, MP4, MP3 is handed over from MP2 to MP4. In this case, MP4 sends a route update message to its upstream MP, in this case the MP-GW 2410. In this case, MP-GW 2410 also sends a route update message (not shown) to the core network nodes (or to an AN between the mesh network and core network).

In Architecture A, when MP3 has individual per-hop S1/NG interfaces as in Method 2, then after the handover, all SCTP and per UE/E-RAB GTP-U links up to the node where the path switch occurs must be updated. In the example shown in FIG. 24, MP3 would establish an SCTP link to MP2, and for each of its connected UEs, it would set up a new GTP-U link to MP3. MP2 would then set up the associated SCTP and GTP-U links to MP-GW 2402.

In Architecture B, when MP3 has end-to-end F1 interfaces to MP-GW 2402 as in Method 1, changing MP3's upstream backhaul link from MP1 to MP2 does not impact the end-to-end SCTP or GTP-U links, but the IP routing tables in upstream nodes need to be updated, so that all packets destined for MP3 can now be routed via MP2, instead of MP1, as described earlier for Architecture A1.

In Architecture B, when MP3 has individual per-hop F1 interfaces to MP-GW 2402 as in Method 2, then after the handover, all SCTP and the per UE/E-RAB GTP-U links up to the node where the path switch occurs must be updated, in a similar manner as described above for Architecture A.

Figure 25:
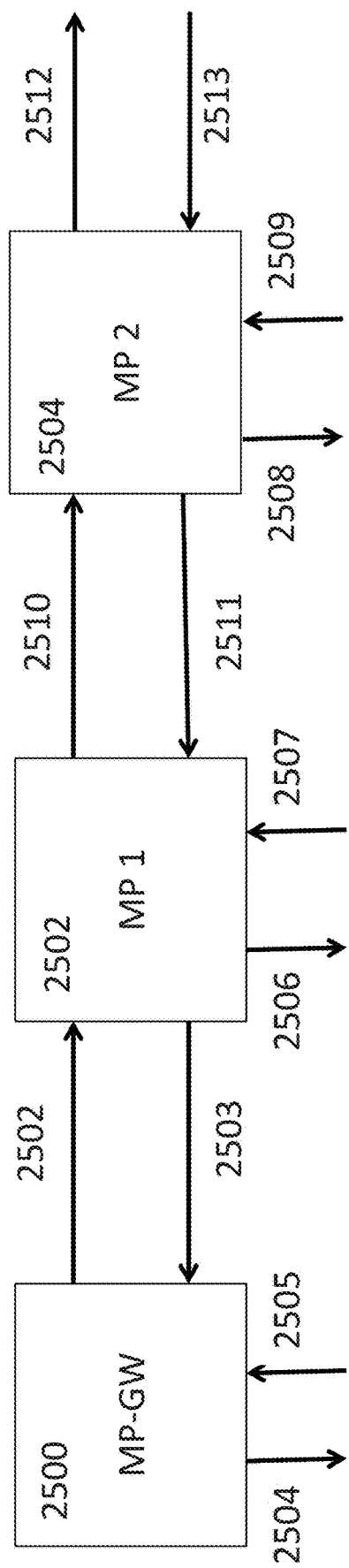
Figure 26:
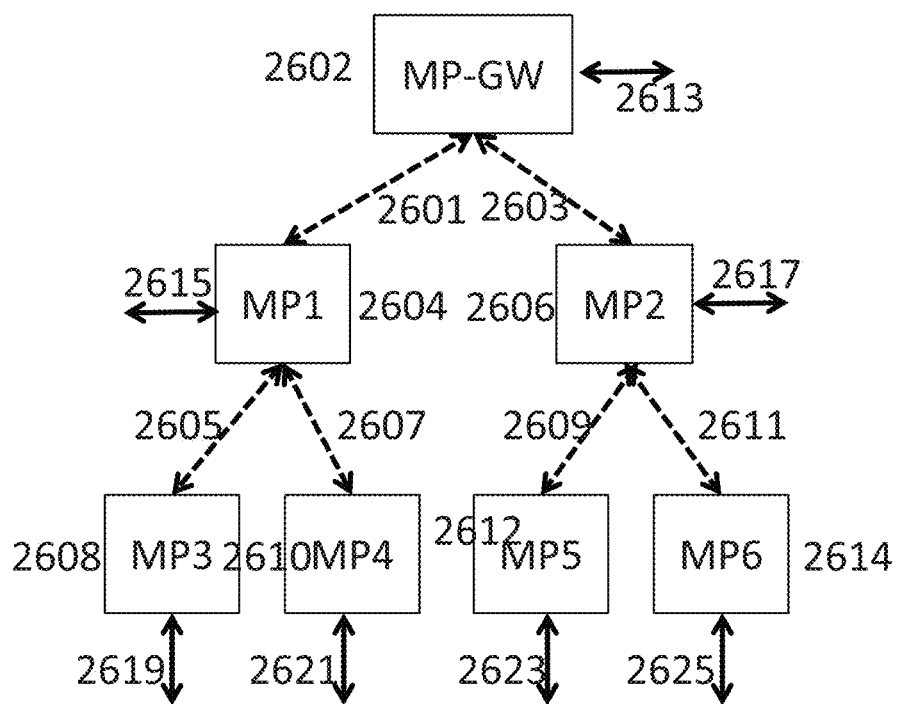

FIG. 25 and FIG. 26 show two mesh network examples. These examples will be used later when we describe how scheduling is performed in the mesh network.

Architecture B with a Central Controller

Figure 27:
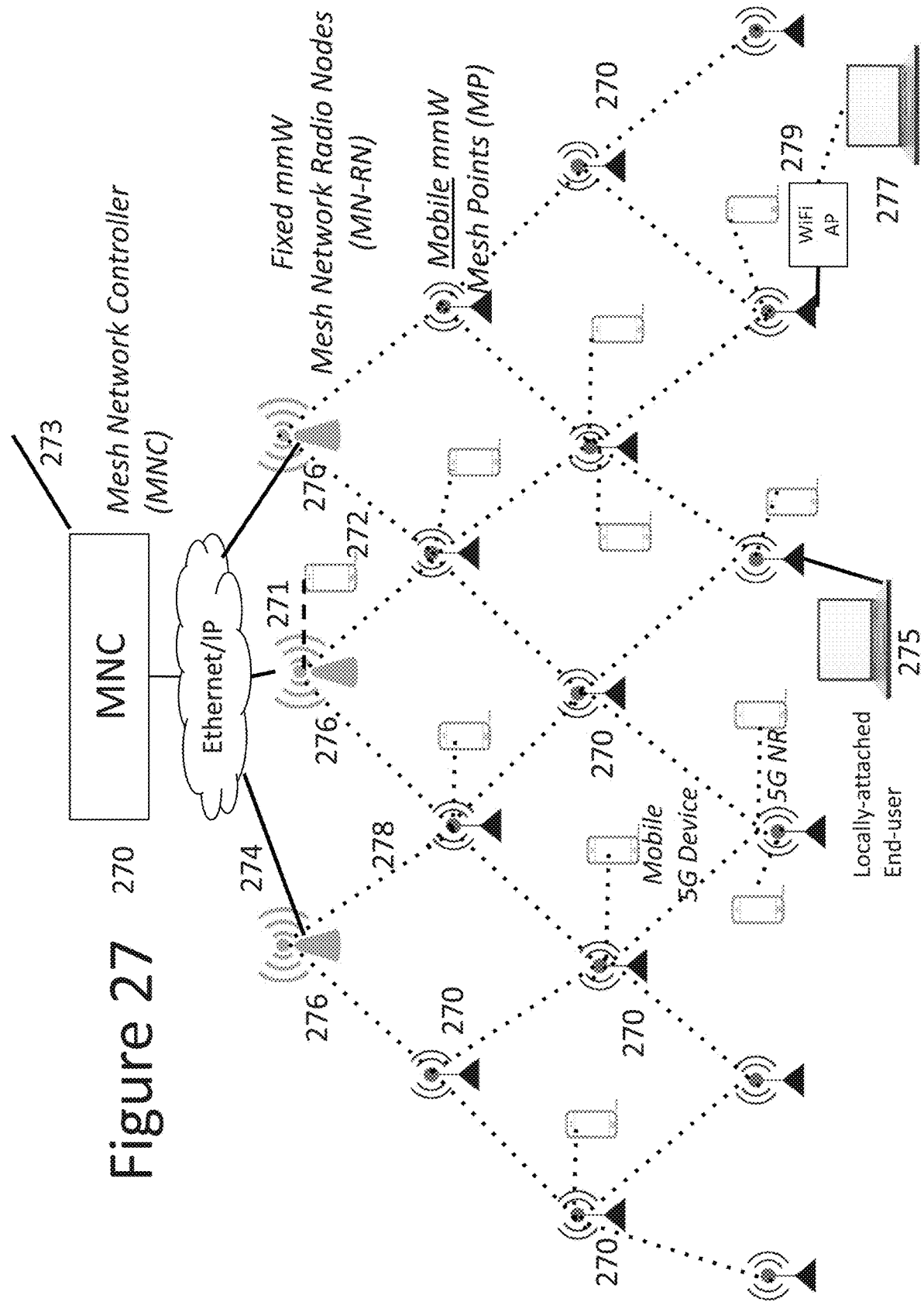

FIG. 27 shows the in-band cellular wireless mesh network 14 of FIG. 1 redrawn to explicitly show the Architecture B with a central controller, referred to as a Mesh Network Controller (MNC). An MNC 270 is a network node that has a connection 273 to a core network; e.g., a public Internet, an operator core network, a private core network, etc. The connection 273 is often provided by fixed links (e.g., public/private Ethernet services running over fiber). An MNC also has fixed or out-of-band wireless fronthaul links 274 to one or more Mesh Network Radio Nodes (MN-RNs) 276. (In this specification, we will sometimes use the terminology fronthaul and backhaul interchangeably. We will often, but not always, use the term fronthaul to refer to a link from a network node that does not fully terminate the airlink protocols; e.g., as in Architecture B, towards the core network.) Operating like a standard RN under the control of the MNC, an MN-RN wirelessly transmits/receives information to/from UEs 272 (e.g., smartphones, tablets, etc.) on access links, indicated in FIG. 27 by dashed lines 271, in a manner compatible with the 5G NR standard as will be specified in 3GPP Release 15 and beyond. MN-RNs also wirelessly transmit/receive information to/from other Mesh Points (MPs) in the mesh network on fronthaul links indicated by dotted lines in FIG. 27. For example, the MN-RNs may be installed on the roadside or on the top or side of buildings or homes, on streetlights or traffic lights or even alongside of highways. An MN-RN may be a terrestrial node. An MN-RN may also be an aerial mobile node. It may be incorporated into an aerial drone with an out-of-band wireless link to the core network. In the special case where an MNC serves only 1 MN-RN, the combination of the MNC and the MN-RN is referred to as an MP-GW. The MNC and MN-RN also correspond to the network nodes CU and DU, shown in FIG. 21, respectively.

Like an MN-RN, an MP 270 wirelessly transmits/receives information to/from UEs (e.g., smartphones, tablets, etc.) on its access links according to the 5G NR standard, but an MP communicates with the MNC only through an MN-RN and reaches the MNC using in-band wireless backhaul links, possibly via other MPs. Among other benefits of this arrangement, since MPs don't need fixed fronthaul connectivity to the MNC, a mesh network is deployed more easily and provides RF coverage more economically than traditional cellular networks. Since MN-RNs and neighboring MPs need to be in RF range of each other to support the fronthaul links, the MPs in a mesh network need to be deployed more densely than traditional APs with fixed backhaul. This makes it even more important that MPs are low-cost and easy to deploy. An MP is a fixed node, which has a fixed position, or it is a mobile (moving) node. In the description that follows, we will sometimes collectively refer to an MP and MN-RN as an RF node.

An MP that is directly attached to an MN-RN via an in-band wireless link is referred to as a 1-hop MP. An MP that can reach an MN-RN via one other MP is referred to as a 2-hop MP, and so on. An N-hop MP has a hop distance of N to an MN-RN. We use the phrase "hop distance" to refer to the number of in-band wireless hops from MP to MP ultimately ending in a wireless hop to an MN-RN and then reaching the MNC via a fixed or out-of-band wireless fronthaul link.

An MN-RN is a 0-hop RF node. Sometimes we use the terminology "even-hop RF node" and "odd-hop RF node" to describe a group of RF nodes that have an even-numbered and odd-numbered hop distance, respectively.

The mesh network also supports multi-connectivity, in which an MP is attached to two or more upstream RF nodes. In some applications, an MP is allowed to attach to multiple upstream RF nodes only when the upstream RF nodes have the same hop distance. In other applications, an MP is allowed to attach to multiple upstream RF nodes only when the RF nodes all have an odd-hop distance or an even-hop distance.

In some examples, an MP is deployed on the roof or attached to a wall on the side of a building, and in addition to serving as a mesh network node, it provides Internet access to one or more local devices 275, 277 located in the building. A local device 275 connects to the MP directly or a local device 277 first connects to a WiFi network and a WiFi AP/router 279 then connects the local device to the MP, for example using an Ethernet interface. Providing local users access to the operator core network and ultimately to the Internet through the mesh network further increases the utility of the wireless mesh network.

In some embodiments, when the MP is deployed inside a vehicle, such as a car, bus, train, and provide wireless Internet access services to local devices inside the vehicle, for example using a WiFi AP, while at the same time providing wireless backhaul services to a mesh network.

In the mesh network, an MP joins (becomes active in) the mesh network for the first time by connecting to the MNC via an upstream MP or MN-RN, for example, like a UE. Once it has connected to an MNC, the MP obtains an IP address and establishes connectivity to the core network via the MNC. An MP may select the upstream MP or MN-RN for connection establishment based on attachment quality. Attachment quality is considered high when the hop distance and airlink utilization (load) of the MP to which the joining MP is to be attached is low and fronthaul link signal quality is above a certain threshold.

Now we describe in detail how Architecture B is used to connect the MPs and the MN-RNs to the MNC, to terminate the air interface to UEs in the mesh network and to connect the UEs to the MNC and ultimately to an operator's core network. The core network can be a 4G core network (Evolved Packet Core, or EPC) where a Mobility Management Entity (MME) terminates the control plane and a Serving Gateway (S-GW) terminates the user plane, or a 5G core network (5G-CN) where an Access and Mobility Management Function (AMF) and a Session Management Function (SMF) terminate the control plane and a User Plane Function (UPF) terminates the user plane. UEs may use dual connectivity, where a UE maintains a primary connection to a 4G LTE eNodeB and a secondary connection to the 5G NR mesh network. An MP may also use 4G LTE+5G dual connectivity, where the MP maintains a primary connection to a 4G LTE eNodeB and a secondary connection to an RF node in the mesh network.

In the description that follows the various nodes are shown as logical nodes whose functionality can be split across multiple physical nodes. In particular, the control and user plane functionality of the MNC can be split into two physical nodes, one handling the control plane and another handling the user plane. It is also possible to split the functionality of the MNC between the part that serves the MN-RNs and the part that serves the MPs. In one embodiment of the architecture, the MN-RN may be an RF node compatible with a 3GPP 5G Distributed Unit (DU). Also, the part of the MNC that serves the MN-RNs may be compatible with a corresponding 3GPP 5G Central Unit (CU).

Architecture B with a Central Controller and RF Nodes with Individual Physical Cell IDs In some embodiments described here a UE operates as standalone 5G NR device without any concurrent connectivity with the 4G LTE network, and each MN-RN and MP serves a different cell that is distinguishable by the Physical Cell ID (PCI) it advertises. The PCI of an MN-RN or MP is unique at least among all neighboring RF nodes. 3GPP is developing an F1 interface for use between a Central Unit (CU) and a Distributed Unit (DU) in a Centralized Radio Access Network (C-RAN). F1 interface uses an F1-AP (F1 Application Protocol) for the communication between a CU and a DU.

Figure 28:
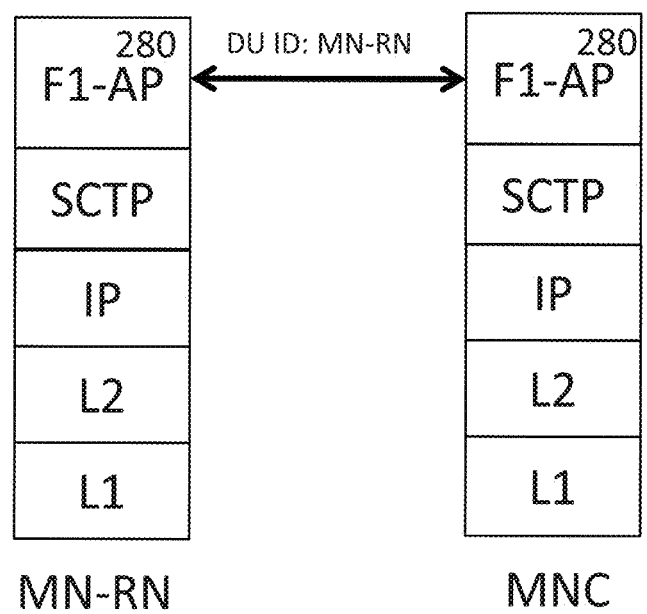

When an MN-RN is first activated, it establishes the Transport Network Layer (TNL) for the F1-C link between the MN-RN and the MNC. The TNL operates over SCTP/IP. Well-known procedures can be used for the MN-RN to receive a private IP address for its F1-C endpoint and to learn the IP address of the F1-C endpoint in the MNC. Once the TNL has been formed, MN-RN sets up the F1-AP interface 280 by exchanging F1-AP Setup messages with the MNC according to the protocol diagram shown in FIG. 28. IP Security (IPSec) protocol may be used to protect the confidentiality and integrity of the communication between the MN-RN and the MNC. If it is not already established, the MNC also establishes an S1-C/NG-C interface with the core network. The MNC presents itself to the core network as a 5G NR gNB and hides the MN-RNs and the MPs of the mesh network from the core network.

Once the F1-AP link has been set up, MN-RN is considered attached to the MNC as a DU. At this point, it starts advertising itself as a 5G NR RF node by transmitting SS/PBCH Blocks (SSBs). SSBs include synchronization signals that carry the Physical Cell Identifier (PCI) along with a short Master Information Block (MIB) that is carried on the physical broadcast channel (PBCH). SS/PBCH signals are transmitted on certain pre-determined OFDM airlink resources. Idle UEs and MPs nearby use SSB signals to detect the MN-RNs, learn their PCI and measure their received signal quality.

Figure 29:
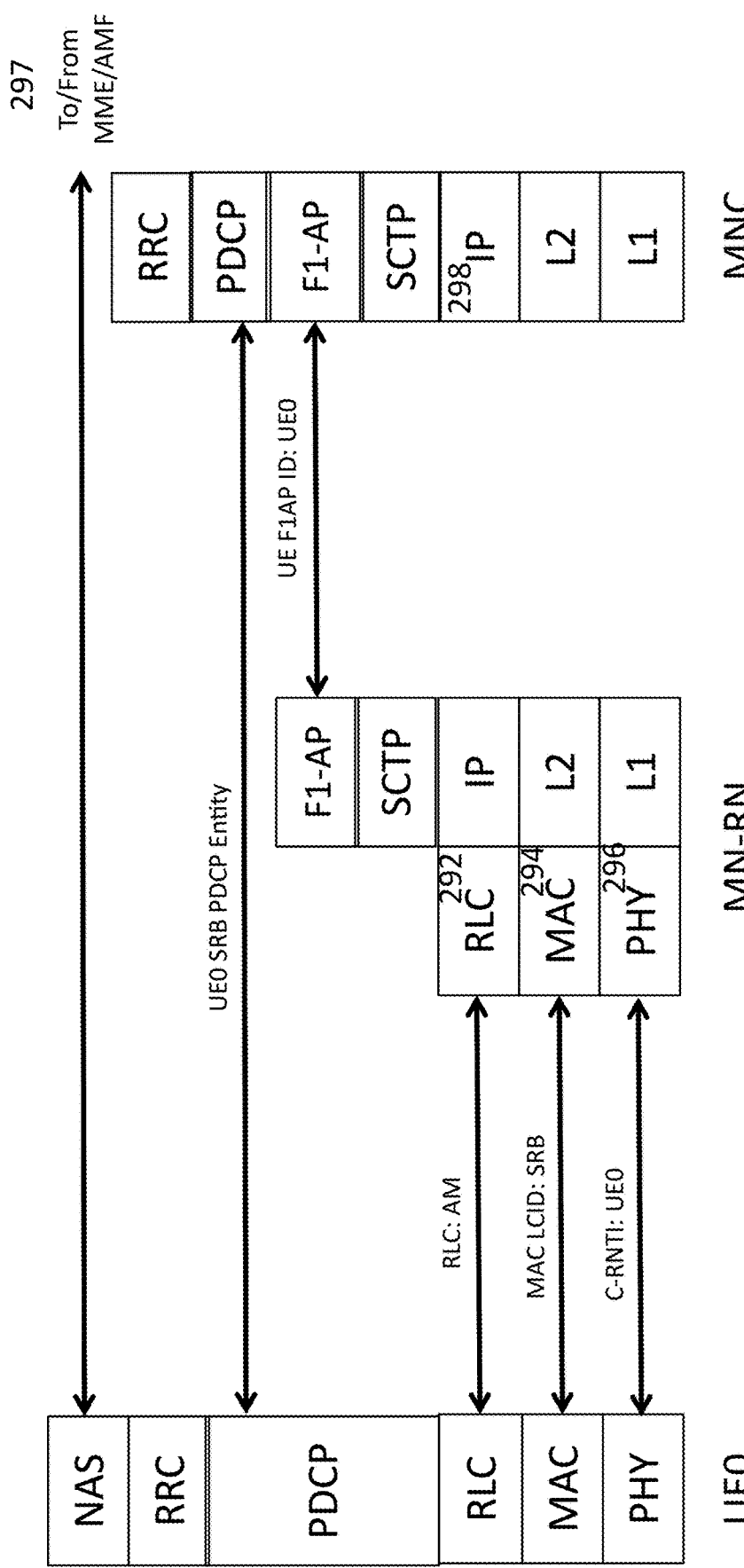

A UE, UE0 that is in the coverage area of the MN-RN can initiate the connection set-up procedures with the mesh network using the random-access channel. The F1-C link between the MN-RN and the MNC is used to exchange control messages for the connection set up. NR RRC UE context is formed and maintained at the MNC. MN-RN relays RRC messages between UE0 and the MNC as described in the control plane protocol stacks shown in FIG. 29. The MN-RN terminates only the PHY 296, MAC 294 and RLC 292 layers of the NR airlink protocol on the access link. On the UL, the MN-RN extracts the PDCP PDUs that carry the ciphered and integrity protected NAS/RRC messages received from UE0 on the access link, and encapsulates them in F1-AP/SCTP/IP and sends them to the MNC using the IP address of F1-AP endpoint 298 in the MNC as the destination address and a unique identifier of UE0 inside the F1-AP message.

Figure 30:
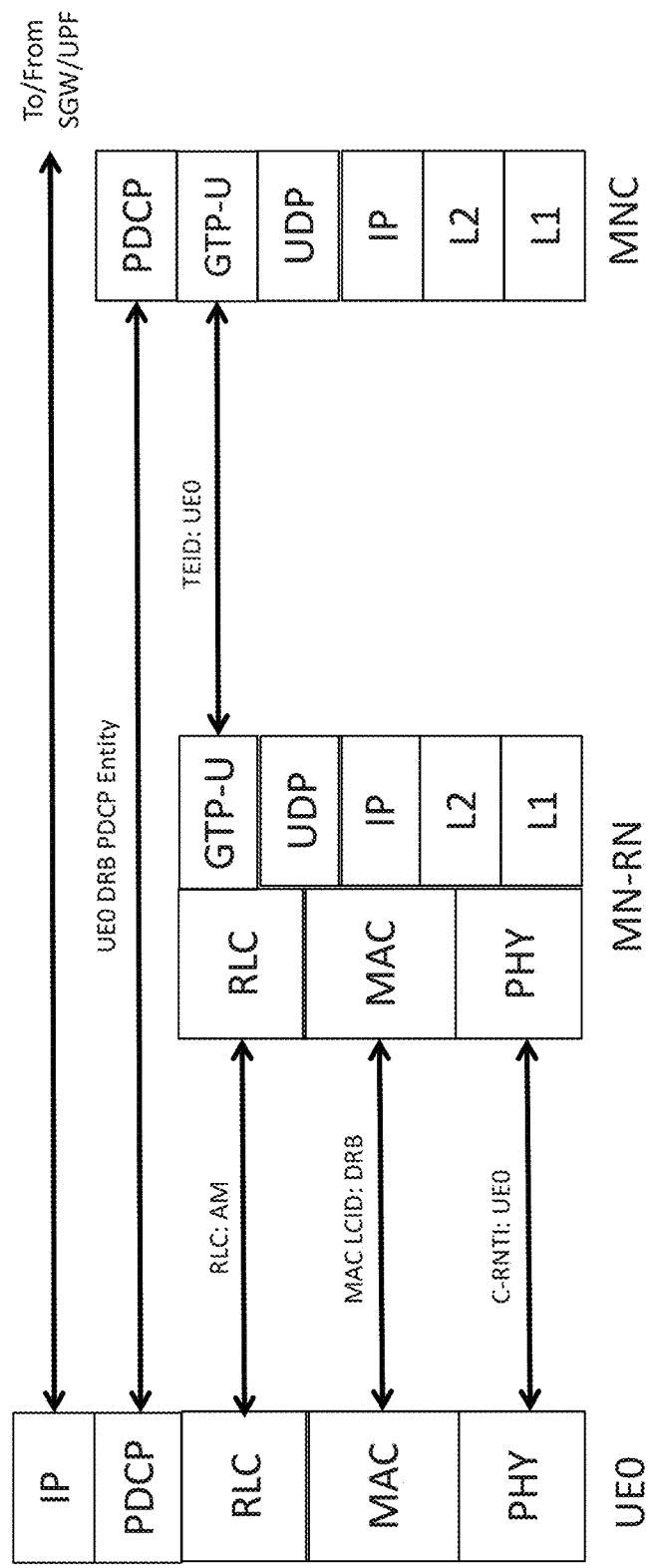

The MNC pulls out the PDCP PDU from the F1-AP container and performs the PDCP receiver function, including in-order delivery, deciphering and integrity checking, to obtain the RRC message sent by UE0. MNC processes the RRC messages like a 5G NR gNB. When the RRC message carries a NAS message from the UE, MNC forwards the NAS message 297 to the MME (or AMF/SMF) over the S1/NG interface. On the DL, the MNC forms the RRC message for UE0 like a 5G NR AP, performs the PDCP function, including ciphering and encapsulates the PDCP PDUs in F1-AP/SCTP/IP and sends them to the MN-RN using MN-RN's IP address for the F1-C endpoint as the destination address. MN-RN extracts the PDCP PDUs, processes them through the RLC, MAC and PHY layers and transmits them over-the-air to UE0. During the connection set-up procedure, a UE-specific F1-U link is established between the MN-RN and the MNC to tunnel user plane packets of UE0 between the MN-RN and the MNC. Based on QoS needs of UE0, multiple GTP-U tunnels may be established for UE on the F1-U interface, one for each of its Data Radio Bearers (DRBs). Once the airlink connection has been established, MNC establishes an S1/NG-U interface to a S-/P-GW (or UPF), and UE0 is assigned a public IP address. User plane processing in the mesh network is similar to the control plane, except in this case GTP-U/UDP/IP tunneling is used to carry UE0's IP packets using the IP addresses of the F1-U endpoints in the MN-RN and the MNC as the tunnel endpoint IP addresses. Unique GTP Tunnel Endpoint Identifiers (TEIDs) are used to identify UE0 and UE0's DRBs, as illustrated in the user plane protocol diagram shown in FIG. 30.

An idle MP, MP1, attaches to an MN-RN like a UE, except for a few differences. To facilitate MP or MN-RN selection, all MN-RNs and all active MPs may advertise their hop distance, where an MN-RN or MP is considered active if it is connected to the MNC (i.e., has an F1-AP link set up) and it is ready to accept 5G NR connection requests from UEs and other downstream MPs. MN-RNs and MPs may transmit their hop distance and airlink load information in the MIB or in a system information block (SIB), which is transmitted on the Physical Downlink Shared Data Channel (PDSCH). Each MN-RN and MP broadcasts SIBs periodically. Transmitting the hop distance in the MIB or in a SIB allows idle MPs to take hop distance into account when selecting or reselecting an MP or MN-RN.

Once MP1 connects to the mesh network like a UE, it receives a private IP address from the core network (e.g., a P-GW in the 4G core network). This IP address is used by the MP to communicate with other nodes in the operator network. In a preferred embodiment of the architecture, the logical core network nodes P-/S-GW (or UPF) for MP1 are physically co-located with the MNC, or may be a part of the MNC. This is in contrast to P-/S-GW (or UPF) nodes for end-user UEs, which may be located at a physical location different from that of the MNC. Co-locating the logical S-GW/P-GW nodes (or UPF) for MPs eliminates unnecessary routing of fronthaul packets destined for the MNC through the operator core network. Core network procedures are used by the MME (or AMF/SMF) to select the co-located S-GW/P-GW when MIP is registering with the core network. For example, MPs stored profile in the core network (e.g., HSS in a 4G EPC core network) may indicate the selection of a local S-/P-GW. It is also possible to implement the MNC functionality as distributed nodes, where the logical MNC serving an MP is placed in a location different from that of another logical MNC that is serving an MN-RN or another MP. In this case, the S-GW/P-GW (or UPF) serving the MP and the virtual MNC serving the MP as a UE should be co-located.

Figure 31:
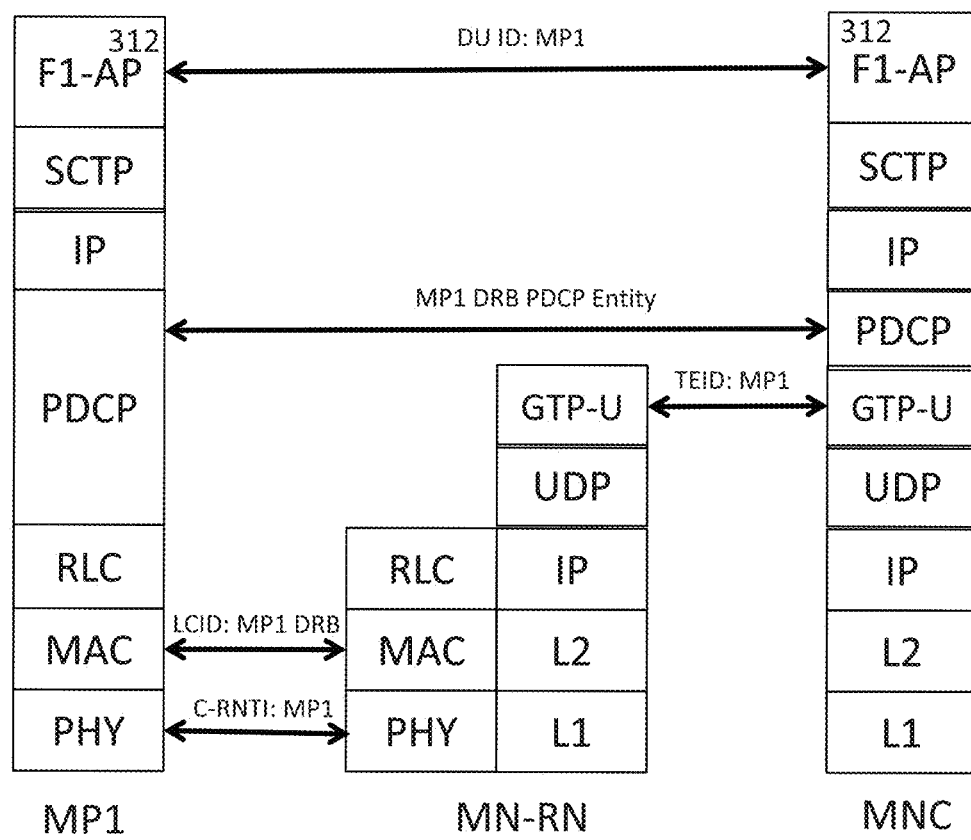

An F1-U GTP-U tunnel is created between the serving MN-RN and the MNC to carry user plane packets of MP1. MP1's radio bearers run between MP1 and MNC. Signaling Radio Bearers (SRBs) carry NAS/RRC signaling messages and Data Radio Bearers (DRBs) carry user plane IP packets between MP1 and MNC. Multiple DRBs can be formed to handle traffic with different QoS needs. Once MP1 has established a bearer path through the MNC, it presents itself to the MNC as a 5G NR DU. It establishes an F1-AP interface 312 with the MNC by exchanging F1-AP set-up messages, as illustrated by the protocol diagram in FIG. 31. F1-AP set-up messages are encapsulated in SCTP/IP using an IP address of the MNC as the destination address and they are transmitted over the wireless link between MP1 and the serving MN-RN. MN-RN terminates only the RLC, MAC, PHY layers of the 5G NR air interface, and transfers MP1's ciphered PDCP PDUs to the MNC using the F1-U GTP-U tunnel between MN-RN and MNC previously set up for MP1. On the UL, after receiving the PDCP PDUs of MP1 from MN-RN, the MNC deciphers the PDCP PDU and extracts the F1-AP message. On the DL, MNC encapsulates the F1-AP message destined for MP1 in SCTP/IP using the IP address of MP1 as the destination address, processes it in the PDCP layer including ciphering and tunnels the PDCP PDU to the serving MN-RN using the GTP-U tunnel previously set up for MP1. MN-RN forwards the PDCP PDUs to MP1 over the 5G NR wireless link. MP deciphers the PDCP PDU and extracts the F1-AP message.

Figure 32:
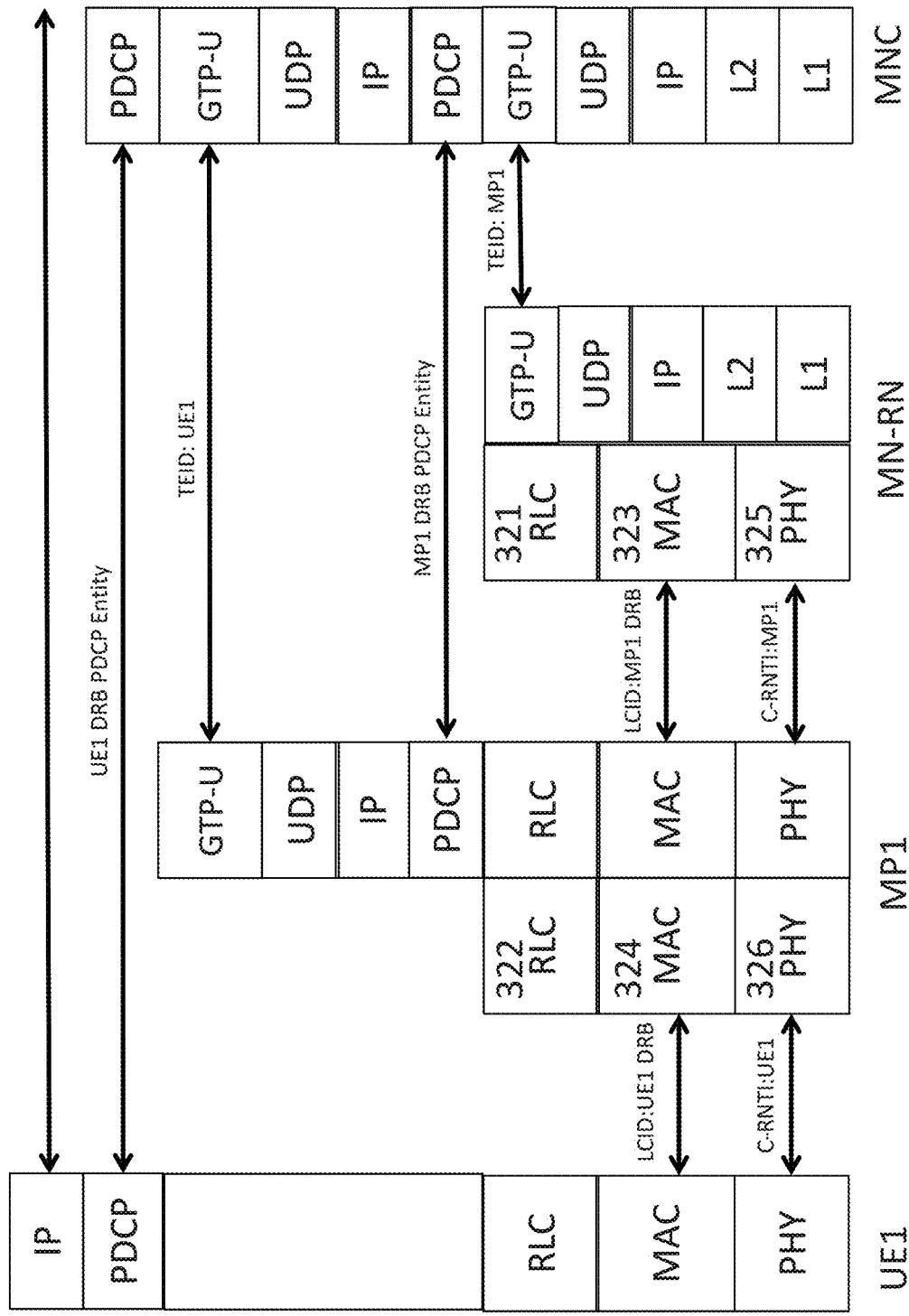

Once the F1-AP link between MP1 and MNC is established, MP1 advertises its PCI by transmitting SSBs, and it accepts connection requests from UEs in its coverage area. When a UE, UE1, attaches to MP1, MP1, acting as a DU, transfers RRC messages to the MNC using F1-AP messages and this sets up UE's context in the MNC. Once UE1's 5G NR connection is established, UE1 receives a public IP address from a P-GW or (SMF/UPF) and can send and receive IP packets to/from sites on the public Internet. The protocol stack diagram in FIG. 32 illustrates the user plane packet processing in the mesh network. On the 5G NR access link it has with UE1, MP1 terminates the PHY 326, MAC 324 and RLC 322 protocol layers. On the UL, PDCP PDUs that carry UE's ciphered IP packets are encapsulated by MP1 in GTP-U/UDP/IP and tunneled to MNC using an MNC IP address as the destination address for the tunnel endpoint. These IP packets are then ciphered again, this time using MP1's private key, and a PDCP header is added to support packet sequencing. PDCP PDUs are carried over the wireless link between MP1 and MN-RN in a DRB of MP1. MN-RN terminates the PHY 325, MAC 323 and RLC 321 layers, and tunnels MP1's PDCP PDUs to MNC using an F1-U GTP tunnel previously established for MP1. MNC first terminates MP1's PDCP layer; i.e., it detects and removes any duplicate PDUs, provides deciphering and delivers MP1's PDCP SDUs in sequence for further processing. Inside MP1's PDCP SDUs, MNC finds the GTP-U/UDP/IP packet that carries UE's PDCP PDUs. (This inner IP packet is routed locally through MP1's S-/P-GW (or UPF) to the IP endpoint terminating UE1's F1-U link.) MNC then terminates UE's PDCP; again, it detects and removes any duplicate PDUs, provides deciphering and extracts UE's PDCP PDUs in sequence and obtains UE's IP packets and forwards them to UE's S-/P-GW (or UPF).

In the other direction, for an IP packet destined to UE1, MNC first performs the PDCP processing for UE1, encapsulates the PDCP PDU in GTP/UDP/IP to generate a tunnel IP packet destined for MP, and then applies PDCP again, this time for MP1, and sends the PDCP PDUs to MN-RN using a GTP/UDP/IP tunnel previously set up for MP1. MN-RN extracts the PDCP PDU for MP1, performs the RLC, MAC and PHY protocol layer operations, and transmits the PDUs to MP1 using a data bearer of MP1. MP terminates the PDCP, RLC, MAC and PHY layers to extract the GTP/UDP/IP packets sent by the MNC, which carry UE1's PDCP PDUs. MP1 sends the PDCP PDUs to UE1 after processing the RLC, MAC and PHY layers for the access link. It is noted that the PDCP link for the access link operates between UE1 and MNC and the PDCP link for the fronthaul link operates between MP1 and MNC.

Figure 33:
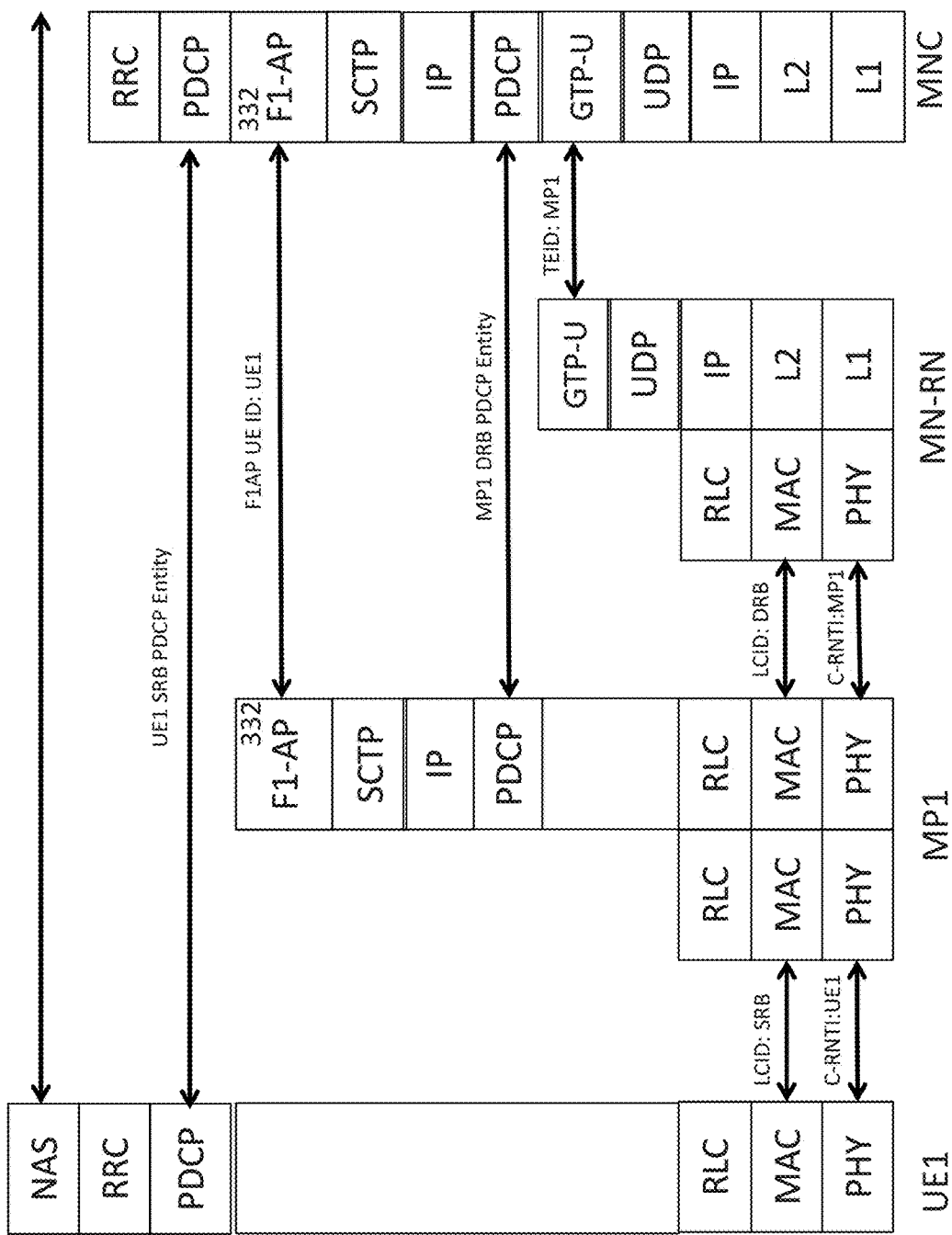

Control plane is handled similarly as shown in the protocol diagram of FIG. 33. In this case, an SCTP/IP link is used to carry NAS/RRC messages of UE1 inside F1-AP messages over the F1-AP interface 332 between MP1 and the MNC using a DRB of MP1. To ensure low latency for signaling traffic a DRB with a matching QoS profile is used.

Figure 34:
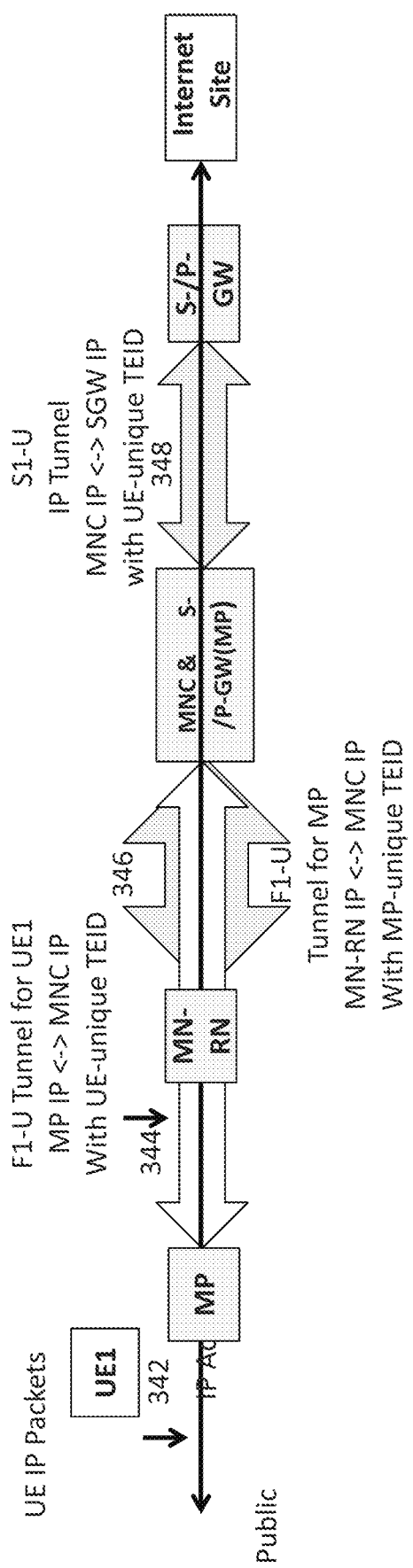

FIG. 34 shows how IP packets travel between UE1 and a destination on the Internet through the mesh network and the core network using tunnels. UE1's IP packets 342 are carried between its serving MP and MNC using a UE1-specific GTP-U tunnel 344. Between the MN-RN and the MNC, UE1's tunnel 344 is carried inside another GTP-U tunnel 346, associated with MP1. Between the MNC and the core network nodes S-/P-GW (or UPF), UE1's IP packets are carried in a GTP-U tunnel 348.

Figure 35:
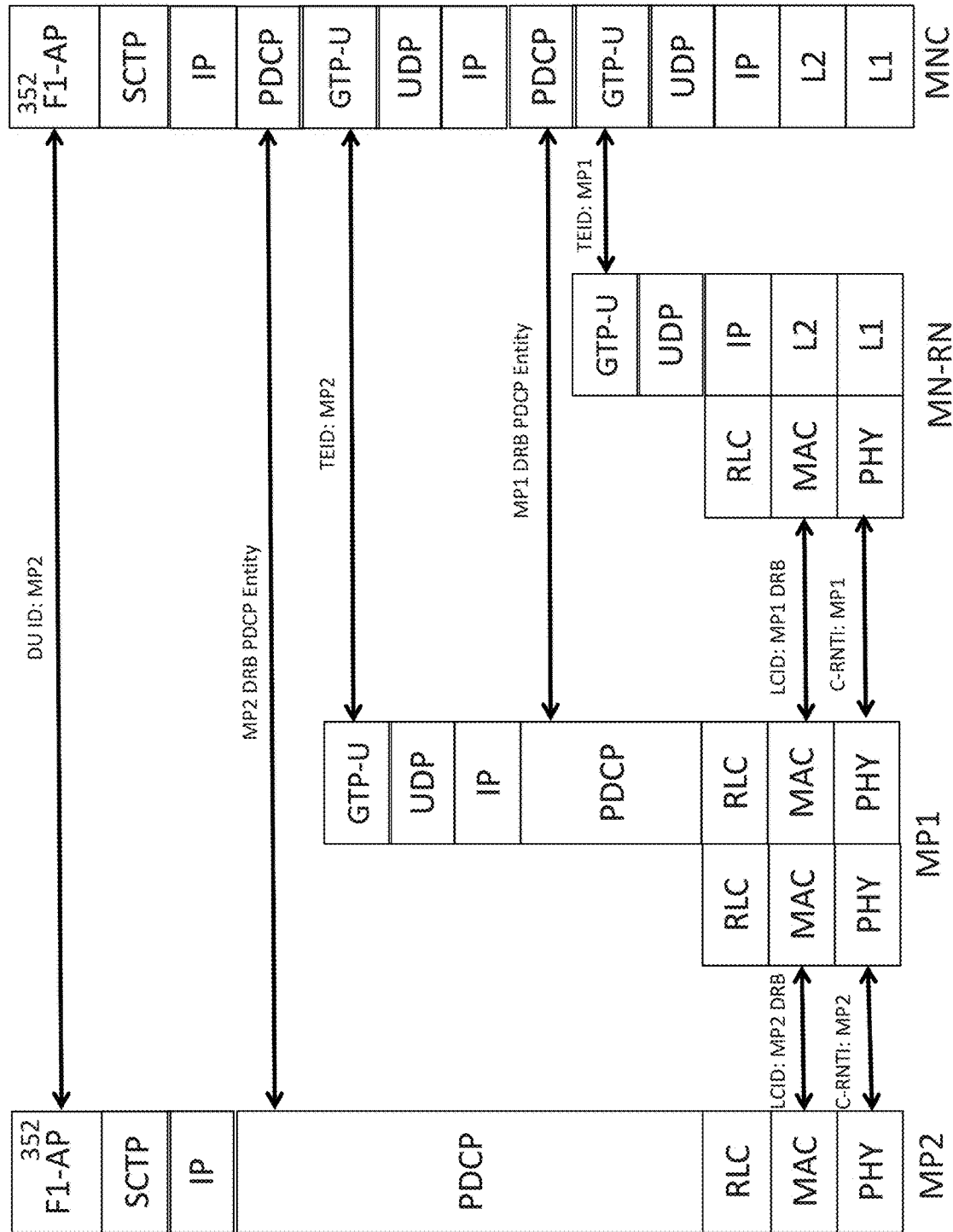
Figure 36:
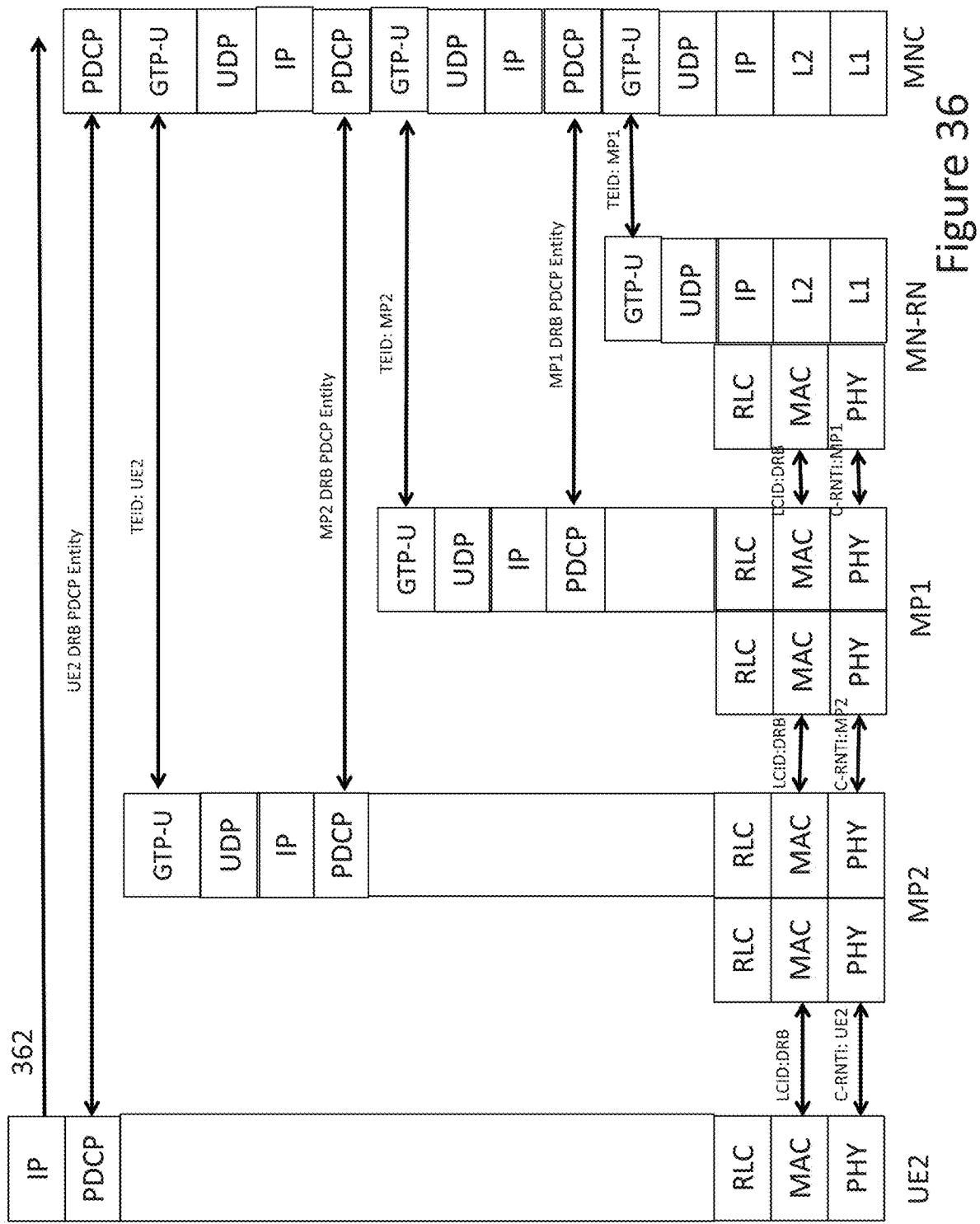
Figure 37:
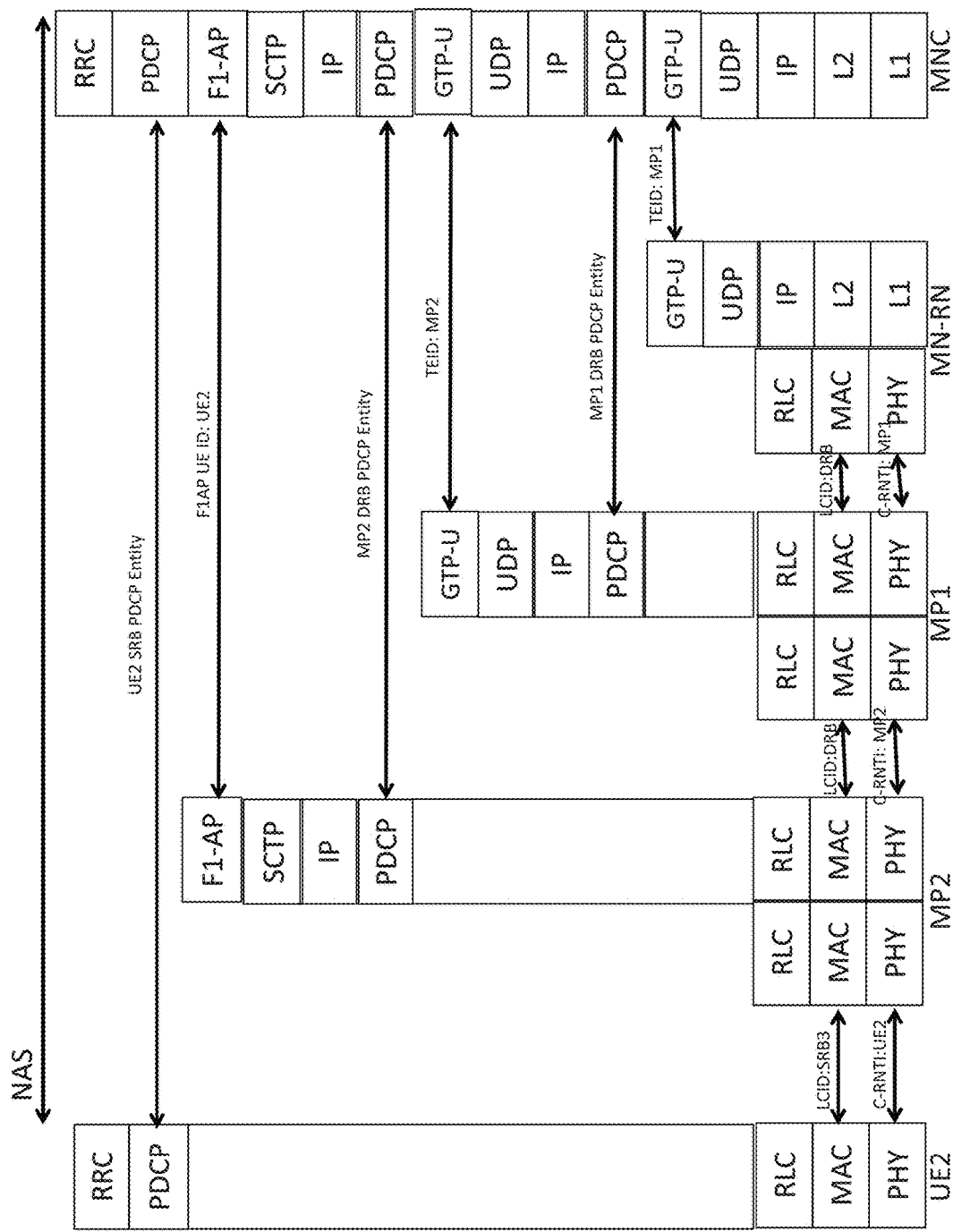

In the case of a 2-hop link, another MP, MP2 attaches to MP1 like a UE, and establishes an MP context at the MNC. MP2 obtains a private IP address from an S-/P-GW (or UPF) co-located with or integrated into the MNC. It then associates with the MNC as a 3GPP DU. FIGS. 35-37 show the protocol stacks for this case. MP2 exchanges F1-AP messages with MNC over the F1-AP interface 352, as illustrated in FIG. 35, using data bearers over fronthaul links and end-to-end GTP-U/IP tunnels. UE2 IP packets 362 are carried between UE2 and MNC using data bearers on access and fronthaul links, as shown in FIG. 36. RRC/NAS messages are exchanged between UE2 and MNC using signaling bearers on the access link between UE2 and MP2, and using data bearers on the fronthaul links, as illustrated in FIG. 37. For the access link PDCP operates between UE2 and MNC and PDCP PDUs are carried between MP2 and MNC using a GTP-U/UDP/IP tunnel set up for UE2. For the first fronthaul link, PDCP operates between MP1 and MNC and PDCP PDUs are carried between MP1 and MNC using another GTP-U/UDP/IP tunnel set up for MP2. Finally, for the second fronthaul link, PDCP operates between MN-RN and MNC and PDCP PDUs are carried between MN-RN and MNC using another GTP-U/UDP/IP tunnel set up for MP1.

MNC maintains separate PDCP links for served UEs and for each MP in between. This increases the processing complexity and latency. For example, in FIG. 35, on the UL, upon receiving the PDCP PDUs from UE2, MP2 encapsulates them with a GTP-U/UDP/IP header. After adding the GTP-U/UDP/IP header, MP2 applies PDCP ciphering to the tunnel IP packet and adds its own PDCP header. The ciphering is removed at the MNC. Ciphering is computationally intensive. Since the IP packet received from UE2 is already ciphered, the ciphering applied by MP2 only serves to protect the GTP-U/UDP/IP header. Yet the PDCP processing in MP2 ends up ciphering UE2's IP packet again, even though it was already ciphered by UE2. This procedure is repeated in MP1. Upon receiving PDCP PDUs from MP2, MP1 encapsulates each PDU with a GTP-U/UDP/IP header, this time for MP2's F1-U link. After adding the GTP-U/UDP/IP header, MP1 applies PDCP ciphering to the tunnel IP packet and adds another PDCP header. In order to extract UE2's IP packet, MNC has to terminate PDCP three times. It has to perform packet sequencing 3 times to detect duplicates and deliver packets in order and perform deciphering 3 times in order to reverse the ciphering performed by UE2 and also by MP2 and MP1. This is computationally expensive. Also, multiple F1-U GTP-U tunnels stacked on top of each other increase header overhead. A significant part of the information carried in GTP-U/UDP/IP headers is redundant and does not need to be sent in every packet.

The PDCP link between the MP and the MNC is used to carry packets of different UEs. Using this PDCP link has certain benefits: 1) PDCP ciphering protects the confidentiality of the GTP-U/UDP/IP header added by the MP; in particular, it helps keep the private IP address of the MP confidential, 2) PDCP sequence numbering provides for lossless handovers when an MP is mobile; during MP handovers upstream MP or MP-RN can indicate the sequence number of the last successfully transmitted PDCP PDU, 3) PDCP sequence numbering is also useful for flow control between MNC and the MP; when the radio link between an MP and its upstream MP or MP-RN is lost, flow control can be used to help the MNC regulate the transmission of DL packets.

Figure 38:
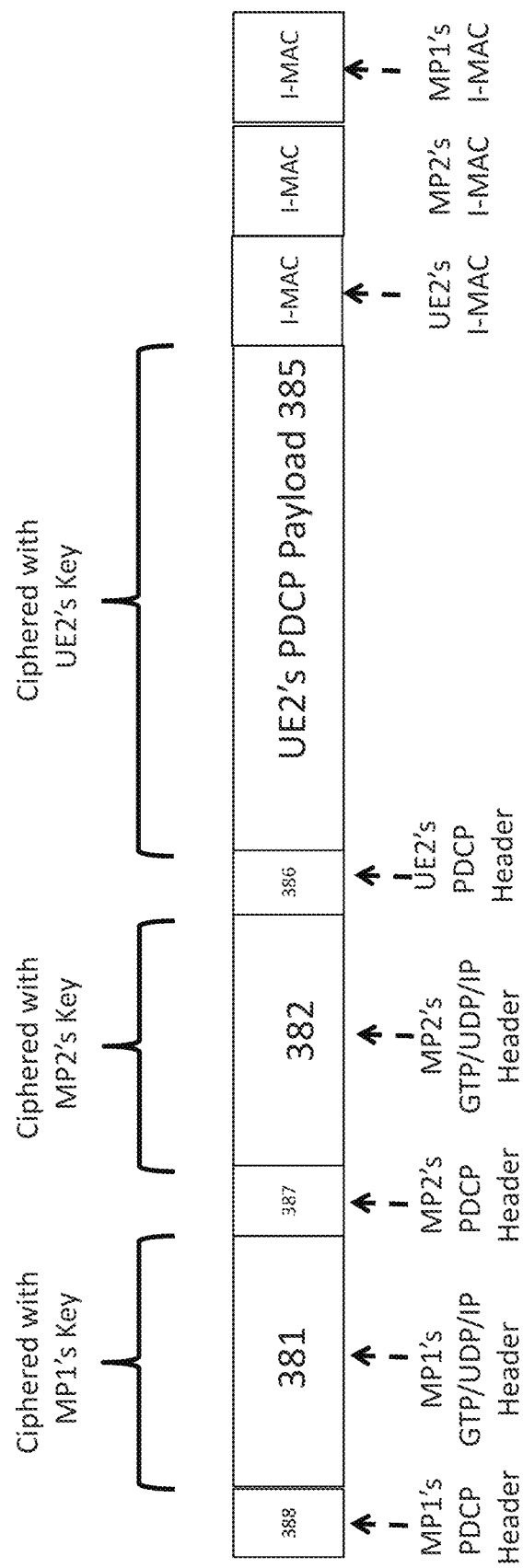

The main drawback of the architecture described so far is the heavy computational burden imposed on the MPs and the MNC to apply multiple layers of ciphering and deciphering when processing the PDCP layer separately for the UE and the intermediate MPs. This drawback can be overcome by applying the ciphering only to the portion of the payload not already ciphered as illustrated in FIG. 38 for the user plane and in FIG. 39 for the control plane. For example, in the user plane protocol stack shown in FIG. 36, for the PDCP link between MP2 and MNC, on the UL MP2 applies ciphering only to the GTP-U/UDP/IP header 382, as illustrated in FIG. 38. The payload carries UE2's PDCP payload 385, which is already ciphered (except the optional integrity check bytes, which don't need to be ciphered). Similarly, for the PDCP link between MP1 and MNC, on the UL MP1 applies ciphering only to its own GTP-U/UDP/IP header 381, leaving the already ciphered MP2 PDCP packet intact. Complexity is also reduced in the MNC, where deciphering is first applied to the GTP-U/UDP/IP header of MP using the ciphering key for MP1, then to the GTP-U/UDP/IP header of MP2 using the ciphering key for MP2, and finally to the PDCP payload of UE2 using the ciphering key for UE2. Only 1 deciphering is applied to each byte of data carried between UE2 and the MNC. Complexity is similarly reduced on the DL, where ciphering is performed in the MNC and the deciphering is performed in MP1 and MP2. In this simplified method, it is possible for MP2 and MP1 to also cipher the PDCP headers 386, 387, but in some applications, this is not necessary.

Figure 39:
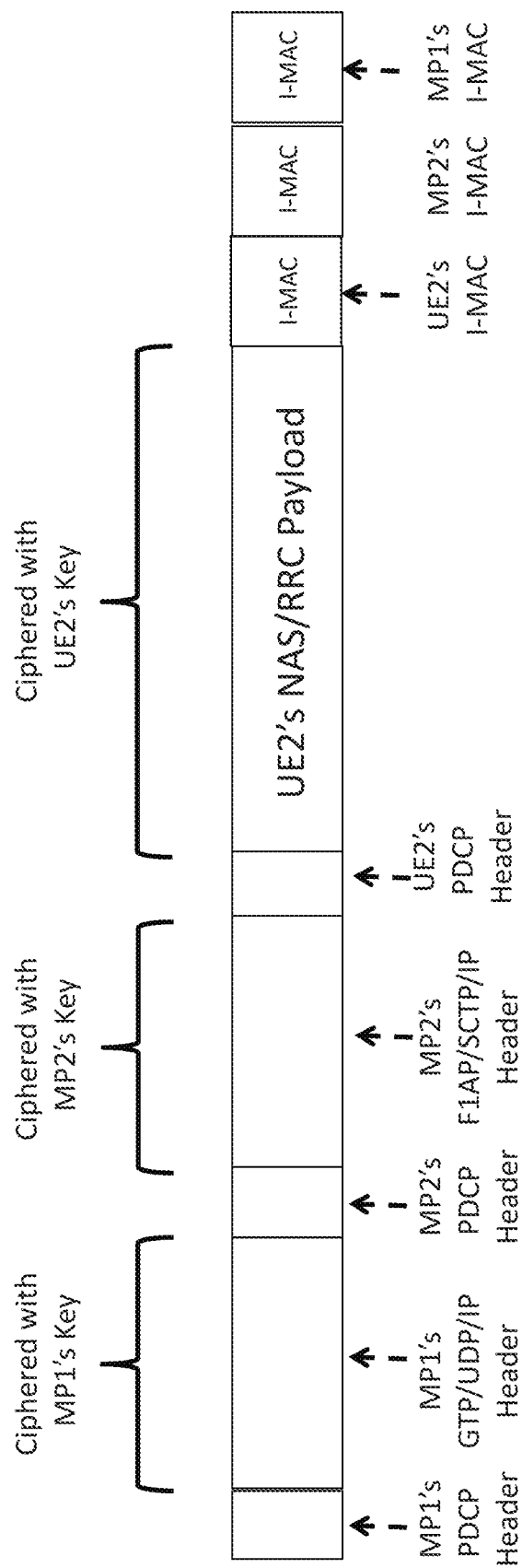

For control plane packets, a similar procedure is used, except replacing GTP-U/UDP/IP headers with F1-AP/SCTP/IP headers, as illustrated in FIG. 39. As before PDCP headers can be sent in the clear, so MP2 and MP1 can leave the messages carried in F1-AP containers intact. For common channel RRC messages, (e.g., SIBs) that are carried directly over RLC, there is no need for PDCP processing, but ciphering can be applied to the GTP-U/UDP/IP headers for MP1 and MP2.

Another drawback of the architecture described is the overhead caused by multiple layers of packet overhead that are added by intermediate nodes MP2 and MP. Header compression can be used to significantly reduce such header overhead. For example, using UDP/IP header compression a 28 (48 for IPv6) byte UDP/IP header can be reduced to just 5 bytes.

Further Details of Header Compression

Figure 40:
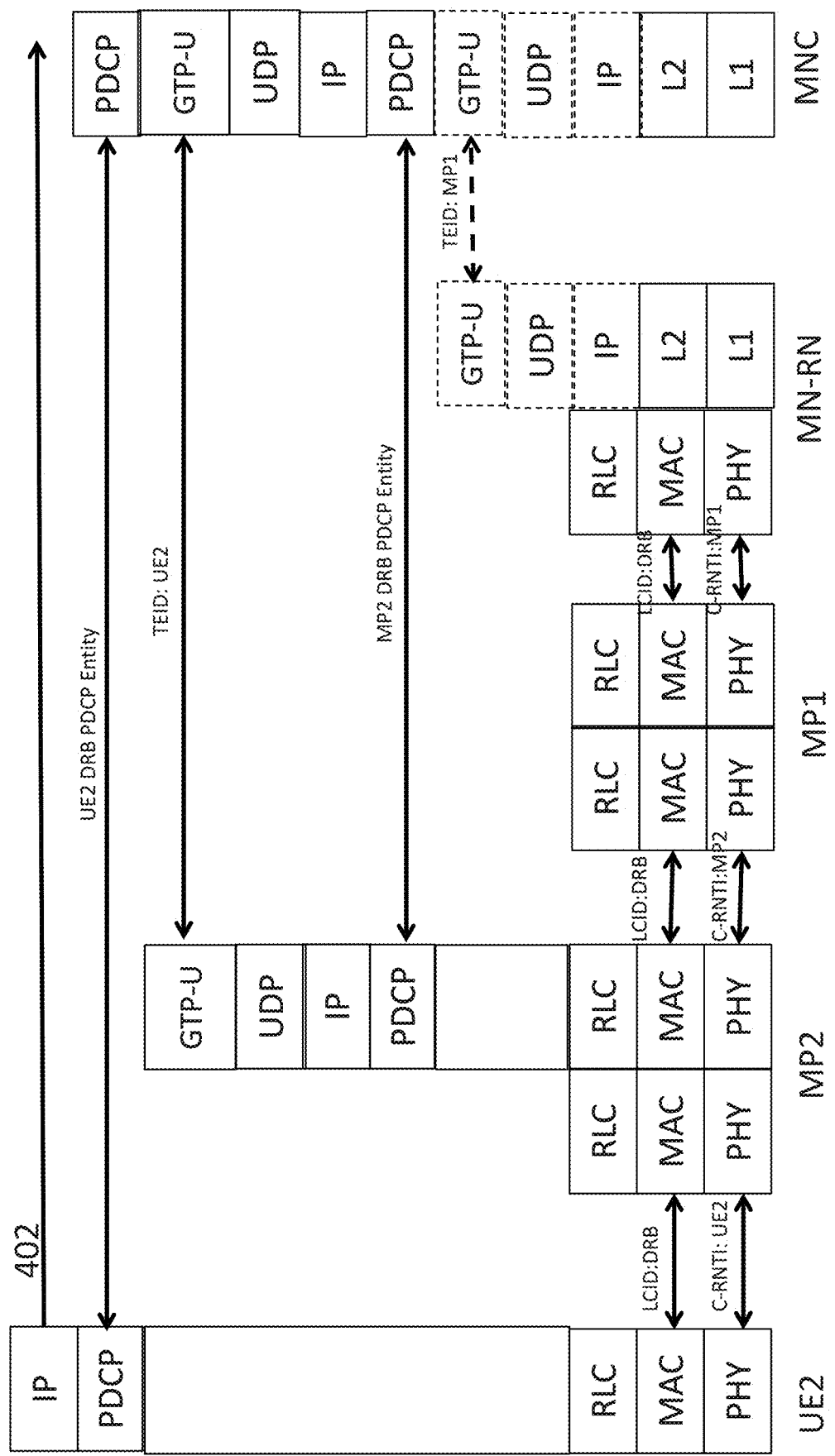
Figure 41:
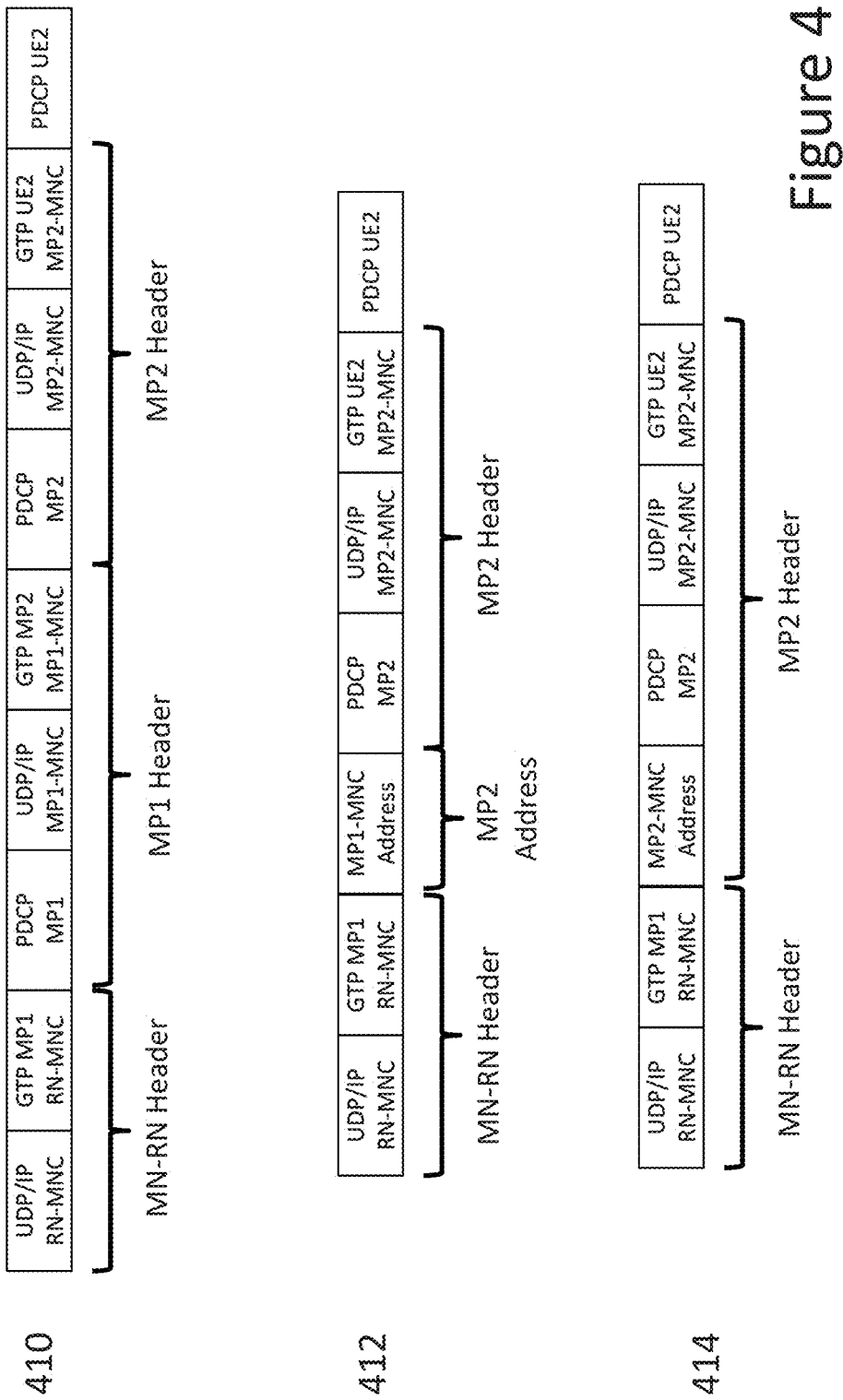

In one form of header compression, as shown in FIG. 40 for the user plane of MP2, the GTP-U/UDP/IP/PDCP protocol layers in the intermediate node MP1 can be replaced by a simpler routing function (not explicitly shown in FIG. 40). To assist MP1 in routing DL packets received from the MN-RN to MP2, the MNC handling the PDCP processing for MP2 will include in the PDCP header an address to indicate that the PDCP PDU is intended for MP2. In some applications, MP and MNC may still perform the control plane processing to set up the GTP-U/UDP/IP tunnel for MP2 between the MNC and MP1, and the 4-byte GTP-U TEID for this tunnel, or a compressed version of it, may be used as the address for MP2 known to MP1. On the DL, the RLC layer in MP1 receives from the MAC Layer RLC PDUs intended for downstream MPs, reassembles them to form RLC SDUs, and then reads the address of the next-hop MP, MP2, removes the address, extracts MP2's PDCP PDU and forwards it to MP2 using MP2's MAC/PHY-layer address (e.g., C-RNTI). The MNC, who is serving MP1 as a UE, removes the overhead of the GTP-U/UDP/IP/PDCP protocol layers for MP1 and tunnels MP2's PDCP PDUs to MN-RN. If the MNC has a direct physical link to MN-RN, it may also bypass the GTP-U/UDP/IP protocol layers for communication with MN-RN that are indicated in FIG. 40 by dotted-lines. To assist MN-RN in routing DL packets received from the MNC to MP1, the MNC, instead of adding the GTP-U/UDP/IP headers, includes an address for MP1 to indicate to MN-RN that the next-hop is MP1. Again, in some applications the 4-byte GTP-U TEID for MP1, or a compressed form of it, may be used as the address for MP1. When MN-RN receives the PDCP PDU intended for MP2, it can identify the next-hop as MP1 by reading the next-hop address in the PDCP header. For further efficiency, MN-RN may remove the address identifying MP1, before relaying the PDCP PDU. FIG. 41 shows the PDCP header overhead with 411, 412 and without 410 header compression for MP. As shown in the block diagram 412, when header compression is used for MP1, the GTP/UDP/IP/PDCP overhead introduced by MP is replaced by an address field for routing. To distinguish the traffic for UEs served on its access links from fronthaul traffic for downstream MPs, an MP or MN-RN uses different data radio bearers for the two fronthaul traffic types, where one DRB is associated with a PDCP entity for access links and another DRB is associated with another PDCP entity for downstream MPs. The header compression scheme described here is used only with the latter. A similar method is used to handle MP2's control plane traffic in MP1.

Further header compression may be applied in the GTP-U/UDP/IP/PDCP protocol layers between MP2 and the MNC to reduce the overhead further, for example using ROHC compression. When additional intermediate MPs are present, the same method can be used to bypass the GTP-U/UDP/IP/PDCP protocol layers in these intermediate MPs as well. In the header compression scheme described above, no extra state information is kept in the intermediate MPs for routing PDCP PDUs. On the DL, the RLC layer in MP1, receives from the MAC Layer RLC PDUs intended for downstream MPs (carried in a DRB for downstream MP traffic), reassembles them to form RLC SDUs, and extracts the PDCP PDUs for downstream MPs. MP1 then reads the address of the next-hop MP, MP2, optionally removes the address from the header, and forwards the PDCP PDU to MP2 using MP2's MAC/PHY-layer address (e.g., C-RNTI).

Figure 42:
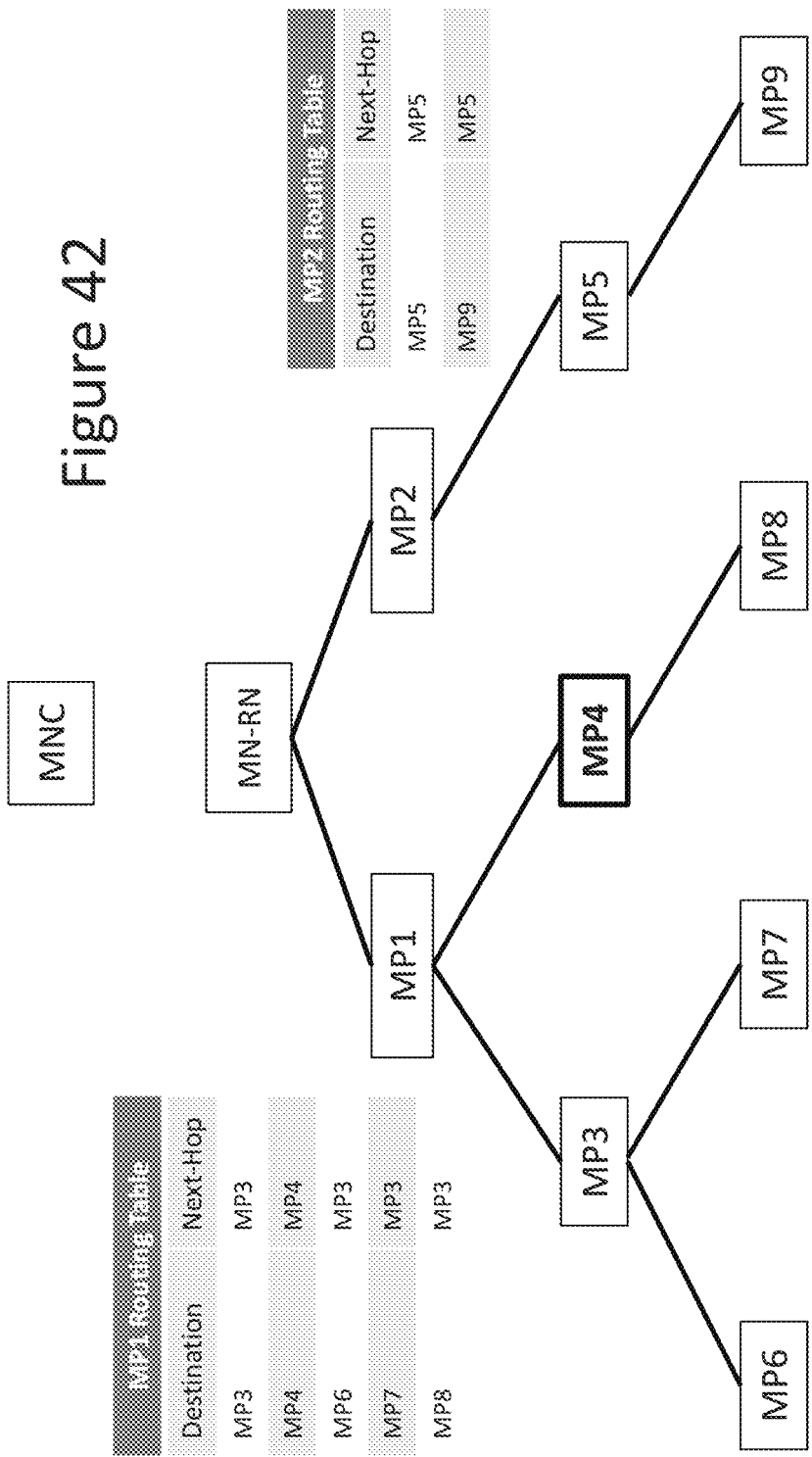
Figure 43:
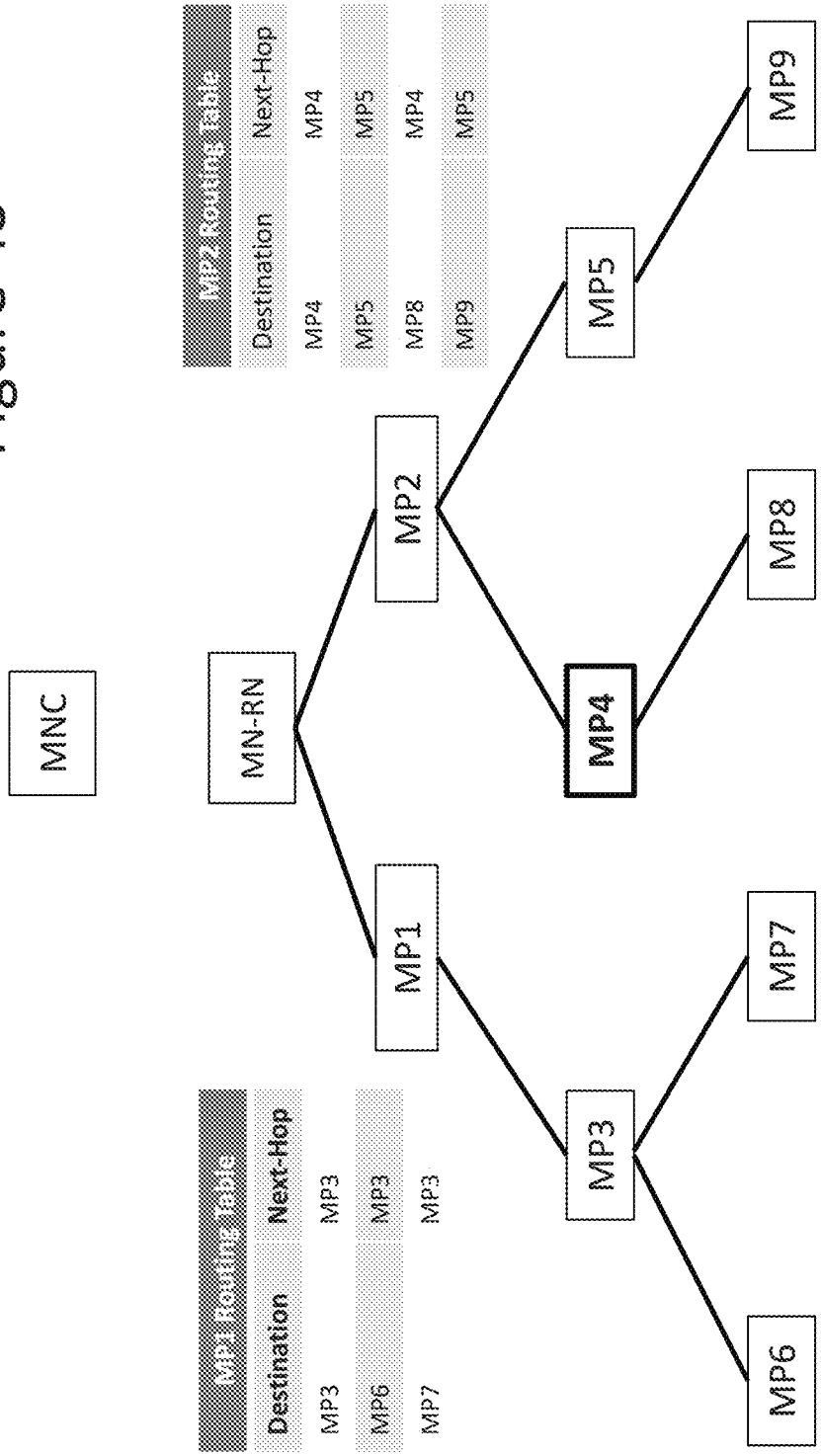

One drawback of the header compression method we described above is that multi-hop address information is still required in the PDCP header, and may still result in some overhead, especially when the number of intermediate MPs is large. As we described in an earlier part of this specification, it is also possible for the intermediate nodes to act like routers by maintaining routing tables for all downstream MPs. In this case, packets can be routed based on the destination address and there is no need to include the address of intermediate nodes in the packet. Whenever, an MP changes its point-of-attachment, all upstream intermediate nodes (MNC, MPs and MN-RNs) update their routing tables. For example, in the mesh network shown in FIGS. 42 and 43, when MP4 disconnects from MP1 and connects to MP2, MN-RN must update its routing table entries for MP4 and MP8, MP2 must add new routing table entries for MP4 and MP8, and MP1 must remove routing table entries for MP4 and MP8. FIG. 42 shows the routing table entries in MP1 and MP2 before the MP4 handover, and FIG. 43 shows the same after the handover. Routing table entries can be updated during the MP handover procedure. In this method, in the PDCP link between the MNC and MP2 shown in FIG. 40, only the address of the end nodes MP2 and MNC needs to be carried in the PDCP header. The header overhead 414 in this case is shown in FIG. 41.

Figure 44:
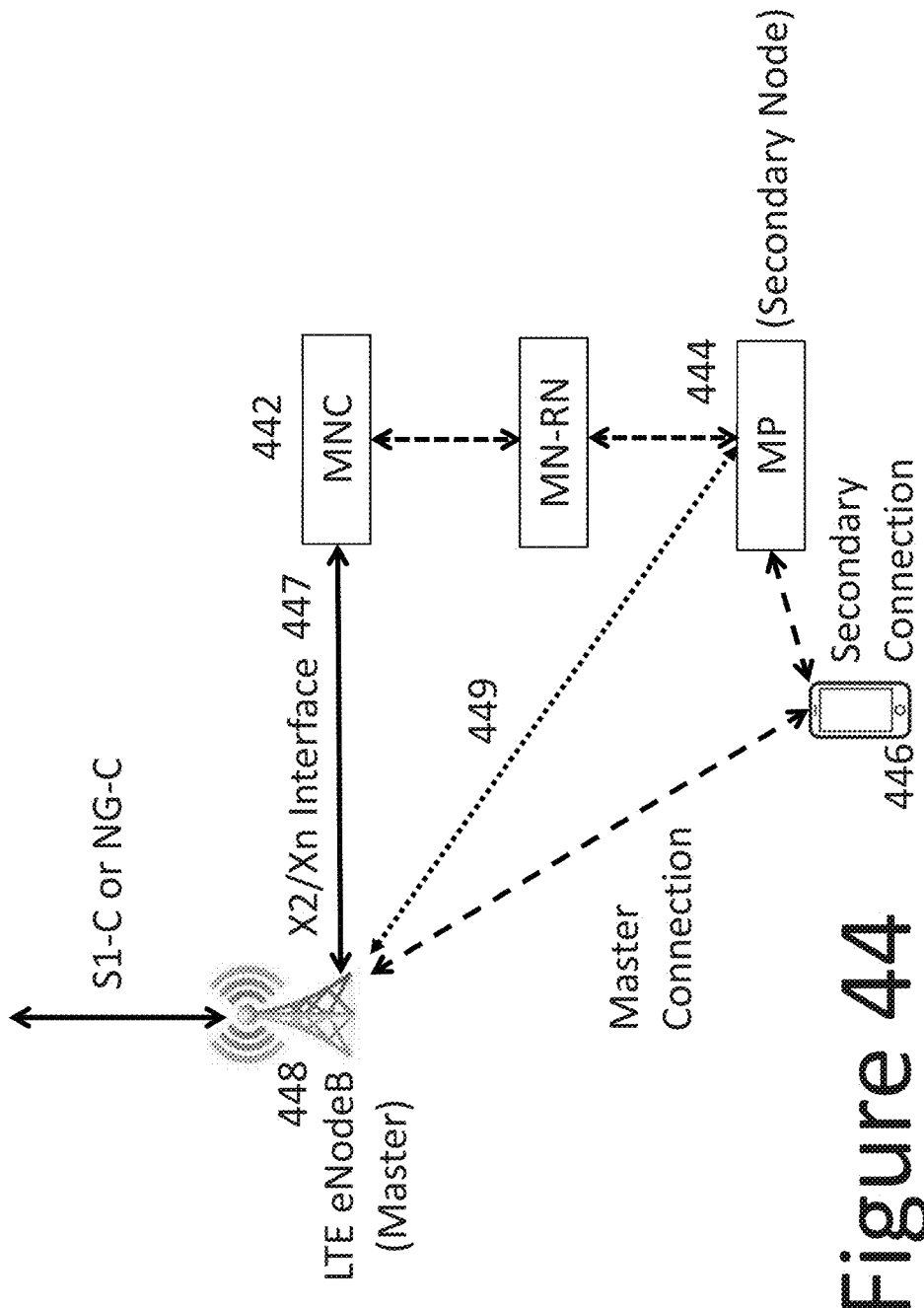
Figure 45:
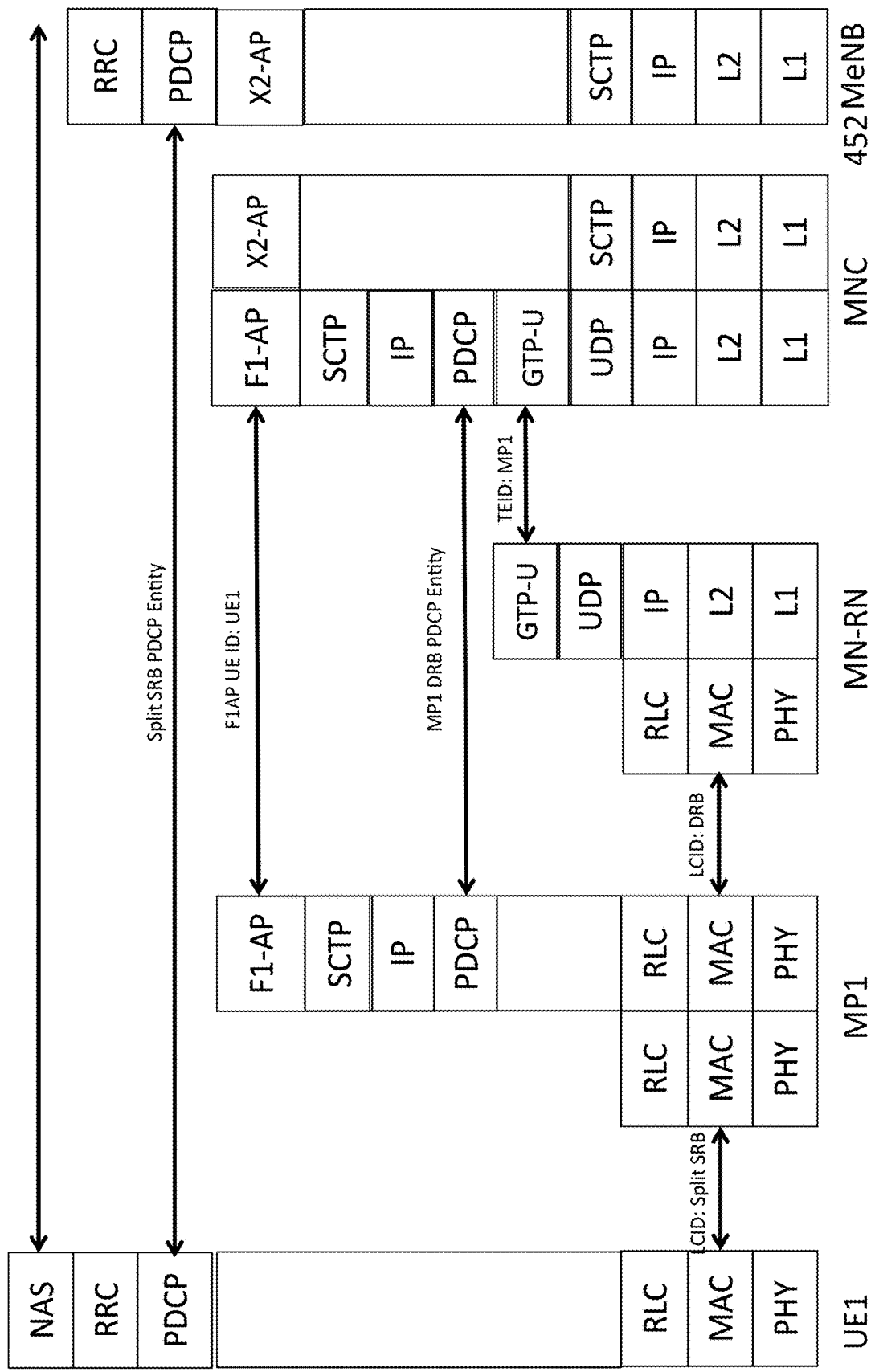
Figure 46:
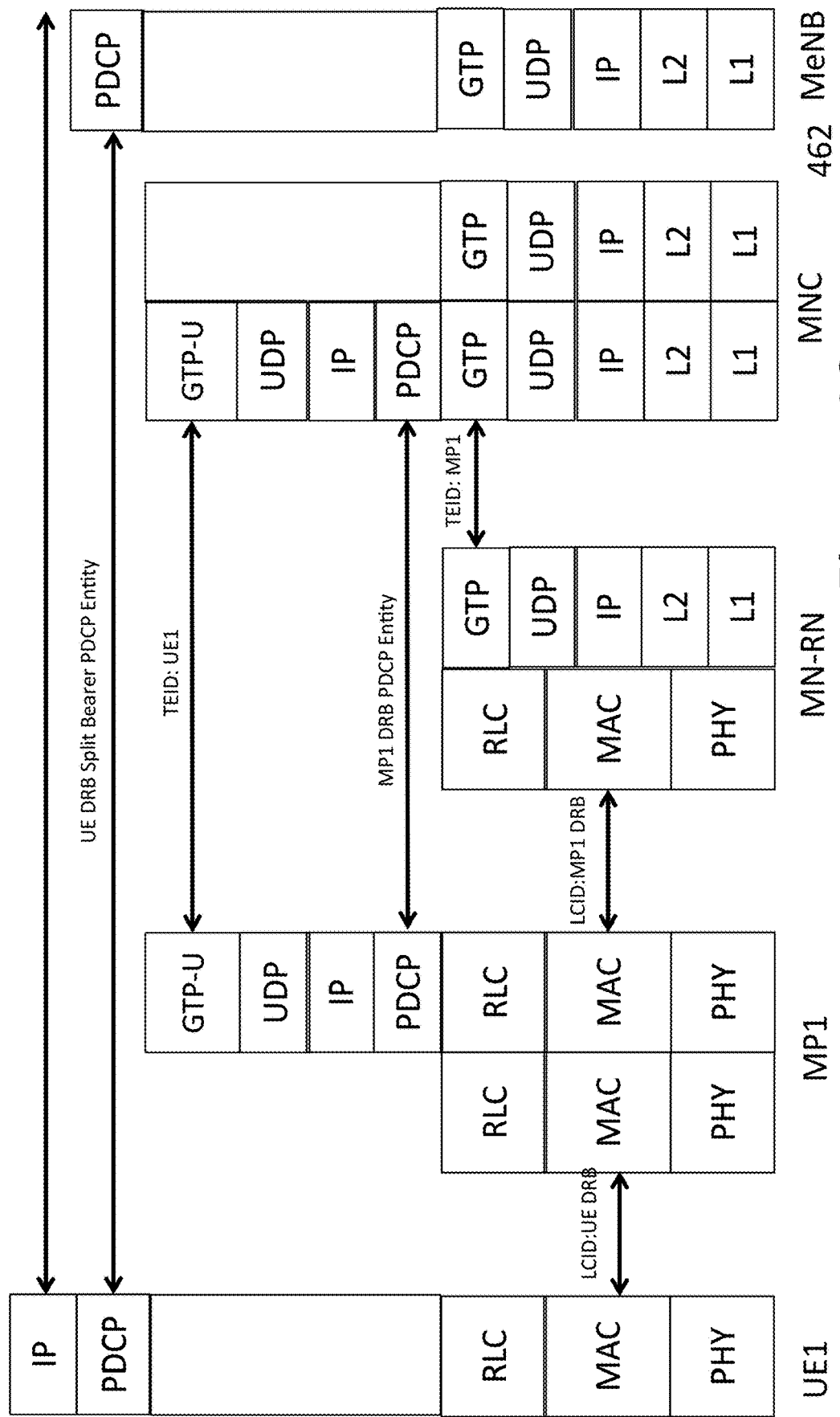

In some embodiments of the technology that we are describing, Dual Connectivity (DC) is used. In DC a UE 446, in addition to receiving service from the mesh network, also receives service from an LTE base station or eNodeB, as shown in FIG. 44. LTE eNodeB 448 terminates the S1-C/NG-C control plane interface to the core network and acts as an anchor. An X2/Xn interface 447 used to carry X2/Xn control messages and user plane data between the LTE and the 5G NR mesh networks runs between the eNodeB and the MNC 442. By terminating the X2/Xn interface, MNC hides mobility within the mesh network from the LTE eNodeB. The LTE eNodeB acts as the master node and the serving MP 444 together with the MNC acts as the secondary node of DC. In DC, LTE and 5G NR typically operate on different channels. For example, 5G NR operates on a wide channel in the mm wave band and 4G LTE operates on a narrower channel in the cellular LTE band. There is an RRC entity in the LTE eNodeB and also in the MNC of the mesh network, but the RRC connection state of the UE is based on the RRC entity in the LTE eNodeB. In other words, UEs always establish a connection with the LTE eNodeB, and the LTE eNodeB adds the MNC and the mesh network as a secondary 5G NR node. LTE eNodeB configures the UE for cell measurements in the mesh network, and uses UE's Measurement Reports in deciding when to add the mesh network as a secondary node. LTE eNodeB also sends the Measurement Report received from the UE to the MNC to assist in selecting the preferred MN-RN or MP during the secondary node addition procedure. Mesh network nodes transmit SSBs to allow idle UEs to synchronize with the mesh network, but they don't need to send any SIBs. UE's use the random-access channels in the mesh network in contention-free mode to attach to the mesh network when the LTE eNodeB adds the MNC and the mesh network as a secondary node. When DC is in use, contention-based random access is not used in the mesh network. The RRC entity in the 5G NR mesh network exchanges RRC messages with the UE directly without involving the LTE eNodeB using a third Signaling Radio Bearer (SRB), SRB3. The RRC entity in the LTE eNodeB 452 exchanges RRC messages with the UE either directly or via the 5G NR mesh network (split SRB) as illustrated by the protocol diagram shown in FIG. 45. User data is carried either via the master LTE eNodeB or the 5G NR mesh network, either split at the radio bearer level or at the packet level (split bearer). FIG. 46 shows the protocol diagram for a split bearer that terminates in the MeNB for PDCP PDUs exchanged with the UE via the mesh network. In some embodiments, all DRBs can be assigned to the mesh network as a split bearer. S1-U/NG-U user plane interfaces to the core network are terminated in the MNC. In a split bearer that terminates at the MNC, the MNC can send the UE PDCP PDUs either via the mesh network or via the LTE eNodeB.

Figure 47:
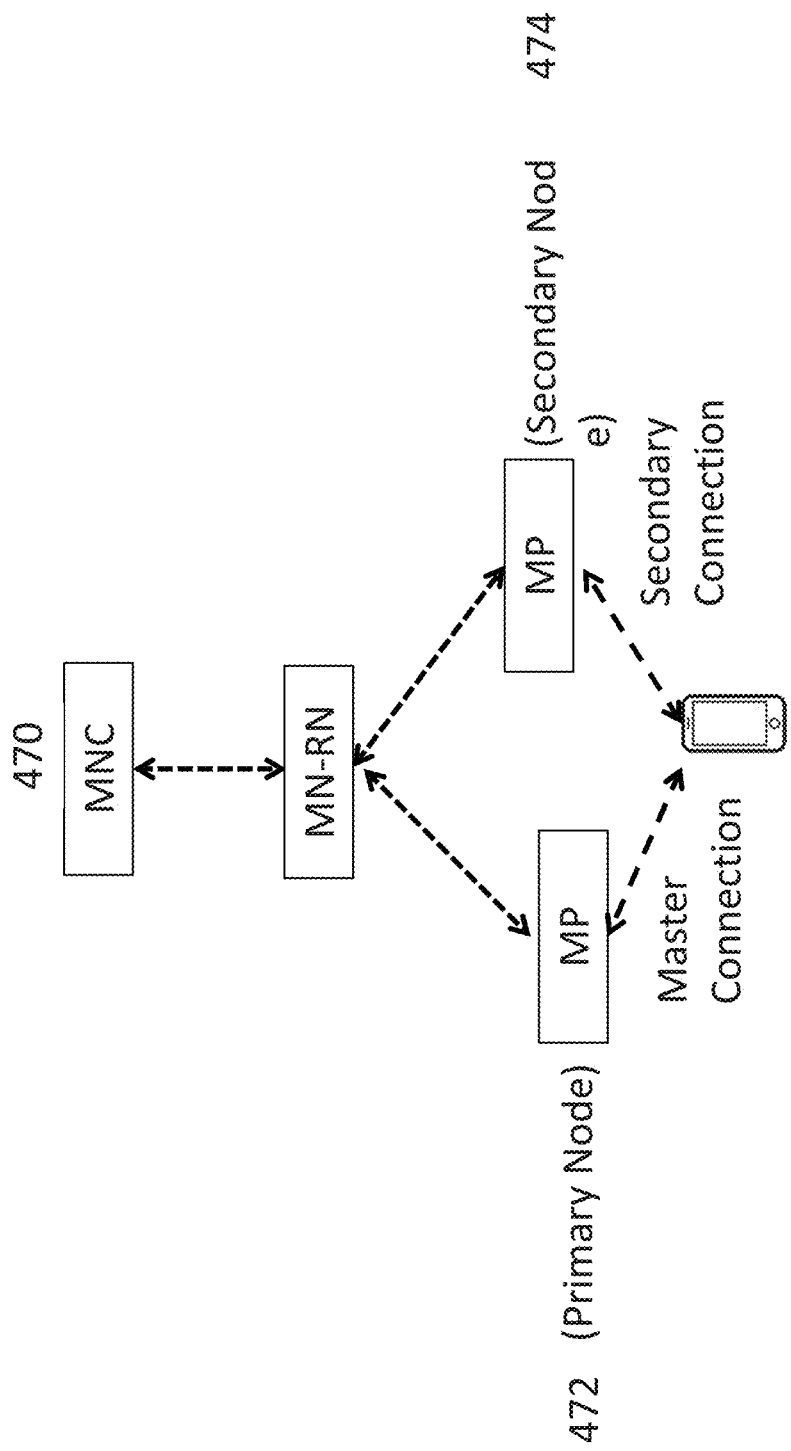

Dual connectivity can also be used between two or more MPs or MN-RNs in the mesh network on the same channel provided sufficient spatial isolation can be achieved between the transmissions. In this case, illustrated in FIG. 47, a UE may receive service from two RF nodes (MPs or MP-RNs) simultaneously, but on different isolated Rx beams. In this case, UE maintains separate MAC entities to communicate with the two RF nodes 472, 474 simultaneously. Both RF nodes belong to the same eNodeB, represented by the MNC 470.

Use of dual connectivity in the mesh network can also be extended to multi-connectivity where the UE maintains more than 2 MAC entities to communicate with more than 2 RF nodes using the 5G NR interface.

MPs may also use dual connectivity to communicate with the MNC. In this case, as shown in FIG. 44, MPs maintain a primary connection 449 to the LTE eNodeB and a secondary connection to an RF node in the mesh network. Using dual connectivity for all UEs and MPs eliminates the need for RF nodes to broadcast system information. SSB transmissions are still needed for an MP to acquire radio frame timing and the system frame number, at least before it attaches to the RF node.

Figure 48:
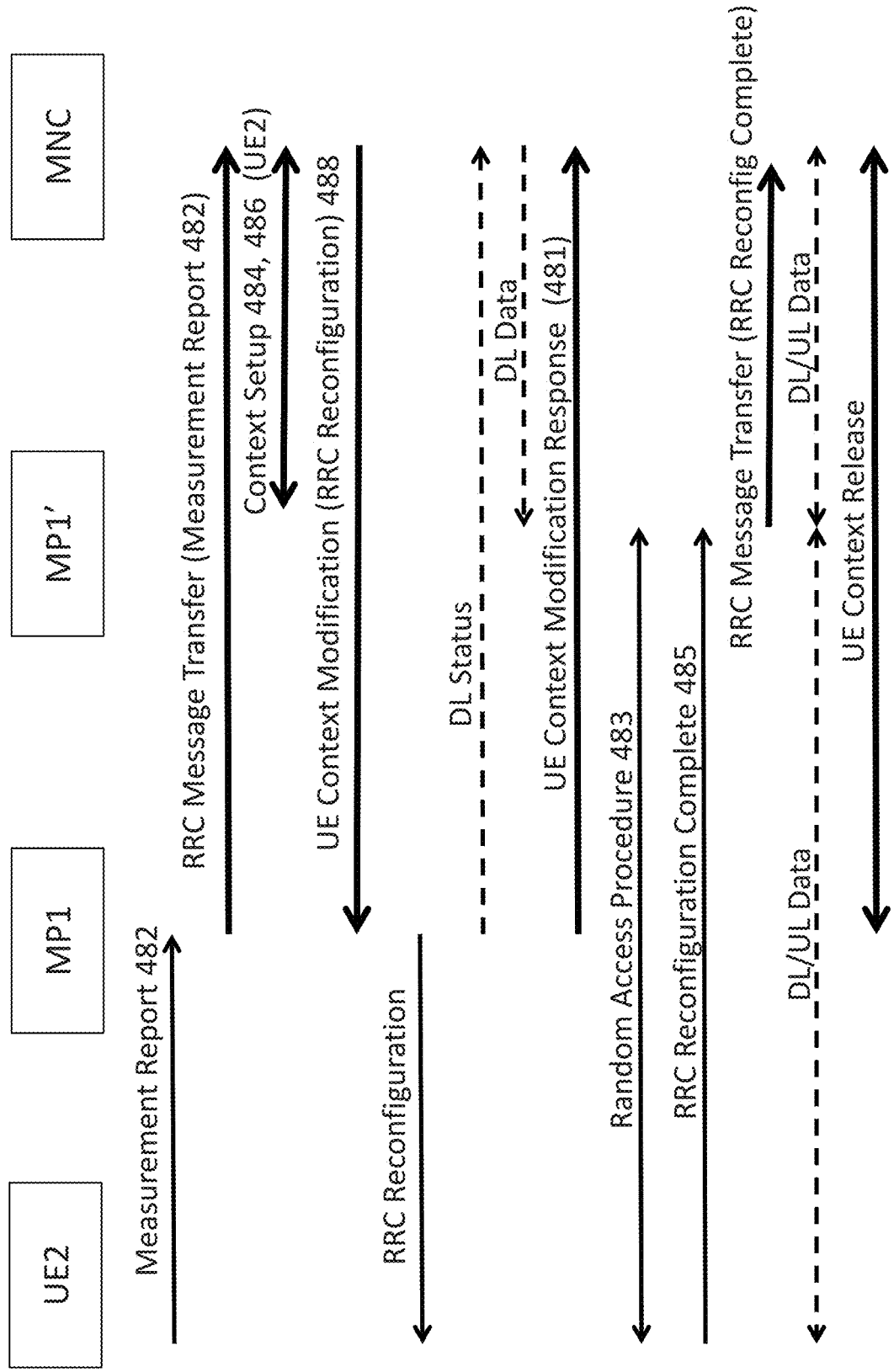
FIGS. 48-51, 58, 63, 66-67 and 77 are call flow diagrams.

UE Handovers in Architecture B with Centralized Controller and RF Nodes with Individual PCIs In the mesh network UE handovers are supported under the control of the MNC using the F1-AP interfaces between the MNC and the RF nodes (MPs and MN-RNs). We describe the handovers first for the case when a UE is accessing the mesh network in a standalone 5G NR mode with a single connection as illustrated by the call flow shown in FIG. 48. At any given time only one MP or MN-RN, referred to as the serving RF node, communicates with the UE. The UE is configured by the MNC to send Measurement Reports using RRC messages. UE will continually measure the received signal quality of transmissions from nearby MPs and MN-RNs based on SSB and/or CSI-RS transmissions by these nodes. UE can determine received signal quality for example by measuring Reference Signal Received Power (RSRP) of SSB or CSI-RS. CSI-RS refers to CSI reference signals. MNC can configure UEs with one or more CSI-RS by specifying the parameters, such as the time and frequency positions CSI-RS occupies on the OFDM grid and the time period between successive transmissions. CSI-RS configuration also includes a unique identifier of the CSI-RS signal to allow the UE to indicate a specific CSI-RS in a Measurement Report it sends to the MNC. CSI-RS RRC configuration is associated with the serving cell, but the reference signals may be transmitted by the serving RF node or by a neighbor RF node. When a UE is configured to monitor a CSI-RS transmission from a neighbor RF node, the MNC communicates with the neighbor cell to ensure the timely transmission of that CSI-RS.

When a UE moves from the coverage area of the serving RF node (e.g., MP1) to the coverage area of another RF node (e.g., MP1'), UE's RRC Measurement Report received by the MNC will indicate the need for a handover. The measurement report will include information on PCI and specific reference signal identifiers to allow the MNC make a determination on the preferred cell and the preferred beam. The MNC will trigger the handover based not only on the Measurement Report 482 received from the UE, but also based on the hop distances of the source and target RF nodes (MP1 and MP1'). The hop distance of an RF node is known to the MNC. When processing messages received from an MP or MN-RN, the MNC can count the number of tunnel headers and determine the hop distance. Alternatively, MPs may include a hop count in the PDCP header. At each hop, the transmitting MP updates the hop count value. This will make it easier for the MNC to determine the hop count.

When a UE is in between two RF nodes, the MNC may prefer to keep the UE on the current serving RF node, if it has a lower hop distance, and the signal quality on the source serving RF node is acceptable. In other words, the MNC will apply a hurdle for triggering the handover when the handover results in a hop distance increase. The applied hurdle increases with the amount of increase in the hop distance.

The handover is handled by the MNC over the F1-AP interface by switching the termination endpoint of the GTP-U tunnel that originates at the MNC from the source serving RF node (MP1) to the target serving RF node (MP1'). In this architecture, there is no need for MPs to communicate with each other directly, instead they use existing fronthaul links to reach the MNC, and the MNC performs the handover locally using the F1-AP interface without involving the core network. To trigger the handover, the MNC sends a UE Context Setup Request message 484 to the target serving RF node (MP1') over the F1-AP interface. The UE Context Setup Request message includes information about the UE context and its radio bearers. The target serving RF node (MP1') performs admission control and if it is able to accept the handover, it responds to the MNC by sending a UE Context Setup Response message 486, which includes an RRC reconfiguration message for the UE. RRC reconfiguration is necessary during a handover, because RRC configuration is cell-specific and needs to be renewed every time the UE changes its serving cell. MNC relays the RRC reconfiguration message of the target serving node (MP1') to the source serving node (MP1) in the RRC container of an F1-AP message (UE Context Modification Request message 488). Source serving node (MP1) forwards the RRC reconfiguration message to the UE and stops transmitting any DL data to the UE. Source serving node also sends the DL data delivery status to the MNC by indicating the sequence number of the last PDCP PDU successfully transmitted by MP1 to the UE for each one of its data bearers. When Acknowledged Mode (AM) RLC is in use, a PDCP PDU is considered successfully transmitted when acknowledged by the UE in the RLC layer. DL data delivery status may be sent from MP1 to MNC in a GTP-U packet carrying UL PDCP PDUs from the same UE. MNC starts forwarding DL PDCP PDUs for the UE to MP1'. MP1 also sends a confirmation to the MNC using the F1-AP UE Context Modification Message 481. Upon receiving the RRC reconfiguration message from MP1, the UE temporarily disconnects from the mesh network and starts the procedure to re-attach to the mesh network, this time via the target serving node (MP1') using the random-access channel of MP1'. To prevent delays that may occur in random access, the RRC reconfiguration message includes information (e.g., a dedicated random-access preamble) for contention-free use of the random access channel of MP1'. The random-access resource is linked to the preferred beam as determined by the MNC based on measurement reports received from the UE. During the random-access procedure 483, the UE also synchronizes its UL timing phase to MP1'. Once connected via MP1', UE sends an RRC Connection Reconfiguration message 485 to MP1', who relays it to MNC in an F1-AP message. User data now flows between MNC and UE via MP1'. As a clean-up step, the MNC and MP1 will execute an F1-AP message exchange to release the UE context in MP1.

In the case of dual connectivity with a 4G LTE eNodeB, the procedure is very similar. A Signaling Radio Bearer (SRB3) can be established between the UE and MNC, and SRB3 is used to configure the UE for RRC measurements and for the UE to send its measurement reports directly to MNC without involving the LTE eNodeB. All RRC signaling related to the mesh network can occur between the UE and the MNC over SRB3. In this case, during the handover, UE will maintain its connection to the LTE eNodeB.

Figure 49:
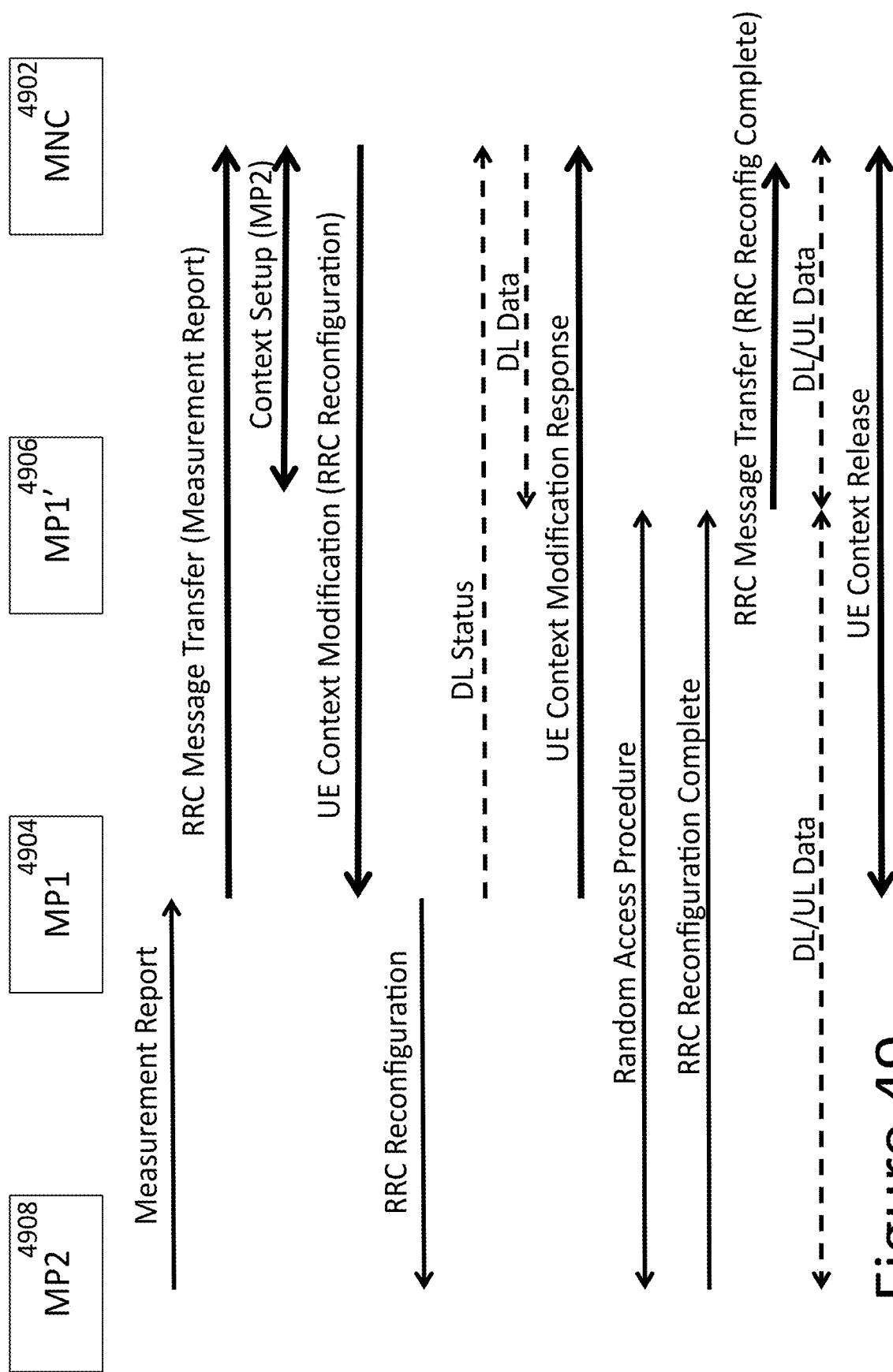

Mesh Point Handovers in Architecture B with Central Controller and RF Nodes with Individual PCIs When MPs are mobile, they also need to perform handovers. In some embodiments, at any given time one upstream MP or MN-RN serves an M. For example, as shown in FIG. 49, an MP, MP2 4908, is attached to an upstream MP, MP1 4904, but is moving towards the coverage of MP1' 4906. Like a UE, MP2 is RRC configured by the MNC 4902 to send Measurement Reports based on SSB or based on configured CSI-RS transmissions. Based on RRC Measurement Reports received from MP2, MNC triggers a handover of MP2 from MP1 to MP1'. The handover procedure is very similar to the handover procedure described earlier for a UE. As before, when triggering a handover, the MNC takes into account not only the Measurement Report, but also the hop distance of MP1' relative to that of MP1. MNC keeps track of the hop distances of its MPs. After the handover, MP2's GTP-U tunnel endpoint will be switched from MP1 to MP1'. Prior to the handover, MP2's GTP-U tunnel runs between the MNC and MP1, and after the handover the tunnel runs from the MNC to MP1'. MP1's PDCP link to the MNC remains intact; MP1 indicates to MNC the sequence number X of the last DL PDCP PDU that was successfully transmitted to MP2, so MNC starts forwarding MP2's PDCP PDUs to MP1' starting with sequence number X+1. During the handover, MP1 resets the lower layer protocols, including RLC and MAC. An important attribute of the MP handover procedure illustrated above is that it has no impact on the interfaces maintained for UEs or downstream MPs served by MP2. UEs or downstream MPs may experience a brief interruption during the path switching, but there is no need to reestablish any of the interfaces they maintain with the MNC. The handovers are also hidden from the core network, as the MNC acts as an anchor for the user plane.

When the PDCP header compression scheme described earlier is in use, the data bearer of MP1 used to carry MP2's PDCP PDUs, may not have its own PDCP layer with its own sequence numbers. Therefore, when MP2 performs a handover from MP1 to MP1', it will not be possible for MP1 to indicate the sequence number of the last DL PDCP PDU successfully transmitted to MP2. This may cause a PDCP PDU of MP2 sent by the MNC to MP1, but not delivered to MP2, to be lost. To avoid this problem, for each one of its downstream MPs, the intermediate MP, MP1, can keep track of, the sequence number of MP2's PDCP PDUs, and report these sequence numbers to the MNC during the handover. In the absence of header compression, intermediate RF nodes send to the MNC the sequence number of the last successfully transmitted PDCP PDU in the GTP-U extension header. In this case, since MP1 does not use GTP-U to relay MP2's PDCP PDUs to the MNC, it inserts the sequence number in a PDCP extension header.

Architecture B with a Central Controller and RF Nodes Using a Single PCI

In the architecture described so far, each MN-RN or MP is configured as a different cell. They transmit SSBs with a different Physical Cell Identifier (PCI). A UE is served by a single RF node at a time and maintains an RRC configuration that may depend on the cell. In UE handovers, the UE is explicitly involved in the procedure. UE sends RRC measurements to the MNC via the serving RF node. When MNC triggers the handover, the UE receives an RRC reconfiguration message from the source serving RF node, briefly disconnects from the mesh network after detaching from the source RF node and performs a contention-free random-access procedure with the target RF node. It sends a contention-free PRACH preamble based on the preamble index it received in the RRC reconfiguration message and the serving RF node responds with a MAC Layer Random Access Response (RAR) to complete the access procedure. UE then sends an RRC reconfiguration message to the MNC via the target serving RF node. In MP handovers, the mobile MP is also actively involved in the handover procedure in a similar manner. UE's active participation in handovers does not result in a significant performance degradation in a traditional mobile network, but in small cell networks and especially in mobile networks like the ones described in this specification, handovers may occur very frequently and active involvement of the UE in the handover procedure can result in disruptions in data transmission, increase latency and reduce UE battery life. Also, in a dense network with many individual cells, cell-based RRC measurements increase processor load and power consumption for UEs. Also, the management of individual cells in a dynamic mobile mesh network can be unwieldy.

In some implementations, mesh network architecture supports handovers that do not require the active involvement of the UE or of the mobile MP. The mesh network utilizes physical layer channel measurements provided by the UE or the mobile MP to perform the handover entirely on the network side. To avoid the active participation of the UE in the handover procedure, at least some of the MN-RNs and MPs advertise the same PCI/MIB in SSB transmissions. All SIB transmissions by the MN-RNs and MPs that share the same PCI are also the same. SSB and SIB1 transmissions (when present) are all synchronized and occur at the same time. As a result, to an idle UE the mesh network appears like a single physical cell. When the UE is configured for dual connectivity with an LTE eNodeB acting as the primary eNodeB, single cell operation of the mesh network also simplifies the configuration of the UE by the LTE eNodeB for RRC measurements, because the UE is configured to measure a single cell for the mesh network. This also reduces the processing load and battery consumption in the UE.

Known single-cell LTE radio network architectures rely upon fronthaul links that use Ethernet-based physical media with tightly controlled latency (sub ms) between the central controller and the remote RF nodes. Such low latency fronthaul links allow the RLC and MAC functions (including the scheduler and the HARQ termination) to reside in the central controller node. In such single-cell architectures, the UE intrinsically sees a single cell with a single MAC entity and a single RLC entity per radio bearer (per DL/UL direction for Unacknowledged Mode RLC). DL transmissions from different remote RF nodes appear like transmissions from distributed antennas, and the MAC entity in the controller can coordinate the transmissions from these antennas. Such coordinated transmission can improve the received signal quality seen by the UE, but even slight increases in fronthaul latency may cause delays in HARQ processing, which degrades overall system performance and reduces achievable peak user rates. In these systems, it is also possible to centralize the PHY layer functions, and specifically on the UL baseband signals received from multiple RF nodes can be combined in the central controller to provide diversity gain. But again, such capabilities are only possible if the fronthaul link has very low (sub ms) latency. In a wireless mesh network, imposing a tight latency requirement on the wireless fronthaul link would greatly complicate the system design and may reduce reliability. In some of the single-cell mesh network architectures we describe here, the RLC, MAC and PHY layer functionality are implemented in the RF nodes (MN-RNs and MPs). In particular, the scheduling and HARQ termination functions of the MAC layer reside in the RF nodes. Each RF node performs its own scheduling and in general no attempt is made to transmit the same data to a UE from multiple RF nodes at the same time. At any given time, the mesh network transmits to a UE from a single RF node and receives from the UE via the same RF node (Note: we will describe below some extensions of this architecture where the UE can receive different data from two or more RF nodes simultaneously or receive the same data from two or more RF nodes, but not simultaneously.) This new architecture significantly relaxes the latency requirement on the fronthaul link between the MNC and the RF nodes and simplifies the implementation of the system, while still providing the key advantages of a single-cell wireless network.

In order for the single cell architecture described here to work in practice, it is necessary to develop 1) a reliable method for a UE to access the single-cell mesh network and select an initial serving RF node (MN-RN or MP) and beam for communications, and 2) a procedure to reliably switch the serving RF node and beam as the UE (or the MP) moves from the coverage area of one RF node to the coverage area of another RF node. Since in this mesh network the RLC, MAC and PHY layers are implemented in a distributed manner in geographically separated RF nodes, special measures need to be taken to present the mesh network to the UE as a single 5G NR cell, and to avoid any performance degradation. Towards this end, the MNC plays an important role in making the distributed RLC, MAC and PHY entities in multiple nodes behave as if they were a single entity, and some functions of these layers are handled centrally by the MNC, as will be described further below.

Figure 50:
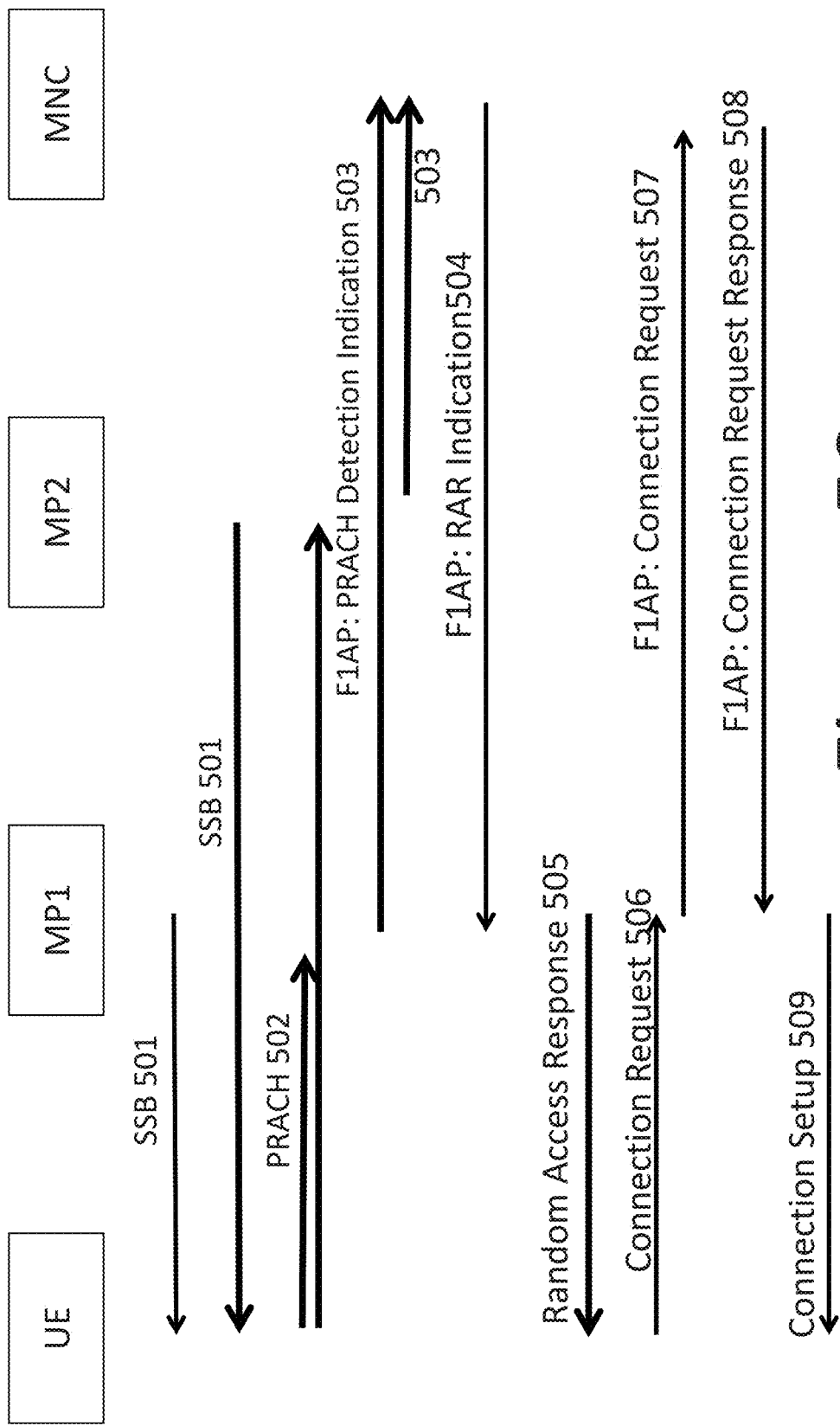

UE Initial Access in Architecture B with a Central Controller and RF Node with a Single PCI We start the description of the system with initial access in a standalone 5G NR mesh network. We use the call flow diagram shown in FIG. 50 to illustrate the procedure. As we discussed earlier, in 4G LTE+5G NR dual connectivity, initial access is replaced by a procedure to add the mesh network as a secondary node. This will be discussed later. As we saw earlier, SSB transmissions play a critical role in initial access in 5G NR. In mm wave 5G NR systems, SSBs 501 are transmitted using a beam sweep. Idle UEs use SSB beam sweep to identify a preferred DL Tx beam and use the preferred beam to select a corresponding PRACH resource. This allows the MP or MN-RN receiving the PRACH to form a reciprocal UL Rx beam to reliably receive the PRACH preamble. When neighboring MPs and MN-RNs use different PCIs, their SSB transmissions can be distinguished by UEs, because the synchronization sequence transmitted in the SSB depends on the PCI. When neighboring RF nodes use the same PCI and the same MIB, their SSB transmissions will be indistinguishable to a UE. In mm wave frequency bands, up to 64 SSB transmissions may occur within a 5 ms time window and form an SSB burst (or SSB beam sweep). Each SSB transmission in an SSB beam sweep is represented by a 6-bit index and otherwise carries the same digital information; i.e., PCI and MIB, but individual SSB transmissions in an SSB beam sweep may use different Tx beam(s). Tx beam(s) are generated using analog, digital, or hybrid analog/digital beamforming. In other words, each SSB in an SSB burst uses a specific beamforming matrix applied at the RF node. SSB bursts are periodic and repeat every P ms, where P=5, 10, 20, 40, 80 or 160 ms. In every SSB burst, the RF node uses the same sequence of beamforming matrices. This allows UEs to measure signal quality for each SSB (index) over multiple SSB bursts, determine the best Rx beam to receive the SSB and also average the measurements over a time interval when selecting the cell (PCI) and the best SSB. The selected SSB will be the one that produces the strongest signal at the UE. In the single-cell system, when multiple RF nodes are transmitting SSBs at the same time, since the UE cannot distinguish between individual SSB transmissions arriving from different RF nodes, it picks the strongest SSB index based on the aggregate RF energy received from all SSB transmissions of nearby RF nodes. In some embodiments, all RF nodes that use the same PCI use the same beamforming matrix $B_i$ for the i'th SSB, where i=0, 1, . . . , 63. This will tend to minimize the overlap of received RF energy from transmissions of neighboring RF nodes. For example, if an RF node is transmitting a single beam directed towards a UE at a 45-degree angle, the transmission of the same beam by a neighbor node will point away from the UE. This will reduce the overlap between SSB transmissions arriving from different RF nodes and the best aggregate SSB transmission selected by the UE is also likely to be the best individual SSB transmission. This will improve the reliability of initial access in single-cell networks. Using the same sequence of beamforming matrices across all RF nodes is only one of many possible means of SSB beam sweeping in the mesh network. Use of other beam sweeping strategies is within the scope of the single cell architecture described here. For example, in some implementations RF nodes may have multiple antenna panels driven by independent TXRUs. In this case, all panels may transmit the same SSB index at the same time.

Once the UE has selected an SSB index that produced the best signal quality, it initiates the random access procedure. Using the information read from the MIB transmitted in SSBs, the UE also learns other relevant system information by listening to SIB1 and SIB2 transmissions from the RF nodes. SIB1 and SIB2 transmissions can be synchronized across all RF nodes so as to minimize any interference. Once the UE has acquired all necessary configuration information from SIB1 and SIB2, it can send a PRACH preamble 502 using a unique PRACH resource that corresponds to the selected SSB index (beam). Using channel reciprocity, UE derives the Tx beam to use to send the PRACH preamble from the Rx beam it learned from the corresponding SSB beam. All RF nodes are configured with the same PRACH resources. Therefore, PRACH receivers in different RF nodes will operate on the same PRACH resource with the same Rx beam at the same time. Each PRACH resource configuration also includes a CORESET, a control channel resource set, for the UE to use to receive the Random Access Response (RAR) message.

Each RF node implements its own PRACH receiver. RF nodes also use channel reciprocity to derive an Rx beam from the SSB Tx beam that corresponds to the PRACH resource. Upon detecting a preamble, the RF nodes (MP1 and MP2 in FIG. 50) send F1-AP messages 503 to the MNC indicating an identifier of the preamble and a received signal quality derived by their preamble detector. (When an RF node has multiple antenna panels, it will use a separate PRACH detector for each panel, and when two or more panels detect PRACH on the same resource, the RF node will send to the MNC the highest received signal quality.) When two or more RF nodes that are near the UE indicate to the MNC the reception of the same PRACH preamble (as in the case shown in FIG. 50B), MNC selects the one with the highest reception quality. MNC sends a RAR indication 504 to the selected RF node (MP1 in FIG. 50), which sent the PRACH detection indication with the highest reception quality. The RAR indication includes a temporary C-RNTI, which is a MAC/PHY layer address, and a CORESET, which is a Control Channel Resource. The UE will use the contents of the RAR message to complete the connection setup procedure. When two or more RF nodes that indicated reception of the same preamble are far apart from each other, MNC may conclude that the received PRACH preambles belonged to different UEs, and may send separate RAR indications to the RF nodes. This allows multiple UE's that are located in different parts of the mesh network that share the same PCI to establish connections at the same time using the same PRACH preamble. MNC may also include a unique PUSCH Data Scrambling Identity and a unique UL-DMRS-Scrambling ID in each RAR indication.

An RF node (MP1 in FIG. 50) that receives the RAR indication from the MNC forms an airlink RAR message in its MAC layer entity and sends the RAR message 505 to the UE. The RAR message includes the temporary C-RNTI received from the MNC, a timing advance computed by the RF node based on the timing of the received PRACH preamble and an UL resource grant for the UE to send its first UL message. The timing advance is chosen to ensure that all UL transmissions arrive at the RF node within the cyclic prefix interval of the 5G NR OFDM system. RAR message also includes the PUSCH Data Scrambling Identity and the UL-DMRS-Scrambling Identity received from the MNC. RF node sends the RAR message to the UE using RA-RNTI as the physical layer address for PDCCH. In the multi-cell mesh network architecture that we described earlier, the MAC layer in an RF node may determine the RAR message on its own without the involvement of the MNC. In the single-cell architecture described here, however, the MNC determines which PRACH reception is deemed successful and selects the temporary C-RNTI and the scrambling identities to ensure their uniqueness across the entire single-cell mesh network. The selected RF node sends the RAR message using the Tx beam that corresponds to the selected SSB index (as indicated by the PRACH resource used by the UE.)

After sending the PRACH, the UE listens to receive the RAR message using the RA-RNTI as the address and the PRACH CORESET as the DL control channel resource. After receiving the RAR, the UE responds with an RRC Connection Request message 506, which it sends using the same Tx beam it selected from the SSB beam sweep and the UL resource grant and scrambling identities it received in the RAR message. Upon receiving the RRC Connection Request message from the UE, the RF node relays the message to the MNC in an RRC container inside an F1-AP message 507. The RRC Connection Request message includes an identifier of the UE, which the MNC includes in its response to the UE in order to resolve any contention that may arise when two or more UEs nearby try to attach to the mesh network at the same time using the same PRACH preamble. The UE identifier is sent to the UE by the MAC Layer of the serving RF node and is not explicitly shown in FIG. 50. Only the UE, who receives back the identifier, continues with the connection setup procedure. In some embodiments, that UE may use the temporary C-RNTI as its C-RNTI for the connection. MNC also forms the RRC Connection Setup message and sends it to the serving RF node in an F1-AP message. The serving RF node transmits the message to the UE on the access link using the temporary C-RNTI (as the physical layer address in the control channel message) and the CORESET that were previously included in the RAR message. The Connection Setup message includes the initial Radio Resource Configuration for the UE.

MNC immediately configures the UE with essential reference signals and control channel resource sets (CORESETs). In particular, the Radio Resource Configuration includes a configuration for the Sounding Reference Signals (SRS). UE can be configured with multiple SRS resource sets. Each resource set may have multiple SRS resources that are specified using several parameters including a cyclic shift to distinguish multiple SRS transmissions in the same resource, a time/frequency allocation to identify its position on the OFDM grid, a periodicity and time offset to specify the OFDM symbols on which SRS is sent and a unique identifier of the SRS resource. An SRS resource can be configured for UL CSI measurement or for UL beam sweeping. An SRS resource is also associated with a DL reference signal resource; i.e., SSB or CSI-RS. This indicates to the UE to use as its Tx beam for SRS the best Rx beam it determined when receiving the associated DL reference signal. In the mesh network, the MNC requests all RF nodes in the vicinity of the UE to perform SRS measurements for the UE. Only one of these RF nodes is actually serving the UE, but multiple RF nodes listen to UE's SRS transmissions. The RF nodes forward the results of the SRS measurements to the MNC. MNC uses these SRS measurements for mobility and beam management. In particular, it uses the measurements to determine when to switch the serving RF node of the UE.

MNC will also configure the UE with one or more CSI-RS resources. CSI-RS resources can be configured for CSI measurements on the DL. CSI measurements include Channel Quality Indication (CQI), which the serving RF node uses to determine the data rate at which to serve the UE, Precoding Matrix Indication (PMI), which the serving RF node uses to determine the digital precoding matrix, Rank Indication (RI), which the serving RF node uses to determine the number of layers (5G NR currently supports up to 8 layers) to transmit to the UE in spatial multiplexing and CRI (CSI Resource Indicator), which the serving RF node uses to determine the preferred DL beam. CSI-RS configured for CSI will usually use two or more digital antenna ports, in order to facilitate channel rank estimation for spatial multiplexing. CSI-RS can also be configured for beam management. In this case, it may be sufficient to configure CSI-RS with a single antenna port.

CSI-RS transmissions can be periodic, semi-persistent or aperiodic. When semi-persistent or aperiodic, CSI-RS transmissions are triggered by DCI transmissions using the DL control channel PDCCH. MNC may configure periodic CSI-RS transmissions from RF nodes that are currently not a serving RF node.

CSI-RS configurations may also include CSI-RS reporting configurations. CSI reports can be periodic, semi-persistent or aperiodic. Semi-persistent or aperiodic reports are triggered by DCI transmission from the serving RF node. CSI-RS reports are always sent to the serving RF node either over the uplink control channel PUCCH or the uplink shared data channel PUSCH.

The scheduler in the serving RF node uses CSI reports to select the DL transmission parameters, for example the Modulation Coding Scheme (MCS), the number of layers, and possibly the preferred Tx/Rx beam. Serving node can also use CSI reports in selecting the UL transmission parameters in an UL scheduling grant. CSI reports can also be used for mobility management. CSI reports for mobility management may include RSRP measurements. Serving RF node forwards CSI reports for mobility management to the MNC. MNC may use CSI reports for mobility management to trigger a path switch to a different serving RF node, as described in more detail below. UE can also be configured to send RRC Measurement Reports based on SSB and/or CSI-RS reference signals, in addition to the physical layer measurement reports described above.

The MNC will also configure the UE with control resource sets (CORESETs). CORESETs are used by UE to search for DL PDCCH control channel transmissions. CORESET configuration specifies a unique CORESET ID, a unique PDCCH DMRS scrambling ID, a time duration of 1, 2 or 3 OFDM symbols, a set of resource blocks to carry the PDCCH data, and interleaving parameters for mapping data bits to resources on the OFDM grid. The CORESET configuration also includes a TCL parameter, which indirectly associates the PDCCH transmission with a specific beam index identified as an SSB index or as a CSI-RS index. For each CORESET, UE is also configured with multiple search spaces. Each search space is identified by a search period (e.g., 1, 2 or 4 slots) and time offset, an aggregation level (1, 2, 4, 8 or 16), which determines the amount of redundancy added for error-correction coding, and the starting OFDM symbol within the slot.

UE Handover in Architecture B with a Central Controller and RF Nodes with the Same PCI Once configured with CORESETs, a UE can search for DL PDCCH transmissions that are intended for the UE, by using an Rx beam that matches the Rx beam for the reference signal index (SSB or CSI-RS) that the CORESET is associated with. MNC may configure the UE with CORESETs that are primarily aimed at transmissions from RF nodes that are neighbors of the RF node currently serving the UE. Since the UE can receive only from one RF node at a given time, these CORESETs may not be used for dynamically scheduled transmissions until the MNC determines that it is better to serve the UE from one of the neighboring nodes and after a path switch is executed. However, configuration of the CORESETs prior to a path switch ensures that the switch can be completed in a very short time without any new configuration. (In some applications of the technology of this specification, a UE may be attached to multiple RF nodes and may receive from, or transmit to, multiple RF nodes. These extensions are described later in the specification.)

In order to track the UE, multiple CSI-RSs are configured on the serving RF node for CSI reporting and multiple CORESETS are configured for DL PDCCH control channel transmissions. These CSI-RS resources correspond to the serving beam as well as certain adjacent beams, as determined by the MNC. UE reports CSI on the uplink PUCCH control channel. Reported CSI includes CQI, PMI and CRI. In some applications, the UE may send SRS for beam management. For each set of configured single-port CSI-RS transmitted using the same Tx beam, UE first determines the best Rx beam and then sends SRS using the same beam as its Tx beam. In this case, UE does not need to transmit a CSI report to the serving RF node to indicate the CRI. Instead for each set of single-port CSI-RS, it sends an SRS and the RF nodes directly measure the signal strength. The RF nodes then forward the result of their measurements to the MNC. On the DL the serving RF node can switch from one beam to another by simply including a CSI Resource Indicator (CRI) in the DCI sent to the UE for scheduling DL PDSCH or UL PUSCH transmissions. In some applications, the CRI may be sent using an index that points to an entry in a previously configured table. The entry indicates an identifier of a reference signal, for example a CSI-RS identifier. This information allows the UE to point its receive beam in the direction of the new beam. The RF nodes may filter the physical layer reports received from the UE or SRS measurements performed by the RF node, and relay certain reports and measurements based on pre-configured triggers for report relaying.

Figure 51:
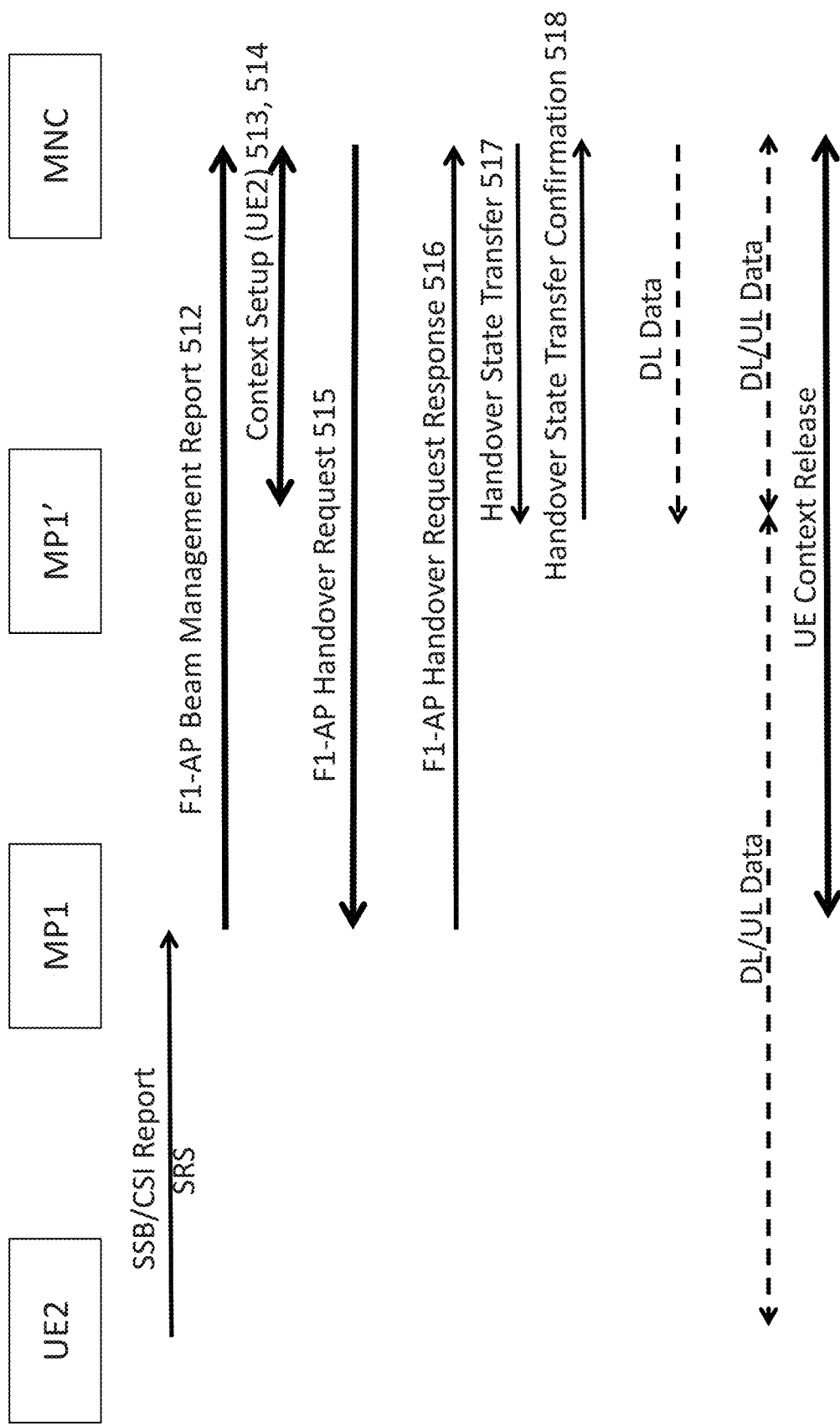

When MNC determines that a handover is required for a UE based on SRS measurement results and/or based on CSI reports, it triggers a handover. As before, these handover triggers also take into account the change in the hop distance for the UE. These same cell handovers occur entirely within the mesh network without the participation of the UE. In fact, to the UE the handover behaves like a beam switch within the same cell. We now describe how the handover is executed in such a manner that avoids data loss and minimizes packet latency. The call flow is shown in FIG. 51, where MP is the source serving RF node and MP1' is the target serving RF node.

As in normal handover upon triggering the handover, or pre-emptively to prepare the handover, MNC first sends an F1-AP message 513 to the target RF node to set up the necessary UE context. The UE context includes the RRC configuration parameters of the UE, which are shared among all RF nodes that share the same PCI. The target RF node responds with a UE Request Setup Request Response message 514 also sent using the F1-AP interface.

MNC then sends a handover request message 515 to the source RF node. The source RF node stops scheduling any further transmissions to the UE and marks the current state variables and certain timer values to ensure a seamless handover in the lower protocol layers of RLC and MAC. Source RF node passes all required state variables and timer values to the MNC in a Handover Request Response message, and the MNC forwards these to the Target RF node in a Handover State Transfer message 516. The target RF node starts the RLC, MAC and PHY layers from where the source RF node has left off, thus presenting a seamless transition to the UE, as if there were a single RLC, MAC and PHY entity. The target RF node confirms the state transfer after it has started to communicate with the UE using the state variables received from the MNC. It sends a Handover State Transfer Confirmation message 518 to the MNC.

For the PDCP layer, the source RF node marks the sequence number of the last PDCP PDU it successfully sent to the UE. For the RLC layer, the source RF node sends the various state variables and timer values maintained by the RLC entity in the source RF node. For example, for the RLC Unacknowledged Mode (UM), the source RF node sends the sequence number of the next RLC SDU to be sent to the UE on the DL, and if the last RLC SDU is only partially transmitted, it also sends the offset value of the next RLC SDU segment to be transmitted. For the receive side (UL) of the UM RLC entity, the source RF node may also send additional state variables related to the reassembly window. For the RLC Acknowledged Mode (AM), the source RF node also indicates a list of RLC SDUs or RLC SDU segments that have been transmitted on the DL, but not yet acknowledged. To support a seamless transfer of the UE connection to the target RF node in the MAC layer, source RF node may also include certain timer information related to special UE configurations such as DRX. Source RF node may also pass state information related to HARQ, though this may not be necessary. The RLC layer can recover any lost transmissions in the HARQ sublayer. During the handover the RLC/MAC entities are transferred from one RF node to another RF node, and they communicate with the corresponding RLC/MAC entity in the UE like a single centrally located RLC/MAC entity.

Figure 52:
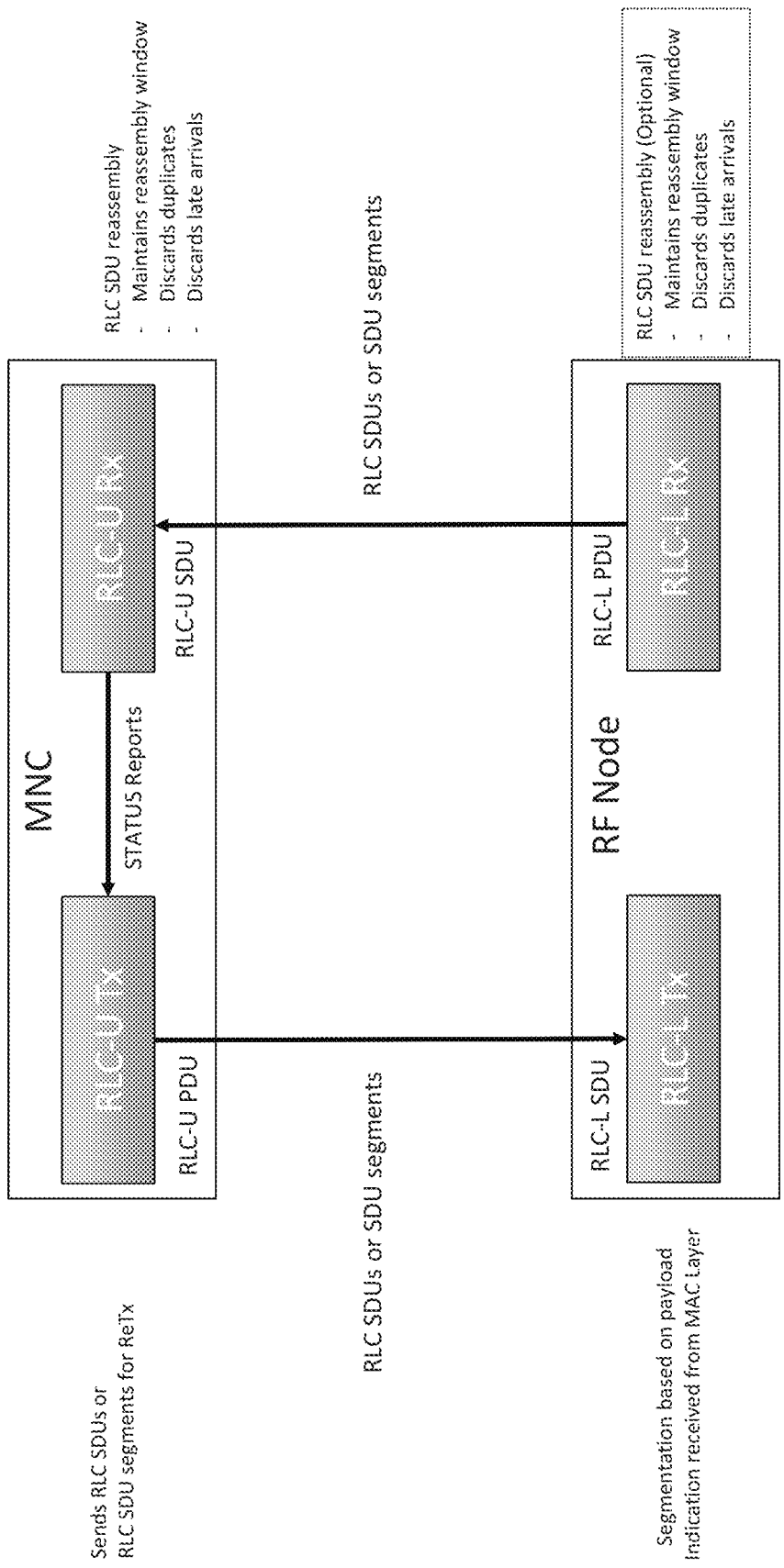
Figure 53:
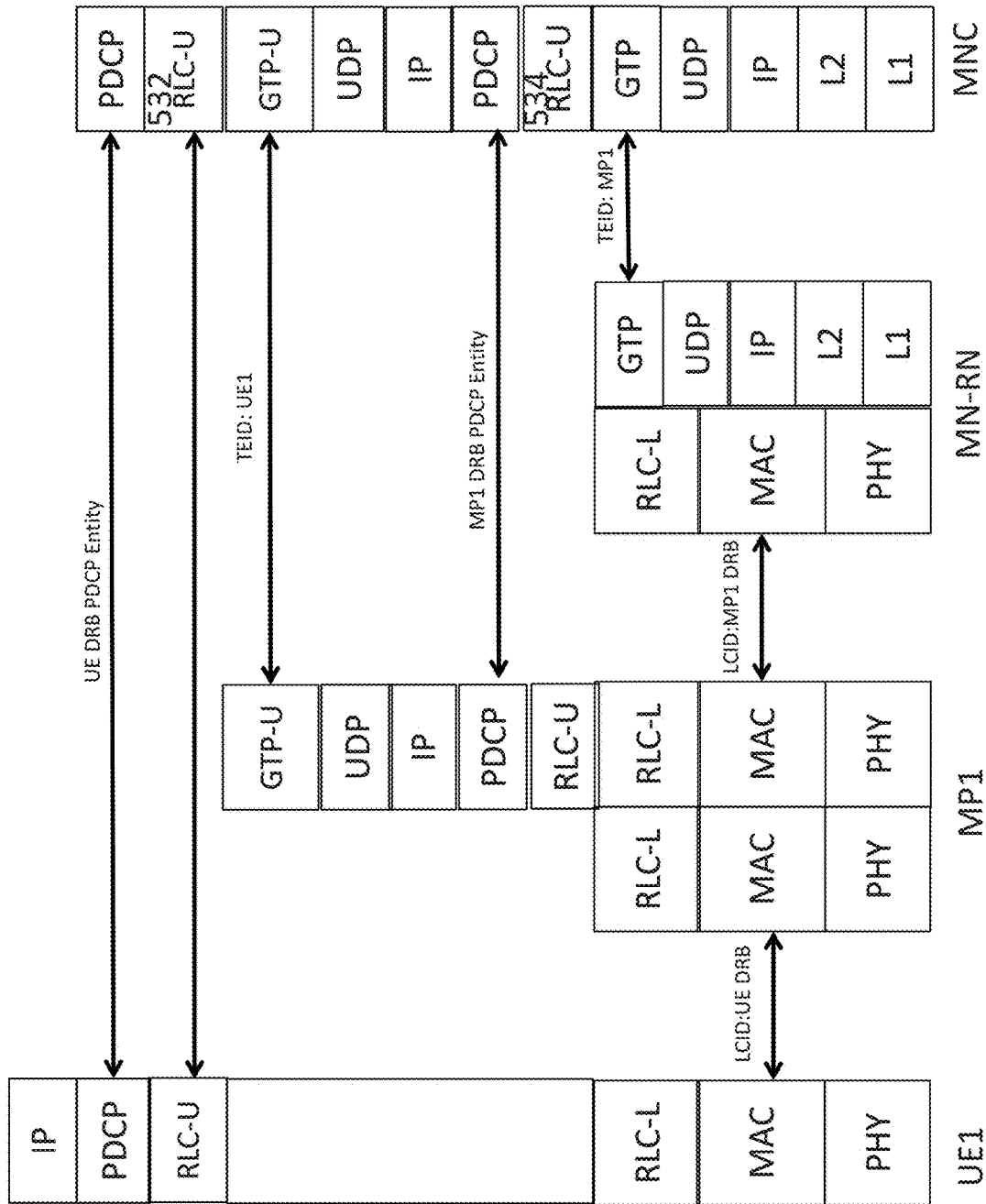
Figure 54:
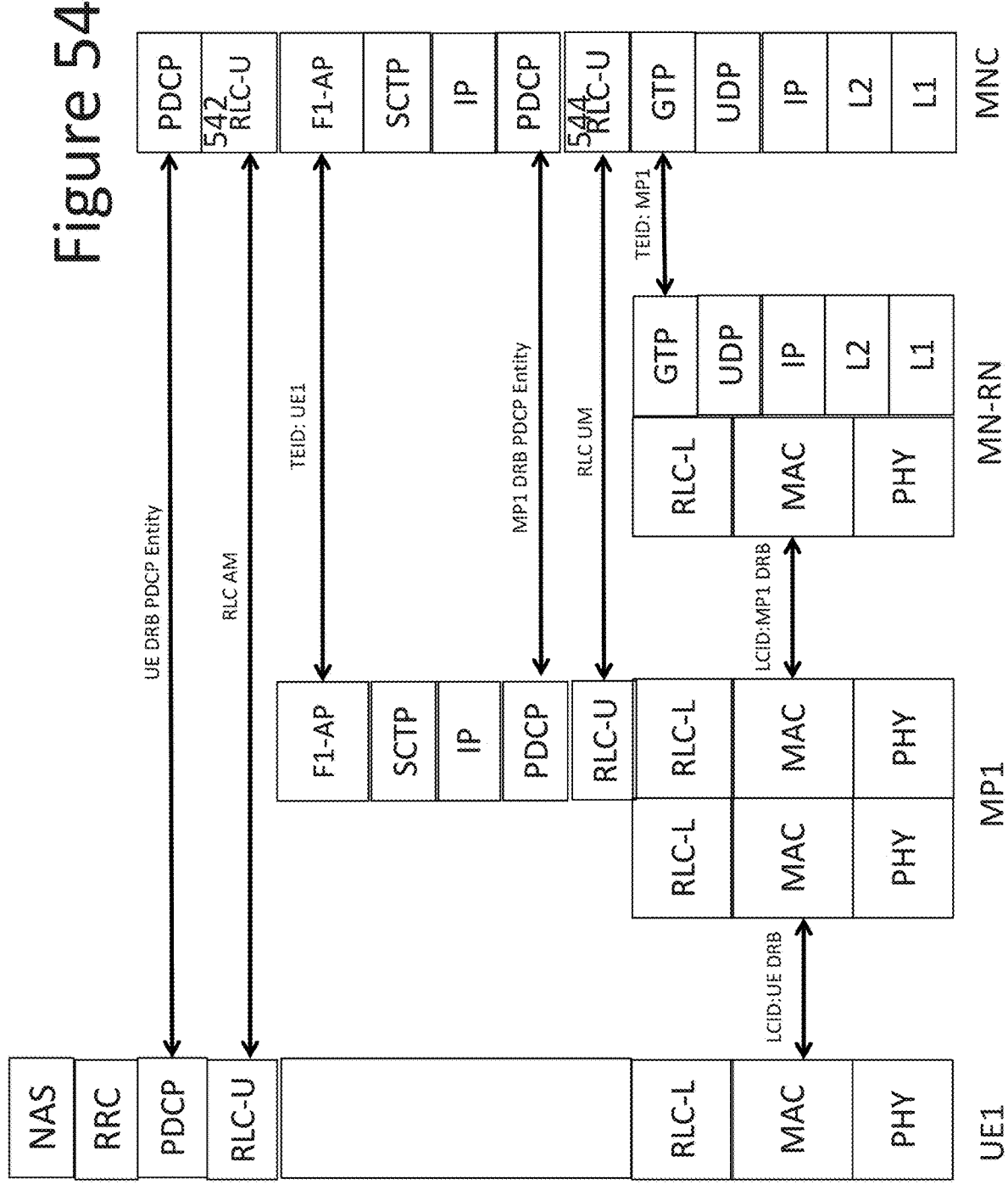

In some embodiments of the mesh network architecture additional advantages can be obtained by splitting the RLC layer in the serving RF node into two sublayers, an upper RLC sublayer (RLC-U) and a lower RLC sublayer (RLC-L), where RLC-L handles the time-sensitive transmit side (DL) segmentation function and RLC-U handles the remaining functions of the RLC layer on the DL and UL, including DL retransmissions. This is illustrated in FIG. 52. (In some applications, the RLC-L sublayer may also include the RLC reassembly function.) The RLC transmitter segments RLC SDUs in order to fit the payload available in a scheduled packet as determined by the MAC scheduler at the time of resource allocation. As illustrated in FIGS. 53 and 54 for the user plane and the control plane, respectively, RLC-U for the UE 532, 542 and RLC-U for the MP 534, 544 are now terminated in the MNC instead of the serving RF node. RLC-L functions remain in the serving RF node. In AM mode of operation, on the DL the MNC forms an initial RLC PDU for the UE assuming no segmentation, adds an initial RLC PDU header accordingly and sends it to the serving RF node. When the serving RF node needs to segment the received RLC PDU (based on indications received from the MAC layer), it modifies the RLC header accordingly and processes the remaining segment(s) in the next transmission opportunity. When transmitting an RLC PDU that carries an RLC SDU segment that is not the first segment of the RLC SDU, the RLC header includes a Segment Offset (SO) field to assist the receiving RLC entity in the UE to reassemble the RLC SDU. The RLC Status Reports sent by the UE are received by RLC-L in the serving RF node, and forwarded to the MNC, where the receive side RLC-U entity resides. UE sends Status Reports to request retransmissions. RLC Status Reports indicate RLC SDUs or RLC SDU segments that are missing at the UE. MNC may retransmit only the missing segment instead of the entire RLC SDU. On the UL, the serving RF node (in FIGS. 53, 54 MP1 for the UE, and MN-RN for MP1) forwards the received RLC PDUs to the MNC, which performs the reassembly and the remaining RLC functions. RLC Status Reports for the UL direction are generated by the MNC. The RLC split described above can also be used when the RLC entity is configured for the UM mode of operation. RLC split can also be applied to the fronthaul links between MPs and upstream RF nodes (MPs or MN-RNs) at least for the data bearers that carry other UE's or MP's traffic. Since RLC retransmissions are handled end-to-end, it is not necessary to use the AM mode on these links. UM mode can be used for all data bearers, thereby eliminating duplicate retransmissions. Splitting the RLC layer in this manner greatly simplifies the single-cell handover procedure described earlier, since it is no longer necessary to transfer significant RLC state and timer information from the source to the target RF node during the handover. Since these state variables and timers are now kept in the MNC, seamless handovers can be performed more easily. Another benefit of the split RLC architecture is that it further simplifies the processing in the MPs. One drawback of end-to-end retransmissions is the increased fronthaul traffic generated by retransmissions. When an RLC packet is lost on the access link, it now needs to be retransmitted on the fronthaul links as well. At least in some embodiments, as long as the RLC packet loss rate is low, the benefit of end-to-end RLC retransmissions will outweigh this drawback.

Figure 55:
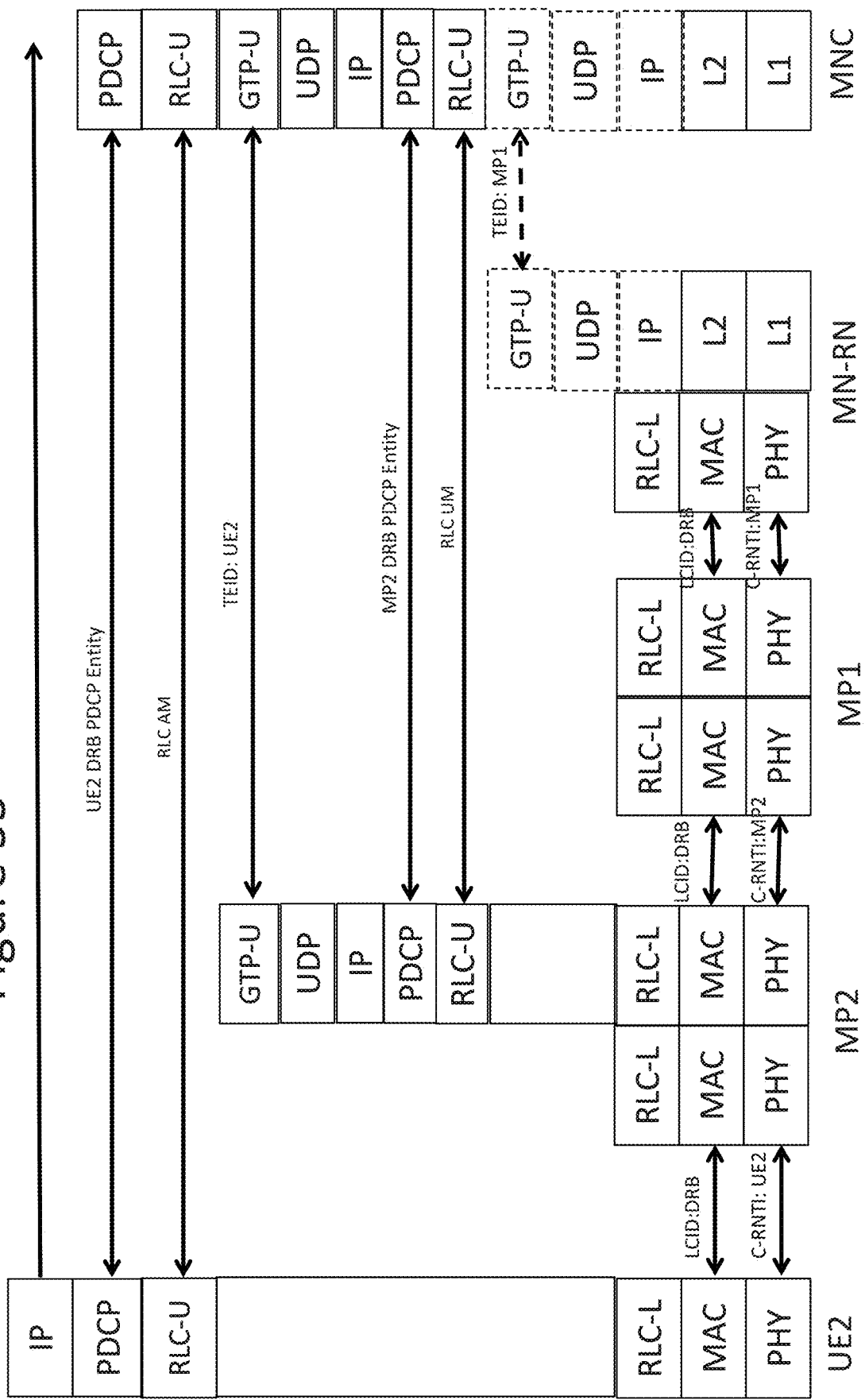
Figure 56:
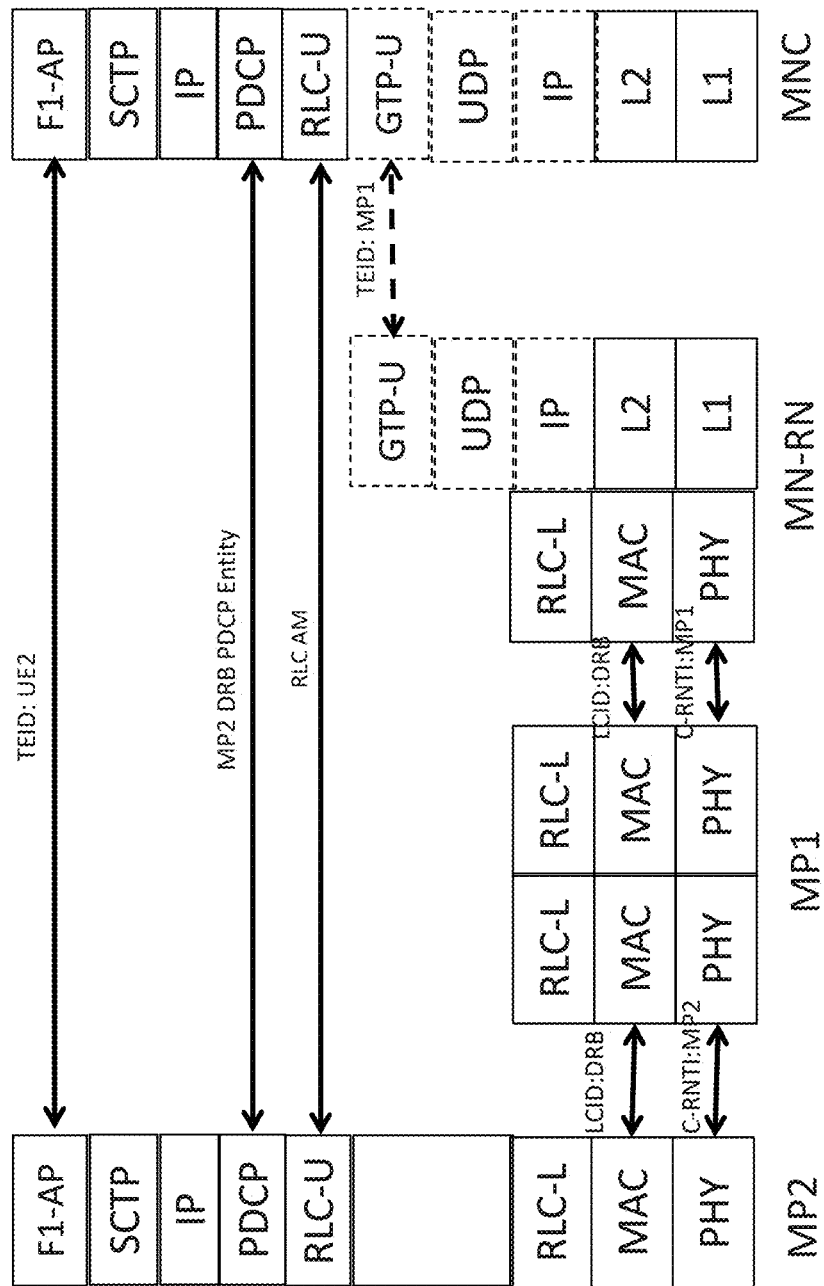

FIGS. 55 and 56 illustrate the split-RLC architecture for a 2-hop mesh link, for the user-plane and for the control plane, respectively. In this case, as we described earlier for mesh networks with RF nodes that use individual PCI, header compression can be applied to reduce the packet overhead in the relay node MP. In the absence of header compression, to carry user plane packets over the fronthaul link between MP1 and MNC via an MN-RN, the protocol layers GTP-U/UDP/IP/PDCP/RLC-U would need to operate between MP1 and MNC, with RLC-L/MAC/PHY operating between MP1 and MN-RN. To avoid the extra overhead and processing complexity, in one form of header compression, as shown in FIGS. 55 and 56, the GTP-U/UDP/IP/PDCP protocols operating between MP1 and MNC can be bypassed. The RLC-U sublayer may still operate between MP1 and MNC, or in the case of the TM or UM modes of operation, as shown in the example of FIGS. 55 and 56, the receiver reassembly function can be moved to the RLC-L sublayer and terminated locally between MP1 and MN-RN. This avoids any RLC layer processing at the MNC. To assist MP1 in routing DL RLC-U packets received from the MN-RN to MP2, the MNC handling the RLC-U processing for MP2 will include in the RLC-U header an indication that the PDCP packet is intended for MP2. This indication may include an address for MP2 known to MP. For example, in some applications the 4-byte GTP-U TEID for MP2, or a compressed form of it, may be used as the address known to MP2. The MNC can tunnel MP2's RLC-U packets to MN-RN using a GTP-U/UDP/IP tunnel to MN-RN. If the MNC has a direct physical link to MN-RN, it may also bypass the GTP-U/UDP/IP protocol layers for communication with MN-RN that are indicated in FIGS. 55 and 56 by "dotted-lines.

To assist MN-RN in routing DL packets received from the MNC to MP1, the MNC appends to the RLC SDU header for MP2 an indication for MN-RN that the next-hop is MP1. Again, in some applications GTP-U TEID for MP1, or a compressed form of it, may be used as the address for MP1. When MN-RN receives the RLC-U packet intended for MP2, it can identify the target as MP1 by reading the next-hop address in the RLC-U header.

Figure 57:
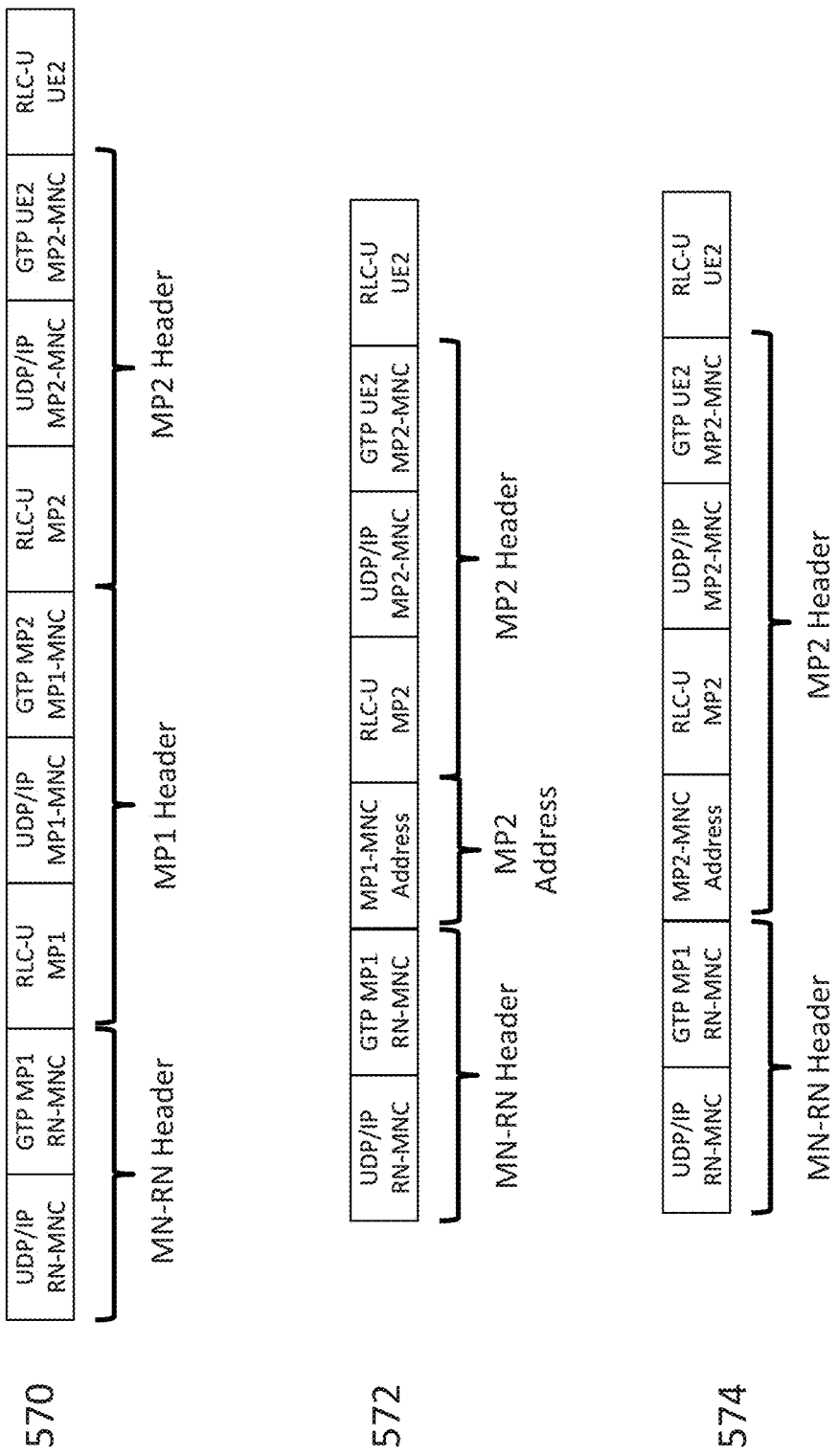

FIG. 57 shows the RLC-U header with address information for routing in the case when header compression is used for the fronthaul link between MNC and MP1. To distinguish between fronthaul traffic for UEs served on its access links and fronthaul traffic for downstream MPs, MP1 may use different radio bearers for the two fronthaul traffic types, where each data bearer is associated with a different PDCP/RLC-U entity. The header compression scheme described here is used only for the data bearer/PDCP entity for the fronthaul traffic of downstream MPs.

Additional header compression, e.g., ROHC compression, may be applied in the GTP-U/UDP/IP protocol layers between MP2 and the MNC to further reduce overhead. When additional intermediate MPs are present, the same method can be used to bypass the GTP-U/UDP/IP/PDCP protocol layers in these intermediate MPs as well. In this header compression scheme, no extra state information is kept in the intermediate MPs. One drawback of this scheme is that multi-hop address information still needs to be included in the PDCP/RLC-U header, and this will increase the overhead.

As discussed earlier in this specification, it is also possible for the intermediate nodes to act like routers by maintaining routing tables for all downstream MPs. In this case, the RLC-U PDUs will only carry address information for the end-points. For example, in the protocol stack described in FIG. 57, the RLC-U PDUs will carry a source and a destination address for MP2 and MNC. When an intermediate node (e.g., MP1) receives an RLC-U PDU from MN-RN, it relays the RLC-U to MP2 based on the destination address. Likewise, in the UL direction, when MP1 receives an RLC-U PDU from MP2, it forwards it to MN-RN based on the destination address (e.g., MNC address). In this case, whenever an MP changes its point-of-attachment, all upstream network nodes (MNC, MPs and MN-RNs) will update their routing tables.

In the PHY layer, the UE can receive DL transmissions from the target RF node. MNC will configure the UE with a CORESET that corresponds to a Tx beam that is the best beam that the UE can receive from the target RF node. The target RF node can then schedule a DL PDSCH transmission by sending a DCI in PDCCH that corresponds to the configured CORESET. In the UL, the MAC in the target RF node can schedule UL resources based on SRS channel measurements.

The single-cell architecture described above also simplifies any RRC measurement reporting by the UE to support mobility inside the mesh network. It also greatly simplifies the procedure for adding the mesh network as a secondary node in dual connectivity. Since the mesh network is seen by the UE as a single cell, UE only needs to report RRC measurements for a single cell and the details of the mesh network is hidden from the LTE eNodeB. UE measures the mesh network signal quality, as described earlier for an idle UE, based on SSB transmissions from the RF nodes in the mesh network. To add the mesh network as a secondary node for the UE, the LTE eNodeB sends an X2/Xn message to the MNC. At this point, MNC does not know the precise position of the UE, but it knows the SSB index that the UE prefers. MNC forms an RRC reconfiguration message for the UE and sends it to the LTE eNodeB, and the LTE eNodeB forwards it to the UE. The RRC reconfiguration message includes a contention-free PRACH preamble for the selected SSB index, which the MNC reserved for contention-free access across the entire mesh network. UE performs the random-access procedure using the assigned PRACH preamble on the PRACH resource associated with the selected SSB beam index. Detection of the PRACH preambles and the transmission of the Random Access Response (RAR) message proceed as before. In this case, there is no need for contention resolution and connection setup procedure. However, MNC can set up a user plane bearer at the MNC and set up a corresponding S1/NG link to the core network (S-/P-GW or UPF). A data bearer in the mesh network can be established as a split bearer. This allows the MNC to forward PDCP PDUs to the UE via the LTE eNodeB when airlink to the UE is temporarily lost.

Idle MP Initial Access in Architecture B with Central Controller and RF Nodes with Same PCI When an idle MP attaches to the mesh network it uses the same random-access procedure as a UE, except for the few differences highlighted earlier in the case where RF nodes have different PCIs (e.g., S-/P-GW selection and private IP address allocation). Once it has established an RRC connection with the mesh network, registered with the core network and formed an F1-AP interface to the MNC, the MP can turn active as a DU and start sending SSBs. In half-duplex MPs, once the MP starts transmitting SSBs simultaneously with other MPs and MN-RNs in the single-cell mesh network, it can no longer monitor SSB transmissions of other RF nodes. SSB transmissions of the MP will cause large self-interference to its receiver and prevent reliable SSB received signal measurements. Therefore, active half-duplex MPs will exclusively rely upon CSI-RS and SRS transmissions for beam management. CSI-RS and SRS transmissions are configured by the MNC on a per MP basis. In 5G NR networks, UEs may also rely upon SSB transmissions for time and frequency synchronization. In the single-cell mesh network, active MPs also use configured CSI-RS transmissions to track time and frequency. If at any point, an MP loses connectivity to an upstream node and needs to reattach to the mesh network, it may temporarily stop SSB transmissions in order to listen to SSB transmissions of neighboring RF nodes. Also, once MP turns active as a DU, it will receive any updates to Master Information Block (MIB) or System Information Blocks (SIBs) from the MNC. This information can also be used by the UE side of an MP to stay up-to-date on any critical MIB/SIB updates in the single cell network, which is common to all RF nodes.

MPs that have full-duplex transmission capabilities can listen to SSB transmissions of neighbor RF nodes even when they are transmitting. In such full-duplex mesh networks, MPs and UEs can operate on the same cell, and active MPs can monitor SSBs in addition to monitoring configured CSI-RS resources.

MPs that use LTE+NR dual connectivity, first attach to an LTE network and establish a primary connection to an LTE eNodeB. MPs can report mesh network measurements to LTE eNodeB based on SSB transmissions, until a secondary connection to the 5G mesh network can be established. MPs can obtain System Information for the 5G mesh network from the LTE network.

MP Handovers in Architecture B with Central Controller and RF Nodes with the Same PCI When an MP, MP1 moves within the coverage area of the Mesh Network, MNC may trigger a path switch and change the serving upstream MN-RN or MP for MP1. For half-duplex MPs, such handovers won't rely on MP reports based on SSB transmissions of neighboring nodes. Instead the MNC will trigger the handover using measurements made in RF nodes based on SRS transmissions by the MP and CSI-RS reports sent by the MP. For full-duplex MPs, handovers can also utilize physical layer reports that are based on SSB transmissions.

Figure 58:
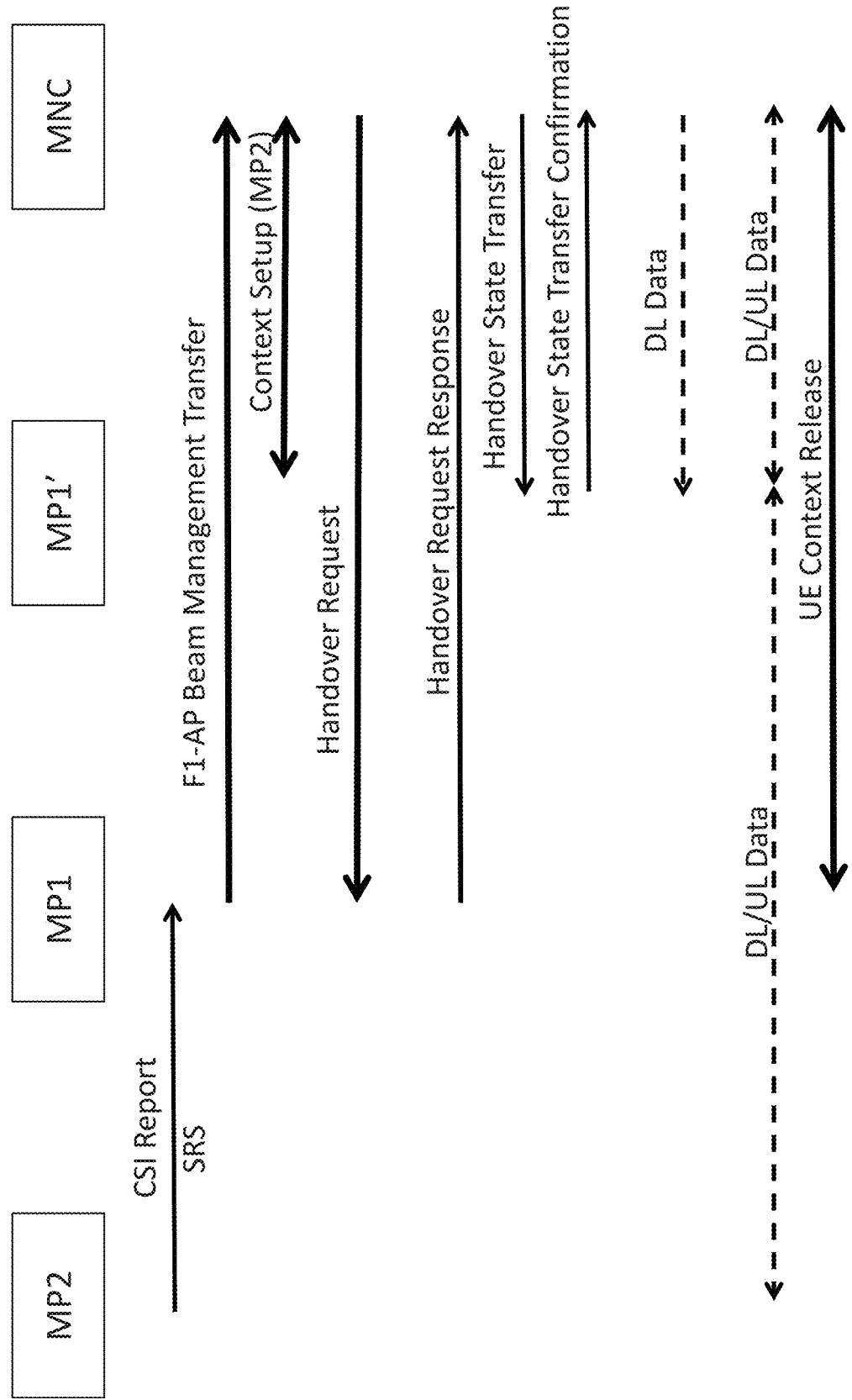

When the MNC determines that a path switch is required for MP1 based on SRS measurement results and/or based on CSI reports, it triggers a handover. These same-cell handovers occur entirely within the mesh network without the participation of MP1. In fact to MP1 the handover appears like a beam switch within the same cell. The handover from a source RF node to a target RF node is executed in a manner to avoid data loss and to minimize packet latency. The call flow is shown in FIG. 58. The handover procedure is almost identical to that of a UE, with the exception that the handover is triggered by reports from MP2 based on CSI-RS only, whereas in the case of the UE handover they are also triggered by reports based on SSB.

As we saw earlier, handover of an MP does not impact the UEs that are attached to it, as long as the UEs can remain attached to MP2. MP handover also has no impact on the core network.

In some embodiments of the single-cell mesh network described above, the network may not have any MPs. In this case, the network will primarily comprise an MNC (i.e., a CU) and two or more MN-RNs (i.e., DUs).

In some other embodiments, only the MPs in a mesh network may use the same PCI. MN-RNs may use different PCIs.

Further Methods for Architecture B with a Central Controller and RF Nodes with a Single PCI We now describe further methods for mesh networks using Architecture B with a Central Controller. Some of the technologies described in this section also apply to single-PCI mesh networks with no MPs.

Further Description of Protocol Processing in the Mesh Network

Earlier, we described the protocol processing in the mesh network using split-RLC functional partitioning for the UE. In split-RLC functional partitioning, the RLC entity in the mesh network that is communicating with the RLC entity of the UE is split into an upper and a lower part, RLC-U and RLC-L, and RLC-L is terminated in the RF node serving the UE and RLC-U is terminated in the MNC. On the DL, the RLC-L transmitter in the serving RF node performs the RLC segmentation function and, on the UL, the RLC-L receiver in serving RF node forwards the received RLC PDUs towards the MNC. The RLC-U function in the MNC reassembles UE's received RLC PDUs into RLC SDUs. When the UE is configured for RLC Acknowledged Mode (AM) for one or more Data Radio Bearers (DRBs), the Automatic Repeat Request (ARQ) function is terminated by RLC-U in the MNC. The RLC-U function may also segment RLC SDUs for ARQ retransmissions and provides the transmission and reception of STATUS PDUs. RLC ARQ operates end-to-end between the MNC and the UE. RLC SDUs or RLC SDU segments are carried over backhaul links between a serving RF node of the UE and the MNC.

Figure 59:
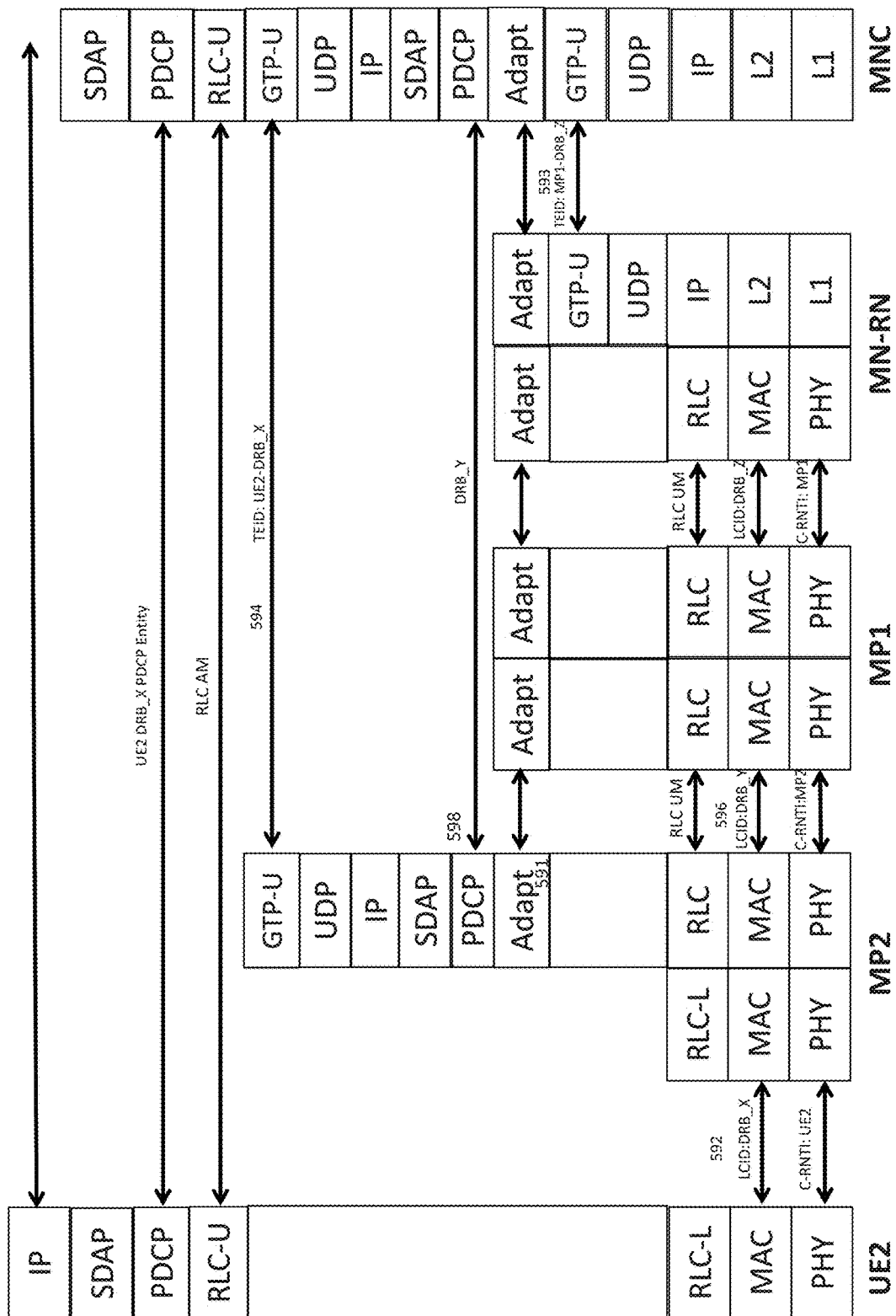

In some implementations, as shown in FIG. 59, for the backhaul links between the UE component of an MP (MP-UE) and its serving RF node, for DRBs the RLC layer is configured to operate in Unacknowledged Mode (UM). When UE is configured with ARQ, it operates end-to-end between the UE and the MNC, and use of additional ARQ on backhaul links becomes unnecessary. This simplifies the overall protocol architecture, as it allows RLC to operate link-by-link on the backhaul links between an MP-UE and its serving RF node As illustrated in FIG. 59, on the UL, for each DRB DRB_x 592 configured for the UE, its serving RF node MP2 receives a sequence of RLC PDUs from the UE. Received RLC PDUs are encapsulated with a GTP-U/UDP/IP header for tunneling to the MNC. An identifier of DRB_x is mapped to the TEID 594 in the GTP-U header, which uniquely identifies DRB_x. The resulting sequence of IP packets are transmitted on the backhaul link from MP2 to MP1, using a DRB_y 596 of the UE function of MP2, MP2-UE. Multiple DRBs can be configured between MP2-UE and its serving RF node MP1, each with a different QoS profile. UE's serving RF node MP2 maps RLC PDUs arriving on one of the UE DRBs to one of the backhaul DRBs of MP2-UE based on the QoS profiles of these DRBs. MP2-UE's PDCP layer 598 applies ciphering only to the GTP-U/UDP/IP header and avoids unnecessary duplicate ciphering of UE's data. An address header is added to MP2-UE's PDCP PDUs. This address header can be part of the PDCP layer, it can be part of the lower RLC layer, or as shown in FIG. 59 it can be part of a new Adaptation Layer (AL) 591. On the link between MP2-UE and MP1, on the UL the RLC receiver in MP1 performs the RLC reassembly function for RLC PDUs received from MP2-UE and terminates the RLC.

The primary responsibility of the AL is to provide the address information for packet routing in the mesh network. On the UL, when each MP has only 1 serving RF node, MP2-UE's PDCP PDUs can be routed to the MNC by intermediate RF nodes without any additional addressing. All MP2-UE RLC PDUs received by its serving RF node MP1 on DRB_y can be mapped to DRB_z based on a QoS configuration of MP1-UE. Similarly, all MP1-UE RLC PDUs received at MN-RN are tunneled to the MNC using a GTP-U tunnel for DRB_z of MP1-UE. When MPs have multiple serving RF nodes, as will be described in further detail later, MP-UEs can make the routing decision on their own, based on the current loading or current channel conditions on backhaul links or other factors. As long as the MNC is reachable through IP routing from any one of the MN-RNs that are reachable by UE's serving RF node MP2, no additional addressing is necessary to route UE's RLC packets. However, if the MNC can be reached only by a subset of the MN-RNs, additional address information is required. Therefore, for completeness the AL is also included in FIG. 59 for UL packet processing.

On the DL, since it cannot be assumed that the serving RF node of the UE (MP2 in FIG. 59) can be reached via any upstream RF node, MNC includes the desired route for each AL PDU of MP2-UE in the address field of the AL header. When the MN-RN receives a tunneled GTP-U/UDP/IP packet from the MNC carrying AL PDUs, the TEID 593 in the GTP-U header can be mapped to a DRB of MP1-UE to carry the AL PDUs over the backhaul link between the MN-RN and MP1-UE. Thus, the MN-RN does not need any additional address information to route the AL PDUs to MP1-UE. However, when MP1 receives the AL PDUs from MN-RN, it uses the address information in the AL header to route the packet to MP2. In some implementations, this address information can be an address of MP2, for example an RF node identifier. In this case, once MP1 determines that the AL PDU is destined to MP1, it can determine the DRB on the backhaul link between MP2 and MP-UE using a local mapping of the DRB used on the link between MP1 and MN-RN, for example based on RRC configuration. In other implementations, the address information in the header can be a combined identifier for the RF node and the DRB. In this case, in some implementations, a GTP-U TEID can be used to form the address information carried in the AL header. When there are additional hops, for example from MP2 to MP3 (not shown in FIG. 59), MNC will include in the adaptation layer header additional address information for the MP3-MP2 backhaul link. In this case, once the AL PDU reaches MP1, to reduce overhead, it can remove the address of MP2 from the header before forwarding the AL PDU to MP2. In other implementations, the address information carried in the AL header can be an address of the RF node serving the UE and may not explicitly contain the addresses of intermediate RF nodes. In this case, intermediate RF nodes will have to maintain a routing table, which contains a route for each downstream MP. When the UE's link to an MN-RN has multiple hops, this method may reduce the overhead of the address header but will increase the processing complexity in the RF nodes.

Figure 60:
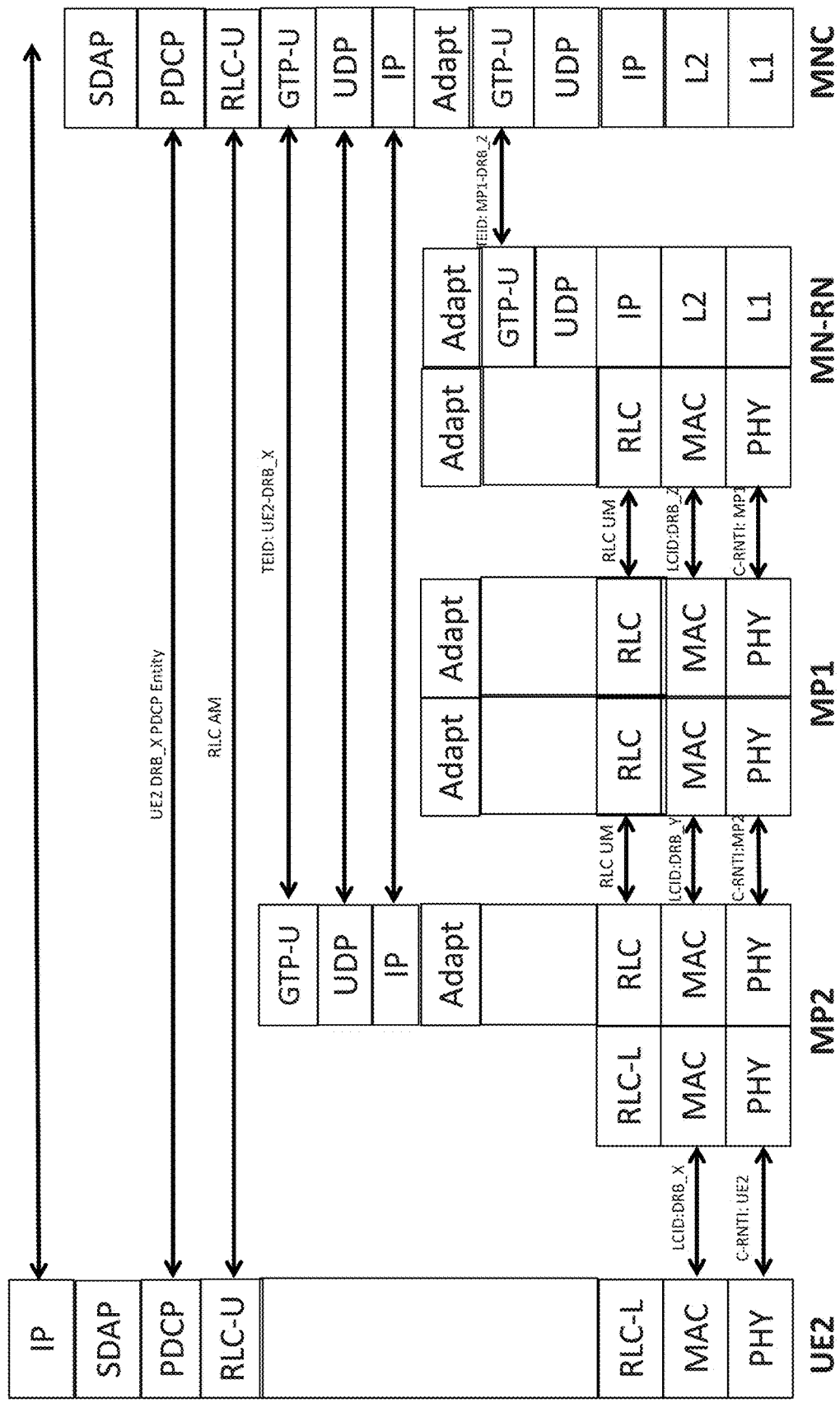

It is possible to absorb the AL into the PDCP or the RLC layers, as shown earlier in FIG. 53. Alternatively, it is also possible to absorb the functions of the PDCP layer into the AL as shown in FIG. 60. In this case, there is no PDCP layer processing in the RF node serving the UE. Such alternative protocol definitions do not change the actual functions implemented at each RF node.

Combining the split-RLC functional split with the use of UM RLC on backhaul links as we described above results in streamlined protocol processing in the mesh network, which also reduces any state information that needs to be maintained at the RF nodes. This is especially useful in single-cell mesh networks, since it makes it easier to transfer state of the UE between RF nodes during beam switching from one RF node to another. In particular, it eliminates the need to maintain any RLC state for a UE or an MP-UE at the RF nodes. This method is also useful in multi-cell mesh networks, because it reduces protocol processing in the MPs by eliminating the RLC ARQ processing.

Figure 61:
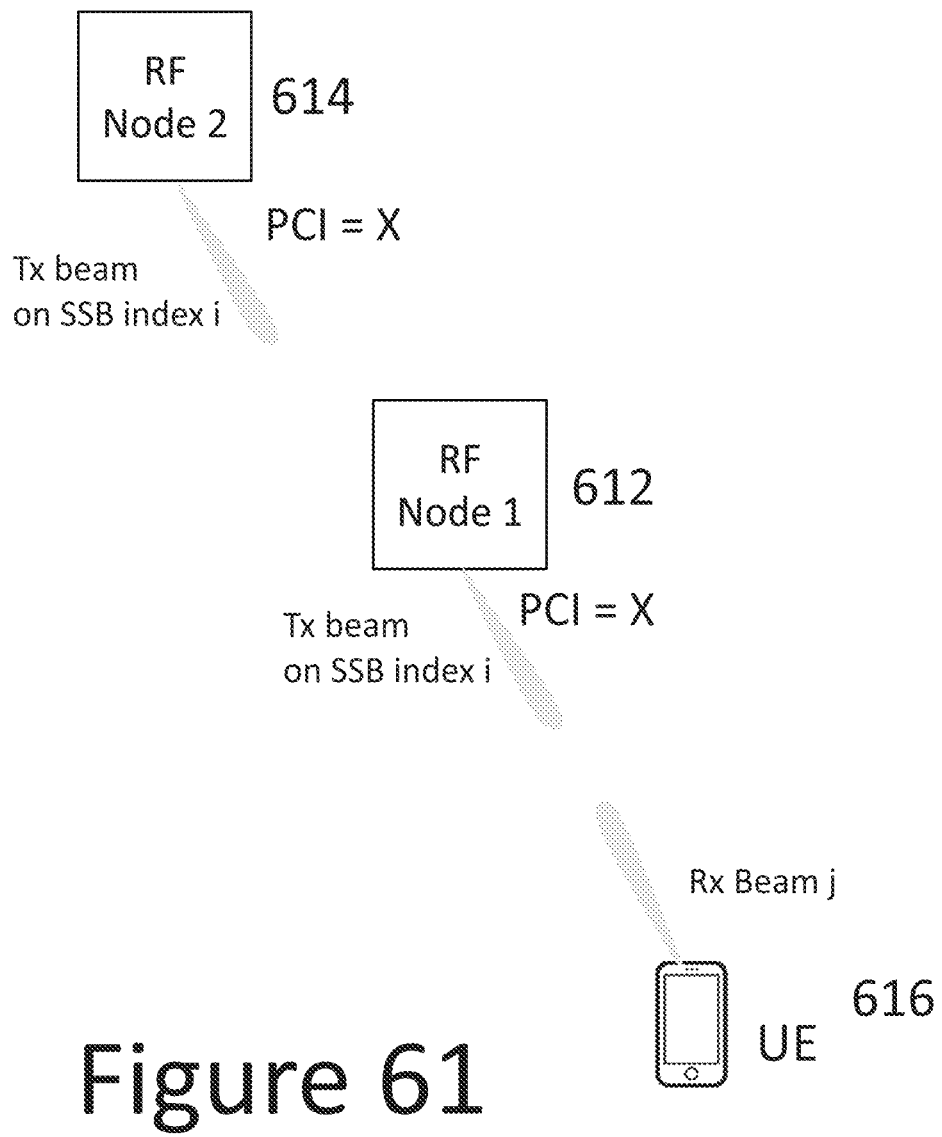

Methods for More Reliable Initial Access in Architecture B with a Central Controller and RF Nodes with a Single PCI As described earlier, an SSB burst set consists of up to 64 SSB transmissions that occur on specific symbol positions within a 5 ms half-frame. In a single-PCI mesh network, in some implementations, all RF nodes transmit the same SSB burst set (same PCI and MIB) on the same time/frequency resources. For example, SSB index n, n=0, 1, 2, . . . , 63 is transmitted by all RF nodes on the same OFDM symbols in the same half-frame. However, the spatial Tx filter (i.e., beam direction) used by different RF nodes for the same SSB index can be different. For example, in some implementations one RF node may transmit the SSB for index n with 0-degree angle (relative to the antenna boresight) and another RF node may transmit the SSB with the same index n with a 30-degree angle. In general, it is desirable to minimize the probability of a UE strongly receiving the transmission of two or more SSBs with the same index from different RF nodes. When two neighboring RF nodes, RF Node 1 612 and RF Node 2 614 are deployed with the same antenna orientation as shown in FIG. 61, a UE 616 located along the line connecting the two RF nodes may have a line-of-sight path to both RF nodes in the same UE Rx beam direction. In such a scenario, the UE may hear SSB transmissions from both RF nodes.

Figure 62:
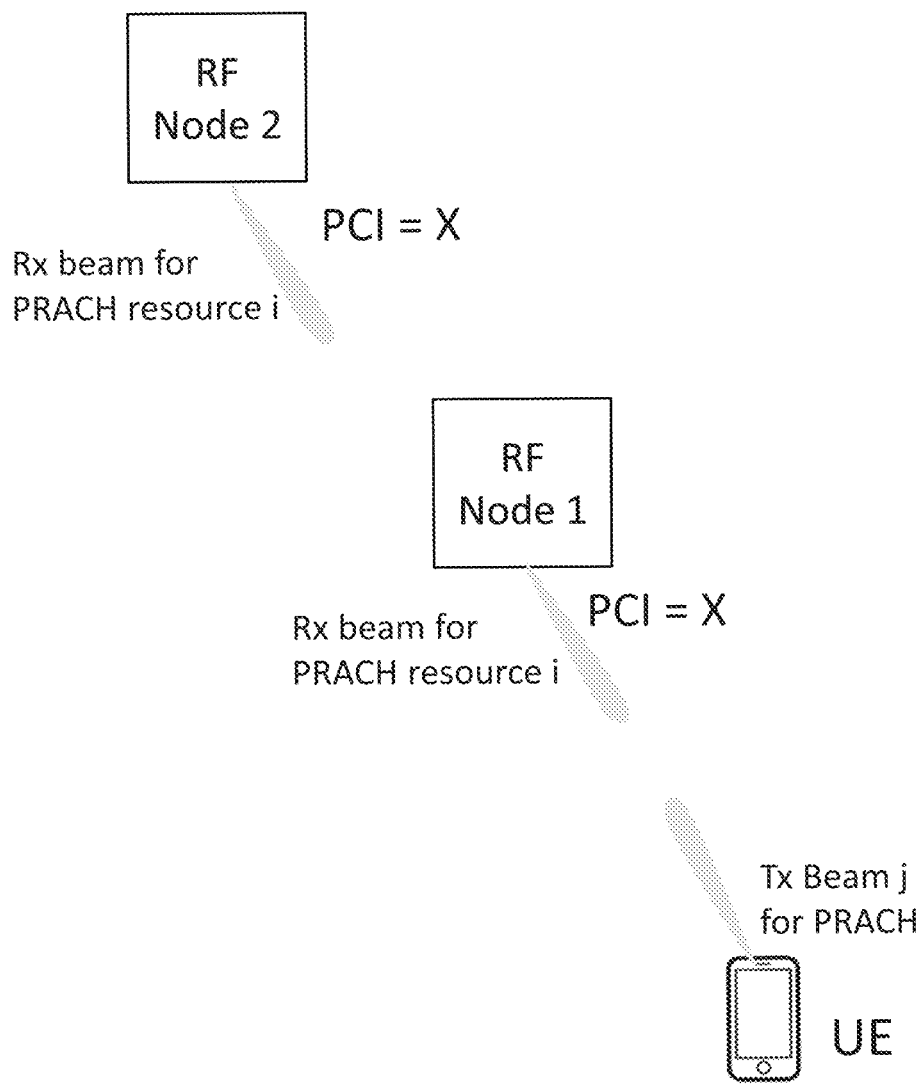
Figure 63:
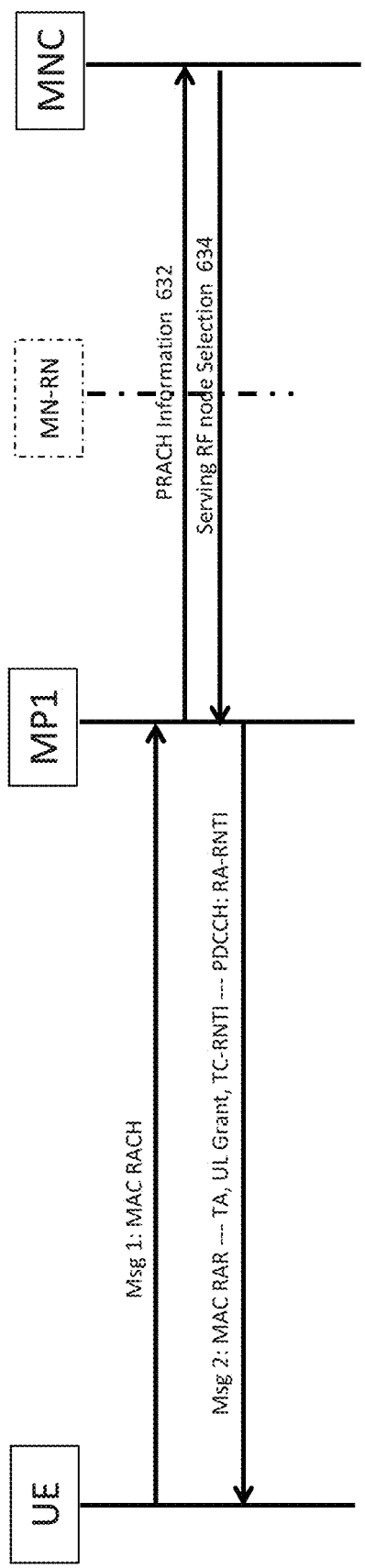

In standalone 5G NR deployments, during initial access UE selects the best SSB index in the SSB burst set that has an acceptable level of received signal reference power (RSRP), and then transmits PRACH using as the spatial Tx filter the same spatial filter it used to receive the best SSB index when transmitting PRACH on a PRACH resource that corresponds to the selected SSB index. When a UE can hear two or more transmissions of the same SSB index from different RF nodes as shown in FIG. 61, its PRACH transmission will likely be received by both RF nodes as shown in FIG. 62. As a result, RF node 1 and RF node 2 may both detect UE's PRACH preamble. In order to select a single serving RF node for the UE, as shown in FIG. 63, all RF nodes that detect PRACH forward to the MNC PRACH information 632 that represents the quality of the received PRACH preamble along with an identifier of the preamble and the MNC then selects one of these RF nodes (in FIG. 62, it would likely select RF node #1, which is located closer to the UE) as the serving RF node for the UE and sends a message 634 to the RF nodes to indicate the selection. This procedure involves a round-trip message transfer between the RF nodes and the MNC and may delay the transmission of the Random Access Response (RAR) message to the UE by the selected RF node and increase the time it takes to set up UE's connection. In the NR RACH procedure, after transmitting a PRACH preamble, the UE looks for a RAR message for a configurable RAR window period, and when no RAR message is received during the RAR window period, the UE sends another PRACH preamble. The RAR window period can be configured to be as large as 10 ms. In some applications, when a serving MP is many hops away from the MNC, the round-trip message delay may exceed the RAR window period and cause the UE to send another PRACH, which may also fail for the same reason.

In the duplicate PRACH detection scenario shown in FIG. 62, the RF nodes have the same 2D orientation and use the same mapping between the beam direction (analog spatial filter) and SSB beam index. This causes the RF nodes to transmit SSB for the same index in the same direction pointing to the UE. In order to reduce the probability that a PRACH transmitted by a UE is received by multiple RF nodes, when RF nodes all have the same orientation, adjacent RF nodes can be configured to apply an offset when mapping SSB indices to spatial Tx filters. For example, when an RF node is transmitting an SSB with a spatial filter that provides a beam angle of x degrees (relative to the antenna broadside angle), its neighboring RF nodes can be configured to transmit the same SSB with a beam angle of x−90 (modulo 180) degrees. In implementations, where the 2D orientation of the RF node cannot be flexibly set, orientation detection sensors, which are commonly used in smartphones, are included in the RF nodes, so that the mapping of spatial Tx filters to SSB indices can also account for the orientation of the RF node. For example, a magnetometer (e.g., a compass) can be used to determine the orientation of the RF node relative to the magnetic North. An accelerometer can be used to detect the orientation (e.g., pitch, roll and yaw) of a fixed RF node relative to the ground. An accelerometer together with a gyroscope is typically used in a smartphone to determine the orientation of a moving device. In the technology of this specification, at least in applications where the RF nodes are not mobile when they are transmitting SSBs, prior to starting the transmission of SSBs, each RF node may measure its own orientation using one or more orientation sensors.

Figure 64:
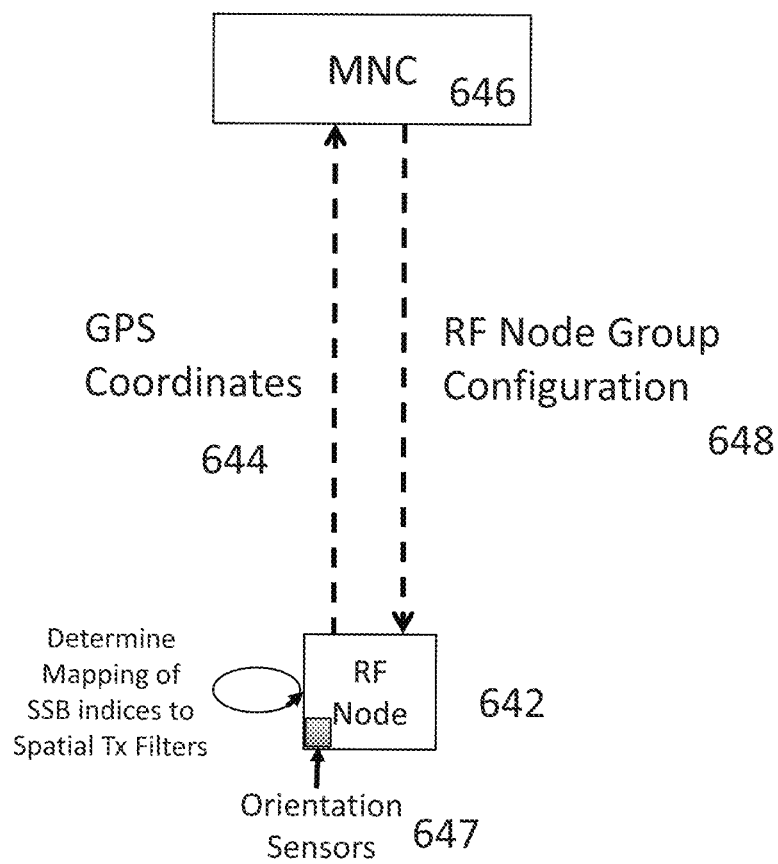

RF nodes may also include a GPS receiver and send their GPS coordinates to the MNC as shown in FIG. 64. MNC uses the GPS coordinates to divide RF nodes into two groups, A and B, in such a way that most of the time neighboring RF nodes belong to different groups. MNC may then send a message to each RF node to assign it to one of the two groups (A or B). RF nodes use the assigned group together with their orientation as determined by local sensors 647 to establish a mapping between each SSB index and the spatial Tx filter to use when transmitting the SSB with that index. For example, when transmitting SSBs with the same index, RF nodes in group B with horizontal orientation may apply a 90-degree offset to their beams relative to RF nodes in group A also with a horizontal orientation. When an RF node determines that it has a 2D 45-degree rotated orientation, it may apply an additional +45-degree (modulo 180) rotation to its analog beams. Other more complex orientation information can be built into the calculation of the SSB spatial filters.

Figure 65:
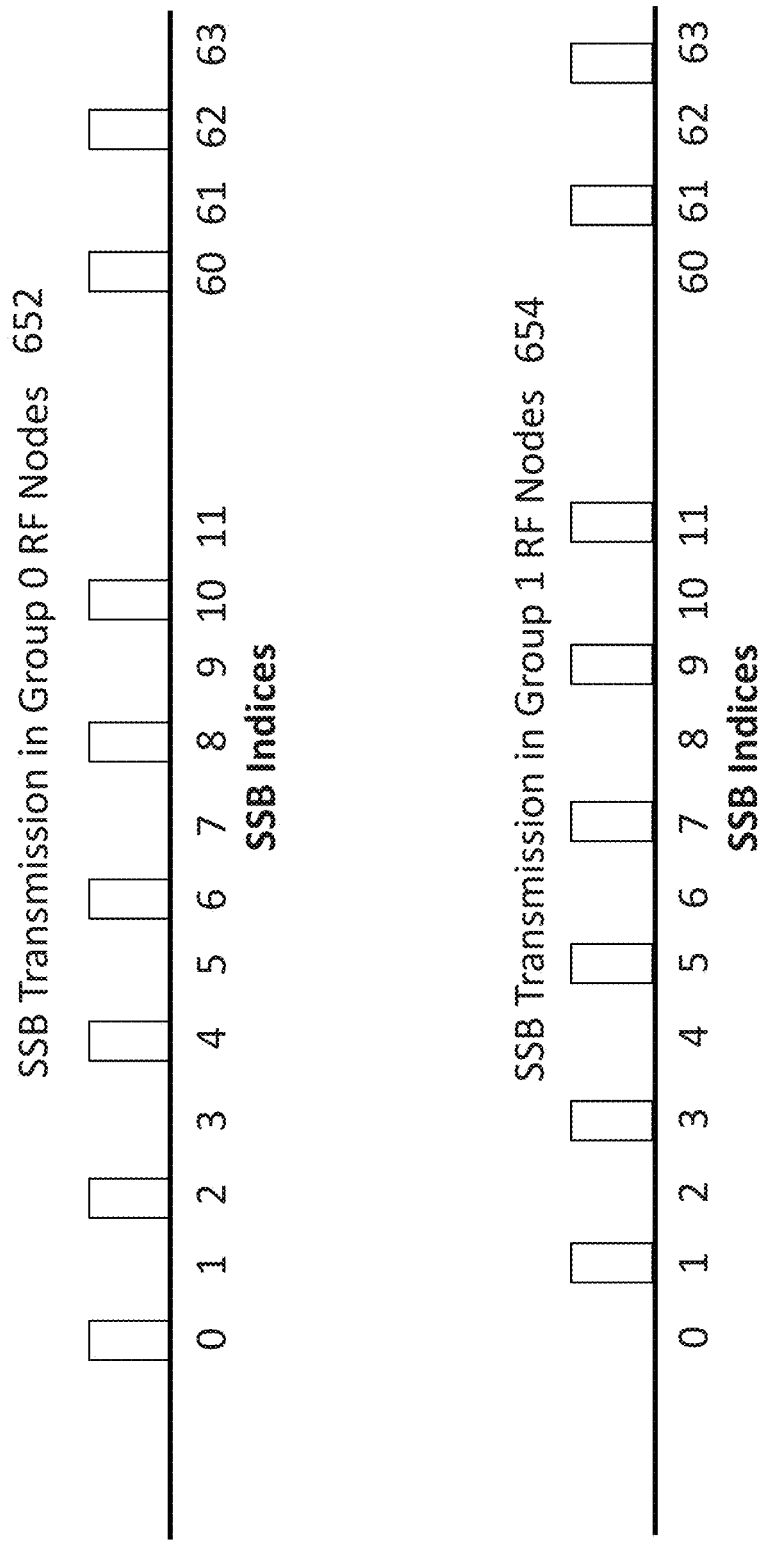

In another implementation, the probability of two RF nodes detecting the same PRACH transmission can be reduced, by having the MNC assign RF nodes in the mesh network to, K SSB groups, indexed 0, 1, . . . , K−1, such that RF nodes that belong to the same group cannot reliably receive each other's signals. Assuming a cell-wide SSB burst set with 64 beam indices, in each SSB burst set period, each RF node sharing the same PCI transmits only 64/K SSBs. As shown in FIG. 65 for K=2, RF nodes in SSB group 0 652 transmit SSB indices 0, 2, 4, . . . , 62 and RF nodes in SSB group 1 654 transmit on SSB indices 1, 3, 5, . . . , 63. Single-cell mesh network indicates to the UE (for example in a SIB1 or RRC message) the actual transmitted SSB indices as 0, 1, 2, . . . , 63, so the UE monitors all 64 SSB transmissions in the cell. Since each RF node actually transmits only 32 SSBs in an SSB burst set, the beam width is increased compared to the case when all RF nodes transmit on all 64 SSB occasions, such that all RF nodes can still provide a full beam sweep. When UE measures the SSB signal strength, it doesn't need to know that different SSB indices of the same cell are transmitted from different RF nodes. According to 3GPP specification 38.211, a UE cannot assume that the SSB transmissions for different indices are quasi-co-located, implying that the UE cannot assume that they are transmitted from the same antenna. When the UE determines a preferred SSB index, it also unknowingly determines a preference for an RF node in an SSB group (e.g., in FIG. 65, group 0 or group 1). When the UE selects a corresponding PRACH resource, by ensuring that Group 0 and Group 1 SSB indices are associated with different PRACH time occasions, only the RF nodes in SSB group 0 or RF nodes in SSB group 1 will look for a PRACH on a given PRACH time occasion. Since a UE is less likely to receive SSB transmissions from two RF nodes in the same SSB group, the probability that two or more RF nodes will receive the same PRACH is reduced. Increasing the number of SSB groups K, for example to 4, further reduces the probability of PRACH detection by multiple RF nodes, but also increases the beam width of individual SSB transmissions and this will reduce the antenna gain for SSB.

Figure 66:
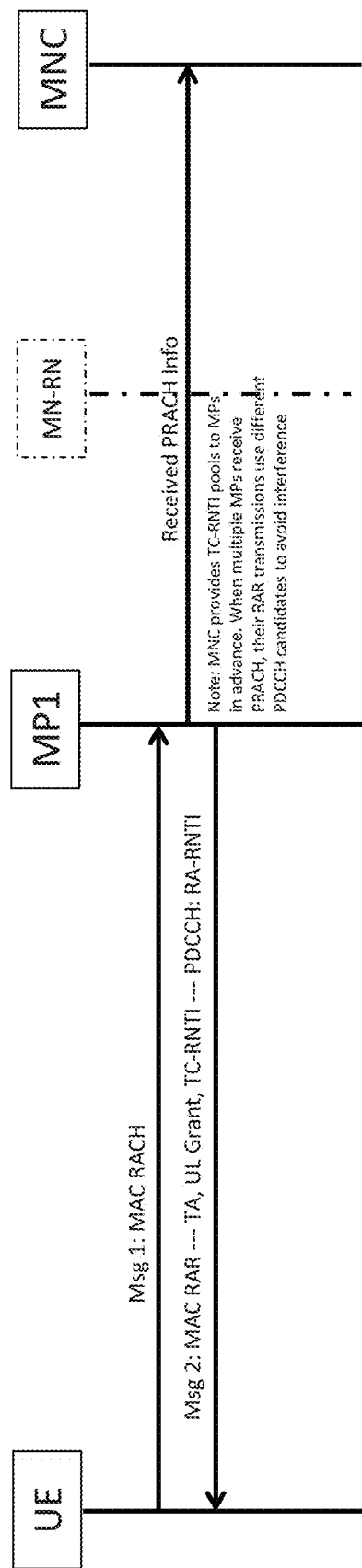

Fast Random Access Response (RAR) Transmission and Connection Setup in a Single-PCI Mesh Network In the technology of this specifications, in some applications the round-trip message transmission delay that occurs during initial access, as shown in FIG. 63, can be avoided, by allowing the RF nodes that detect a PRACH preamble to send a RAR immediately, without waiting for a serving RF node selection by the MNC, as illustrated in FIG. 66. The content of the RAR message can be generated locally by each RF node, except for the 16-bit Temporary C-RNTI (TC-RNTI). TC-RNTI is a physical layer address for the UE, which is elevated to become UE's C-RNTI at the end of a successfully completed random access procedure. C-RNTI needs to be unique in the single-cell mesh network and therefore TC-RNTI also needs to be unique in the cell. To ensure this, the MNC divides available C-RNTI values among the RF nodes, so that each RF node can allocate a globally unique TC-RNTI from its own pool and include it in the RAR message and avoid waiting for the MNC to supply the TC-RNTI.

When a UE's PRACH transmission is received by two or more RF nodes, in this method two or more RF nodes send a RAR message to the same UE. In mm-wave systems, use of beam-based transmission and reception naturally reduces the probability of multiple RF nodes receiving the same PRACH, and the methods we described above can further reduce that probability, but duplicate detection of a PRACH may still occur occasionally. When two or more RF nodes transmit different RAR messages to the UE, there is an increased probability that the UE may not correctly receive any of the PDCCH transmissions. For example, this may occur when PDCCH transmissions that indicate the presence of the PDSCH transmission that carries the RAR message occur on the same time-frequency resources, because then the two or more PDCCH transmissions will use for demodulation identical reference signals (DM-RS) on overlapping resources. This may cause the UE to estimate the channel based on the sum-channel of two DM-RS transmissions, whereas the actual PDCCH data sent by the two RF nodes will generally be different. Even though all PDCCH transmissions for RAR will use the same scrambler initialization, because the content of the DCI messages carried by PDCCH transmitted by two different RF nodes will generally be different, the perceived difference between DM-RS and PDCCH transmissions will lead to an SNR penalty caused by a bias in the channel estimation. In one method to reduce the effect of the potential bias penalty, RF nodes sending RAR may use more conservative transmission parameters (e.g., a higher aggregation level for PDCCH).

All UEs accessing a single-cell network use a common RA-CORESET and RA-Search Space to look for PDCCH transmissions that schedule the RAR message. All UE's performing random access in the mesh network with a single PCI share the same RA-CORESET and RA-Search Space for RAR messages. When the RA search space is sufficiently large, to reduce the probability of PDCCH transmissions perfectly overlapping with each other, the MNC may instruct neighboring RF nodes to select different Control Channel Elements (CCEs) for PDCCH when sending a RAR message. As long as neighboring RF nodes use different CCEs for PDCCH, the probability of PDCCH overlap as described above will be reduced. Also, to reduce the probability that the UE decodes the RAR message of an RF node with a weaker signal before it decodes the RAR message of the RF node with a stronger RF signal, RF nodes can be configured to apply a short delay (e.g., 0, 1, 2, 3 or 4 slots) based on the strength of the PRACH signal they received. This way, UE is more likely to first detect the RAR message from the RF node transmitting the strongest RF signal.

In the scenario when the UE does not detect any RAR transmission before the RAR window timer expires, it will raise its Tx power and repeat the random-access procedure. To prevent repeated RAR failures caused by simultaneous transmission of RAR messages by multiple RF nodes, immediately after sending a RAR message to the UE, the RF nodes also send a PRACH received signal quality metric to the MNC, and the MNC returns a selection of a preferred RF node to serve the UE. After sending a RAR message to a UE and before receiving a corresponding Msg 3 (Connection Request message) from the UE, if the RF node receives another PRACH that corresponds to the same SSB index, it does not send a RAR in response to the second PRACH unless it receives an indication from the MNC that it is the preferred RF node for the previous reception. This procedure can be used to prevent repeated RAR message failures when multiple RF nodes sharing the same PCI receive the PRACH transmission of a UE.

It should be noted that according to 3GPP 5G NR specifications, when a UE correctly receives a PDCCH transmission in the common search space for RAR, scrambled with the RA-RNTI, and correctly decodes the RAR message carried in the PDSCH transmission, it is not expected to look for any additional RAR message transmissions in the same search space. Therefore, upon detecting a RAR message, the UE will proceed to the next step and send a Connection Request (Msg 3) using the UL resources allocated in the RAR. In other words, the RF node whose RAR message is first decoded by the UE, will become the serving RF node. The Msg 3 PUSCH transmission uses a scrambler that is initialized based on the TC-RNTI assigned by the target RF node that sent the RAR message and therefore, the PUSCH transmission won't be received correctly by the other RF nodes who also sent a RAR. The demodulation reference signal (DM-RS) used by UEs to send Msg 3 in PUSCH only depends on the PCI. Therefore, in a single-cell network when two UEs send Msg 3 at the same time and on the same frequency resources, the receiver of an RF node looking to receive one of these Msg 3 transmissions may experience bias if it can also hear the transmission of the other UE. The probability of such events, which are naturally low due to use of narrow beams in mm-wave mesh network, can be further reduced by having neighboring RF nodes select different time and frequency resources for Msg 3 PUSCH transmissions under the coordination of the MNC.

Figure 67:
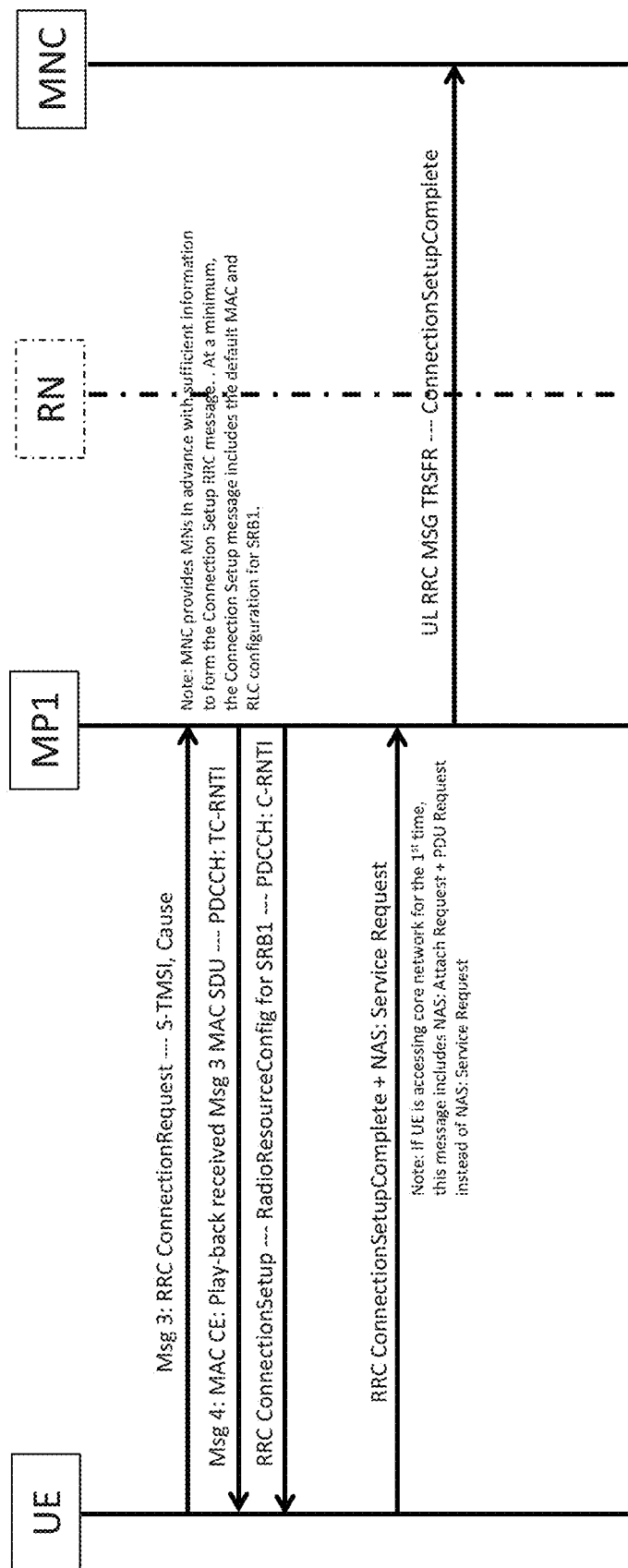

After receiving Msg 3, the RF node will normally forward the ConnectionRequest message to the MNC and the MNC will form an RRC Reconfiguration message for the UE. Again, this procedure may cause a round-trip message transmission delay. To avoid this delay, in some implementations of the technology of this specification, the RF node can form the Msg 4 for Contention Resolution without waiting for the RRC Reconfiguration message from the MNC. Msg 4 carries in a MAC CE the Msg 3 received from the UE, and typically it will also include (piggyback) the RRC Reconfiguration message. Since RRC reconfiguration applies across the entire single-cell mesh network, a proxy RRC sublayer can be established in the RF nodes, thereby allowing the RF nodes to send the RRC Connection setup message immediately upon receiving Msg 3. This is illustrated in FIG. 67.

Enhanced Initial SN-Add Procedure in EN-DC (NR-LTE Dual Connectivity)

In non-standalone 5G NR deployments using dual connectivity with an LTE eNodeB, UE first establishes a connection with the LTE eNodeB, and the LTE eNodeB configures the UE to measure and report measurements for the mesh network. Based at least in part on the measurement results, the LTE eNodeB sends a request to the MNC to add the mesh network as a secondary node and includes the measurement results received from the UE in the request. When the mesh network uses a single-PCI in its SSB transmissions, UE's SSB-based measurement report may not allow the MNC to determine precisely which RF node(s) the UE will likely be served from. Therefore, before accepting the request, the MNC is not able to consider the current traffic load of the likely serving RF node.

Also, in standalone or non-standalone NR deployments, after the UE is attached to the single-cell mesh network, the network relies on the UE to discover and report new RF nodes. In 5G NR networks, such cell detection relies on SSBs that carry a geographically unique PCI in each RF node. The UE is configured with an SSB Measurement Timing Configuration (SMTC), which indicates to the UE the OFDM symbols for SSBs. However, in a single-cell network, since all RF nodes transmit identical SSBs, it is not possible to uniquely identify an RF node based on SSB. Therefore, in the single-cell mesh network of this specification, alternative methods are used for RRC mobility management.

In one method, the UE is configured with NZP-CSI-RS resources for RMM. However, one drawback of CSI-RS-based RRM is that the network needs to determine the likely nodes the UE may discover and configure the UE in advance with these resources. By comparison, when UE searches for cells using SSB, it does not need to be configured with the identity of the cells.

Figure 68:
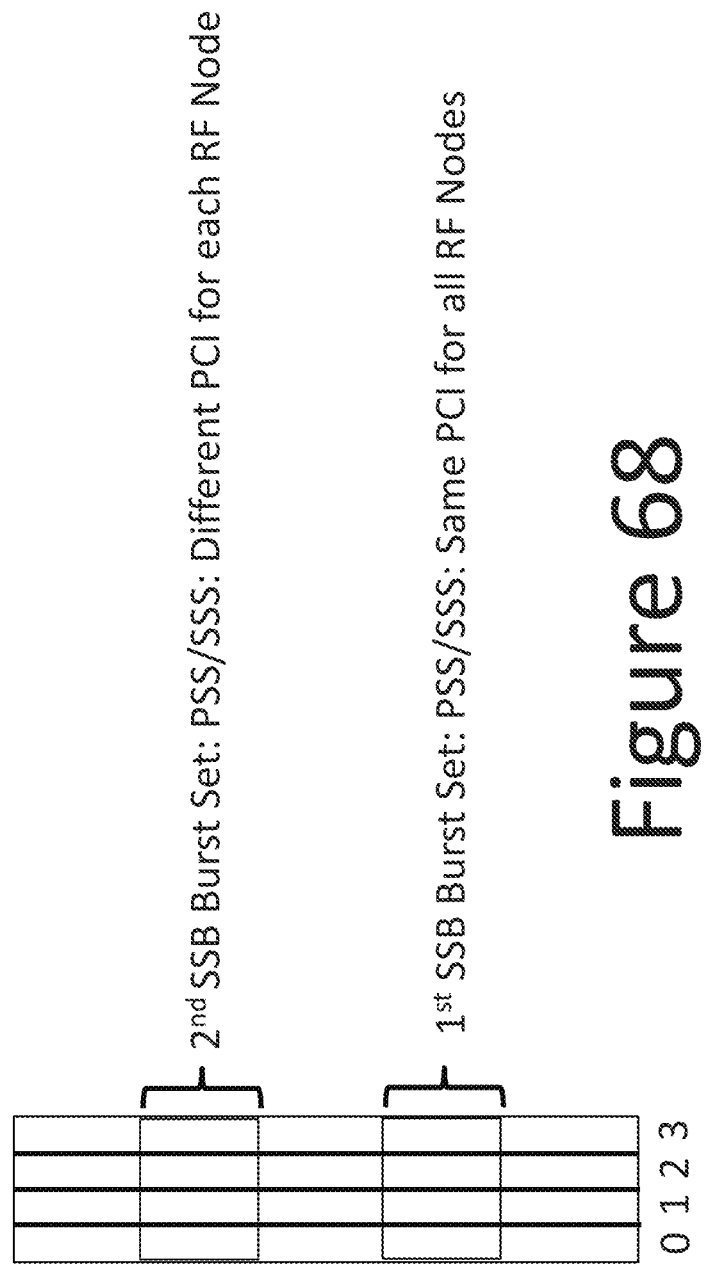

In some applications, to avoid these drawbacks, the single-PCI mesh network broadcasts a second SSB burst set which use individual PCIs at each RF node, as shown in FIG. 68. The second SSB burst set is transmitted outside the 5G NR frequency raster, which all idle UEs are configured to monitor and use during initial access in standalone mode, possibly using the same OFDM symbols as the $1^{st}$ SSB burst set transmissions. In non-standalone mode, after the UE attaches to the LTE eNodeB, LTE eNodeB will configure the UE with an SSB measurement window that uses the second SSB burst set. When the UE reports measurement results to the RRC in LTE eNodeB or to the RRC entity in the MNC, it uses the SMTC configuration for the second SSB burst set. When the eNodeB sends a request to the MNC to add the mesh network as a secondary node, the MNC will know which RF node(s) the UE is likely to pick as its serving cell and can take this into account in its admission control. When the MNC accepts the UE, it forms an NR RRC Reconfiguration message to configure the UE and sends it to the UE via the LTE eNodeB. In the RRC reconfiguration message, the MNC will also configure the UE to perform contention-free RACH. This contention-free RACH will be based on a specific beam in the single-cell SSB, which will be indicated to the UE as part of the RRC reconfiguration. The single-cell SSB represents the serving cell that the UE will attach to. UE will measure the signal quality on the indicated single-cell SSB index, and if it meets a certain RSRP threshold, the UE will transmit a PRACH preamble on a PRACH resource that corresponds to the indicated single-cell SSB index using a specific preamble configured in the RRC reconfiguration message. Immediately after sending the RRC Reconfiguration to the LTE eNodeB, the MNC will also send an indication to the target RF node to help it prepare to receive the contention-free PRACH preamble from the UE. Using the procedure described above, in non-standalone deployments, the target RF node can respond with a RAR message immediately, but not before receiving the PRACH target indication from the MNC. This procedure will also help avoid the scenario where two or more RF nodes send RAR for the same received PRACH as we described earlier. The rest of the connection setup procedure, including the method to speed up the transmission of the ConnectionSetup message using an RRC proxy in the RF node, can proceed as we described earlier.

RRM for a Connected UE in a Single-Cell Mesh Network Using Off-Raster SSB

In connected state, the mesh network appears to the UE as a single cell. In the technology of this specification, as we described earlier, this allows the handling of the mobility of the UE across the coverage area of the RF nodes using physical/MAC layer beam management instead of the slower and higher overhead RRC-based mobility management. For example, when the UE moves from the coverage area of one RF node to the coverage area of another RF node, the handover appears to the UE as a beam switch in the same serving cell. In contrast to traditional handovers, in a beam switch the UE is not required to perform a complete RRC reconfiguration or a RACH procedure to receive/transmit from/to a new RF node and there is no need for the UE to exchange control signaling with the central MNC. The beam switch can be performed by the network in the MAC/PHY layers without the direct involvement of the UE. At the RRC level, in some applications, the UE may still be configured to report RRC measurements to the MNC based on Measurement Objects that use the second SSB burst set transmission described earlier, where each RF node is assigned an individual PCI. UE can be configured by RRC with an SMTC to measure the second multi-cell SSB burst set transmissions. This can assist the MNC in configuring the UE with the reference signal transmissions for beam management.

In summary, in some implementations, a second multi-cell SSB burst set are transmitted by the RF nodes. We described how the second SSB burst set is used in non-standalone NR deployments for RRC measurements prior to secondary node addition. We also described how the second SSB burst set can also be used for RRC-based RRM measurements after the UE has connected to the mesh network in both standalone and non-standalone deployments.

RRM for a Connected UE in a Single-Cell Mesh Network Using SRS

Figure 69:
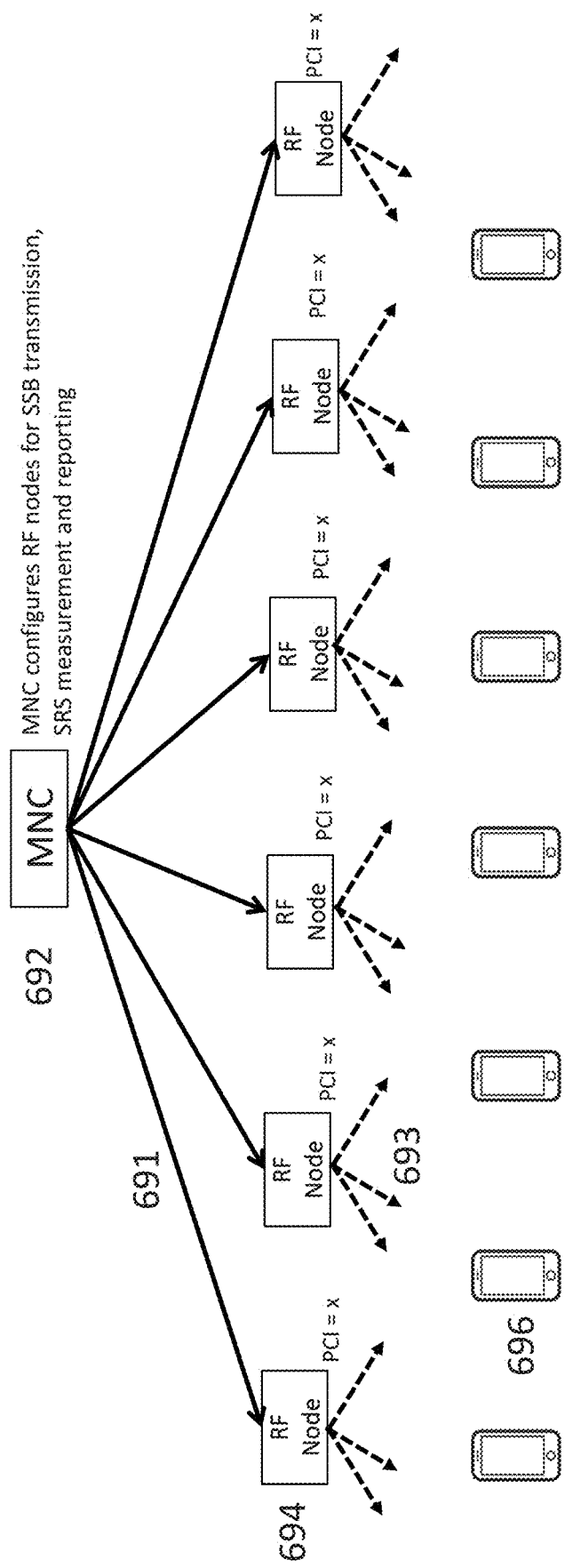

In some applications, it may not be desirable to introduce a second SSB burst set transmission that use multiple PCIs. In some applications, allocating a geographically-unique PCI to each RF node adds complexity, especially when the mesh network is ultra-dense as it would often be at mm-wave frequencies. In other implementations, the additional overhead of a second SSB burst set transmission may not be acceptable. As shown in FIG. 69, in a mesh network, where the UE is configured with a single-PCI serving cell, for SRS-based RRM, RRC in the MNC 692 configures each connected UE 696 to periodically send SRS. In some deployments, the SRS configuration 691 may be for a 1-antenna port or a 2-antenna port SRS transmission, meaning that the reference signal is transmitted using up to 2 digital antenna ports, each feeding a different RF transceiver. In the SRS configuration, UEs are also configured to spatially align their SRS transmissions to the single-PCI SSBs 693 they are monitoring in the mesh network.

For example, in a deployment where RF nodes transmit 64 SSBs in an SSB burst set, the UE is configured to transmit SRS on 64 different time occasions indexed 0 through 63, and on each time occasion, it uses a spatial Tx filter that corresponds to the spatial Rx filter the UE has determined is the best spatial Rx filter for receiving the SSB corresponding to that index. All connected UEs in the mesh network monitor the same single-PCI SSB burst set transmission and transmit the SRS that is associated with the same SSB index simultaneously on the same time occasion. SRS transmissions from multiple connected UEs are multiplexed on the same symbol using Code-Division-Multiplexing (CDM) and Frequency-Division-Multiplexing (FDM). For CDM, UEs sharing the same PRBs may be assigned different cyclic shifts of the same Zadoff-Chu (ZC) base sequence, which are orthogonal in the absence of any channel distortion. The base ZC sequence is chosen based on the SRS Sequence ID number (mod 30) configured by RRC. However, since SRS transmissions of different UEs may be received by an RF node with different propagation delays, orthogonality of different cyclic shifts of the same ZC sequence may be lost at the RF node receiver. Therefore, more robust CDM performance can be achieved by assigning UEs cyclic shifts from different ZC base sequences by configuring them with different SRS Sequence IDs (mod 30). Such sequences, although not orthogonal, will exhibit low correlation even in the presence of propagation delay differences. Further SRS multiplexing can be achieved using FDM, for example by configuring UEs to use different PRBs or different Resource Element (RE) comb phases in the same time occasion. Using these techniques, a large number of UEs can transmit SRS on the same time occasion. Multiple symbols in a slot can be allocated to SRS to further increase SRS capacity.

Figure 70:
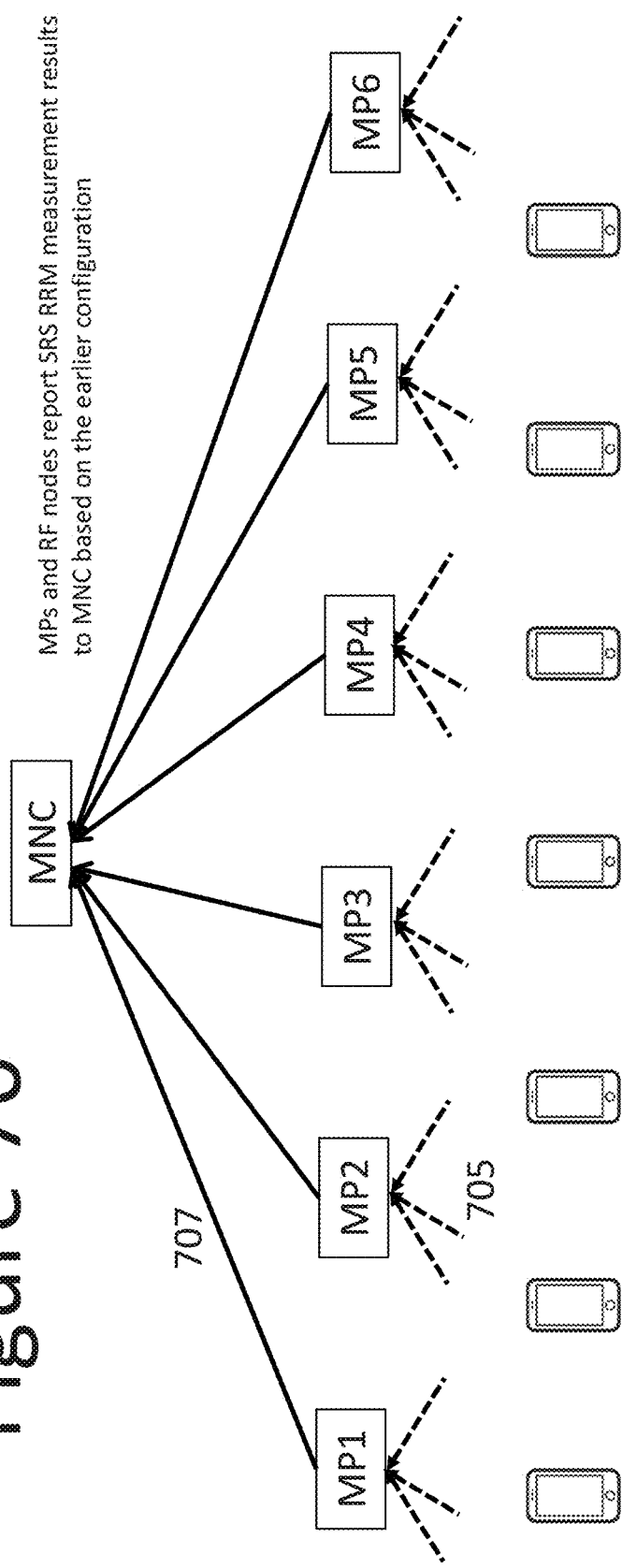

The RF nodes can measure the SRS transmissions from the UEs without any explicit knowledge of the individual SRS configurations of the UE's. RF nodes are configured with the time/frequency resources where they can expect SRS transmissions and the range of base sequences and cyclic shifts that the UEs may be configured with, as well as the SSB index that is spatially associated with each SRS time occasion. As shown in FIG. 70, when measuring SRS 705, the RF node will use as its spatial Rx filter the spatial Tx filter it uses to transmit the corresponding SSB.

When an RF node is not transmitting any SSB on an SSB index, as in the method that uses SSB groups as described earlier, then the RF node will not look for any SRS in the corresponding OFDM symbol. In other words, an RF node measures SRS only in SRS occasions that correspond to actual SSBs transmitted by that RF node. When there are 64 SSB indices in the single-cell mesh network, UE will transmit SRS on 64 different time occasions. When K=2 groups are used, each RF node will measure SRS in only 32 time occasions. This will reduce the SRS processing burden in RF nodes.

For blind detection, in each SRS time/frequency occasion the SRS receiver will first look to detect the presence of a signal, and if a signal is detected, the receiver will perform a further test to determine the parameters of the ZC sequence; i.e., the SRS Sequence ID and the cyclic shift and determine the received signal strength or RSRP. The SRS parameters SRS Sequence ID, cyclic shift and time/frequency occasion of the SRS fully identify the connected UE that transmitted the SRS. The identity of the UE that corresponds to a set of SRS parameters is known by the MNC configuring the UE, but it does not need to be known by the RF nodes. To avoid inter-symbol interference in the presence of different propagation delays, the schedulers in the RF nodes may insert guard symbols to prevent a late-arriving SRS transmission from causing interference to another OFDM symbol that is carrying data.

RF nodes will filter the measured received signal level associated with each set of SRS parameters and will send measurement results 707 to the MNC based on certain triggers. The reported measurements are used by the MNC to configure the beam management parameters of the associated UE, as will be described further below.

Further Description of Beam Management and Beam Switching in a Single-PCI Serving Cell with Multiple RF Nodes In the technology of this specification, a UE that is compatible with 3GPP Release 15 (R15) specifications can communicate with a mesh network that comprises of multiple RF nodes that share the same PCI. In such a network, the RF nodes in the mesh network form a single serving cell for the UE. A 3GPP R15 compliant UE has one MAC entity that communicates with a corresponding MAC entity in the mesh network. The functions of the MAC entity in the network include Hybrid ARQ (HARQ) operation, scheduling of user data, multiplexing/demultiplexing of logical channels, management of uplink timing synchronization, fast MAC-layer reconfiguration of the UE using MAC Control Elements (CEs), management of UL Scheduling Requests (SRs), Buffer Status Reports (BSRs) and UL Transmission Power Headroom (PHR) reports of the UE.

In some applications, the MAC entity of the mesh network communicating with UE's MAC entity may reside in the MNC. However, this would impose a strict latency constraint on the link between the MNC and the serving RF nodes. This latency constraint is primarily a consequence of the tight latency requirement in HARQ. In HARQ, when it receives a NAK from a UE for a DL transmission of a Transport Block (TB), the mesh network needs to schedule a retransmission quickly. For example, when a UE is being served continuously with 1 TB in every slot, assuming the UE is configured with 16 HARQ processes, a retransmission for a TB must occur within 16 slots in order to prevent the blocking of a TB transmission for a HARQ process or to ensure continuous transmission of UE data. For a subcarrier spacing of 120 kHz, 16 slots take just 2 ms, which would imply that only 2 ms is available from the time an RF node transmits a TB to the time a HARQ retransmission must start. This time includes the processing time in the UE to receive the DL transmission and to transmit the NAK, leaving very little time for the RF node to relay the received NAK to the MNC for scheduling the retransmission and for the retransmitted TB to travel from the MNC to the RF node. While there are methods to relax this tight latency requirement, such methods affect the operation of HARQ and will reduce achievable user throughput and increase latency. Therefore, in the technology of this specification we developed methods that allow the MAC entity in the mesh network to reside in the RF nodes that are serving the UE, and the MAC entity is transferred between RF nodes as needed based on channel conditions and/or UE's position.

In some implementations, at any given time the MAC entity of the mesh network may reside in one RF node and only the RF node that holds the MAC entity serves the UE. We refer to this RF node as the serving RF node of the UE. The MAC entity in the serving RF node maintains a MAC state for the connected UE. The content of the MAC state is much smaller than the content of the more extensive RRC state, also known as UE's RRC context. Each UE's RRC context is anchored in the MNC and a copy of a subset of the RRC UE context, which includes the configurations related to the MAC/PHY protocol layers processed by the RF nodes, is also kept in the serving RF node.

Each RF node in the mesh network transmits up to N NZP-CSI-RS, where each NZP-CSI-RS is associated with a different spatial Tx filter or Tx beam. All UEs can use these transmissions for CSI measurements. In some implementations, an NZP-CSI-RS resource may have 2 digital antenna ports transmitted using two transceivers. Each NZP-CSI-RS is transmitted by RF nodes periodically in configured slots and configured OFDM symbols in those slots. As will be described later, RF nodes may use different slots and/or symbols to transmit NZP-CSI-RS. When two RF nodes in close proximity transmit NZP-CSI-RS on the same time occasion, the spatial Tx filters used to transmit NZP-CSI-RS can be chosen to minimize the probability that a UE is configured to measure both transmissions. In some implementations, the OFDM subcarrier spacing is 120 kHz, and each NZP-CSI-RS is transmitted periodically once every 80 slots (10 ms).

In some implementations, to reduce the overhead, NZP-CSI-RS transmissions by RF nodes are demand-based such that an RF node transmits an NZP-CSI-RS only when at least 1 UE is configured to measure the NZP-CSI-RS. Prior to sending an RRC reconfiguration message to a UE to configure a new NZP-CSI-RS resource that is currently not used by another UE, the MNC sends an activation command to the corresponding RF node to initiate the transmission of the NZP-CSI-RS. Similarly, after sending an RRC reconfiguration message to a UE that removes a NZP-CSI-RS resource that is not used by any other UE, the MNC sends a deactivation command to the corresponding RF node to stop the transmission of the NZP-CSI-RS.

To support beam management, a connected UE is configured by RRC in the MNC for beam measurements based on the NZP-CSI-RS transmissions of the RF nodes. A connected UE is configured to measure the RSRP level on one or more NZP-CSI-RS resources that belong to the same resource set and report the CSI-RS Resource Indicator (CRI) and the corresponding RSRP level for the NZP-CSI-RS in the resource set that produced the N1 highest RSRP. In some implementations, N1=1, 2, 3 or 4, depending on UE capability. The resource sets represent NZP-CSI-RS that are transmitted by 1 RF node or by a small group of RF nodes. When NZP-CSI-RS resources are to be measured periodically or semi-persistently, they are transmitted by the RF nodes with a configured period and offset (measured in slots) and the NZP-CSI-RS resources in 1 configured resource set are used by the UE to take measurements and to create the CRI/RSRP reports that are sent according to a corresponding reporting configuration.

Each configured NZP-CSI-RS can be spatially linked to one of the SSB indices used by the RF nodes to transmit single-PCI SSB burst sets. However, when a NZP-CSI-RS transmitted by a single RF node is spatially linked to an SSB index, it is possible for the best spatial Rx filter for an SSB index determined by the UE to be different from the best spatial Rx filter for the corresponding NZP-CSI-RS. This occurs when a UE can receive SSB transmissions on the same time occasion from two or more RF nodes. Therefore, in some applications it is preferred not to link the NZP-CSI-RS spatially to an SSB index. The UE will then independently determine the best spatial Rx filter for each configured NZP-CSI-RS. When neighboring RF nodes transmit SSBs in different time occasions, as described earlier, it is possible for NZP-CSI-RS to be spatially linked to an SSB index. This will simplify the Rx beam alignment in the UE. In this case, since the spatial Tx filters used for SSB transmissions will be wider than the spatial filters used for NZP-CSI-RS transmissions, two or more NZP-CSI-RS may be spatially linked to the same SSB index.

When the number of configured NZP-CSI-RS resources cover a large area, it is not necessary for the RRC in the MNC to modify the resource configuration frequently. This is important because RRC reconfigurations can use significant airlink capacity in the mesh network. To minimize the measurement burden on the UE, in some implementations, multiple semi-persistent resource configurations are configured, and they are individually activated or deactivated by the serving RF node using MAC CE transmissions, for example based on the position of the UE as determined by the MNC based on RRC measurements received from the UE or based on SRS-based measurement results received from the RF nodes. Multiple semi-persistent reporting configurations are configured in such a way that the RF node receiving the CRI/RSRP reports sent by the UE over PUCCH can be changed without an RRC reconfiguration of the UE. Further, the CRI/RSRP reporting is configured in such a way that, when possible, an RF node can receive PUCCH reports from multiple UEs in the same symbol using the same spatial Rx filter. Below we will describe a method to achieve these flexibilities.

A connected UE is also configured to measure one or more NZP-CSI-RS resources in 1 resource set and report the CRI and the corresponding CQI/PMI/RI for the resource in the resource set that produced the highest RSRP (or the highest CQI). Multiple reporting configurations are configured where each configuration is semi-persistent, and the resource set used by each reporting configuration consists of NZP-CSI-RS that are all transmitted by the same RF node. Among all configured semi-persistent reporting configurations, only the reporting configurations associated with PUCCH resources that are linked to a NZP-CSI-RS transmitted by the serving RF node are active and the others are inactive. The scheduler in the serving RF node uses the CRI/CQI/PMI/RI report to select the best Tx beam, to determine the Modulation and Coding Scheme (MCS) and the number of layers and to form the precoding matrix for PDSCH transmission. As described below, the reporting configurations are chosen such that the Rx beam on which a PUCCH report is received can be switched from one RF node to another RF node without requiring an RRC reconfiguration of the UE. Further, the reporting configurations are designed in such a way that an RF node can receive PUCCH reports from two or more UEs at the same time using the same spatial Rx filter.

The UE is configured by RRC in the MNC with up to 8 spatial relations for PUCCH where each spatial relation references one of the NZP-CSI-RS resources that the UE is configured to measure. For each reporting setting, for CRI/RSRP or for CRI/CQI/PMI/RI reporting, the UE is also configured with a reporting period and offset that identifies the slots where the report is transmitted and a PUCCH resource that specifies the symbols used within the slot. When more than 1 spatial relation is RRC configured, a MAC CE is used by the serving RF node to select the NZP-CSI-RS that the UE will use as the spatial reference for the PUCCH transmission. By configuring more than 1 spatial relation for PUCCH, the Rx beam to receive the PUCCH can be switched by sending to the UE a MAC CE to modify the NZP-CSI-RS spatial reference used for PUCCH. For example, by switching the spatial reference for PUCCH from a NZP-CSI-RS transmitted by an RF node #1 to a NZP-CSI-RS transmitted by RF node #2, the CSI report the UE sends on PUCCH can be received on a different beam by a different RF node. However, to modify the PUCCH spatial reference of a CSI reporting configuration using a MAC CE, CSI reporting configurations of different UEs must use different time occasions. In the technology of this specification, to allow an RF node to receive PUCCH CSI reports from multiple UEs on the same time occasion when they can be received with the same spatial Rx filter, UEs are configured with multiple semi-persistent reporting configurations for the same CRI/RSRP to be reported, where each reporting configuration is associated with a different NZP-CSI-RS as its spatial reference for PUCCH. Reporting configurations all have the same slot period, but different slots and/or different symbols are used for the CSI transmissions on PUCCH. By establishing a one-to-one relationship between the reporting configuration and its associated PUCCH time occasions, as determined by slot and symbol positions, and a NZP-CSI-RS spatial reference, the RF node can receive PUCCH transmissions from multiple UEs on the same time occasion when the UEs are using the same NZP-CSI-RS as the spatial reference for PUCCH. Since these reporting configurations use the same NZP-CSI-RS resource configurations for measurements, configuring the UE with multiple semi-persistent reporting configurations for the same measured quantity does not increase the processing in the UE for CSI measurements. Since for each CSI to be reported, only one of the semi-persistent reporting configurations is active, the number of transmitted CSI reports also does not change. The serving RF node activates/deactivates the reporting configurations based on which Rx beam it wants to receive the report. The semi-persistent reporting configurations configured with the same resource configurations are identical except for the reporting slot offset and the associated PUCCH resource.

Figure 71:
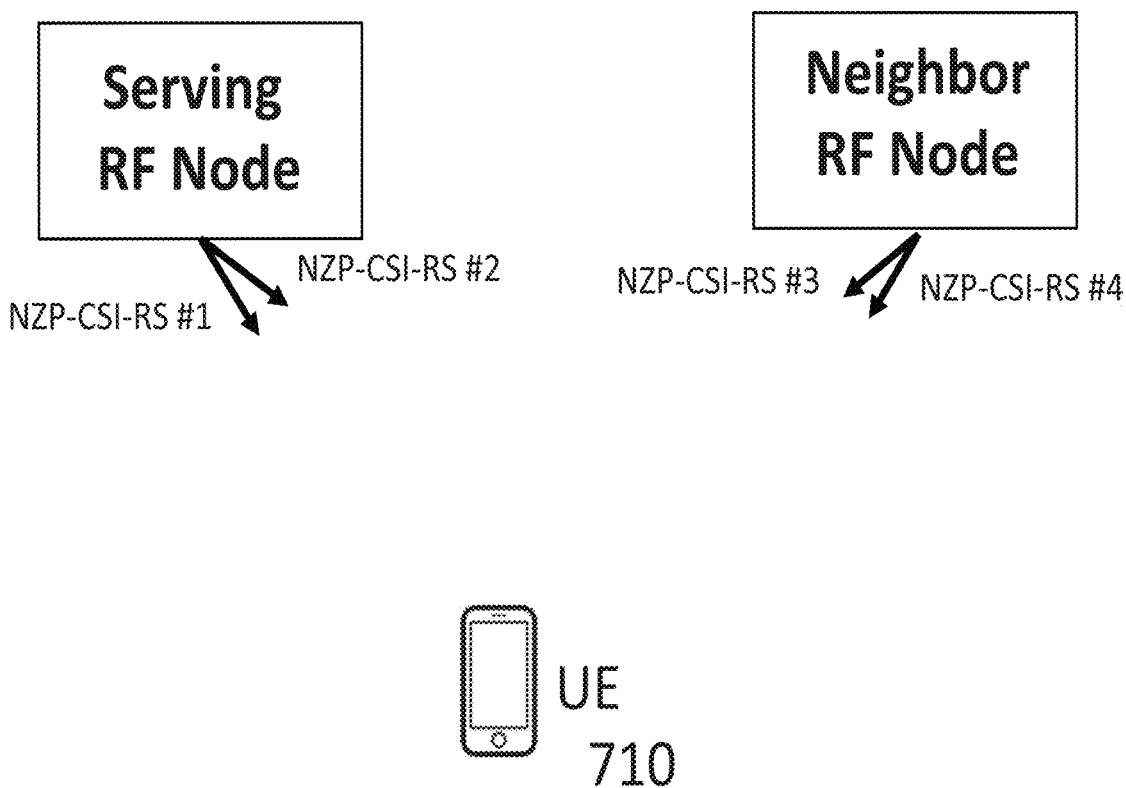

FIG. 71 illustrates the concepts we described above with an example. In this example, the number of reference signals is intentionally kept small in order to simplify the description. In practice, the number of reference signals can be significantly higher. Here a UE 710 is configured to report CRI/RSRP and CRI/CQI/PMI/RI on two resource sets, where Resource Set #1 has NZP-CSI-RS resources NZP-CSI-RS #1 and NZP-CSI-RS #2 transmitted by the serving RF node, and Resource Set #2 has NZP-CSI-RS resources NZP-CSI-RS #3 and NZP-CSI-RS #4 transmitted by another RF node nearby. As shown in FIG. 72, for CRI/RSRP reporting 720 4 semi-persistent reporting configurations are configured. Two of the reporting configurations 721 and 722 use Resource Set #1 and the other two reporting configurations 723 and 724 use Resource Set #2. The 2 reporting configurations associated with the same Resource Set use different configured PUCCH resources. The spatial relations table (not shown) for PUCCH has 2 entries pointing to NZP-CSI-RS #1 and NZP-CSI-RS #2. Serving RF node sends a MAC CE to assign PUCCH resource #1 to the spatial relation table entry for NZP-CSI-RS #1 and another MAC CE to assign PUCCH resource #2 to the spatial relation table entry for NZP-CSI-RS #2. One of the semi-persistent reporting configurations 721 or 722 is inactive and one of the semi-persistent reporting configurations 723 or 724 is active. This determines the time occasions and the spatial Rx filter the serving RF node will use to receive the PUCCH transmissions from the UE that carry the CRI/RSRP reports. Serving RF node can switch the spatial Rx filter it will use to receive PUCCH from the UE by sending MAC CEs to activate the desired PUCCH resource.

As shown in FIG. 72, for CRI/CQI/PMI/RI reporting 725, 2 semi-persistent reporting configurations 726 and 727 are configured, one for each candidate spatial reference, NZP-CSI-RS #1 and NZP-CSI-RS #2, for PUCCH. The UE measures the CRI/CQI/PMI/RI using the NZP-CSI-RS resources in Resource Set #1.

The serving RF node can switch the beam on which the CSI reports are received by deactivating a currently active reporting configuration and activating the other one. For example, when receiving CSI reports on the beam associated with NZP-CSI-RS #1, the serving RF node sends a MAC CE to deactivate the reporting configurations 721, 723 and 726, and activate the reporting configurations 722, 724 and 727. This will also switch the time occasions on which the CSI reports are received from time occasions identified in FIG. 72 as A to time occasions identified in FIG. 72 as B. In the technology of this specification, using semi-persistent reporting configurations in the manner described above allows multiple UEs to send PUCCH transmissions at the same time on the same symbol. This is achieved by using multiple semi-persistent reporting configurations with a one-to-one relationship between the time occasions used for a PUCCH transmission and the spatial reference the serving RF node will use to receive that transmission.

The UE is also RRC configured by the MNC with up to 3 CORESETs to receive PDCCH that carries a DCI whose Cyclic Redundancy Code (CRC) is scrambled with UE's C-RNTI. Among other things, a CORESET specifies the RBs and the number of consecutive symbols in a slot that will be used for PDCCH transmissions associated with that CORESET. In some implementations, a CORESET may indicate a 1 symbol duration for PDCCH. Further, up to 64 Transmission Control Indication (TCI) states for PDCCH are configured by RRC in the MNC as candidates for spatial relations for PDCCH. These PDCCH TCI states each spatially reference one of the configured NZP-CSI-RS, as described above. A copy of the PDCCH TCI state information is also maintained at the serving RF node, where the MAC entity is located. To link a CORESET to a specific TCI, for example to a specific NZP-CSI-RS transmitted by the serving RF node, the serving RF node sends a MAC CE to the UE to activate the corresponding TCI state. For each configured CORESET, RRC in the MNC also configures the UE with one or more search spaces. Among other things, a search space identifies the specific slots and the specific OFDM symbol(s) within the slot where the serving RF node may transmit PDCCH to the UE. For example, when the CORESET indicates a duration of 1 symbol, the configured search space identifies the slots and the symbol position within the slot. The UE then searches for PDCCH candidates on the configured time and frequency occasions. When searching for PDCCH candidates for a configured CORESET, the UE uses as its spatial Rx filter the spatial Rx filter that the UE has determined as the best spatial Rx filter to receive the NZP-CSI-RS that is the spatial reference for the CORESET. The MAC entity in the serving RF node can schedule a PDCCH transmission to the UE using one of up to 3 spatial Tx beams, identified by a NZP-CSI-RS transmitted by the serving RF node, by using the CORESET that is linked to that NZP-CSI-RS as its spatial reference. A serving RF node may send on different symbols in the same slot different PDCCH transmissions on 3 different CORESETs using 3 different spatial Tx filters to schedule the same or different PDSCH transmissions. Scheduling the same PDSCH with multiple PDCCH transmissions can increase the system reliability.

PDSCH transmission to the UE may use the same spatial Tx filter used for PDCCH, or a different one of up to 8 spatial Tx filters, which can be indicated using a 3-bit index in Format 1_1 DCI carried in PDCCH that schedules the PDSCH transmission. Up to 8 different spatial Tx filters for PDSCH can be activated by sending to the UE a MAC CE that selects up to 8 entries from a 64-entry TCI State table for PDSCH that is configured by RRC in the MNC. As in the case of the TCI State table for PDCCH, each entry in the TCI State table for PDSCH points to one of the configured NZP-CSI-RS as a spatial reference. Similarly, to receive the PDSCH, the UE uses the same spatial Rx filter as the one it used to receive the scheduling PDCCH, or when the PDSCH TCI state is indicated in the DCI, it uses as the spatial Rx filter the same spatial Rx filter that it has determined for the NZP-CSI-RS, which corresponds to one of the 8 activated TCI states. The serving RF node can switch the beam on which it transmits PDSCH either by switching the beam it uses to send the PDCCH by not including a TCI state index in the DCI, or it changes the TCI state index and includes it in the DCI.

After receiving PDSCH, to send HARQ ACK/NAK, the UE will select one of up to 32 configured PUCCH resources in PUCCH Resource Set 0. As before each PUCCH resource is linked to 1 of up to 8 configured spatial relations for PUCCH. For each PUCCH resource one of the 8 spatial relations is activated by the mesh network by sending a MAC CE to the UE. The UE selects the PUCCH resource to send HARQ ACK/NAK based on a 3-bit index included in the DCI scheduling the PDSCH, and when there are more than 8 resources in Resource Set 0, also based on the initial index of the Control Channel Element (CCE) used to send the PDCCH to schedule the PDSCH. When there are 8 or fewer resources in the PUCCH resource set 0, the 3-bit index directly selects the PUCCH resource. To have two or more UEs send HARQ ACK/NAK on the same OFDM symbol, the serving RF node selects the PUCCH resource indices indicated in the DCI sent to each UE in such a way that the UEs use the same NZP-CSI-RS as the spatial reference. The serving RF node selects the initial CCE index and the PUCCH resource index such that the UE selects a PUCCH resource that has the desired spatial reference. According to 3GPP specification 38.213, the UE determines the PUCCH resource index according to the following formula:

$$r_{PUCCH} = \begin{cases} \left\lfloor \frac{n_{CCE,p} \cdot \lceil R_{PUCCH}/8 \rceil}{N_{CCE,p}} \right\rfloor + \\ \quad \Delta_{PRI} \cdot \left\lceil \frac{R_{PUCCH}}{8} \right\rceil & \text{if } \Delta_{PRI} < R_{PUCCH} \bmod 8 \\ \left\lfloor \frac{n_{CCE,p} \cdot \lfloor R_{PUCCH}/8 \rfloor}{N_{CCE,p}} \right\rfloor + \\ \quad \Delta_{PRI} \cdot \left\lfloor \frac{R_{PUCCH}}{8} \right\rfloor + & \text{if } \Delta_{PRI} \geq R_{PUCCH} \bmod 8 \\ \quad R_{PUCCH} \bmod 8 \end{cases}$$

Here, $R_{PUCCH}$ is the number of PUCCH resources configured in Resource Set 0, $n_{CCE}$ is the initial CCE index used to send PDCCH carrying a Format 1_1 DCI, $N_{CCE}$ is the number of CCEs in the CORESET used to transmit the PDCCH and $\Delta_{PRI}$ is the 3-bit PUCCH resource index sent to the UE in the DCI. In one example, when $R_{PUCCH}$=32 and $N_{CCE}$=40, the available CCEs can be divided into 4 groups with indices [0-9], [10-19], [20-29] and [30-39]. For a given CORESET, the PUCCH resource that the UE will use depends only on the CCE group of the initial CCE used for PDCCH and the 3-bit PUCCH resource index carried in the DCI. PDCCH transmissions that use CCE group [0-9] will map to PUCCH resources with index 4k, where k=0, 1, . . . , 9, CCE group [10-19] will map to PUCCH resources with index 4k+1, CCE group [20-29] will map to PUCCH resources with index 4k+2, and CCE group [30-39] will map to PUCCH resources with index 4k+3, where k=0, 1, . . . , 9. By linking the 32 PUCCH resources in Resource Set #0 are linked to 8 NZP-CSI-RS such that 4 PUCCH resources with consecutive indices (4k, 4k+1, 4k+2 and 4k+3) are linked to the same spatial reference, according to the formula given above, the NZP-CSI-RS spatial reference for PUCCH then becomes independent of the CCE group and only depends on the value of $\Delta_{PRI}$. Serving RF node can then select any of the 8 NZP-CSI-RS as a spatial reference for PUCCH by choosing Am accordingly. The same procedure can be used to ensure that the desired PUCCH resource is also selected in a similar manner for other UEs. When HARQ ACK/NAK from two or more UEs can be received using the same NZP-CSI-RS as the spatial reference, the serving RF node can schedule the transmissions in the same symbol and choose the 3-bit PUCCH resource index for the UEs such that they all use the same spatial reference.

RRC in the MNC also configures the UE with one or more Scheduling Request configurations. Each Logical Channel is associated with at most 1 Scheduling Request configuration. Each SR configuration also includes an SR resource configuration, which consists of a periodicity and offset configuration that specifies the SR time occasions in slots, and an associated PUCCH resource. The spatial reference for PUCCH can be activated as before by selecting one of 8 Spatial References in the configured PUCCH Spatial Relations table using a MAC CE. This method is compatible with the 3GPP R15 specifications. In networks with a large number of connected UEs, this method will use significant time-domain resources, because when multiple UEs share the same time-domain SR occasions, they cannot utilize different NZP-CSI-RS as their spatial reference. This would prevent the serving RF node from changing the spatial reference of the PUCCH resource of a UE with a MAC CE. In order for the serving RF node to receive SR from two or more UEs on the same symbol, an RRC reconfiguration would be required.

As we saw earlier, performing an RRC reconfiguration for a beam change would add significant overhead, especially in a mesh network. In the technology of this specification, a UE is configured with multiple semi-persistent SR configurations for the same logical channel. In contrast to SR configuration in R15, these SR configurations can be activated or deactivated using a MAC CE. As before, in addition to a PUCCH resource, each SR configuration has its own (slot) offset and therefore a different set of time occasions for SR. The time occasions of the SR configuration are linked to 1 NZP-CSI-RS as the spatial reference. By configuring different UEs that use the same NZP-CSI-RS as the spatial reference with the same SR time occasions and different PUCCH resources, when multiple UEs send SR that can be received by an RF node using the same spatial Rx filter, they can send them on the same time occasion. This will reduce the overhead of SR transmissions. The time occasions for SR may at least partially overlap with the time occasions used for CSI reporting. The serving RF node activates one of the semi-persistent SR configurations by sending a MAC CE.

Figure 73:
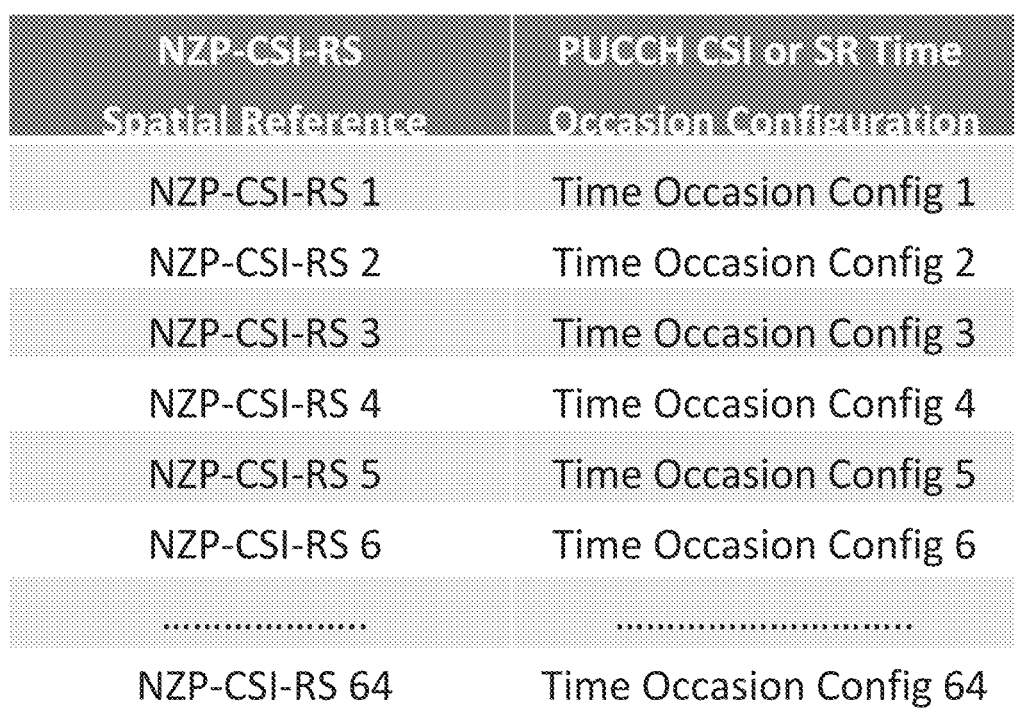

As shown in FIG. 73, NZP-CSI-RS spatial references are linked to time configurations defined as a Period and Offset configuration. Here when the time occasions in a first Period and Offset configuration is a subset of the time occasions in a second Period and Offset configuration (with a smaller period), the two Period and Offset configurations belong to the same time occasion. For example, a CSI reporting configuration with a period of 80 slots and 0 offset and an SR configuration with a period of 8 slots and 0 offset can be linked to the same NZP-CSI-RS spatial reference. Using semi-persistent SR configurations together with semi-persistent CSI reporting configurations, multiple UEs can transmit SR and/or CSI in PUCCH in the same symbol and the serving RF node can receive them at the same time using the same spatial Rx filter.

RRC Configurations for MP-UE in a Mesh Point

In the previous section, we described the RRC configuration and beam management procedures for UEs that connect to the single-cell mesh network on an access link. We now describe how the same beam management procedures are extended to support the operation of an MP-UE. In this section we use L, K and P to represent similar parameters with slightly different uses.

Since RF nodes transmit NZP-CSI-RS periodically (or at least semi-persistently based on actual use by a UE), within each period P the NZP-CSI-RS time occasions (for example, L=64 time occasions) of an MP must not overlap with the NZP-CSI-RS that its co-located MP-UE is configured to measure. However, in a large mesh network with hundreds of RF nodes, it may not be possible to find such non-overlapping time occasions for each RF node.

In some implementations, each RF node is assigned L time occasions to send NZP-CSI-RS as follows: when RF node A is transmitting using a spatial Tx filter, an MP should not be allowed to transmit on the same time occasion unless its co-located MP-UE receives the signal from RF node A at a low RSRP. In one special case of this method, the RF nodes collectively transmit NZP-CSI-RS on L×K time occasions that are divided into K non-overlapping groups of L time occasions. Each RF node is assigned to one of these K groups. RF nodes that are assigned to different groups transmit NZP-CSI-RS on different time occasions. RF nodes that are assigned to the same group transmit NZP-CSI-RS on the same time occasions. For good performance, an MP and an RF node that are assigned to the same group receive each other's signals at a very low RSRP.

Figure 75:
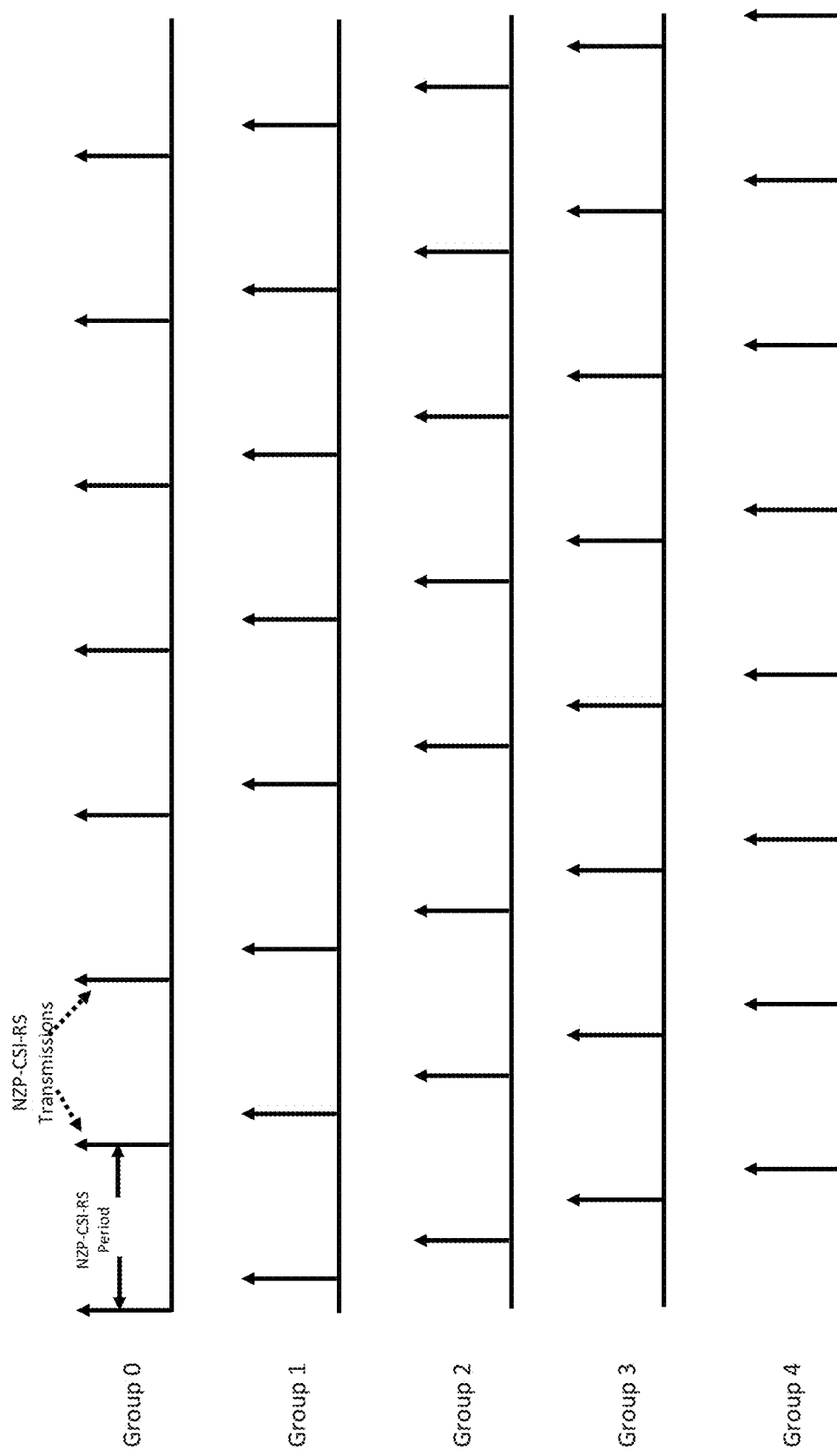

FIG. 74 shows an example where in a mesh network with a rectangular layout and a unit distance between RF nodes, using K=5 groups, the distance between an MP and the nearest RF node sharing the same group is sqrt(5). In FIG. 74, the RF nodes are located in the middle of each square. Dividing the RF nodes into groups in this manner would allow the MNC, for example to configure the MP-UE in an MP in group #1 with NZP-CSI-RS that are transmitted from RF nodes in groups 0 or 2-4. FIG. 75 shows an example of the time occasions used in groups 0-4 for NZP-CSI-RS transmissions. It can be seen that NZP-CSI-RS transmissions from RF nodes that belong to different groups do not overlap in time. Sufficient gap symbols need to be inserted between NZP-CSI-RS time occasions that belong to different groups such that MPs have sufficient time to switch from transmitting NZP-CSI-RS to receiving a NZP-CSI-RS and vice versa. This method allows an MP to transmit NZP-CSI-RS and its co-located MP-UEs to measure NZP-CSI-RS from other RF nodes, both periodically, on different time occasions. The only RF nodes that an MP-UE cannot be configured to measure are the RF nodes that belong to the same group. In some implementations, the number of groups K can be much larger than the value 5 used in FIG. 75.

In another implementation, the grouping described above can be applied only to a subset of $L_A<L$ of the L NZP-CSI-RS transmitted by the RF nodes. For these $L_A$ NZP-CSI-RS, $L_A \times K$ time occasions are set aside and divided into K non-overlapping groups. Each RF node is allocated to one of the K groups as before. RF nodes that are assigned to the same group are chosen as we described earlier. But in addition, for each RF node, the subset of $L_A$ NZP-CSI-RS are chosen by selecting the NZP-CSI-RS that are least likely to be configured to an MP-UE.

For an MP to receive periodic PUCCH transmissions for CSI reporting, the time occasions of these PUCCH receptions (for example, L=64 time occasions, one for each possible Rx beam at an RF node) must not overlap with the time occasions on which its co-located MP-UE is configured to transmit its own CSI reports using PUCCH. This can be achieved using the same methods we described earlier for NZP-CSI-RS transmissions and measurements. For example, in some implementations such orthogonality of PUCCH time occasions can be achieved by first selecting within each CSI reporting period L×K time occasions for PUCCH transmissions and as before assigning each RF node L time occasions for receiving PUCCH from other MPs. In some implementations, one can divide the available time occasions into K groups and assign each RF node to 1 group in the same way we described above for NZP-CSI-RS, such that an MP and an RF node sharing the same group receive each other's signals at a very low RSRP. Using the same example shown in FIG. 74, in a mesh network with a rectangular layout using K=5 groups, the distance between an MP and the nearest RF node sharing the same group is sqrt(5), or 2.2 times larger than the distance between adjacent RF nodes. Such an assignment would allow the MNC, for example, to configure the MP-UE in an MP in group #1 with CSI reporting to any one of the RF nodes in groups 0 or 2-4. Like a UE on the access links, an MP-UE is configured with multiple semi-persistent CSI reporting configurations for the same CSI report, and different CSI configurations will use different NZP-CSI-RS transmitted by other RF nodes that belong to different groups, and the mesh network will use MAC CE to activate one of the semi-persistent CSI reporting configuration for each requested CRI/RSRP or CRI/CQI/PMI/RI.

When the MNC wants to configure an MP-UE with a measurement of a NZP-CSI-RS transmitted by an RF node that belongs to the same group, it can configure the UE with an aperiodic NZP-CSI-RS resource configuration and an aperiodic reporting configuration. The (non-serving) RF node transmitting the NZP-CSI-RS is configured by the MNC to transmit the NZP-CSI-RS in designated positions and the serving RF node is also informed of the configuration. The serving RF node can then trigger the aperiodic NZP-CSI-RS reporting by sending a CSI request using PDCCH.

SR configurations for MP-UEs also follow the same method. Multiple semi-persistent SR configurations are configured, and each SR configuration is associated with a different set of time occasions that are directly linked to 1 NZP-CSI-RS transmitted by the serving RF node. An RF node and MP that can hear each other strongly use different time occasions for SR based on the grouping described above.

In a strictly half-duplex MP, symbols on which the MP-UE receives PDCCH from a serving RF node cannot overlap with the symbols used by that MP for any RRC configured transmission. Therefore, when an MP-UE is configured with a search space and an associated CORESET, if the time occasions associated with the search space are used by the MP for any transmission (for example, SSB, NZP-CSI-RS or PDCCH), the MP-UE cannot reliably receive a PDCCH transmission from its serving RF node. The time occasions of PDCCH search spaces that an MP-UE is configured with should not overlap with time occasions the MP is configured to transmit periodic SSB or NZP-CSI-RS. Further, time occasions of search spaces configured for MP-UEs in neighboring MPs should not overlap such that an RF node can schedule a PDCCH transmission to an MP-UE that is co-located with an MP and that MP can schedule PDCCH to another downstream MP-UE without any conflict. In some implementations, all MPs use the same symbols, for example symbols 0 and 1, to send PDCCH to the UEs they serve on their access links. Since access links produce the highest demand for PDCCH transmissions, separate symbols can be allocated to them. In the technology of this specification, L×K symbols within a search period are assigned to PDCCH, where L is the number of symbols in the CORESET, and these L×K symbols are divided into K groups, and each MP is assigned to one of these K groups. For example, when the search period is 1 slot, L=1 and K=4, symbols 2-3 are assigned to Group 1, symbols 4-5 are assigned to Group 2, symbols 6-7 are assigned to Group 3, symbols 8-9 are assigned to Group 4. MPs are assigned to one group in such a way that MPs that are assigned to the same group receive each other's signals at a low RSRP. All MP-UEs are then configured with search spaces that only use the symbols in the group assigned to their co-located M. The PDCCH transmissions of an MP (e.g., MP#1) to an MP-UE (MP-UE#2) will therefore not occur on the same symbol as a PDCCH transmission of another MP (e.g., MP#2) to MP-UE #1 co-located with the MP (MP #1).

As we described earlier, in a mesh network, to perform RRM for UEs on access links, the MNC relies upon either RRC Measurement Reports sent by the UE based on measurements of off-raster multi-PCI SSB burst set transmissions or based on SRS measurements performed by RF nodes, where the SRS transmissions by UEs use single-cell SSB burst set transmissions as the spatial reference. In the case of MP-UEs, since an MP-UE cannot measure SSB transmissions of other RF nodes in connected mode when its co-located MP is transmitting its own SSB in the same symbols, it is necessary to ensure that MP and its neighboring RF nodes transmit SSB on different time occasions. In the case of single-cell SSB burst set transmissions, an SSB burst set of L=64 indices can be split into K, for example K=2, 4, 8, 16 or 32 groups, and each RF node is assigned to one group such that an MP and an RF node in the same group receive each others signals at a low RSRP. Then, each RF node transmits only 1/K'th of the L SSB indices. Each RF node transmits fewer, but wider SSB beams. An MP-UE can now measure the SSB transmissions from all RF nodes that are assigned to a different group. This method can also be used in multi-PCI SSB transmissions. The training procedure described above can be used to further optimize the assignment of SSB indices to the RF nodes. A useful property of this method is that single-cell SSB transmissions that are transmitted by different RF nodes can be received by an R15 compatible UE.

Figure 76:
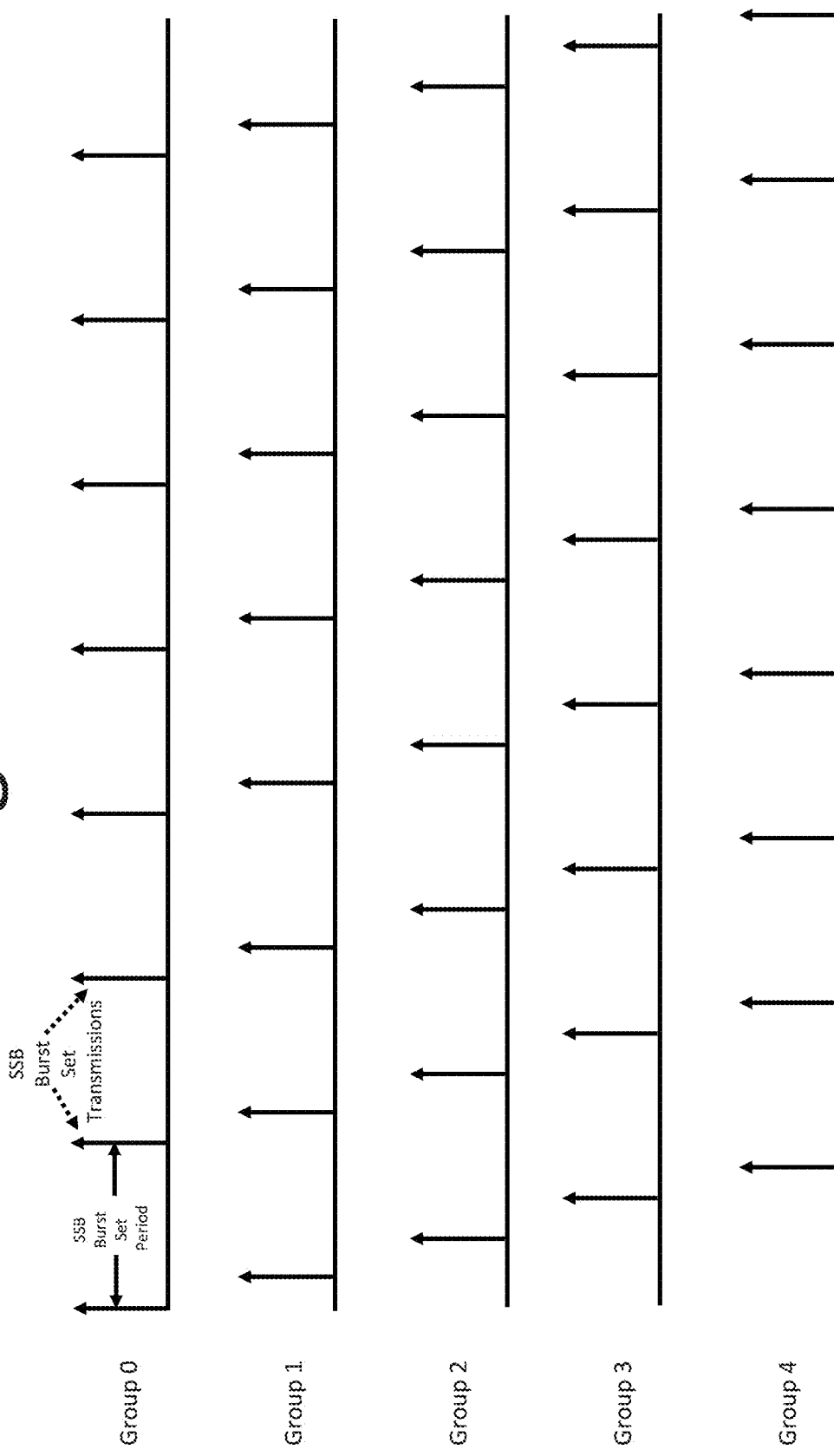

In another method, RF nodes transmit all SSB indices in a half-frame with a period of P half-frames, where for example P=10, and the half-frames in a period P are divided into K non-overlapping groups, where for example K=5, and each RF node is assigned to one group in such a way that an RF node and an MP assigned to the same group receive each other signals at a low RSRP. An RF node will transmit an SSB burst set in 1 half-frame every period and only in the half-frame that is assigned to it. When the RF node is an MP, in the remaining half-frames its co-located MP-UE will measure the SSB transmissions of other RF nodes. The SSB measurement period will be P, and in every period (K−1) half-frames are available for measurement of SSB transmissions of other RF nodes. This is illustrated in FIG. 76.

When the SSB transmissions are off-raster and multi-PCI, each RF node will also be assigned a unique PCI, and MP-UEs can then detect RF nodes based on their PCI and report them to the MNC. When the SSB transmissions are single-PCI, an MP-UE cannot identify individual RF nodes, but it can train its spatial Rx filter for each transmission in an SSB burst set and use the same spatial filter as its spatial Tx filter for SRS transmissions. When an MP-UE is transmitting SRS, its co-located MP cannot listen to SRS transmissions of other MP-UEs. The same method we described above for NZP-CSI-RS and SSBs can be used to allow MP-UEs transmit SRS and their co-located MPs measure SRS without conflicts. For example, in some implementations, L x K time occasions are identified for SRS transmissions in a period P, and they are divided into K groups as described above, and an MP-UE transmits SRS in 1 out of K time occasions within the period and it's co-located MP uses the remaining time occasions to measure SRS transmissions from other MP-UEs. In this method, RF nodes measure SRS transmissions in K times as many time occasions. In order to reduce the overhead in this method, a larger SSB beam width is utilized, so as to reduce the number of symbols used to transmit SSBs and SRS.

To implement the methods described above in a wireless network, an additional method is required to find the best time occasion assignments for the RF nodes. In networks where the MPs are static, this can be performed during initial network deployment and later repeated when nodes are added to the network and also during low-traffic periods. In some implementations, the RF nodes include a GPS receiver and the assignment of time occasions can be performed based on GPS coordinates of RF nodes. In other implementations, to determine the best time occasion assignments, all RF nodes are configured to transmit a discovery signal burst set on L time occasions with a period of P, where L represents the number of distinct beams transmitted by the RF node for discovery. The discovery signal carries an identifier of the RF node that is unique in the mesh network. The discovery signal may be an SSB and each time occasion may occupy 4 OFDM symbols. In this case, the PSS/SSS portion of the SSB can carry the RF node identifier (max 1024). In some implementations, the discovery signal is a new signal that can support a larger number of RF node identifiers. The discovery signal may not include a full MIB in the PBCH transmission, but PBCH and the DM-RS for PBCH are included for frame synchronization. This would allow the MP-UEs to determine the SFN, frame and half-frame boundaries. In a single discovery signal burst set, nominally RF nodes transmit the discovery signals on L time occasions on designated symbols and the discovery signal is nominally repeated once every P msec. In some applications, P may be 5 ms. In order to allow their co-located MP-UEs measure the discovery signals of other RF nodes, MPs take turn in muting the transmission of their discovery signal in K designated consecutive periods. In some applications, the muting pattern is determined based on an identifier of the RF node. During these K periods, MP-UEs train their spatial Rx filters for each of the L discovery signals received on L time occasions in every period. In some applications, K=1, and MP-UEs train their spatial Rx filter across multiple periods.

At the end of the procedure, RF nodes transmit to the MNC the RSRP of the strongest signals they have received on each time occasion and the identity of the RF node who transmitted the discovery signal. The MNC then uses this information to assign L time occasions to each RF node. The measurement procedure described above can be completed in N×K×P msec.

When an MP is newly added to the mesh network, it can listen to all multi-cell SSB transmissions and report its measurements to the MNC, prior to assignment to a group. In implementations where the RF nodes don't transmit multi-cell SSB, the MP-UE of the RF node can be configured to measure a large number of NZP-CSI-RS transmitted by nearby nodes.

In applications where the MPs are mobile, the assignment of MPs to groups can be dynamically updated based on the evolving mesh network topology. To insulate UEs on access links from the dynamically evolving backhaul links between RF nodes, all reference signal configurations for UEs may utilize different symbols that are distinct from the symbols used for reference signals of MP-UEs. In some implementations, MPs continuously measure and report their beam measurements using configured reference signals. To allow MP-UEs measure reference signal transmissions (multi-cell SSB or NZP-CSI-RS), MPs are configured to occasionally mute their NZP-CSI-RS transmissions to allow other MP-UEs measure these transmissions. In the case of multi-cell SSB transmissions, in some implementations, the muting patterns is specified in terms of PCI. Since MP-UEs will know the PCI of an SSB they are measuring, they will be able to determine the time occasions on which the SSB will be muted and use those time occasions to measure the SSB transmissions of other RF nodes. In the case of NZP-CSI-RS transmissions, in some implementations, the MP-UE can be configured with the muting pattern by the MNC as part of the NZP-CSI-RS configuration. For example, in some implementations N MP-UEs will periodically report the results of their measurements to the MNC. Based on the reported measurements of reference signals, the MNC dynamically updates the assignment of RF nodes to groups. This updating of the assignments is performed in a synchronized manner to avoid conflicts during transitions. In the case of NZP-CSI-RS configurations, changing the group assignment of an RF node has the effect of changing the time occasions used in NZP-CSI-RS transmissions of RF nodes and in NZP-CSI-RS configurations of MP-UEs.

Beam Switching Across RF Nodes for a UE in a Single-PCI Network

Figure 77:
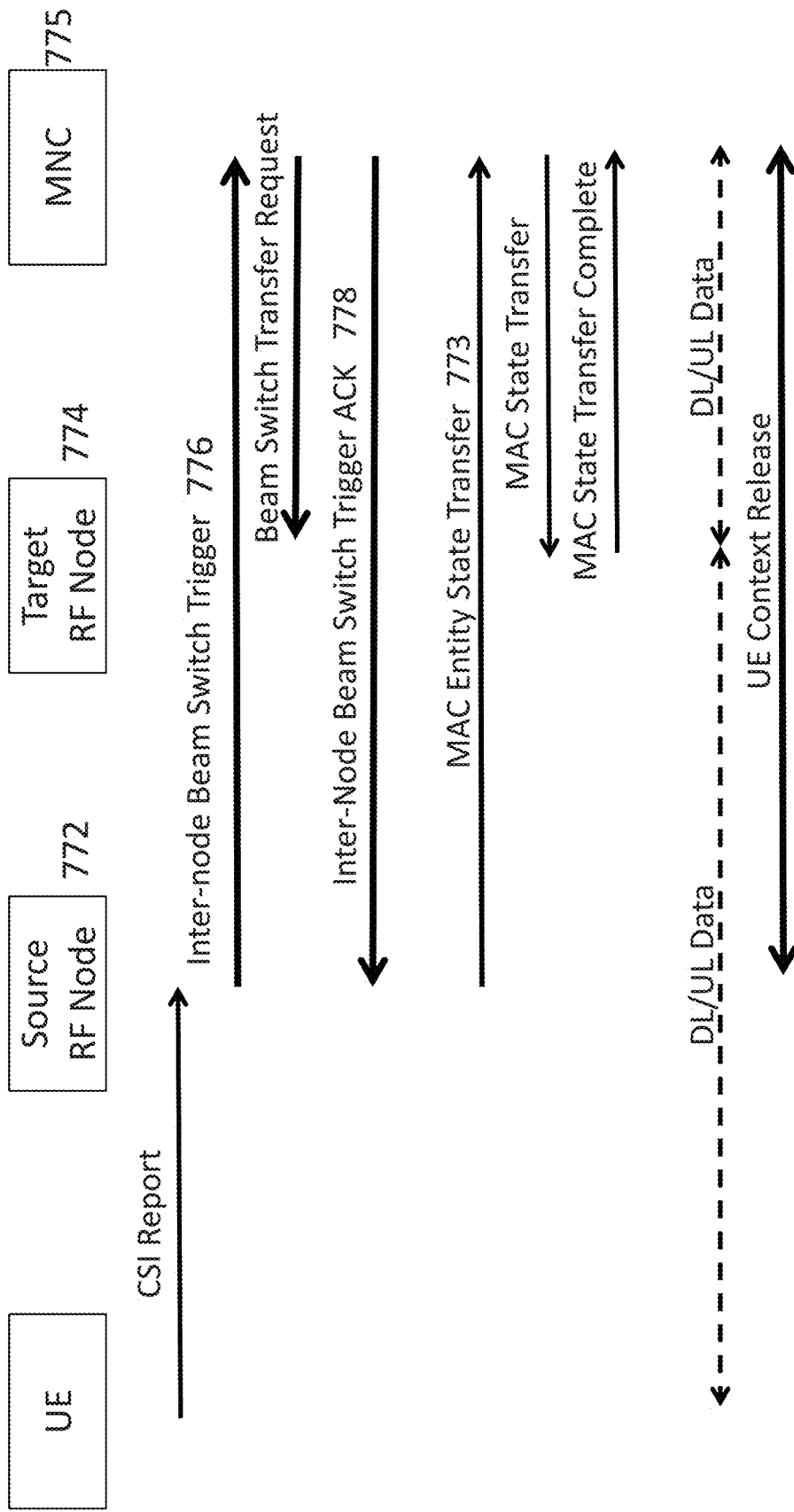

Earlier in FIG. 51, we described the procedure for a UE beam switch between two RF nodes. Here, we use FIG. 77 to describe the same procedure in more detail. We also show a more streamlined message exchange between the RF nodes, which simplifies the beam switch. With the extensions we described in the previous section to support the enhanced RRC configurations with group assignments, the procedure described here also applies to an MP-UE.

In the technology of this specification, as we described above, when multiple RF nodes share the same PCI, it is possible to configure the UE with NZP-CSI-RS that are transmitted from any one of the RF nodes and have the UE send a CRI/RSRP or CRI/CQI/PMI/RI report to one or more RF nodes using PUCCH without an RRC reconfiguration. In contrast, when each RF node has a different PCI and the UE is configured with one of the RF nodes as its serving cell, for CRI/RSRP or CRI/CQI/PMI/RI reporting on PUCCH, for CSI reporting the UE can only be configured with NZP-CSI-RS transmitted by the serving RF node and the CSI report cannot be sent to another RF node without a handover procedure, which includes an RRC reconfiguration. In the technology of this specification, using the same PCI allows the mesh network to use the efficient MAC/PHY layer beam measurement reporting capability to select the best beam across the entire mesh network, not just in the serving RF node, and change the serving RF node without an RRC reconfiguration. By placing the RRC layer in the MNC, all RRC configurations are centrally controlled, but they occur less frequently.

In some implementations the MAC entity serving the UE may be located in a single RF node, and only that RF node is then allowed to transmit to or receive from the UE. When the UE moves from the coverage of one RF node to another or due to a change in channel conditions, a beam switch is performed from a source RF node to a target RF node. Such a beam switch is implemented entirely by the mesh network without any participation by the UE. The beam switch is triggered by the source serving RF node based on the periodic CRI/RSRP beam management reports received from the UE.

Source RF node 772 triggers the beam switch to the target RF node 774 by sending a Beam Switch Trigger message 776 to the MNC, which the MNC acknowledges with a Beam Switch Trigger ACK message 778. In a next step, the MNC sends a Beam Switch Request message 771 to the target serving RF node and transfers the subset of the RRC UE context that the RF node will need to serve the UE. When the source serving RF node is ready to perform the beam switch to the target serving RF node, or shortly before, it freezes the MAC entity state of the UE, and transfers 773 the MAC entity state to the target serving RF node, via the MNC 775. The source RF node also indicates the last GTP-U packet it successfully delivered to the UE. Upon receiving the MAC entity state transfer message from the source serving RF node, the MNC starts forwarding UE's DL RLC SDUs or RLC SDU segments to the target serving RF node, starting with the first packet not successfully delivered by the source serving RF node. In the meantime, the source serving RF node can continue to serve the UE on both the DL and UL for a pre-determined transition period (e.g., a small number of slots) and may indicate the end of the transition period in the MAC state sent to the target serving RF node. This period can be used by the source serving RF node to complete any pending HARQ transmissions.

Figure 78:
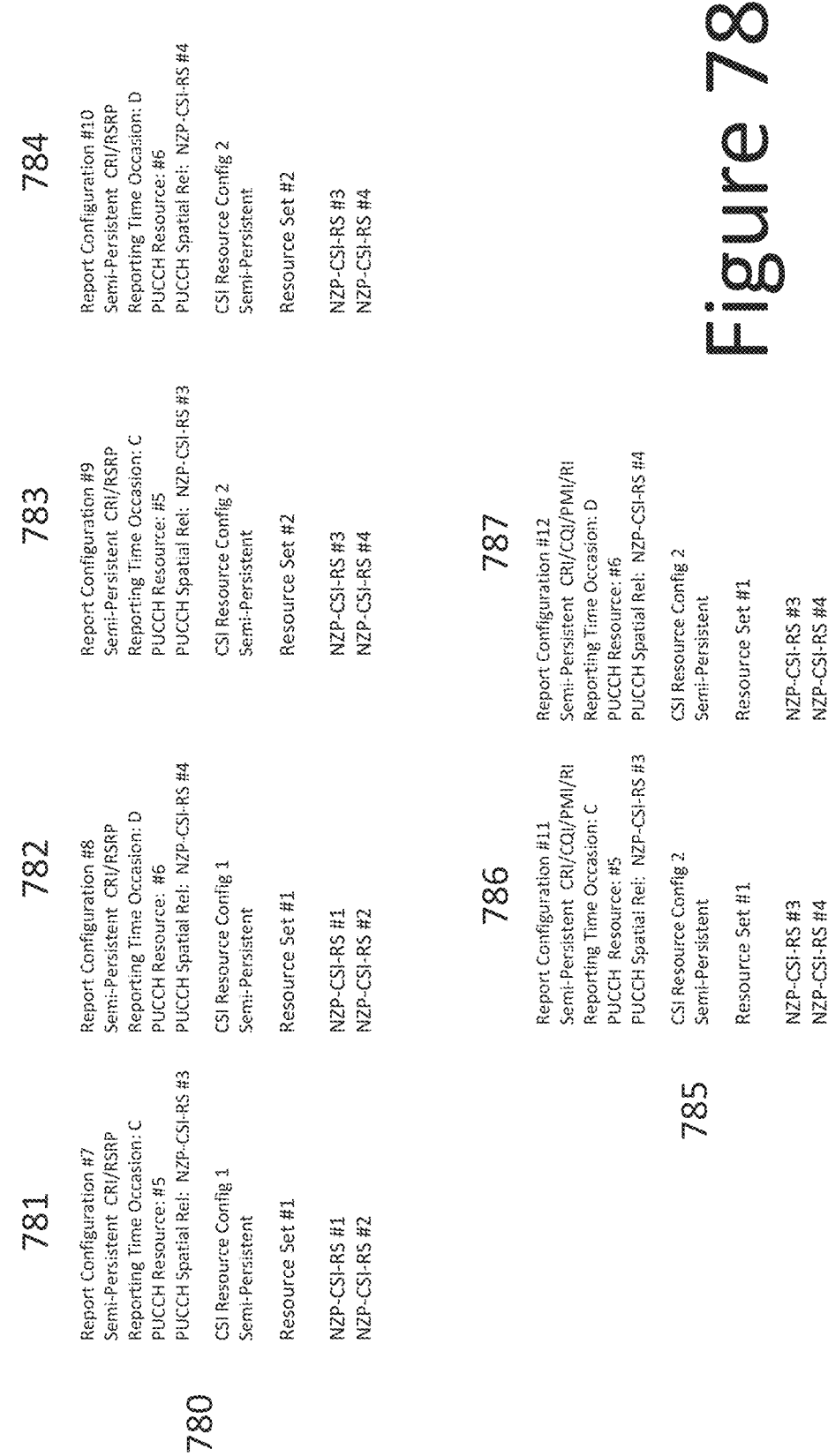

In order to complete the beam switch without any RRC reconfiguration of the UE, additional NZP-CSI-RS reporting settings are configured prior to the beam switch. Expanding the example that we showed earlier in FIG. 71, we show in FIG. 78 the additional reporting settings that are configured. The additional reporting settings support 1) the reception of UE's CRI/RSRP reports by the target RF node and 2) the transmission of CRI/CQI/PMI/RI reports based on NZP-CSI-RS resources transmitted by the target RF node and the reception of these reports by the target RF node. Prior to the beam switch these reporting settings are all inactive. During the beam switch, the reporting settings #1-6 are deactivated and the reporting settings #7-12 are activated by sending a MAC CE to the UE. In some implementations, the deactivation and activation of reporting settings are performed by the source RF node. In other implementations, the deactivation and activation of reporting settings are performed by the target RF node. In some other implementations, the deactivation and activation of some of the reporting settings are performed by the source RF node and the deactivation and activation of other reporting settings are performed by the target RF node.

The source serving RF node also sends the UE a MAC CE to change the spatial reference for one or more configured CORESETs to a NZP-CSI-RS (e.g., in the example of FIG. 71 NZP-CSI-RS #3 and/or #4) transmitted by the target RF node. Typically, these are the NZP-CSI-RS for which the UE has reported a strong RSRP value. This ensures that the target serving RF node is ready to transmit PDDCH to the UE at the end of the beam switch. The source (or target) serving RF node may also activate the PDSCH TCI State to link PDSCH transmissions to different NZP-CSI-RS transmitted by the target serving RF node. The target serving RF node, upon receiving the MAC entity state of the UE, starts serving the UE at the end of the transition period indicated in the MAC state received from the source serving RF node. The target serving RF node can send PDCCH to the UE on one of the CORESETs that are spatially linked to one of the NZP-CSI-RS it is transmitting. The UE will be searching for PDCCH transmissions in the same search space it was using before the beam switch. The UE only changes its spatial Rx filter to the one it is using to receive the NZP-CSI-RS from the target RF node. To ensure the successful delivery of SR control channel transmissions, the source (or target) serving RF node sends the UE a MAC CE to activate the periodic (or semi-persistent) SR configurations associated with NZP-CSI-RS transmitted by the target serving node as the spatial reference. The target RF node can also send PDSCH to the UE using as the spatial filter any of the spatial Tx filters it used to transmit the NZP-CSI-RS that are already configured in UE's Spatial Relations Table for PDSCH after activating them with a MAC CE transmission. To send HARQ ACK/NAK, as before the UE selects a PUCCH resource from PUCCH resource set 0 and uses as spatial Tx filter the same filter it used to receive the corresponding NZP-CSI-RS. If any updates to UE's UL Timing Advance is necessary, target serving RF node sends timing adjustments to optimize UE's TA.

Serving a 3GPP R15 UE from Two RF Nodes Simultaneously

In some implementations, it is possible to extend the procedure described above to allow two RF nodes serve the UE simultaneously. This can be achieved by maintaining two MAC entities in two RF nodes that behave as one MAC entity towards the UE. One MAC entity in one of the RF nodes handles all transmissions and receptions for one set of radio bearers and the other MAC entity in the other RF node handles all transmissions and receptions for the other radio bearers. Since a 3GPP Release 15 UE supports only a single MAC entity, the two MAC entities in the mesh network behave towards the UE as if they are a single MAC entity. When the UE is located between two RF nodes, with a propagation delay difference that is much smaller than the length of the OFDM cyclic prefix, UE can transmit data of different DRBs to different RF nodes at the same time using two different transceivers. One of the MAC entities in the mesh network controls the timing alignment.

When two RF nodes schedule transmissions, their use of HARQ processes may overstep each other and confuse the UE. In the technology of this specification, to avoid HARQ conflicts, the MNC allocates available HARQ processes to the two RF nodes. For example, the MNC may allocate even-numbered HARQ processes to one RF node and odd-numbered HARQ processes to the other RF node. In some applications, the MNC may RRC configure UE with 16 DL and 16 UL HARQ processes, and give each RF node 8 HARQ processes to work with.

To support simultaneous PDCCH reception from two RF nodes, the UE is configured with at least 2 CORESETs, where one CORESET is spatially linked to a NZP-CSI-RS transmission from the first RF node and the second CORESET is spatially linked to a NZP-CSI-RS transmission from the second RF node. As long as the UE is capable of receiving two PDCCH transmissions in the same slot (either using different Rx beams or in different symbols), the mesh network can schedule two PDSCH transmissions. For example, one of the RF nodes may schedule PDSCH transmission to the UE in even time slots and the other RF node may schedule PDSCH to the same UE in odd time slots. When the UE is capable of receiving two PDSCH transmissions on different Rx beams in the same OFDM symbol, then the two RF nodes can schedule two PDSCH transmissions in the same slot and in some implementations in the same symbols.

The RF nodes also schedule the HARQ transmissions by indicating a time offset (in slots) in the DCI. In 3GPP R15, UE can send a 1- or 2-bit HARQ feedback using Format 0 or Format 1 PUCCH. UE is RRC configured by the MNC with up to 32 PUCCH resources in a PUCCH resource set 0. These resources are spatially linked to one of 8 entries in the PUCCH SpatialRelationInfo table. As described earlier, when the RF nodes schedule PDSCH transmissions, the PUCCH resource used by the UE to send HARQ feedback depends on the position of the Control Channel Element (CCE) used to send the PDCCH, the number of CCEs in the CORESET used for PDCCH and a 3-bit index included in the DCI. Using the methods described earlier, the RF node scheduling the PDSCH transmission can choose the 3-bit index in such a way that the UE will select a PUCCH resource that is spatially linked to a NZP-CSI-RS resource transmitted by that RF node. In some applications, the MNC may not assign a spatial reference to the PUCCH resources used for HARQ feedback. In this case, the UE will send HARQ using the same spatial filter it used to receive PDCCH and/or PDSCH.

Scheduling Request (SR) is also configured in such a way that SR indications are always sent to the RF node handling the corresponding DRB (or at the MAC layer the logical channel). There is a separate SR configuration for each DRB, thereby allowing the MNC to configure a different SR configuration for each RF node. Each SR configuration has a PUCCH resource, and the spatial reference for the PUCCH resource is configured using a MAC CE. In this method, both RF nodes can send a MAC CE to change the NZP-CSI-RS used as a spatial reference for the SR PUCCH transmission. But each RF node only modifies the spatial reference of the PUCCH resource that is assigned to it. For CSI reporting, again different CSI reporting settings are configured, one for each RF node, allowing the UE to report CSI to both RF nodes.

To support Buffer Status Reports, the UE can be RRC configured to form Logical Channel Groups, where all the logical channels served by one RF node belong to one group and all the logical channels served by the other RF node belong to the other group. When 3GPP R15 compatible UEs report BSR, they may send the BSR report to the RF node that has allocated UL resources for PUSCH transmission. Therefore, a BSR report that carries buffer status of logical channels served by the RF node A may be sent to RF node B. To get around this problem, RF node B will forward the received BSR to RF node A, via the MNC. This way both RF nodes will have up to date information on the buffer status of the UE. In some implementations, the MNC may configure the UE with a relatively short periodic BSR reporting period. The periodic BSR reporting period can be configured as 1 ms. The UE maintains a timer, which it resets and restarts after the transmission of BSR to one of the two RF nodes. The UE will trigger a periodic BSR report when the timer expires (i.e., 1 ms later) and there is data in its buffers waiting for scheduling. In this method, as long as the UE is scheduled UL resources by both RF nodes, ultimately both RF nodes will receive a BSR report.

Similarly, to support Power Headroom Reports for both RF nodes, the UE can be configured with a relatively low period (e.g., 10 ms) for periodic PHR. The UE will reset or restart the periodic timer after transmitting a PHR.

Serving a UE with Two MAC Entities from Two RF Nodes Simultaneously in a Single-PCI Network In the section above, we described how the mesh network can serve a 3GPP Release 15 compliant UE from a mesh network where the RF nodes share the same PCI and the UE has a single MAC entity, which communicates with a single MAC entity in the mesh network that is distributed across 2 RF nodes. A 3GPP Release 15 UE supports only 1 MAC entity per serving cell. Therefore, to serve a R15 UE from a single-PCI mesh network when two RF nodes hold the MAC entity, they must appear to the R15 UE as if there is only one MAC entity in the network. This also means that when the UE moves, or the channel conditions change, the MAC state of the UE needs to be transferred from one RF node to another.

In the mesh network of this specification, an MP has a UE function MP-UE, which behaves like a UE towards its upstream RF nodes. Since MPs carry the data traffic of the UEs they serve on their access links as well as the data traffic of downstream MP-UEs, it is critical that MPs maintain constant backhaul connectivity towards the MNC, even when they are moving, because losing backhaul connectivity would a large number of UEs from accessing the network. To maintain backhaul connectivity, an MP-UE supports multiple (e.g., two) MAC entities each serving a separate link to a corresponding upstream RF node. The MP-UE first attaches to one upstream RF node, RF Node #1 like a UE, and establishes a 5G NR airlink connection. When MP-UE uses LTE-NR dual connectivity, it first attaches to an LTE eNodeB, and then adds the single-cell mesh network as a secondary connection by first attaching to a first RF node as its primary serving RF node in the mesh network. When MP operates in standalone mode, it attaches to the single-cell mesh network and selects an RF node as its primary serving RF node.

Figure 79:
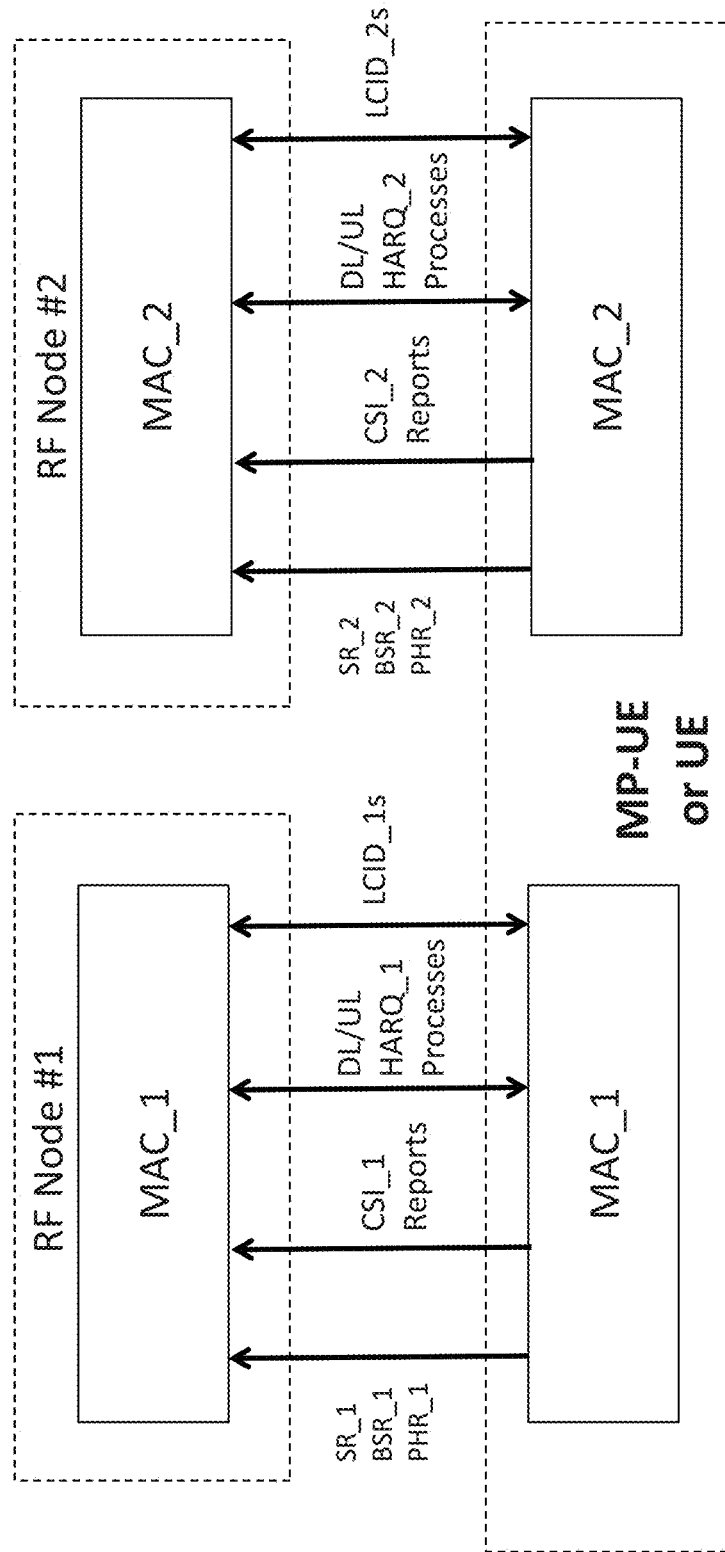

FIG. 79 shows the communication links between the MAC entities in the MP-UE and the MAC entities in the mesh network. The MP-UE is RRC configured by the MNC to measure and report on multiple NZP-CSI-RS resources. Based on CRI/RSRP beam management reports sent by the MP-UE as well as RSRP targets set by the MNC, the primary serving RF node sends a report to the MNC indicating the strength of 1 or more NZP-CSI-RS resources transmitted by another RF node, RF Node #2. This report triggers the MNC to configure the MP-UE with a second MAC entity for the single-cell mesh network. An RRC Reconfiguration message is sent to the MP-UE via RF node #1. The RRC reconfiguration message configures the parameters of the second MAC entity used by MP-UE, which in some implementations will mirror the configured parameters of the first MAC entity. The second MAC entity configuration includes the configuration of SR, BSR and PHR. In addition, RLC bearers for the MAC entity are configured, including the LCIDs that will be used to carry signaling and data radio bearers via the second MAC entity. Each configured LCID is associated with a DRB or an SRB (already established) of MP-UE, as well as a configuration of RLC entities for each bearer. The same DRB can be configured with a different logical channel on both MAC entities.

In some implementations, the RRC Reconfiguration may also include a RACH order to the MP-UE to perform contention-free random access towards the second serving RF node. Upon receiving the RRC Reconfiguration message, MP-UE initiates a PRACH preamble transmission from its second MAC entity. The resources used for PRACH are RRC configured by the MNC, and a NZP-CSI-RS transmitted by RF node #2 is used as the spatial reference for the PRACH transmission. In other words, the MP-UE transmits PRACH using the same spatial filter it determined to receive the designated NZP-CSI-RS transmission from RF node #2. MNC also informs RF node #2 to look for the PRACH transmission. The PRACH procedure can be used by RF node #2 to synchronize the timing phase of the UL transmission from the MP-UE using a Timing Advance value that may be different from the TA value being used by the first MAC entity of MP-UE for UL transmissions to RF node #1.

Once the 2° MAC entity is configured, and the UL timing phase is aligned, the MNC can start forwarding DL RLC packets to MP-UE via either MAC entity. Similarly, MP-UE can send UL RLC PDUs via either MAC entity. MAC functions that are exclusively associated with an RF node will be managed by that MAC entity. This includes HARQ operation and timing maintenance. Each MAC entity will manage its own pool of HARQ processes, without requiring any sharing of HARQ processes with the other RF node, as we described in the case of a single MAC entity. Also, as described above, UL timing will be maintained separately by each MAC entity, as the MP-UE will maintain separate links to each serving RF node using a separate transceiver. Similarly, SR, BSR and PHR are maintained separately. Since the RLC packets of any of radio bearers can be transmitted by either of the two MAC entities, MP-UE can send SR transmissions for a logical channel or logical channel group separately to both RF nodes. Similarly, BSR messages can also be sent separately to both MAC entities. Managing PHR separately for each MAC entity will also allow the MN-UE to account for any possible differences in path loss between the two links. Beam failure is also handled separately for each MAC entity.

Since a half-duplex MP-UE cannot transmit and receive at the same time, the transmission of periodic reference signals (SSBs or CSI-RS) is performed using the same time occasion grouping strategies described earlier.

Multiple MAC entities can also be used in a 5G NR UE, when such a capability is standardized by 3GPP. The method we described above for an MP-UE can also be applied to such a future 5G NR UE. FIG. 79 also applies to such a UE. In the remainder of this section, we will use the term UE to refer to examples of user devices including both an end-user device and an MP-UE.

Figure 80:
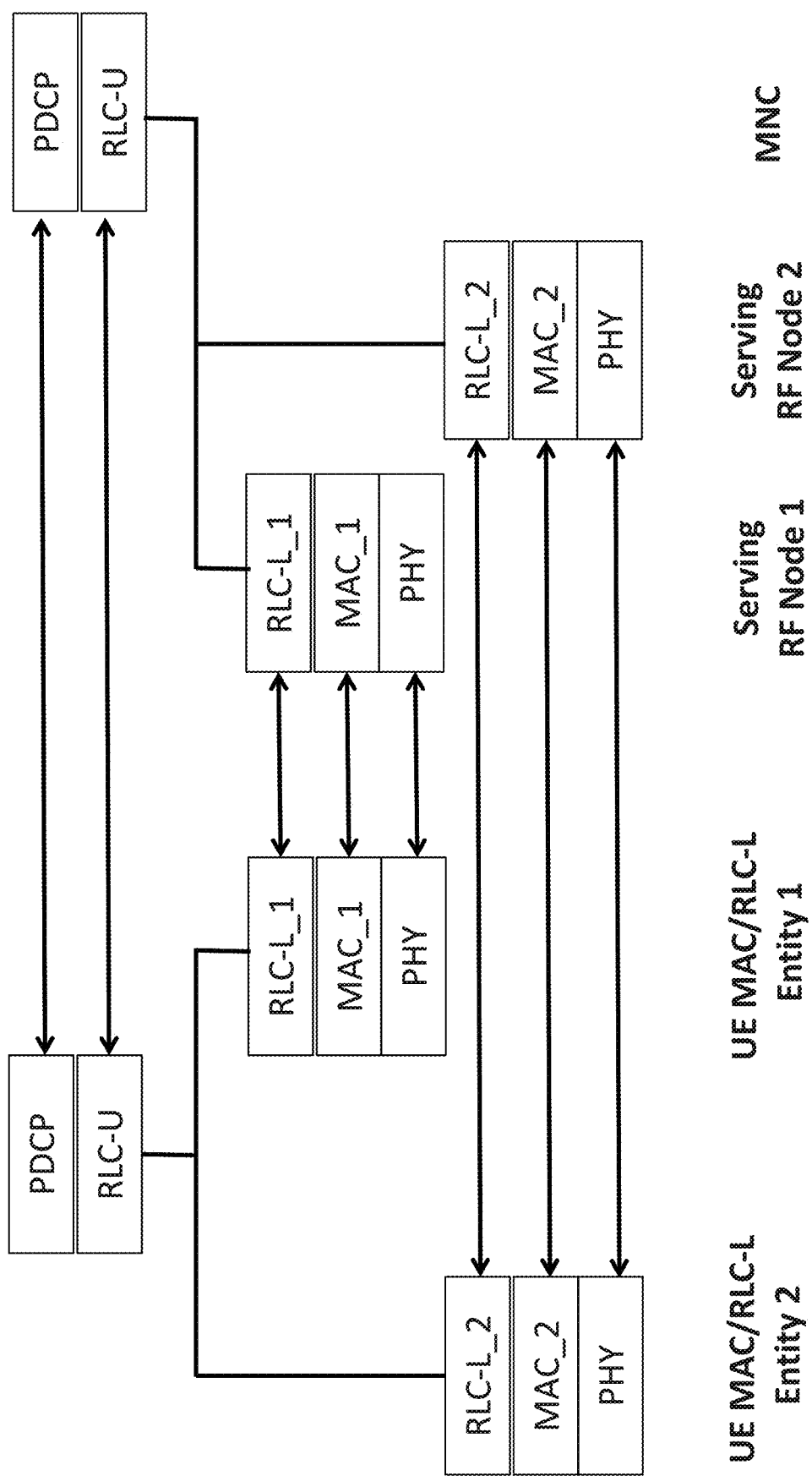

When the single-cell mesh network uses a split-RLC functional split between the MNC and the RF nodes, the same RLC entity can be used with two or more MAC entities configured at the UE. On the UL, the UE may segment an RLC SDU into two RLC SDU segments and may send one segment via one MAC entity and send the other segment via the other MAC entity. Alternatively, the UE may segment an RLC SDU into two RLC SDU segments and send both segments via the same MAC entity. Similarly, an RLC SDU segment that is being retransmitted can be further segmented into two smaller segments that can be sent via different MAC entities. Different RF nodes will receive the two RLC SDU segments, and relay them to the MNC, where they will be reassembled. On the DL, the MNC sends to the serving RF nodes of the UE either RLC PDUs that carry a complete RLC SDU without segmentation, or it sends an RLC PDU that carries an RLC segment for retransmission. In both cases, the RF node receiving the RLC PDU may further segment the RLC SDU and send the segments in different RLC PDUs, after modifying the RLC header accordingly. In this case, different segments of an RLC SDU will be transmitted by the same RF node. The UE will merge the RLC PDUs received by the two MAC entities into a single stream and reassemble them accordingly. This is further illustrated in FIG. 80.

Each MAC entity can be configured with its own PDCCH CORESET. Each RF node can only use the CORESETs configured for its MAC entity. The spatial relations for the PDCCH CORESET is managed by the corresponding RF node using MAC CEs. When an RF node with a dedicated MAC entity decides to change the spatial reference for a CORESET from one NZP-CSI-RS to another, it can do so on its own. Similarly, for PUCCH each MAC entity can be configured with its own set of PUCCH resources. The MAC entity that owns the PUCCH resource can modify its spatial relation to any of the NZP-CSI-RS transmitted by the corresponding RF node that the UE is configured to monitor.

When the UE is configured for CSI measurements, it is configured with CSI Reporting to each MAC entity. In other words, UE will report CSI to the RF node that holds MAC entity #1 and the UE will also report CSI to the RF node that holds MAC entity #2. The CSI Reporting configuration can use CSI resources transmitted by any RF node in the single cell, not just RF nodes #1 and #2. For CSI channel measurement, when UE measures NZP-CSI-RS sent by RF node #1 or RF node #2, it sends the CSI report that is based on that measurement to RF node #1 or RF node #2, respectively. For CSI interference measurement, when UE measures interference based on NZP-CSI-IM sent by RF node #1 or RF node #2, it sends the CSI report based on that measurement to RF node #2 or RF node #1, respectively. In other words, the CSI reports configured for transmission to the RF node that holds MAC entity #1 uses CSI resources transmitted by that RF node for channel measurements and uses CSI resources transmitted by the RF node that holds MAC entity #2 for interference measurements. Similarly, the CSI reports configured for transmission to the RF node that holds MAC entity #2 uses CSI resources transmitted by that RF node for channel measurement and uses CSI resources transmitted by the RF node that holds MAC entity #1 for interference measurements. For beam management, CRI/RSRP reports associated with NZP-CSI-RS transmitted by RF Node #1 are sent to RF Node #1 and CRI/RSRP reports associated with NZP-CSI-RS transmitted by RF Node #2 are sent to RF Node #2. CRI/RSRP reports associated with NZP-CSI-RS transmitted by other RF nodes are sent to the primary RF node.

In a single-cell mesh network, where a UE has two MAC entities, the MAC entities are not linked to RF nodes through RRC configuration. In fact, the only parameters that link the MAC entity to an RF node are the spatial relations that specify the spatial filter the UE will use to transmit or receive. These spatial relations can be modified by a MAC CE transmission either by directly changing the spatial reference for a PUCCH transmission or by activating a new semi-persistent CSI reporting configuration. This greatly simplifies beam switching across RF nodes in a single-cell mesh network. For example, when a UE that is being served by two RF nodes, RF node #1 and RF node #2, moves out of the coverage area of RF node #1 into the coverage area of RF node #3, the MAC entity in RF node #3 can take over the MAC entity from RF node #1. The notion of the primary MAC entity can also be transferred from one RF node to another. For example, in the example above, the primary RF node role can be transferred from RF node #1 to RF node #2. After the transfer, UE will send CSI reports for NZP-CSI-RS transmitted by RF node #3 and all other CSI reports to RF node #2. The spatial filter to use for sending the PUCCH that carries the CSI reports is communicated to the UE by sending a MAC CE to activate a new PUCCH Spatial Relations associated with a NZP-CSI-RS resource transmitted by RF node #2 or by sending a MAC CE to activate a semi-persistent CSI reporting setting where the PUCCH resource is linked to a NZP-CSI-RS transmitted by RF Node #2.

An important advantage of using 2 MAC entities is to serve a UE from a single cell mesh network using two RF nodes that independently schedule simultaneous transmissions to the UE without coordination of resources. In order to serve the UE from two RF nodes simultaneously when the transmissions use the same frequency resources, the UE must be able to avoid the transmissions from interfering with each other. One way to achieve this is to use interference cancellation. However, interference cancellation can increase the cost of the UE. In the technology of this specification, the UE is able to receive from two or more RF nodes simultaneously using spatial filtering. A UE can determine whether it can reliably receive simultaneous transmissions from two different RF nodes by having the UE configured for NZP-CSI-IM transmissions. NZP-CSI-IM transmissions can use the same NZP-CSI-RS already transmitted by the RF nodes, except in these resources instead of measuring the signal, the UE will measure the interference caused by the transmission of one RF node into the transmission of another RF node. The measurement will be reflected in the CQI report sent by the UE.

In some applications using two separate UL frame timings simultaneously, one for each serving RF node, will increase the complexity of the MP-UE, as this would require two separate RF chains. In some implementations, where the second MAC entity is used only to facilitate fast and seamless beam switching between serving RF nodes, to keep the MP-UE complexity low, the MP-UE maintains a single UL frame timing. In this case, the MP-UE sends the PRACH using the timing advance it has established with the first serving RF node using the 1st MAC entity. The second RF node determines the error in its own timing advance and when the error is greater than a threshold, the second RF node declines the request to add the $2^{nd}$ MAC entity. In other implementations where the MN-UE can maintain only a single UL frame timing, the MN-UE can be configured to report the time delay between certain NZP-CSI-RS receptions. This information can be used by the first serving RF node to determine, based on the UE capability of a single UL frame timing, whether a second MAC entity can be added by comparing the reported time delay against a threshold.

UE Emulation in an MP

Figure 81:
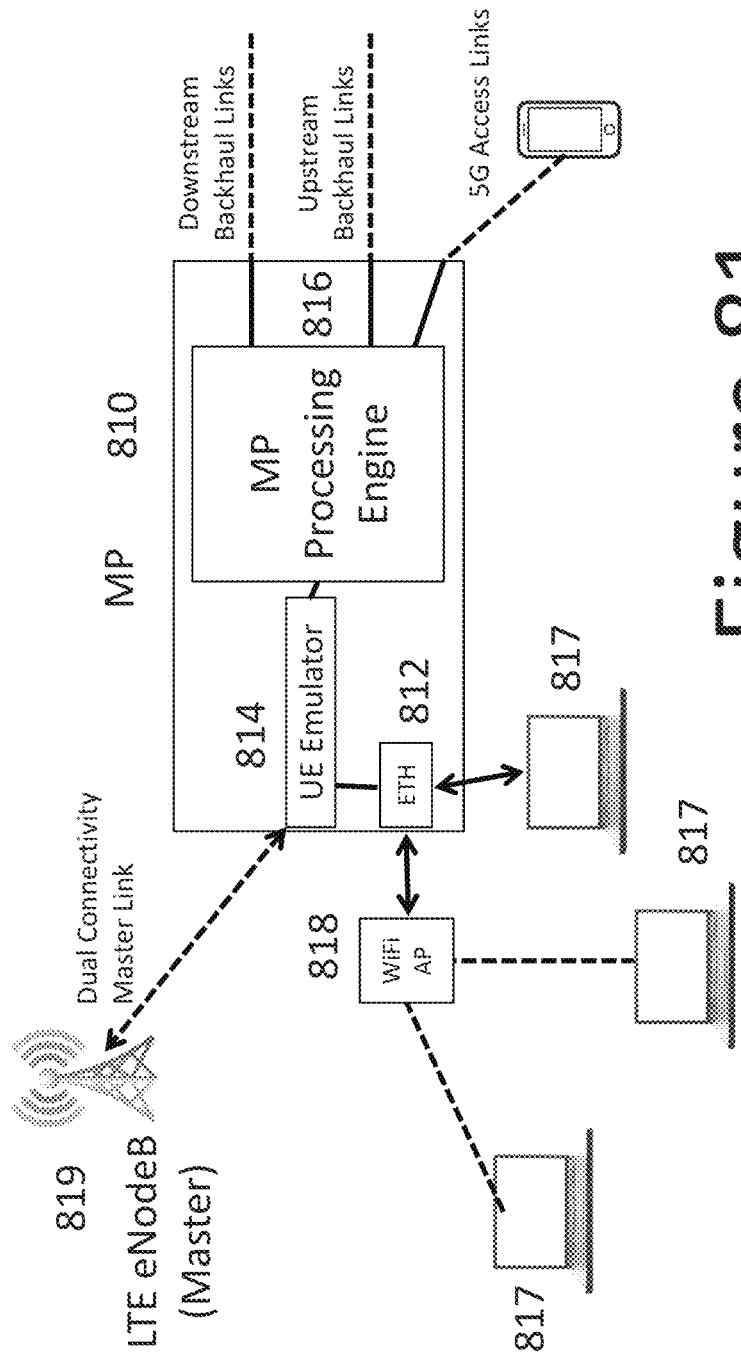

In some embodiments of the technology that we are describing, an MP also carries traffic of end-user devices that are connected to it via a non-5G NR interface. As shown in FIG. 81, MP 810 carries traffic of end-user devices 817 that connect to the MP via a direct Ethernet interface 812 or via a WiFi AP 818 that is connected to the Ethernet interface 812 in the MP via Ethernet cable. In some cases, the MP is attached to the outside wall of a building and in addition to acting as an MP as we describe, also provides Internet access service to end-user devices, such as computers, laptops, tablets, etc., in the building. The WiFi AP may be located inside the building and connect to the MP, which may be deployed outside, via standard Ethernet cabling. A wireless 5G NR access link does not exist between these end-user devices 817 and the MP 810. Instead the Ethernet interface in the MP is used to transmit and receive IP packets between the MP and the end-user devices.

To carry this traffic through the operator's core network, the behavior of a UE is partially emulated inside the MP. This ensures that the local end-user traffic appears to the core network as if it were a 5G NR user. As shown in FIG. 81, the UE emulator 814 sits between the local network interface (e.g., Ethernet) 812 and the MP Processing Engine (MP-PE) 816, which may be implemented in software, handles the airlink processing for the MP. The UE emulator carries a UE identity as in a Universal Subscriber Identity Module (USIM).

Figure 82:
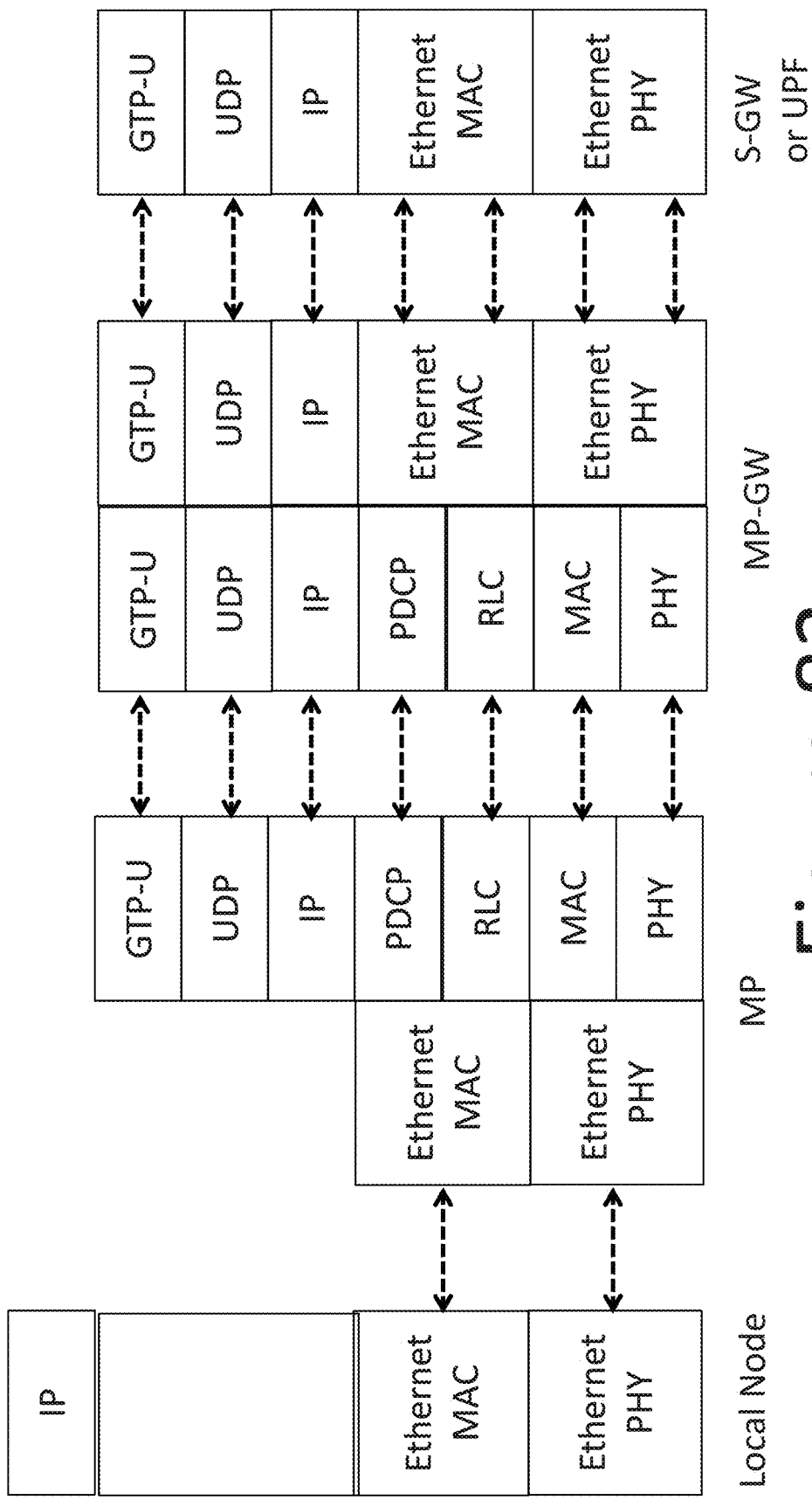
Figure 83:
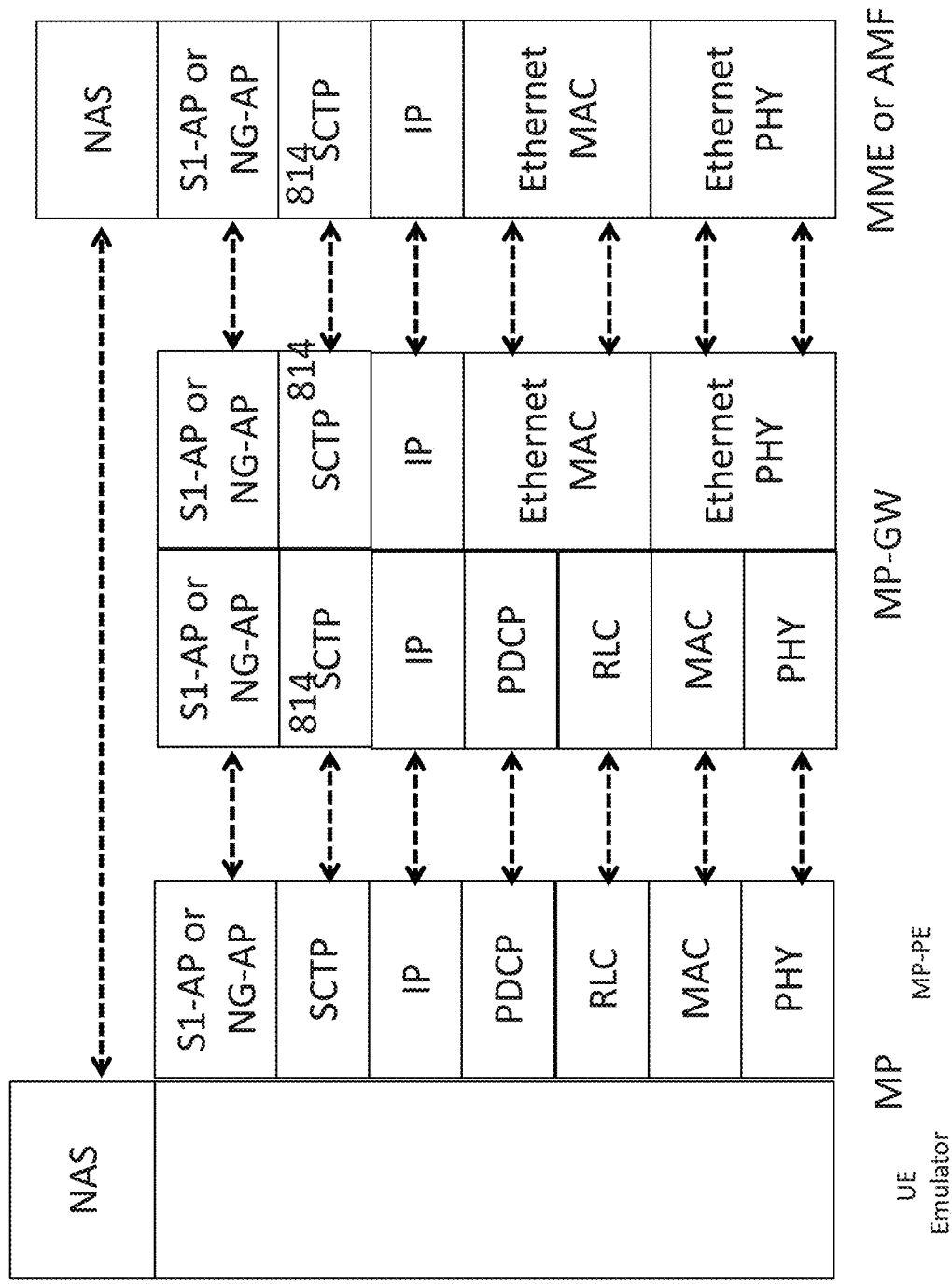

For Architecture A, the user plane and control plane protocol stacks for the UE emulator in the MP are illustrated using the diagrams shown in FIGS. 82 and 83, respectively. Here since the MP's upstream backhaul link carries end-user IP packets in a GTP tunnel, the emulator forwards the end-user IP packets received over the local interface (e.g., Ethernet) to the MP-PE as upstream UL backhaul traffic and the MP-PE maps these IP packets to a GTP tunnel associated with the UE emulator in the same manner as it processes IP packets received from UEs on a 5G NR access link. On the DL, the MP-PE relays IP packets received on the same GTP tunnel to the UE emulator, which forwards them to the local Ethernet interface. For control signaling, the UE emulator generates so-called Non-Access Stratum (NAS) messages and sends them to the MP-PE, which forwards them to the MP-GW in S1-AP or NG-AP messages inside a GTP tunnel, in the same format it forwards NAS messages of UEs that are accessing the mesh network using the 5G NR air interface. Acting as the termination point for core network interfaces, MP-GW forwards these messages to the 4G MME or 5G AMF as before. UE Emulator also processes incoming NAS messages forwarded by MP-PE and responds to them in a manner consistent with a NAS state machine running in a standard 5G NR UE. NAS protocol includes functions such as authentication, mobility management, security control, etc.

Figure 84:
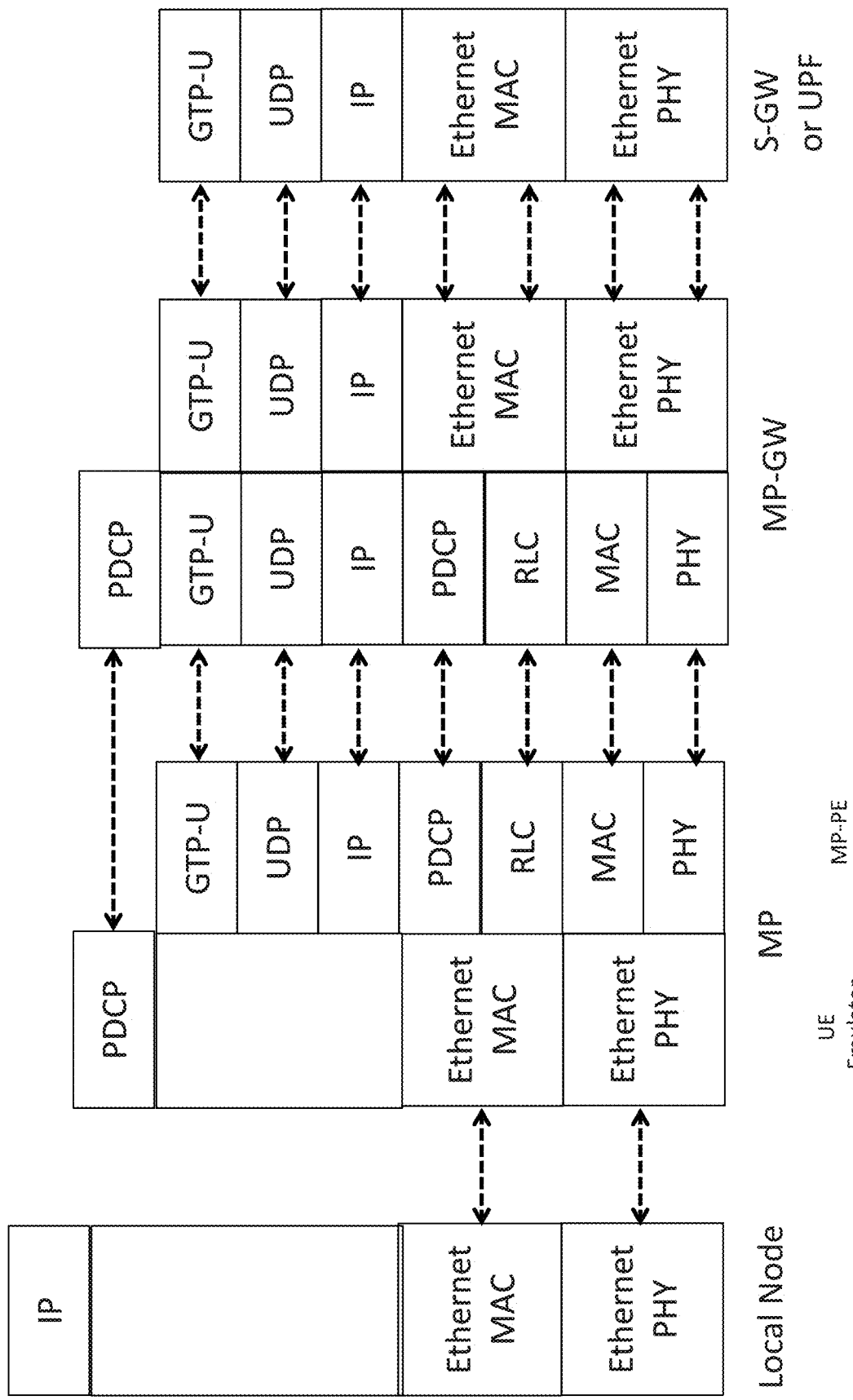
Figure 85:
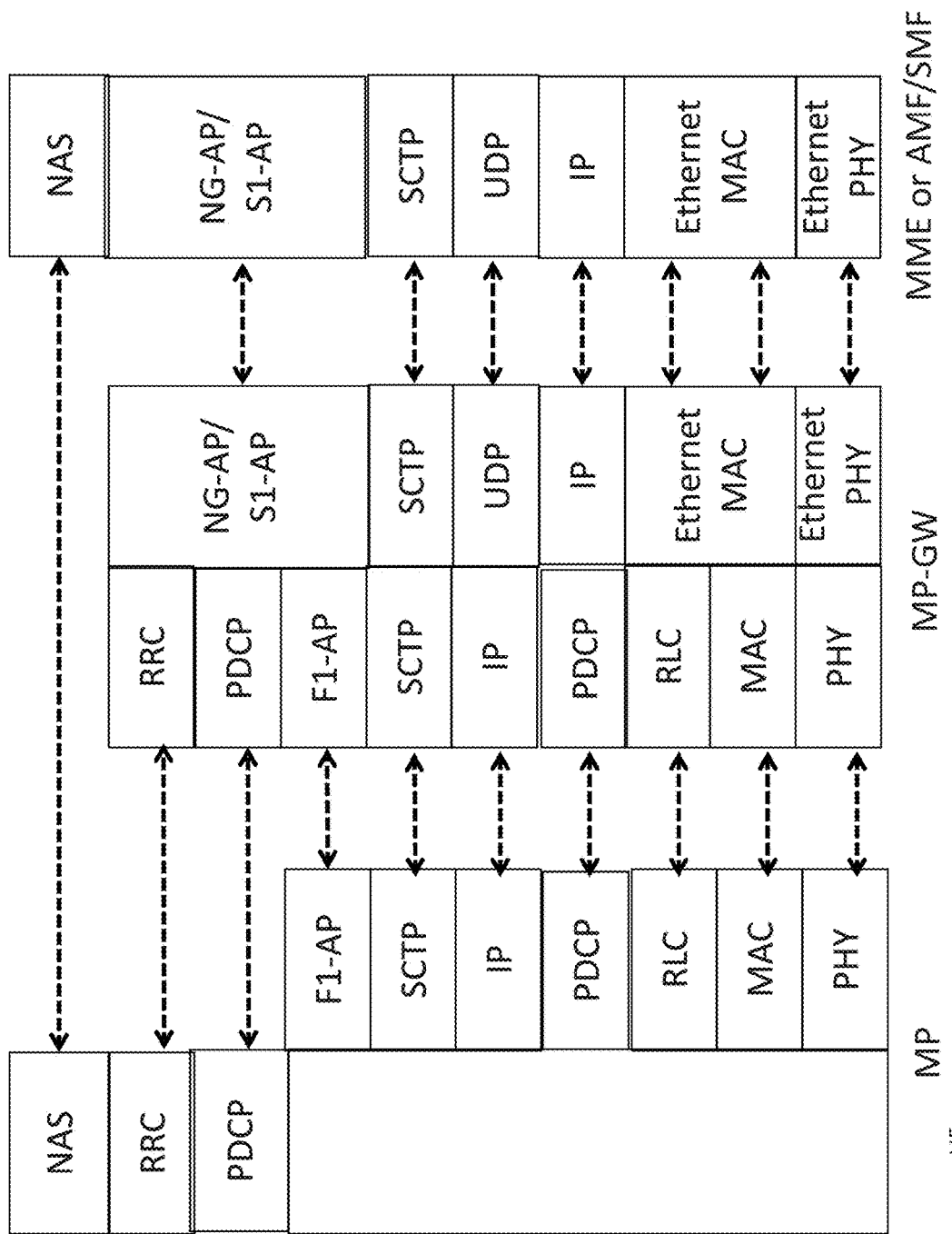

For Architecture B, the user plane and control plane protocol stacks for the UE emulator in the MP is illustrated using the diagram shown in FIGS. 84 and 85, respectively. In the user plane protocol stack shown in FIG. 84, the UE emulator applies PDCP processing to IP packets received from end-user devices over the local (e.g., Ethernet) interface and generates the PDCP PDUs, which are passed on to the MP-PE. On the DL, as in the control plane, UE emulator receives PDCP PDUs for the user plane from the MP-PE, terminates the PDCP and forwards the IP packets to local end-user devices. The user plane protocol stacks for the upstream nodes, including the MP-GW and the S-/P-GW (or UPF) remain unchanged.

In the control plane shown in FIG. 85, on the UL, the UE emulator generates all required RRC and NAS messages and encapsulates them in PDCP like a UE. PDCP SDUs are passed on to the MP-PE. On the DL, UE emulator receives PDCP SDUs from the MP-PE and terminates the PDCP and processes the RRC and NAS messages, again like a UE. UE emulator includes RRC and NAS state machines. The control plane protocol stacks in the upstream nodes, including the MP-GW and the MME/AMF remain unchanged.

To support dual connectivity, the UE emulator also includes a standard LTE UE to establish an LTE connection to an eNodeB 819 as shown in FIG. 81. The emulator operates like an LTE UE and establishes a connection with the LTE eNodeB. In the Neighbor Report it sends to the LTE eNodeB, the UE emulator indicates a strong signal quality for the cell of the local M. Once the LTE eNodeB adds the local MP as a secondary node for dual connectivity, the UE emulator switches to the DC mode of operation. In DC operation, the emulator splits incoming end-user IP packets received over the local interface (e.g., Ethernet) into two groups, one for transmission over the LTE link and another for transport over the mesh network, for example based on the type of radio bearer. For transmissions and receptions using the mesh network, the UE emulator performs the same functions as outlined above for standalone 5G NR mesh network to process the payload and control messages for the secondary 5G NR link.

The protocol stack diagrams shown in FIGS. 82, 83 (Architecture A) and FIGS. 84, 85 (Architecture B) are also applicable to the 5G link of dual connectivity under the assumption of no split bearers. All packets of a radio bearer are carried either by the LTE link or by the 5G NR mesh network link or, in some cases, are handled as split bearers.

In Architecture A, IP packets destined for the mesh network are presented by the UE emulator to the MP-PE as upstream backhaul traffic and the rest of the UL processing proceeds as before. On the DL, the MP-PE relays received IP packets destined to local end-user devices to the UE emulator, which in turn forwards them over the local Ethernet interface. For the control plane, all Non-Access Stratum (NAS) messages generated by the LTE UE in the emulator are sent directly to the LTE eNodeB. It is possible for the emulator to forward NAS messages also via the mesh network as before, except in this case the NAS messages are sent to the MP-GW (possibly via other MPs) using an SCTP link between the MP and the MP-GW. Acting as the X2/Xn termination point, MP-GW will forward these messages to the LTE eNodeB.

In Architecture B, on the UL, for radio bearers destined for the mesh network the UE emulator receives IP packets over the local (e.g., Ethernet) interface, performs the UE PDCP processing locally and presents PDCP PDUs to the MP-PE for further processing. On the DL, the emulator receives PDCP PDUs from the MP-PE and forwards them to end-user devices via the local (e.g., Ethernet) interface. UE emulator also generates all required RRC (and if necessary NAS) messages destined for the DC secondary link, which are encapsulated in PDCP PDUs and passed on to the MP-PE. In the split bearer case, packets that belong to the same radio bearer are sent either through the 4G LTE or the 5G NR links.

Figure 86:
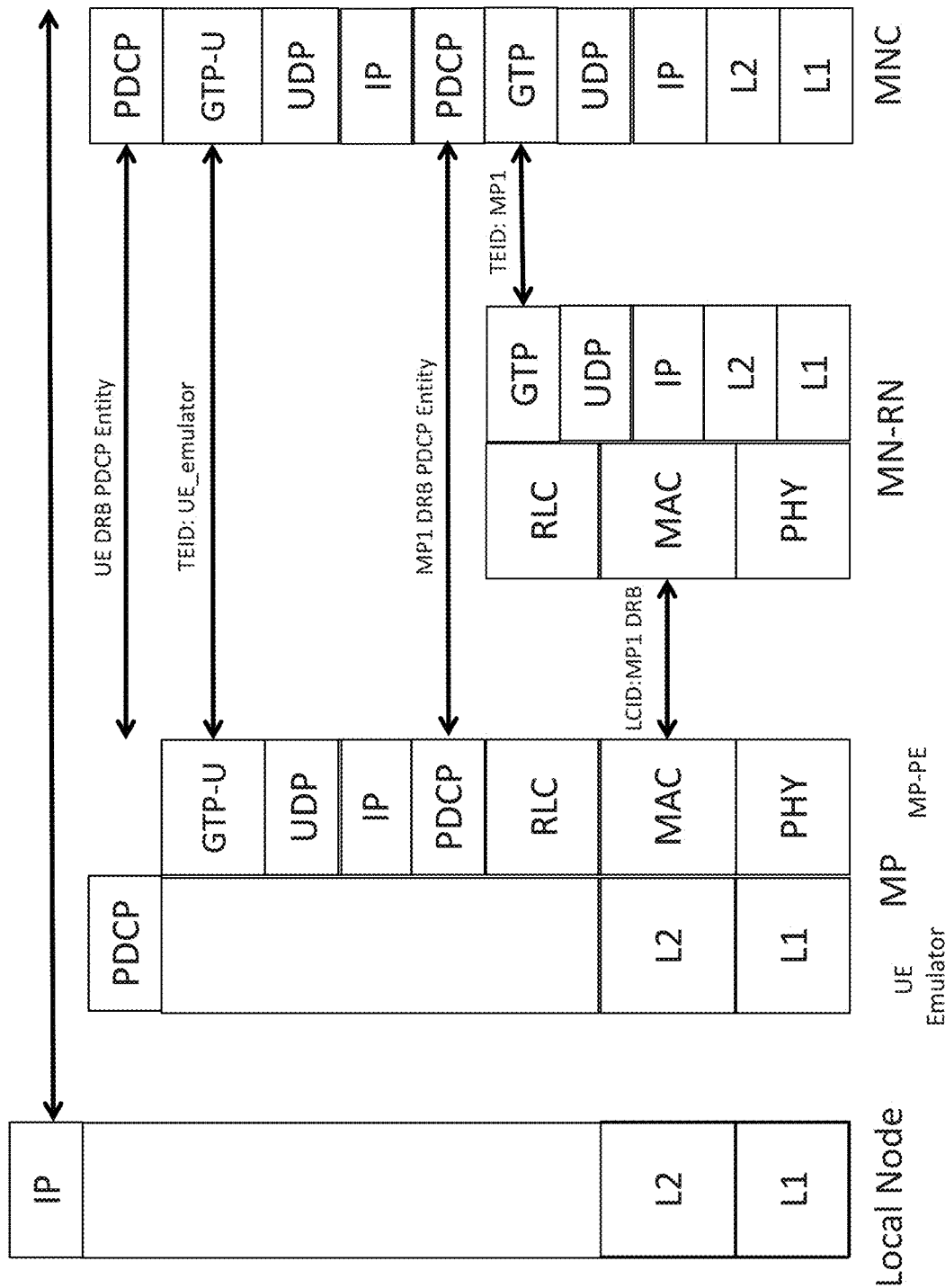
Figure 87:
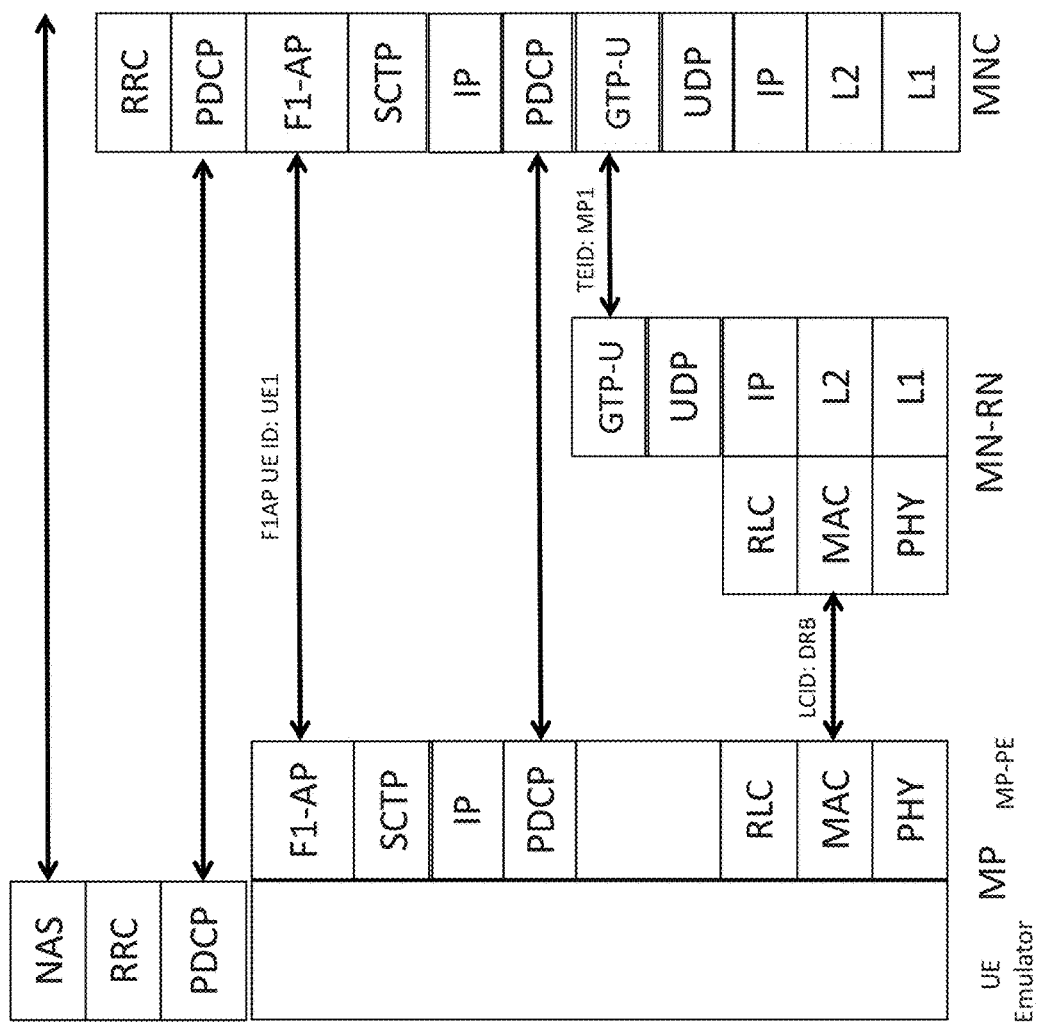

For Architecture B with a central controller the user plane and control plane protocol stacks for the UE emulator in the MP are illustrated for a one-hop mesh network link using the diagrams shown in FIGS. 86 and 87, respectively. On the UL data plane, since the MP's upstream fronthaul link carries PDCP PDUs in a GTP tunnel, the emulator performs the PDCP processing, including ciphering, adds the PDCP header to the UE IP packet received over the local interface (e.g., Ethernet), and forwards the PDCP PDU to the MP-PE as upstream UL backhaul traffic and the MP-PE maps these PDUs to a GTP-U tunnel associated with the UE emulator in the same manner as it processes PDCP PDUs received from UEs on a wireless 5G NR access link. On the DL, the MP-PE relays PDCP PDUs received on the same GTP tunnel to the UE emulator, which performs the PDCP processing, including the deciphering, and forwards the end-user IP packet to the local Ethernet interface. For control signaling, the UE emulator generates Non-Access Stratum (NAS) messages and sends them to the MP-PE, which forwards them to the MNC in F1-AP messages using SCTP/IP, in the same format it forwards NAS messages of UEs who are accessing the mesh network wirelessly using the 5G NR air interface. Acting as the termination point for core network interfaces, MNC forwards these messages to the 4G MME or 5G AMF as before. UE Emulator also processes incoming NAS messages forwarded by MP-PE and responds to them in a manner consistent with a NAS state machine running in a standard 5G NR UE. NAS protocol includes functions such as authentication, mobility management, security control, etc.

In implementations that use the split-RLC architecture, the UE emulator includes the processing of the upper RLC sublayer. On the UL data plane, the emulator implements the ARQ function and passes RLC PDUs to the MP-PE. On the DL data plane, the emulator receives RLC PDUs from the MP-PE and terminates the ARQ function. In the control plane, the emulator behaves like a UE to terminate the NAS/RRC protocols for compatibility with the controller. NAS/RRC messages are carried between the MP and the controller using the SCTP/IP link.

The protocol stack diagrams shown in FIGS. 86 and 87 are also applicable to the 5G link of dual connectivity under the assumption of no split bearers. All packets of a radio bearer are carried either by the LTE link or by the 5G NR mesh network link or, in some cases, are handled as split bearers. In the split bearer case, packets that belong to the same radio bearer are sent either through the 4G LTE or the 5G NR links.

IP packets destined for the mesh network are presented by the UE emulator to the MP-PE as PDCP PDUs and the rest of the UL processing proceeds as before. On the DL, the MP-PE relays received PDCP PDUs that carry IP packets destined for local end-user devices to the UE emulator, which in turn performs the PDCP receive processing to extract the IP packets and forwards them over the local Ethernet interface. For the control plane, all Non-Access Stratum (NAS) messages generated by the LTE UE in the emulator are sent directly to the LTE eNodeB. It is possible for the emulator to forward NAS messages also via the mesh network as before, except in this case the NAS messages are sent to the MNC using an SCTP link between the MP and the MNC. Acting as the X2/Xn termination point MNC will forward these messages to the LTE eNodeB.

Implementation of the UE emulator is simpler in Architecture A. It is possible to use Architecture A for the UE emulator, even when other UEs who attach to the mesh network using a wireless access link are served using Architecture B. In this case, the MP will handle the UE emulator differently from the other UEs it is serving.

Figure 88:
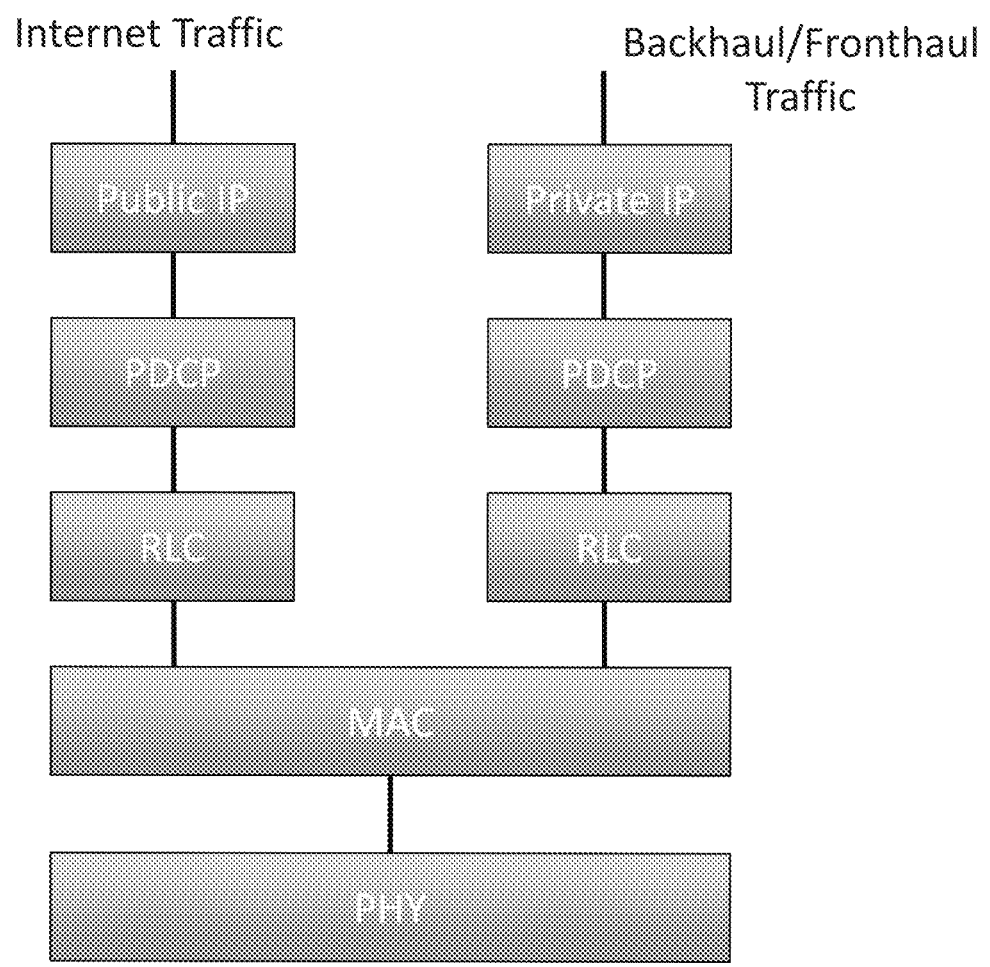

An alternative to the use of a UE emulator is to use the MP as a router. In this case, the MP will request Internet service from the core network and obtain a second IP address, possibly from a different S-/P-GW (or AMF/SMF), which is routable on the public Internet. In this case, the MP can assign a local private IP address to local users and carry their traffic using the mesh network as UE. MP may use techniques such as Network Address Translation (NAT) to translate between private and public addresses. For a 4G core network, the MP would get two separate IP addresses from two different PDNs. New data radio bearers are established for the MP to carry the traffic for the public IP address. No new signaling radio bearers can be used. A single MAC entity can be used in the MP to multiplex all traffic. Public network UE traffic and private network fronthaul traffic can be multiplexed in the MAC layer. This is illustrated in FIG. 88.

Scheduling in Mesh Networks

Two schedulers allocate the airlink resources used by an MP. A scheduler in the MP allocates the airlink resources used on its access links and on its downstream backhaul links. However, a scheduler in an upstream MP or an MN-RN (or MP-GW) allocates the airlink resources used on the MP's upstream backhaul links. If an MP were to make its scheduling decisions independent of its upstream MP or MN-RN (or MP-GW) and use all available airlink resources, sometimes scheduling conflicts will arise, and severe interference will occur. For example, in half-duplex mesh networks, if the scheduler in the MP allocates resources for a transmission, but the scheduler in the MN-RN (or MP-GW) or the upstream MP allocates resources for a reception in the same OFDM symbol, significant self-interference will occur. In half-duplex and full-duplex mesh networks, if the MP and the MN-RN allocate resources for transmission (or reception) on overlapping time/frequency/beam resources, significant interference will occur.

Since with respect to UEs, MN-RNs (or MP-GWs) and MPs behave as APs, the MN-RNs (or MP-GWs) and MPs in a mesh network need to transmit certain standard control and reference signals. For example, SS/PBCH block transmissions and System Information Block (SIB) 1 DL transmissions occur in specific OFDM symbols on pre-determined spatial beams.

Consider the mesh network shown in FIG. 25, where an MN-RN 2500, MP1 2502 and MP2 2504 form a simple two-hop tree. They serve users on their access links 2504-2509 and they use links 2502, 2503 between MN-RN (or MP-GW) and MP1 and links 2510, 2511 between MP1 and MP2 for wireless backhaul. The scheduler in the MN-RN (or MP-GW) can schedule simultaneous UL receptions on its access links 2505 and on its downstream UL backhaul links 2503 on the same OFDM symbol(s), provided these receptions occur on different (isolated) Rx beams or on different RBs at the MN-RNs (or MP-GW). At the same time, the scheduler in MP2 can schedule UL receptions on its access 2509 and downstream backhaul 2513 links without creating substantial interference between them.

When transmitting to MN-RN (or MP-GW) on the upstream UL backhaul link 2503, MP1 may simultaneously transmit on the downstream DL backhaul link 2510 to MP2 and on the DL access link 2506 to its UEs, provided the scheduler in MP1 ensures that these transmissions and the UL backhaul transmission scheduled by MN-RN (or MP-GW) occur on different (isolated) Tx beams or on different RBs.

Schedulers in the MN-RN (or MP-GW) and MP1 must also avoid cross-link interference, which occurs when a strong DL transmitter in node A is near an UL receiver in node B, which is receiving from another node. Same-link interference occurs when a UE or an MP is receiving on the DL (or UL) from an RF node A when another RF node B (or UE or MP) nearby is also transmitting on the DL (UL). In some situations, same link interference seen by an MP can be as strong as cross-link interference. For example, when an MP is receiving on the DL from an RF node A, and another RF node B that is closer to the MP than RF node A is also transmitting on the DL, the same-link interference can significantly affect achievable data rate. To avoid strong cross-link interference to the MN-RN (or MP-GW), MP1 ensures that the DL transmissions it schedules are not received by the MN-RN (or MP-GW) on the same RBs and same (non-isolated) Rx beams as other UL receptions scheduled by MN-RN (or MP-GW) on its access link for the same OFDM symbol. Cross-link interference also occurs between UEs. A UE receiving from MP1 on the DL access link 2506 can be subject to interference from a nearby UE transmitting to MN-RN (or MP-GW) on the UL access link 2505. To allow other UEs to measure cross-link interference, in some applications, UEs are configured to transmit SRS. When scheduling DL transmissions on DL access link 2506 to a UE A that is affected by cross-link interference from a UE B served by MN-RN (or MP-GW), MP1 avoids scheduling UE A on RBs used by MN-RN (or MP-GW) to serve UE B in the same OFDM symbols. To execute such interference avoidance, MN-RN learns an identifier of the "aggressor" UE B in its cell and an identifier of the "victim" UE A in the cell of MP1, and after scheduling a DL transmission to UE B, it informs MP1 of the RBs it used for UE B and of an identifier of UE A.

When receiving from MP1 on its upstream DL backhaul link 2510, MP2 can also receive on its UL access links 2509 and downstream UL backhaul links 2513 in the same OFDM symbol, provided the scheduler in MP2 ensures that these transmissions and the DL backhaul transmission scheduled by MP1 occur on different RBs or on different (isolated) Rx beams (at MP2). In addition, to prevent cross-link interference from MP1, MP2 also ensures that the UL receptions it schedules on its access links 2509 and downstream backhaul links 2513 and the transmissions by MP1 (scheduled by MP) on the same OFDM symbol are received by MP2 on different RBs or different (isolated) Rx beams. Also, when MP2 schedules UL transmissions from a UE A on its access link 2511 that is identified by MP as the "aggressor" of cross-link interference to a "victim" UE B served by MP1, MP2 avoids scheduling UE A on RBs that overlap with RBs scheduled by MP1 for UE B on the same OFDM symbol.

The scheduler in the MN-RN (or MP-GW) can also schedule simultaneous DL transmissions on its access links 2504 and on its downstream DL backhaul links 2502 on the same OFDM symbol(s), provided these transmissions occur on different isolated Tx beams or on different RBs.

When receiving from MN-RN (or MP-GW) on its upstream DL backhaul link 2502, MP1 may simultaneously receive downstream UL transmissions from MP2 on backhaul link 2511 and UL transmissions from its UEs on access link 2507, provided the scheduler in MP1 ensures that these receptions and the DL backhaul transmission scheduled by the MN-RN (or MP-GW) all occur either on different (isolated) Rx beams at MP1 or on different RBs. To prevent strong cross-link interference from MN-RN (or MP-GW), MP1 also ensures that the UL receptions it schedules, and the DL transmissions scheduled by the MN-RN (or MP-GW) on the same OFDM symbols on its access links 2504 are received on different RBs or on different (isolated) Rx beams. Further to prevent cross-link interference between UEs, when MN-RN (or MP-GW) schedules DL transmissions to a UE A that is subject to cross-link interference from another UE B served by MP1, the scheduler in MP1 ensures that UE B is not allocated the same RBs as UE A.

When transmitting to MP1 on its upstream UL backhaul link 2611, MP2 can also transmit on its DL access links 2608 and downstream DL backhaul links 2612, provided the scheduler in MP2 ensures that these transmissions and the UL backhaul transmission scheduled by MP1 all occur on different isolated Tx beams or on different RBs. In addition, to prevent same-link interference to MP1, MP2 also ensures that the DL transmissions it schedules, and the DL transmissions scheduled by MN-RN (or MP-GW) are received by MP1 on different RBs or on different (isolated) Rx beams. Further to prevent cross-link interference between UEs, when MP2 schedules DL transmissions to a UE A that is subject to cross-link interference from another UE B served by MP1, the scheduler in MP2 ensures that UE A is not allocated the same RBs on the same OFDM symbols as UE B.

Mesh Network Scheduling with Time-Division Multiplexing

In a half-duplex mesh network, interference between RF nodes can be substantially avoided by dividing available OFDM symbols into 2 TDM groups (Even, Odd). The OFDM symbols in the even group are used for DL or UL transmissions that are scheduled by even-hop RF nodes (e.g., MN-RN or MP2 in FIG. 25), and the OFDM symbols in the odd group are used for DL or UL transmissions scheduled by odd-hop RF nodes (e.g., MP1). In one example implementation, the slot structure of 5G NR can be used to form the TDM frame. Assuming a TDM frame period of 4 slots, every 4th slot is available to schedulers in odd-hop RF nodes and the remaining 3 slots are available to even-hop RF nodes. Other symbol-level TDM frame structures may also be used.

In the symbols allocated to them, the schedulers in the RF nodes may independently and dynamically use the OFDM symbols for DL or UL transmissions as will be described in more detail later in the specification. When one RF nodes is transmitting on the DL (UL), and the neighbor RF node is receiving on the UL (DL) at the same time, cross-link interference may occur. When one RF node is receiving on the DL (UL) and another RF node nearby is transmitting on the DL (UL) same-link interference may occur. Finer TDM frame structures with additional TDM groups can be used to avoid cross-link interference by preventing simultaneous transmissions in opposite directions in neighboring RF nodes. As described earlier, a finer TDM frame structure may be used, where certain time resources (e.g., OFDM symbols or slots) are designated for DL or UL transmissions only. Such designated time resources may be for access link use only, or they may be for use on access and backhaul links.

In some implementations, the TDM frame structure may include 4 TDM symbol groups to multiplex different backhaul and access link transmissions, where each group consists of a set of consecutive symbols. As illustrated in the table below, in symbol group 0, MN-RNs may transmit on their DL backhaul and/or access links, and RF nodes with hop distance n=2 may receive on their UL backhaul and/or access links. In symbol group 1, RF nodes with hop distance n=1 may transmit on their DL backhaul and/or access links, and in addition MN-RNs may transmit on their DL access links and RF nodes with hop distance n=3 may receive on their UL access links. In symbol group 2, MN-RNs may receive on their UL backhaul and/or access links and RF nodes with hop distance n=3 may transmit on their DL backhaul and/or access links. Finally, in symbol group 3, RF nodes with hop distance n=1 may receive on their UL backhaul and/or access links, and in addition MN-RNs may receive on their UL access links and RF nodes with hop distance n=3 may transmit on their DL access links. The TDM frame structure shown in this example can be readily extended to mesh networks with more than 3 hops.

|  | Symbol Group 0 | Symbol Group 1 | Symbol Group 2 | Symbol Group 3 |
| --- | --- | --- | --- | --- |
| RF node n = 0 | DL Tx (BH + A) | DL Tx (A) | UL Rx (BH + A) | UL Rx (A) |
| RF node n = 1 | DL Rx (BH) | DL Tx (BH + A) | UL Tx (BH) | UL Rx (BH + A) |
| RF node n = 2 | UL Rx (BH + A) | DL Rx (BH) | DL Tx (BH + A) | UL Tx (BH) |
| RF node n = 3 | UL Tx (BH) | UL Rx (A) | DL Rx (BH) | DL Tx (A) |

An important advantage of the TDM frame structure described in the table above is that a receiving RF node A is always at least 2 hops away from a transmitting RF node whose transmission is not under the control of the scheduler in RF node A. This will reduce the amount of cross-link interference and same-link interference in the mesh network. In some implementations, the TDM frame structure may include additional symbol groups. For example, two additional symbol groups may be included, one for transmissions scheduled by even-hop RF nodes and another for transmissions scheduled by odd-hop RF nodes. These symbol groups can be used for dynamic TDD operation to increase multiplexing efficiency.

In some implementations, an additional set of symbols can be set aside to support periodic DL and UL reference signal or control signal transmissions. As we described earlier in this specification, in one example, $K \times L_{DL}$ symbols are set aside and divided into K groups with $L_{DL}$ symbols in each group, and each RF node is assigned to one of these K groups. RF nodes can transmit DL periodic reference and control signals only in the group of symbols assigned to them, and they can receive DL periodic reference and control signals (for example, SSB or NZP-CSI-RS) in the remaining $(K-1) \times L_{DL}$ symbols, based on active RRC configurations. Another set of $K \times L_{UL-1}$ symbols are divided into K groups with $L_{UL-2}$ symbols in each group, and each RF node is assigned to one of these K groups. RF nodes can transmit UL periodic reference signals (for example, SRS for channel estimation) in the group of symbols assigned to them, and they can receive UL periodic reference signals in the remaining $(K-1) \times L_{UL-1}$ symbols based on active RRC configurations. In implementations where MPs can transmit and receive on the DL and UL at the same time, it is possible to choose the same or at least overlapping symbols for the DL and UL reference signal transmissions. For example, an MP can transmit NZP-CSI-RS and SRS on the same symbol using the same spatial filter. A third set of $K \times L_{UL-2}$ symbols are divided into K groups with $L_{UL-2}$ symbols in each group, and each RF node is assigned to one of these K groups. RF nodes can receive UL periodic reference and control signals (for example, SRS for mobility management, SR or CSI reports) in the group of symbols assigned to them, and they can transmit UL periodic reference signals in the remaining $(K-1) \times L_{UL-1}$ symbols based on active RRC configurations.

The symbols set aside for periodic reference and control signal transmissions and receptions may overlap with the symbols used for dynamically scheduled transmissions (for example, PDSCH or PUSCH). In that case, dynamically scheduled transmissions can override periodic reference and control signal transmissions, and receivers will then only process the dynamically scheduled transmissions.

For half-duplex MPs, time resources designated for access and backhaul transmissions may be set aside only for even-hop or odd-hop MPs. For simplicity of the description, these extensions are not described further below, but is within the scope of this specification.

In some applications, it is desirable for all RF nodes to transmit (or receive) reference signals such as SSBs on their access links synchronously in the same OFDM symbol. For example, in mesh networks that use a single PCI, all RF nodes transmit SSBs synchronously on the same OFDM symbols. This would not be possible if even- and odd-hop RF nodes cannot transmit simultaneously. To allow transmission (or reception) by all RF nodes in the same symbol, certain symbol positions in the TDM frame are carved out for simultaneous DL (or UL) transmission on the access links. RF nodes may also utilize these OFDM symbols to schedule PDSCH or PUSCH shared data transmission on their access links.

In practice, to divide airlink resources available to RF nodes using TDM, a method is needed for determining the best TDM frame format and communicating the frame format to the RF nodes. In one method, the TDM frame format may be fixed based on advanced knowledge of factors such as the mesh network topology and the data demand. For example, when it is known that the DL+UL airlink resource demand at the MN-RN is twice that of the maximum DL+UL airlink resource demand of the 1-hop RF nodes, twice as many slots may be assigned to even-hop RF nodes vs. odd-hop RF nodes. When the mesh network topology and the airlink resource demand are known, it is possible to estimate the relative peak demand between even-hop and odd-hop RF nodes. In one example when the DL+UL airlink resource demand on the access link of all mesh points can be assumed to be the same, in a single-tree mesh network the relative demand between even-hop RF nodes and odd-hop RF nodes can be estimated as $N_t/(1+N_2)$, where $N_t$ is the total number of RF nodes under MN-RN and $N_2$ is the maximum number of RF nodes served by a single 1-hop MP. For example, when $N_t=12$ and $N_2=3$, even hop RF nodes are assigned 3 times as many slots as odd-hop RF nodes.

Figure 89:
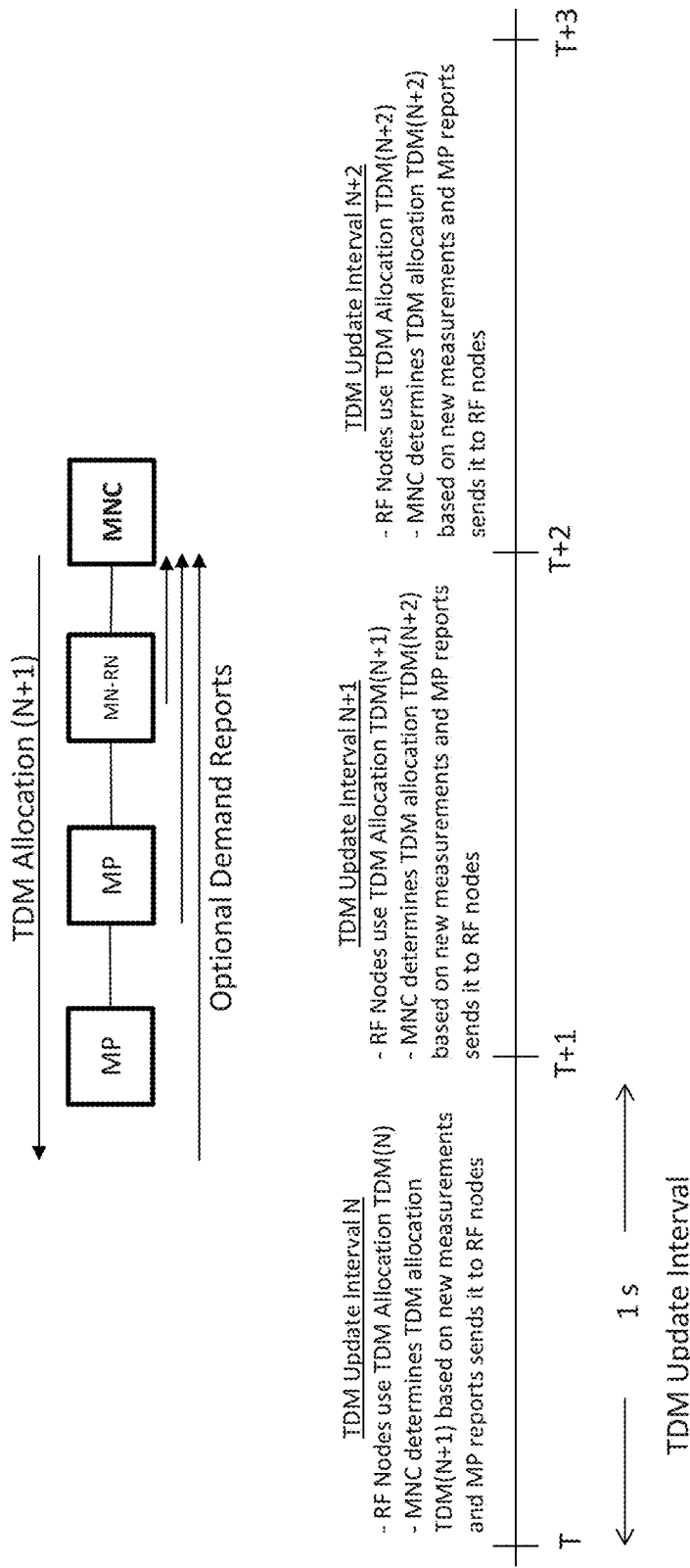

However, in most applications the mesh network topology and the relative airlink resource demand seen by different RF nodes will not be known in advance. In this case, in mesh network architectures that include an MNC, the TDM frame format can be determined by the MNC semi-statically. First, the current mesh network topology is always known at the MNC. In addition, the MNC (or MP-GW) has fairly accurate information on the past data usage of the RF nodes based on the amount of traffic traversing the MNC and this information can be used to estimate the future demand. In addition to data demand, airlink resource demand also depends on the achievable airlink rate. Optionally the MNC may receive additional information from RF nodes on their data demand, including information such as average data rate, average packet delay and average queue depth. The RF nodes can periodically communicate this information back to the MNC to assist in airlink demand prediction. The MNC also configures the periodic reference signals and assigns them to OFDM symbols that are set aside for simultaneous transmissions across a single cell mesh network. After determining the best TDM frame format and the set of OFDM symbols carved out for certain reference signal transmissions on the access links, the MNC sends a TDM frame format map to all RF nodes. The TDM format can be periodically updated based on new data collected at the MNC and the optional periodic data demand reports received from the RF nodes. In one example, the period of the TDM format updates may be chosen as 1 second, or 100 radio frames. As illustrated in FIG. 89, during the N'th update interval, all RF nodes use the TDM format determined and communicated by the MNC near the end of the previous (N−1)'th interval. When MNC also relies upon further feedback from RF nodes to determine the frame format, such feedback can be provided at the beginning of each interval. Once the RF nodes receive a new TDM allocation map near the end of time interval N, they can independently schedule transmissions for the N+1'th interval using the newly received TDM format. TDM frame formats can be updated at 10 ms radio frame boundaries. The period of TDM frame format updates may be in multiples of 10 ms radio frames.

Pipelined Scheduling

In the even-hop/odd-hop TDM scheduling method described above, it is not possible for an MP to communicate with its upstream RF node at the same time (on the same OFDM symbol) it is communicating with a UE on its access link or with a downstream RF node. This can substantially limit the achievable performance at the MP especially when it is capable of spatially multiplexing these transmissions. As we describe below, when even-hop and odd-hop RF nodes are allowed to schedule transmissions in the same OFDM symbol, dynamic coordination is required between RF nodes to substantially avoid interference scenarios.

In this technology, the scheduler in MP1 avoids scheduling conflicts using advance knowledge of the scheduling decisions of the MN-RN (or MP-GW) and the scheduler in MP2 avoids scheduling conflicts by using advance knowledge of the scheduling decisions of MN-RN (or MP-GW) and MP. When MP2 schedules transmissions for a time interval that lasts up to time t, it accounts for transmissions scheduled by one or more upstream MPs up to the same time t, and mutual interference between the nodes is avoided. So as long as MN-RN (or MP-GW) and MP make judicious decisions on use of resources, allowing enough resources for downstream MPs, a coherent scheduling strategy is thereby developed using pipelining. Since all DL and UL traffic to and from UEs being served by an MP go through the MN-RN (or MP-GW) and the upstream MPs and since all MPs report the buffer status for their upstream backhaul links to the upstream MP or MN-RN (or MP-GW), upstream MPs or MN-RN (or MP-GW) have some knowledge of the data traffic demand in downstream MPs. But upstream MPs and MN-RN (or MP-GW) don't know the instantaneous buffer status for traffic that is scheduled by their downstream MPs, because buffer status depends not only on data traffic demand (in bytes) but also on achievable data rates, which in turn depends on the RF quality of individual links. In this technology, additional feedback mechanisms are introduced for MPs to provide additional buffer status information to their upstream MPs and to the MN-RN (or MP-GW) on the RB demand in their access and downstream backhaul links. Upstream MPs and MN-RN (or MP-GW) use such feedback in their scheduling.

Further Details on Pipelined Scheduling

In this technology, we use a pipelined scheduling method to allow MN-RNs (or MP-GW) and their downstream MPs to share available airlink resources equitably and avoid interference. In this section we describe in more detail the operation of pipelined scheduling for a mesh network. Referring to the example mesh network shown in FIG. 26, pipelined scheduling starts at the MN-RN (or MP-GW). MN-RN (or MP-GW) 2602 schedules airlink resources for DL/UL transmissions on its backhaul links 2601, 2603 and access links 2613. When scheduling transmissions, MN-RN (or MP-GW) uses buffer status reports (BSR) and other feedback (CSI, HARQ ACK/NAK, SR) and reference signals (SRS) received from its downstream MPs MP1 2604 and MP2 2606 and from UEs on its access links 2613. For each downstream MP and UE, MN-RN (or MP-GW) learns the best Tx beam(s) to use when transmitting to an MP or to a UE based at least on CRI. Using reciprocity, MN-RN (or MP-GW) also determines from best Tx beam(s) the best Rx beam(s) to use when receiving from an MP or from a UE. MN-RN (or MP-GW) 2602 allocates airlink resources in time (OFDM symbols), frequency (RBs) and spatial beams.

Scheduling at MN-RN (or MP-GW)

On the DL, when MN-RN (or MP-GW) transmits to downstream MPs MP1 and/or MP2 and/or to one or more UEs at the same time (on the same OFDM symbols), the transmissions occur on different (isolated) Tx beams or on different RBs. An MN-RN (or MP-GW) with K TXUs transmits on up to K beams simultaneously. For DL transmissions on one or more OFDM symbols in a time slot n+k, where for example k=4, MN-RN sends to each scheduled downstream MP and UE a DL control indication (DCI) in time slot n. Each DCI is sent on the best Tx beam(s) as determined based on CRI feedback received from the recipient and it indicates the airlink resources (OFDM symbol positions, RBs, beam(s)) on which the recipient will receive the DL signal.

For avoidance of cross-link interference, when MN-RN (or MP-GW) schedules DL transmissions to UEs or to downstream MP MP2 (or MP1) using any of the Tx beams that MP1 (or MP2) has indicated it will receive strongly, it will send a DCI to MP1 (or MP2), which indicates the airlink resources used for these transmissions. Further, when MN-RN (or MP-GW) schedules DL transmissions to a UE A (victim UE) that is subject to cross-link interference from another UE B (aggressor UE) served by MP1 (or MP2), it will send a DCI to MP (or MP2), which indicates the RBs allocated to UE A and an identifier for UE B. DCI transmissions for resource allocation and cross-link interference can be combined in a single DCI.

On the UL, MN-RN (or MP-GW) may receive from downstream MPs MP1 and/or MP2 and/or from one or more UEs at the same time (on the same OFDM symbols) but on different (isolated) Rx beams or on different RBs. An MN-RN (or MP-GW) with K RXUs receives on up to K beams simultaneously. For UL receptions on one or more OFDM symbols in a time slot n+k, MN-RN (or MP-GW) sends to each scheduled downstream MP and UE a DL control indication (DCI) in time slot n. Each DCI is sent on the best Tx beam(s) as determined based on CRI feedback received from the recipient and it indicates the airlink resources (OFDM symbol positions, RBs, beam(s)) on which the MN-RN (or MP-GW) will receive the DL signal.

For avoidance of cross-link interference, when MN-RN (or MP-GW) schedules UL transmissions from UEs or from downstream MP MP2 (or MP) using any of its Rx beams that it will receive strongly from MP1 (or MP2), it will send a DCI to MP (or MP2), which indicates the airlink resources used for these transmissions. Further, when MN-RN (or MP-GW) schedules UL transmissions from a UE B (aggressor UE) that is subject to cross-link interference from another UE A (victim UE) served by MP1 (or MP2), it will send a DCI to MP (or MP2), which indicates the RBs allocated to UE B and an identifier for UE A. DCI transmissions for resource allocation and cross-link interference can be combined in a single DCI.

When the mesh network supports full-duplex communications, MN-RN (or MP-GW) schedules UL and DL transmissions to occur at the same time. Otherwise, DL and UL transmissions occur on different OFDM symbols.

Scheduling at 1-Hop MPs

Upon receiving DCI(s) in time slot n, the scheduler in MP (or MP2) schedules DL transmissions or UL receptions on its access links 2415 (or 2417) and downstream UL backhaul links 2405, 2407 (or 2409, 2411). To avoid interference, MP (or MP2) schedules transmissions only for OFDM symbols for which it has already received a DCI from MN-RN (or MP-GW). When scheduling UL receptions, MP1 (or MP2) schedules in such a way that it uses different OFDM symbols, different RBs or different (isolated) Rx beam(s) than the DL transmissions to MP1 (or MP2) scheduled by MN-RN (or MP-GW) on the backhaul link 2401 (or 2403). When scheduling DL transmissions, MP1 (or MP2) schedules in such a way that it uses different OFDM symbols, different RBs or different (isolated) Tx beam(s) than the UL transmissions from MP1 (or MP2) scheduled by MN-RN (or MP-GW) on the backhaul link 2401 (or 2403).

When the mesh network supports full-duplex communications, MP and MP2 can schedule transmissions and receptions at the same time. Otherwise, when MN-RN (or MP-GW) has scheduled a DL [or an UL] backhaul transmission to [from] M (or MP2), MP (or MP2) cannot schedule a DL (or an UL) transmission on its downstream backhaul or access links.

To avoid MN-RN-to-MP (or MP-GW-to-MP) cross-link interference, MP1 (or MP2) does not schedule any DL or UL transmissions on its access links 2415 (or 2417) or on its downstream backhaul links 2405, 2407 (or 2409, 2411) that conflict with the airlink resources indicated by MN-RN (or MP-GW) in the received DCI. To avoid UE-to-UE cross-link interference, MP1 (MP2) does not schedule any UL transmissions from any (aggressor) UE B on its access links 2415 (or 2417) on time/frequency resources indicated by MN-RN (or MP-GW) in the received DCI. MP1 (MP2) also does not schedule any DL transmissions to any (victim) UE A on its access links 2415 (or 2417) on time/frequency resources indicated by MN-RN (or MP-GW) in the received DCI. To transmit (or receive) K Tx (or Rx) beams simultaneously, MP1 (or MP2) will need at least K TXUs (or RXUs).

When scheduling UL transmissions, MP1 (or MP2) uses control channel feedback (e.g., CSI, HARQ ACK/NAK, BSR, SR) and reference signals (e.g., SRS) received from its UEs and from its downstream MPs MP3 2408, MP4 2410 (or MP5 2412, MP6 2414). Using channel reciprocity, UEs and downstream MPs determine the best UL Tx beam to use when transmitting to MP1 (or MP2) from the best DL Rx beam(s) they selected based on CSI-RS received from MP1 (or MP2). Also using channel reciprocity, MP1 (or MP2) also determines the best UL Rx beam to use based on the Tx beam(s) indicated in CSI reports by its UEs or by its downstream MPs. When channel reciprocity is not available, MP1 (or MP2) determines its preferred UL Rx beam(s) and the preferred UL Tx beam(s) for its UEs and downstream MPs based on SRS measurements and indicates the latter in a DCI.

Upon completing the scheduling, MP1 (or MP2) sends a DL control indication (DCI). Each DCI is sent on the best Tx beam(s) as determined based on CSI feedback received from the recipient. DCI indicates the airlink resources (OFDM symbol positions, RBs, beams) on which the recipient will receive the DL signal or transmit the UL signal. To prevent MP-to-MP cross-link interference, when MP1 2404 is allocated OFDM symbols and RBs on its DL [UL] backhaul link 2401 by the scheduler in MN-RN 2402 and when the scheduler in MP1 allocates OFDM symbols and RBs for UL receptions [DL transmissions] from [to] UEs or from [to] downstream MP MP4 (or MP3) using any of the Rx [Tx] beams that MP1 receives strongly from MP3 (or MP4) [MP3 (or MP4) receives strongly from MP], then it sends a DCI to MP3 (or MP4) that indicates the corresponding airlink resources. Similarly, when MP2 is allocated RBs for its DL [UL] backhaul link 2403 by the scheduler in MN-RN (or MP-GW) 2402 and when the scheduler in MP2 allocates OFDM symbols and RBs for UL receptions [DL transmissions] from [to] UEs or from [to] downstream MP MP6 (or MP5) using any of the Rx beams that MP2 receives strongly from MP5 (or MP6) [that MP5 (or MP6) receives strongly from MP2], then it sends a DCI to MP5 (or MP6) that indicates the corresponding airlink resources. To prevent UE-to-UE cross-link interference, when MP1 (or MP2) schedules UL [DL] transmissions from [to] an aggressor UE B [victim UE A] for a victim UE A [aggressor UE B] served by a downstream MP MP3 or MP4 (MP5 or MP6), then MP1 (MP2) indicates to MP3 or MP4 (MP5 or MP6) in a DCI the RBs allocated to UE A [UE B], along with an identifier of UE B [UE A].

Scheduling at 2-Hop MPs

Upon receiving a DCI from its upstream MP MP1 (or MP2), downstream MPs MP3 or MP4 (MP5 or MP6) schedule DL [UL] transmissions on their access links 2419 or 2421, (2423 or 2425) in such a way that they avoid the airlink resources (OFDM symbols, RBs and Tx beams) that conflict with the airlink resources indicated by MP1 (or MP2) in the DCI. MP3 or MP4 (MP5 or MP6) do not schedule transmissions for OFDM symbols for which they did not yet receive a DCI from MP1 (or MP2). By following the procedure described above, MN-RN and the MP transmit and receive without any substantial mutual interference.

When the mesh network supports full-duplex communications, MP3-MP6 can schedule transmissions and receptions at the same time. Otherwise, when MP1 has scheduled a DL [UL] backhaul transmission to [from] MP3 (or MP4), MP3 (or MP4) cannot schedule a DL [UL]transmission on its downstream backhaul or access links, and when MP2 has scheduled a DL [UL] backhaul transmission to [from] MP5 (or MP6), MP5 (or MP6) cannot schedule a DL [UL] transmission on its downstream backhaul or access links.

Resource Demand Feedback for Pipelined Scheduling

In the pipelined scheduling method described above, in half-duplex systems, the scheduling decisions of MN-RN 2402 affect whether downstream MPs 2404, 2406 will transmit or receive. When MN-RN schedules a DL transmission on the backhaul link 2401 (or 2403) to MP1 (or MP2) on certain OFDM symbols, MP1 (or MP2) cannot transmit in those OFDM symbols. Likewise, when MN-RN schedules a transmission from MP1 (or MP2) on the UL backhaul link 2401 (or 2403) on certain OFDM symbols, then MP1 cannot receive in those symbols. In an extreme example, if MN-RN decides to schedule DL backhaul transmissions to MP1 and MP2 in every OFDM symbol, MP and MP2 can never transmit on the DL and MP3-MP6 can never transmit on the UL. More generally in any system, half-duplex or full-duplex, any transmissions by MN-RN on any Tx beam that can be heard strongly by the downstream MP MP1 (or MP2), blocks MP1 (or MP2) from using the same RBs on corresponding Rx beams on its other links. In an extreme example, if MN-RN allocates all RBs on Tx beams that are received strongly by MP, then MP1 cannot schedule any UL reception on corresponding Rx beams in the same OFDM symbol. When MN-RN schedules DL (or UL) transmissions on its access links and no transmissions on its backhaul links to MP1 [or MP2] on certain OFDM symbols, then MP1 [or MP2] can schedule DL (or UL) transmissions on the same OFDM symbols, but if they schedule UL (or DL) transmissions, to avoid cross-link interference they must avoid certain combination of RBs and Rx beams indicated by MN-RN (or MP-GW) in a DCI. In addition to MN-RN's (or MP-GW's) impact on available airlink resources in MP1 and MP2, MP1 and MP2 also impact available airlink resources in MP3-MP4 and MP5-MP6, respectively.

Therefore, when scheduling DL transmissions, MN-RN (or MP-GW) ensures that the downstream MPs MP1 and MP2 will have enough available airlink resources to schedule UL transmissions on the same OFDM symbols. Similarly, when scheduling UL transmissions, MN-RN ensures that MP1 and MP2 will have enough available airlink resources to schedule DL transmissions on the same OFDM symbols. Also, when scheduling transmissions, MP1 or MP2 also ensure that MP3-MP6 will have enough available airlink resources to schedule their transmissions.

To assist MN-RN (or MP-GW) and upstream MPs in their scheduling decisions, downstream MPs send additional control feedback to the MN-RN (or MP-GW) and upstream MPs to indicate their airlink resource needs. For example, MP3, MP4 and MP5, MP6 indicate the DL/UL airlink resource demand on their access links 2419, 2421 and 2423, 2425 to their upstream MPs MP1 and MP2, respectively. For example, MP3 reports to MP1 the total UL RB demand on Rx beams that MP3 can hear strongly from MP1 and MP5 reports to MP2 the total RB demand on Rx beams MP5 can receive strongly from MP2. Likewise, MP1 and MP2 report to MN-RN (or MP-GW) the total airlink resource demand on their access and downstream backhaul links for each beam that they can hear strongly from MN-RN (or MP-GW). For example, if MP1 hears Rx beam index 3 strongly from MN-RN (or MP-GW), it reports the total UL RB demand and the total DL RB demand on that beam to the MN-RN (or MP-GW). A similar demand feedback mechanism is followed by other MPs. With this information, all nodes take into account the demand from their downstream MPs when making scheduling decisions.

In pipelined scheduling, the schedulers determine how much delay k to introduce between the OFDM symbol n+k when a transmission (or reception) occurs and the OFDM symbol n when the corresponding DCI is transmitted. This delay k depends on the processing time required by downstream MPs. Since downstream MPs cannot schedule transmissions that are assured to be free of interference to/from upstream MPs until they receive DCI, the delay k needs to be large enough to allow downstream MPs to schedule transmissions on the same OFDM symbol. However, when MN-RN (or MP-GW) or upstream MP determines that there is no risk of interference based on demand feedback received from downstream MPs, pipelined scheduling can be temporarily disabled, and downstream MPs schedule their transmissions and receptions irrespective of DCIs received from upstream MPs.

Control Channels and Reference Signal Transmissions in Pipelined Scheduling

In half-duplex mesh networks like the one shown in FIG. 26, control channel and reference signal transmissions must be coordinated to avoid interference. For example, when scheduling a DL backhaul or fronthaul transmission to a downstream MP, MN-RN (or MP-GW) must ensure that downstream MPs can transmit their required DL signals (e.g., SS Block, SIB1) in pre-determined OFDM symbols. In some embodiments of this technology this is achieved by introducing a known phase offset in the timing of these required DL transmissions between odd-hop and even-hop MPs. MN-RN (or MP-GW) and even-hop MPs ensure that their downstream MPs will be able to transmit the required DL signals when needed, by not scheduling a DL backhaul transmission in those OFDM symbols and by avoiding UL receptions in the combination of Rx beams and RBs that will be subject to cross-link interference from these DL transmissions by downstream MPs.

Figure 90:
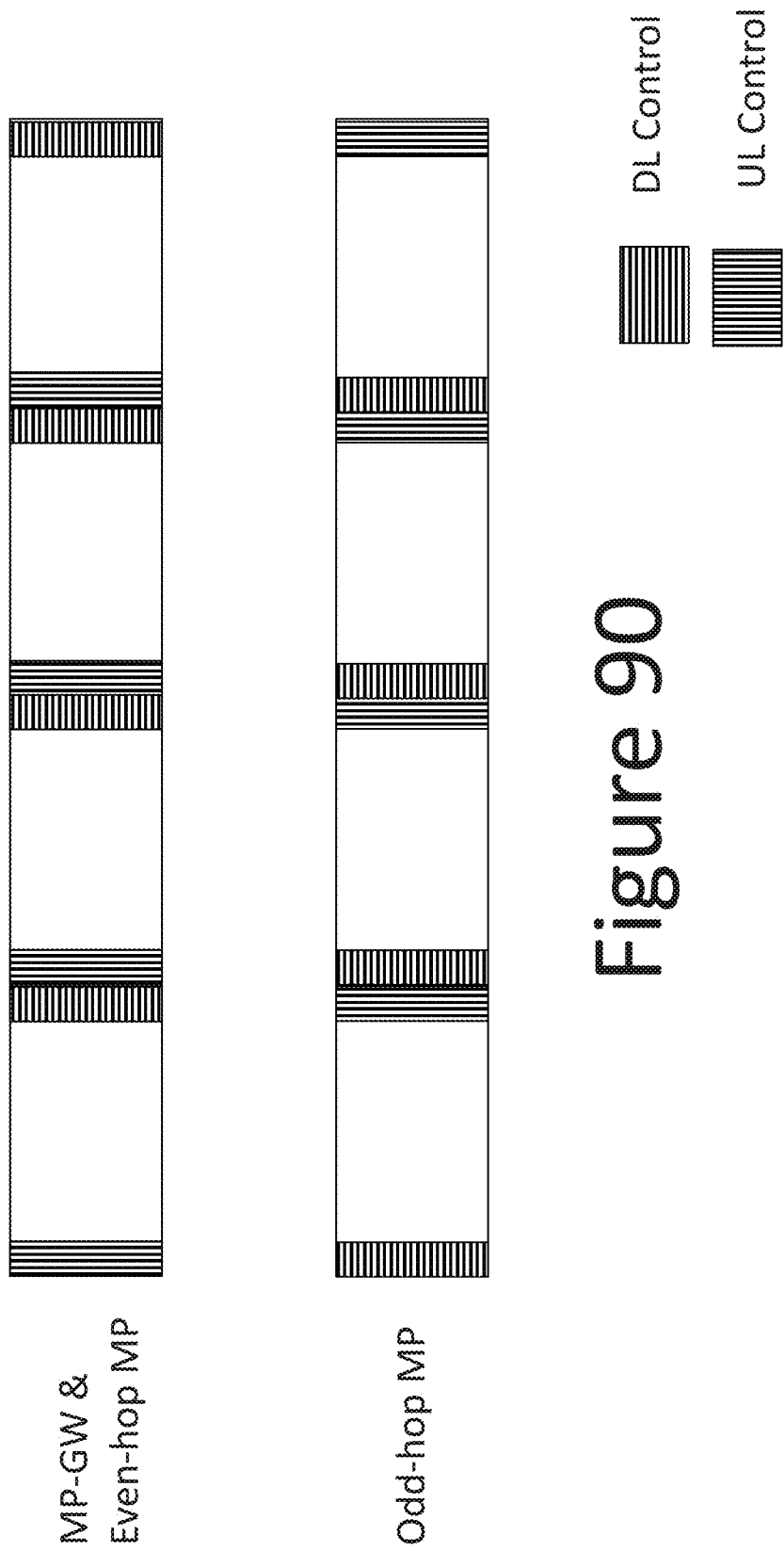

MN-RN (or MP-GW) and MPs also ensure that their DL control channel transmissions (e.g., DCI) are received by their UEs and downstream MPs without substantial interference by ensuring that downstream MPs are not transmitting on the same RBs on the same Rx beams. Also, when downstream MPs are receiving DL control channel transmissions from MN-RN (or MP-GW) or upstream MP, they utilize the same OFDM symbols to receive UL control information (CSI, Scheduling Request, Hybrid ARQ feedback) and reference signals (SRS) from their UEs or downstream MPs. In some embodiments of this technology, potential conflicts are avoided by aligning the OFDM symbol positions for DL and UL control channel transmissions in odd-hop and even-hop distance MPs as shown in FIG. 90. On OFDM symbols when MP-GW and even-hop MPs transmit DL control information to their UEs and downstream MPs, odd-hop MPs receive UL control information from their UEs and downstream MPs. On OFDM symbols when odd-hop MPs are transmitting DL control information to their UEs and downstream MPs, MN-RN (or MP-GW) and even-hop MPs receive UL control information from their UEs and downstream MPs. Since the information carried by control channels needs to be read immediately, airlink resources in OFDM symbols assigned to control channel transmissions are pre-allocated. When MP1 (or MP2) is receiving a DCI from the MN-RN (or MP-GW) on an Rx beam, it cannot simultaneously receive UL control information from a UE or downstream MP on the same RBs on the same Rx beam. Conflicts are avoided by pre-allocating available RBs (and possibly beams) between DL and UL control channel transmissions by odd-hop and even-hop MPs. In some implementations, the pre-allocation is configured in a semi-static manner. In some implementations, it is performed in a more dynamic manner and communicated in the Physical Layer using DCI or in the MAC Layer using Control Channel Elements. This way MN-RN (or MP-GW) and MPs independently transmit and receive DL/UL control information without any further coordination. This method will be compatible with UEs that support 5G NR as long as the standard has the flexibility to configure the position of DL and UL control transmissions on any OFDM symbol in a slot.

The schedulers in the MN-RN (or MP-GW) and in MPs also take into account CSI-RS transmissions. CSI-RS transmissions are periodic and occupy pre-configured REs in certain time slots. MN-RN (or MP-GW) and MPs configure their downstream MPs and their UEs to monitor certain DL CSI-RS transmissions. To avoid conflicts, even-hop and odd-hop distance MPs can schedule their CSI-RS transmissions on pre-assigned non-overlapping OFDM symbol positions. When MN-RN (or MP-GW and even-hop MPs are transmitting CSI-RS, odd-hop distance MPs receive CSI-RS, UL control or UL data in the same OFDM symbol. Conversely, when odd-hop MPs are transmitting CSI-RS, MP-GW and even-hop MPs receive CSI-RS, UL control or UL data in the same OFDM symbol.

In Architecture B with a central controller, the RRC in the MNC configures the MPs and MN-RNs for the SSB transmissions and PRACH receptions and configures the MPs and UEs for CSI-RS and SRS transmissions. These configurations specify the OFDM symbols intervals on which these transmissions occur. For example, the MNC can configure the CSI-RS transmissions on the DL to all occur in certain pre-configured OFDM symbol positions. Similarly, all UEs can be configured to transmit CSI-RS reports or SRS on the UL on certain OFDM symbols. Since such configurations apply across the entire single-cell mesh network, no reconfigurations are needed as UEs or MPs move.

MNC also configures UEs and MPs with CORESETs that indicate the OFDM symbols on which they may receive PDCCH transmissions on the DL. MNC may configure CORESETs associated with the same beam on the same OFDM symbol(s). MNC may configure CORESETs for MPs to occur on the same OFDM symbols as UL control channel transmissions (e.g., PUCCH and SRS), but on different Rx beams. When MP1 (or MP2) is receiving a DCI from the MN-RN on an Rx beam, it cannot simultaneously receive UL control information from a UE or downstream MP on the same RBs on the same Rx beam.

In half-duplex mesh networks, the DL/UL configuration of individual slots can be performed in a dynamic manner and communicated in the Physical Layer using DCI. This way MN-RN and MPs independently transmit and receive DL/UL control information without any further coordination.

The configuration of control channels and reference signals is described in more detail later in the specification.

Further Interference Management in a Mesh Network

The procedure described above provides interference protection among nodes that share the same backhaul path. However, interference can also occur between neighboring MPs and MN-RNs (or MP-GWs) that do not share a backhaul path in the mesh network, if they can hear each other. Such interference can be especially problematic when it is cross-link interference. As an example, cross-link interference occurs when an MN-RN (or MP-GW) or MP, denoted here as A, is receiving on the UL on certain time/frequency/Rx beam resources from a UE or an attached (downstream) MP, another MN-RN (or MP-GW) or MP, denoted here as B, with whom A does not share a backhaul path, is transmitting on the DL on same time/frequency resources and is received by A on the same Rx beam. UE-to-UE cross-link interference may also occur if, when a (victim) UE, denoted here as C, is receiving from an MP or MN-RN (or MP-GW) on a certain time/frequency/Rx beam resource, and another (aggressor) UE, MN-RN (or MP-GW) or MP, denoted here as D is transmitting on the same time/frequency resources and is received by C on the same Rx beam.

Using beam-based transmission and reception greatly reduces the frequency of such interference scenarios, but it does not eliminate it. Since MPs and MN-RN (or MP-GW) can listen to transmissions of SS/PBCH block and CSI-RS transmissions from all nearby MPs and MN-RNs (or MP-GWs), they can measure and identify sources of potential cross-link interference. The interference can then be avoided by allowing only one of the neighboring MPs to transmit on the interfering beams. This will be described further later in this specification.

Also, SRS is used for UEs to measure UE-to-UE cross-link interference and identify the source of the aggressor. To avoid such interference, MPs need to be informed of the SRS measurements of neighbor MPs.

Further Description of the Mesh Network

Figure 91:
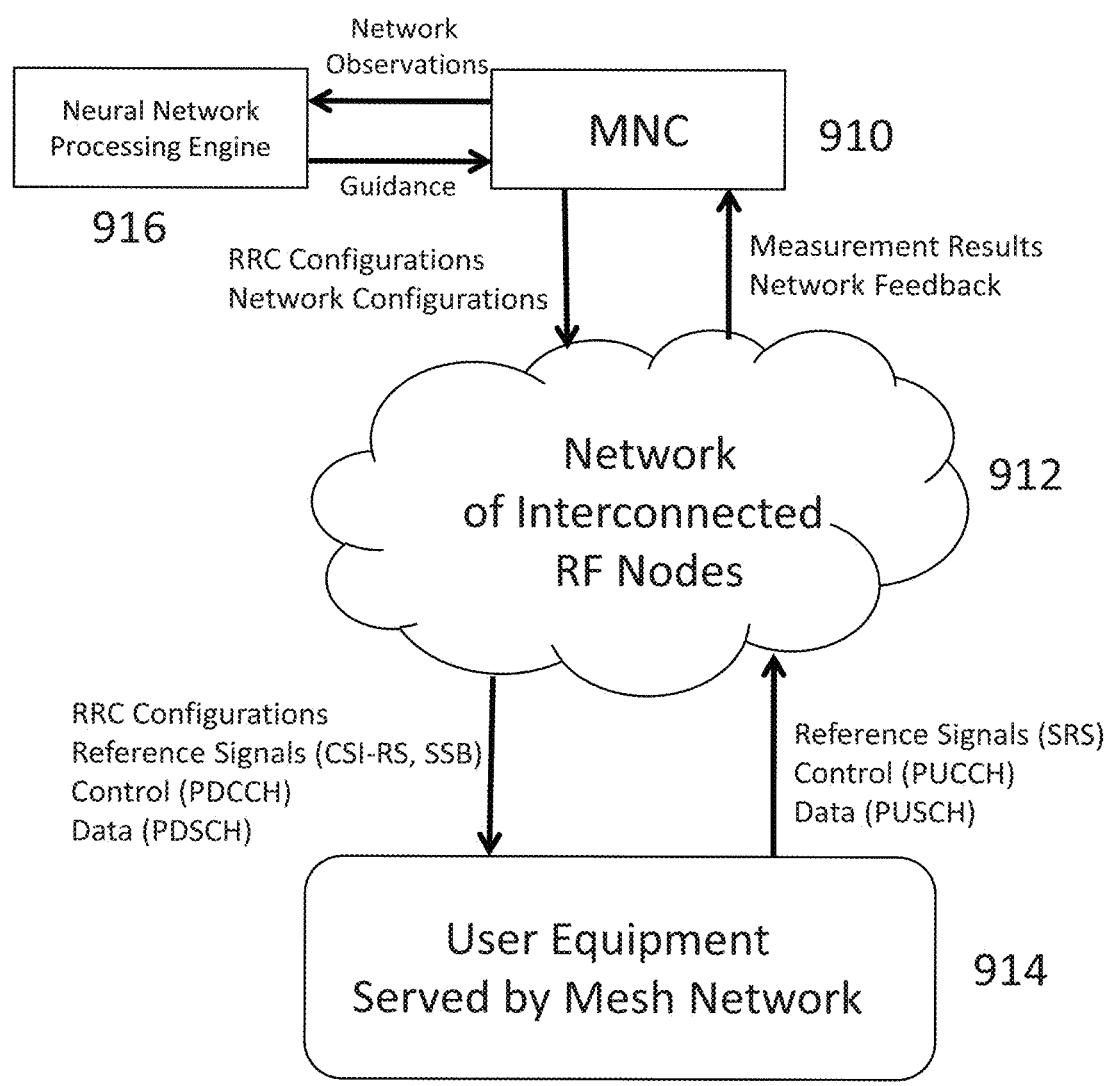

FIG. 91 shows a high-level description of the mm wave mesh network. At the top level is the MNC 910, which is serving a network of interconnected RF nodes 912. The MNC is responsible for the dynamic configuration of the RF nodes and the UEs to ensure a reliable, high-performance operation in the network. The RF nodes are responsible for reliable, high-performance and low-latency wireless communication between the mesh network and the UEs. They also maintain a reliable, high-performance and low-latency communication with the MNC via one or more other RF nodes. The RF nodes RRC configure the UEs based on instructions received from the MNC. Each RF node manages the resources that it controls. RF nodes provide measurement results and network feedback to the MNC to assist the MNC in providing reliable centralized control of the mesh network. The MNC also uses the assistance of a Neural Network Processing Engine (NNPE). The NNPE is a specialized node, designed to execute deep learning neural network algorithms. Deep learning neural network algorithms are used to achieve superior network performance in the mesh network, for example for beam tracking and scheduling coordination. We use the term "deep learning" broadly to include, for example, methods used to learn features and characteristics of signals without using task-specific algorithms. Deep learning methods include the use of supervised neural networks. Examples of neural networks are convolutional neural networks, recurrent neural networks, etc.

In the example described in this section, all RF nodes of the mesh network advertise the same PCI. Many of the technologies described in this section can also be used in a mesh network where RF nodes advertise different PCIs. We use the mesh network diagram shown in FIG. 23 to illustrate the operation.

Figure 92:
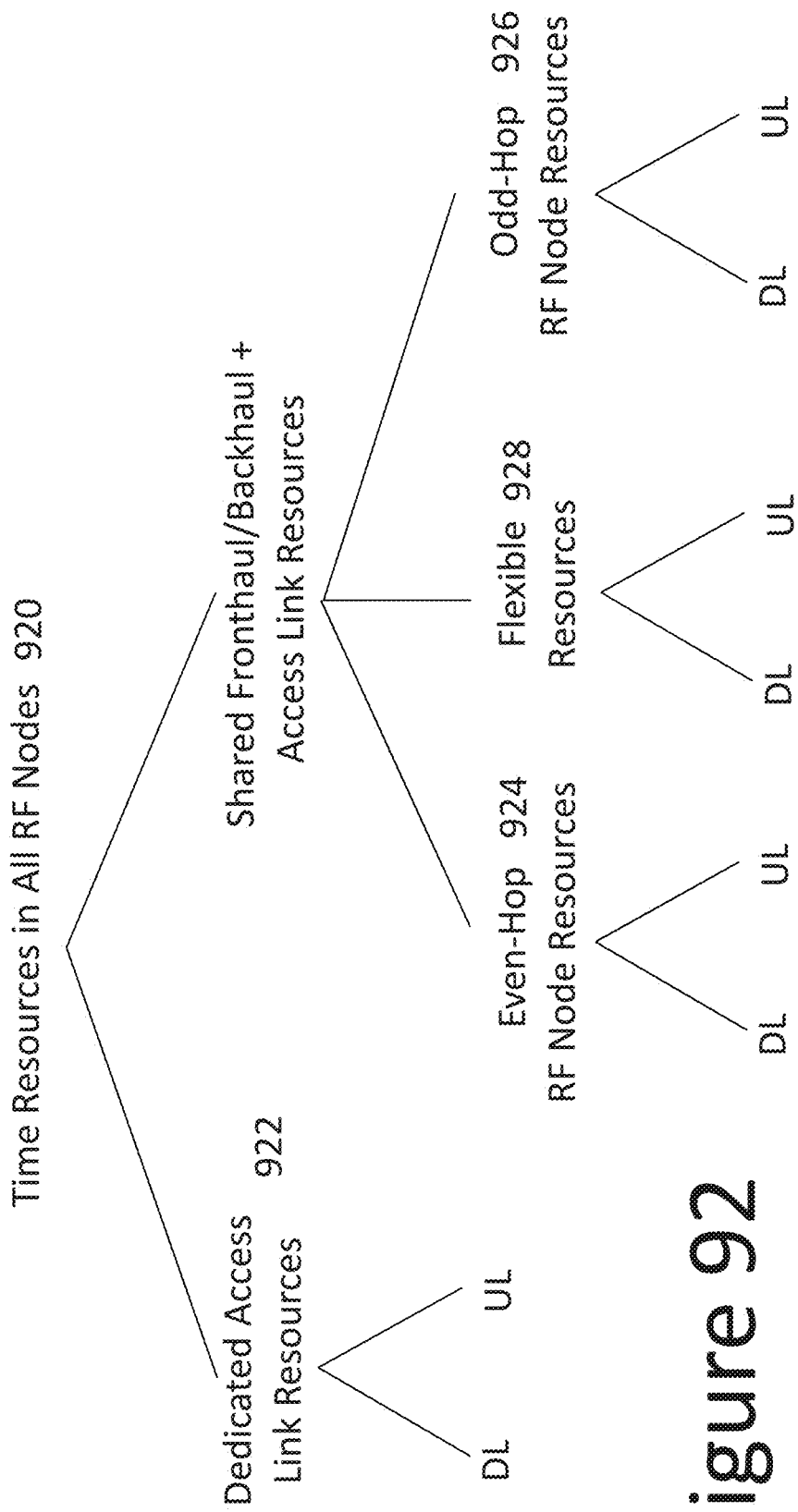

In this example, the mesh network utilizes both the TDM and the pipelined scheduling methods described earlier. The TDM method is preferred when the network is lightly loaded because of its low scheduling delay. The pipelined scheduling method is preferred when the network load is high because of its higher spectral efficiency. In this example, the TDM and pipelined scheduling methods co-exist. FIG. 92 shows the allocation of time resources 920 for access links 922 and the allocation of remaining time resources for backhaul/fronthaul and access links. The time resources allocated to backhaul/fronthaul and access links are further divided between even-hop 924 and odd-hop 926 RF nodes and the remaining time resources are left as flexible 928 for use by pipelined scheduling. In all cases, we assume that the MNC semi-statically updates the TDM frame structure used in the mesh network.

We start with a description of beam management in the mesh network.

Beam Management in the Mesh Network

Figure 93:
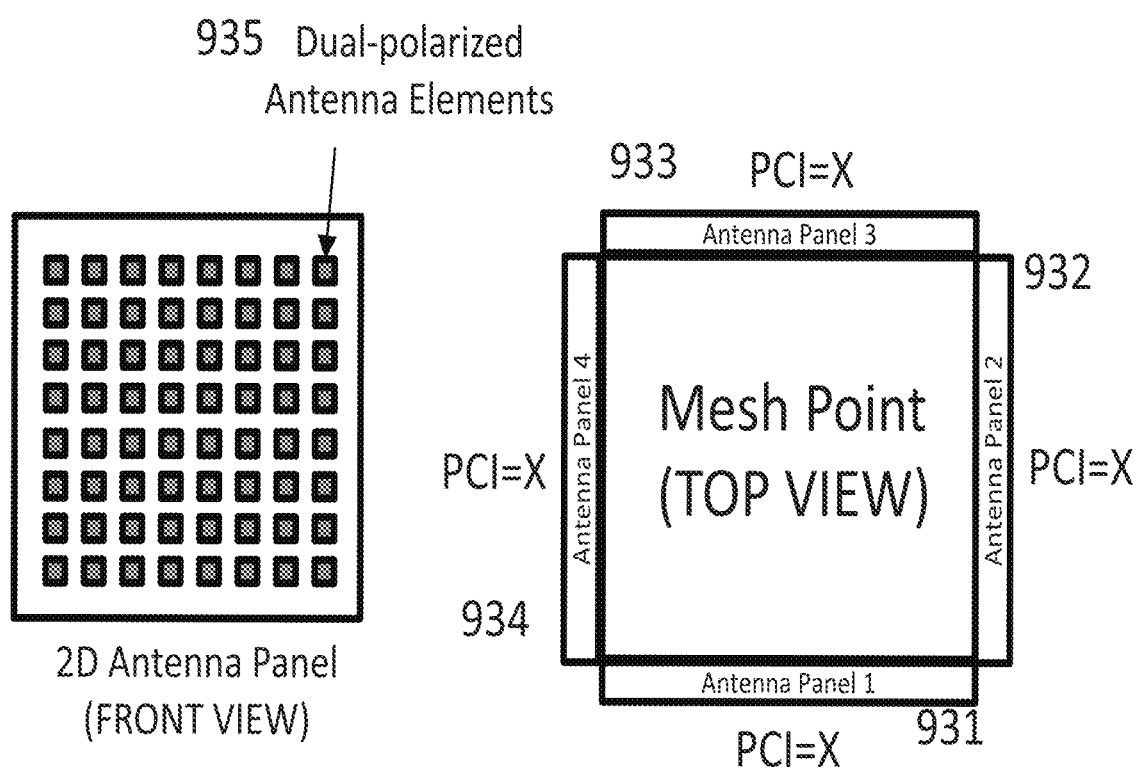
Figure 94:
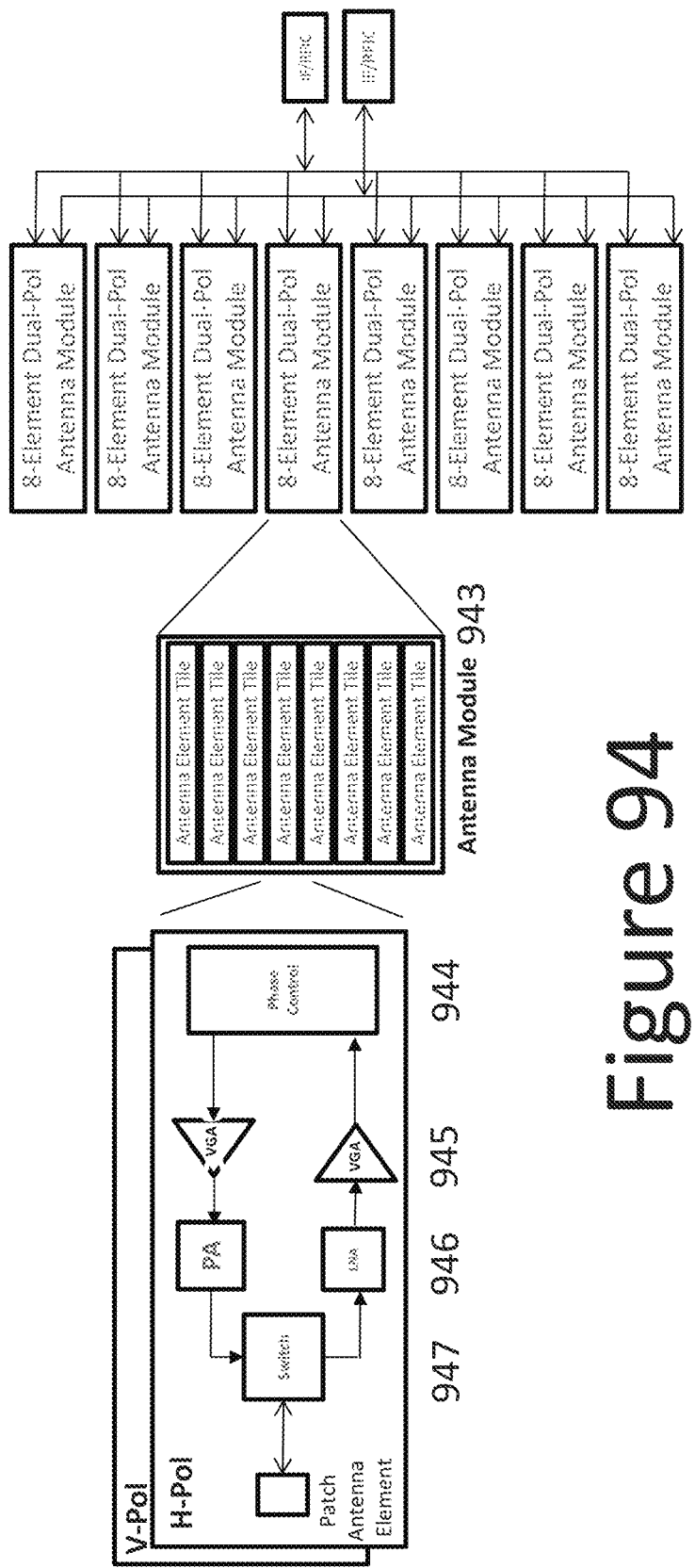

The hardware architecture of the RF nodes used in this example is illustrated in FIGS. 93 and 94. As shown in FIG. 93, the mesh network RF nodes have 4 antenna panels 931, 932, 933, 934 with 64 (two-dimensional 8×8) dual-polarized antennas 935 per panel. As shown in FIG. 94, each panel is driven by two TXRUs, one for each polarization. The TXRUs include 2 IF/RF ICs 941, 942 that drive eight antenna modules 943, where each antenna module consists of 8 antenna tiles. Each antenna tile includes, for each polarization, a phase/gain adjuster 944, 945 for beamforming, a Power Amplifier (PA)/Low-Noise Amplifier (LNA)

946 and a TDD switch 947. Each RF node can produce up to 64 analog Tx (or Rx) beams per panel and these beams are indexed from 1 to 64. The UEs are assumed to have two antenna panels with 32 (two-dimensional 8×4) dual-polarized antennas per panel and each panel is driven by two TXRUs. The UE can produce up to 32 analog Tx (or Rx) beams per panel and these beams are indexed from 1 to 32. All RF nodes are assumed to be half-duplex, but the methods that are described here are readily extendable to full-duplex RF nodes. (Later in this specification, we will describe a system that uses multi-panel full-duplex communications.) The RF nodes and the UEs use channel reciprocity to determine the channel characteristics in the transmit direction based on measurements taken in the receive direction (and vice versa).

In this example, all RF nodes transmit the same SSBs from all their antennas at the same time. SSBs are used primarily by idle UEs to connect during the initial attachment procedure or for UEs using LTE+NR dual connectivity to provide mesh network measurement reports to the LTE eNodeB before the secondary connection is established to the mesh network. In standalone deployments, the SSB period is chosen short enough (e.g., 20 ms) to support fast initial attachment, but not too short to cause excessive overhead. SSB transmissions are configured to occur on specific OFDM symbols. In non-standalone deployments that use LTE+5G NR dual connectivity, where initial access is performed on the LTE system, SSB period is made longer (e.g., 160 or 320 ms). In all RF nodes, the SSB symbol positions are pre-assigned to DL transmission, and furthermore the symbol positions for each SSB are configured for a different one of the 64 Tx beams providing a 64-beam sweep in a complete SSB burst. All RF nodes perform a synchronized 64-beam sweep across all antenna panels simultaneously transmitting the same SSB using the Tx antenna beam with the same beam index. The beam indices in neighboring RF nodes are chosen in such a way that the 4 beams transmitted simultaneously by the 4 panels have as little RF coverage overlap as possible. In the symbols assigned to SSBs, RF nodes can schedule other DL PDSCH access link transmissions on RBs not used by the SSB. RF nodes can transmit a different PDSCH signal from each antenna panel, but on symbols assigned to SSB such transmissions will use the Tx beam of the SSB. During initial beam selection, the UE determines the best Tx/Rx beam by trying out different Rx beam alignments. In the mesh network, the preferred RF node and antenna panel for a UE is determined when the UE sends PRACH as described earlier.

Additional OFDM symbol positions are set aside at each RF node for periodic 1-port CSI-RS transmissions on access links. Each CSI-RS resource occupies certain frequency resources on 1 OFDM symbol. L≥1 (e.g., L=4) consecutive symbols in designated slots are used to transmit L different 1-symbol CSI-RS resources that use the same Tx beam. These CSI-RS transmissions are scheduled to occur in a synchronized manner across all antenna panels and across all RF nodes at designated times. The period $P_{CSI}$ of 1-port CSI-RS transmissions are chosen short enough (e.g., 20 ms) to facilitate fast beam tracking. Each RF node is configured with L × 64 distinct CSI-RS resources per antenna panel such that it can provide a full beam sweep across all antenna panels. Since they each carry a different scrambling code, CSI-RS transmissions from different RF nodes/antenna panels are distinguishable by the UE. An RF node/antenna panel transmits the CSI-RS only if there is a UE that is configured to monitor that CSI-RS. Otherwise, the airlink resources allocated to CSI-RS are used to serve other purposes (e.g., PDSCH transmission on the access links). Some CSI-RS transmissions may occur on the same OFDM symbol as the SSB transmissions. In the special case L=1, there is only 1 CSI-RS resource for each Tx beam. In this case, the period $P_{CSI}$ can be made shorter (e.g., 5 ms). In an alternative configuration, CSI-RS transmissions from different RF nodes/antenna panels may occur on different frequency resources. Zero-power CSI-RS may be used in neighboring RF nodes/antenna panels to further minimize interference between CSI-RS transmissions that occur in the same symbol. Placing simultaneous CSI-RS transmissions on different frequency resources and using zero-power CSI-RS avoids potential interference, but also increases the overhead caused by CSI-RS transmissions. In half-duplex mesh networks, the symbol positions that are set aside for SSB, CSI-RS and SRS transmissions are used only for access link transmissions and are not used in backhaul/fronthaul transmissions.

The RRC in the MNC always selects M (e.g., M=6) candidate Tx beams to serve each UE. These M beams may be associated with one or more RF nodes, including the RF node currently serving the UE and one or more neighboring RF nodes. We will describe later a method for the MNC to select these K beams using deep learning. For each of the M selected beams, RRC configures the UE with L periodic CSI-RS resources that use the same spatial reference. This indicates to the UE that it can train its antenna array receiver for the corresponding Tx beam. In total the UE is configured with M×L CSI-RS resources. All configured CSI-RS resources use the same CSI-RS period $P_{CSI}$.

Figure 95:
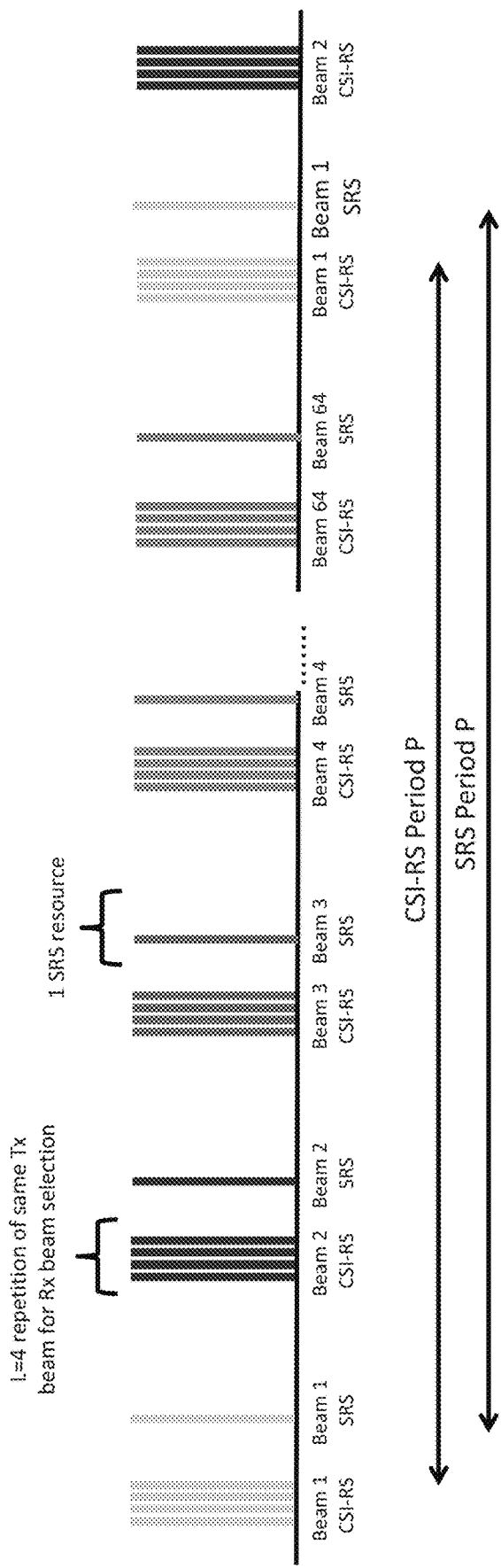

We now describe two alternative methods for the mesh network to learn and track the best beam pair for transmission and reception. In the first method, the UE is further configured for M periodic SRS transmissions, where each SRS transmission occupies 1 OFDM symbol in certain designated slots and $P_{SRS}$ represents the period of the SRS transmissions. $P_{SRS}$=i $P_{CSI}$, i=1, 2, . . . , is chosen as an integer multiple of $P_{CSI}$. Each SRS configuration includes a spatial reference to one of the M Tx beams used by the M×L configured CSI-RS resources. This establishes a one-to-one relationship between the Tx beams on which the CSI-RS resources are transmitted by the mesh network and the SRS resources transmitted by the UE. The spatial reference instructs the UE to use as its Tx beam the best Rx beam it selected for receiving the corresponding CSI-RS reference. In one example, we have L>1, $P_{SRS}$=$P_{CSI}$, and the M SRS transmissions are configured to occur shortly (or immediately) after the corresponding CSI-RS that provides the spatial reference. The timing of CSI-RS transmissions by the RF nodes and the corresponding SRS transmissions by the UE is illustrated in FIG. 95 in the special case M=64 and L=4. For each of the L CSI-RS transmissions that use the same Tx beam in the RF nodes, the UE tries a different one of L candidate Rx beams and selects the best Rx beam across its two antenna panels. It then uses the selected Rx beam/antenna panel as a Tx beam to transmit the corresponding SRS to the RF nodes. When L=1, $P_{SRS}$=K×$P_{CSI}$ (e.g., K=4, $P_{CSI}$=5 ms), the M SRS transmissions are configured to occur after K periods of CSI-RS transmissions. In this case, the UE tries K different Rx beams for the same CSI-RS resource in different successive instances of the CSI-RS.

In the method described above, the UE uses the configured CSI-RS resources for its own Rx beam tracking and uses reciprocity to determine its best Tx beam. It does not send any PUCCH report for beam management. Instead it sends SRS, which the mesh network uses to determine the best Tx beam for the mesh network. In an alternative method, the mesh network can learn the best Tx beam by configuring the UE to periodically report CRI/RSRP using PUCCH. In this case, the UE is configured to periodically send a measurement report to indicate the received signal power for the best few (e.g., 2) CSI-RS resources. In this case, one may set L=1, and these periodic measurement reports can be configured to occur with a period $P_{PUCCH}$=K $P_{CSI}$ (e.g., K=4, $P_{CSI}$=5 ms) and shortly after K periods of CSI-RS. The UE can perform Rx beam tracking by trying out different K different Rx beams during 4 CSI-RS periods.

One advantage of the SRS-based method described earlier is that the mesh network obtains a received signal power measurement for all of the M candidate Tx beams. When M is large, in the PUCCH-based method, the overhead of M reports can be high. As we show later, observing the received power level for many beams is advantageous and can be leveraged by a deep learning algorithm to improve the reliability of beam management. Also, if the Tx beam used for PUCCH were to have poor quality due to a sudden change in the channel, the PUCCH report may not be correctly received by the serving RF node. The SRS-based method does not reply upon the quality of an individual beam.

In half-duplex mesh networks, when all MPs and MN-RNs transmit CSI-RS at the same time, it is not possible to use the same transmissions for beam management for the backhaul/fronthaul links. For example, when an MP is transmitting CSI-RS on its access links, it cannot perform Rx beam selection based on the CSI-RS transmitted by its upstream RF node at the same time. To avoid this problem, the technology described in this specification uses two alternate methods. In the first method, even- and odd-hop MPs are configured with different periodic CSI-RS and SRS transmissions that occur in different OFDM symbols or slots. For example, in a first group of time resources even-hop MPs and MN-RNs transmit CSI-RS to their downstream MPs using a certain set of Tx beams and odd-hop MPs perform Rx beam training for these Tx beams. In a second group of time resources, odd-hop MPs transmit CSI-RS to their downstream MPs and even-hop MPs perform Rx beam training. In a third group of time resources, odd-hop MPs transmit SRS and/or PUCCH and even-hop MPs receive SRS and/or PUCCH. In a fourth group of time resources, even-hop MPs transmit SRS and/or PUCCH and odd-hop MPs receive SRS and/or PUCCH. The main drawback of this method is that when the MPs are moving, a change in the hop-distance of an MP from even-hop to odd-hop (or vice versa) will require a reconfiguration of the CSI-RS and SRS resources. When an MP changes its hop-distance, all downstream nodes also change their hop-distance. This can affect a large number of MPs. Therefore, this method can be used primarily in mesh networks where the mesh points are static.

In an alternative and in some cases preferred method, the technology of this specification uses dynamically triggered CSI-RS and SRS transmissions for beam management on the backhaul/fronthaul links. When the upstream node MP1 wishes to trigger Rx beam alignment by its downstream node MP2, it sends a DL Control Indication (DCI) to MP2 using one of the configured CORESETs. The DCI includes an index to a table, whose entries represent one or more configured CSI-RS resource sets, where each resource set comprises one or more CSI-RS resources and a timing offset per resource set that indicates the slot in which these resource sets will be transmitted. For example, M resource sets each with L=4 CSI-RS resources that use the same Tx beam, as shown in FIG. 95, can be triggered with a single DCI transmission to the downstream MP. In each slot, the downstream MP can train its Rx beam based on each of the M Tx beams. The symbols used by MP1 for CSI-RS transmissions need to be reserved in order to avoid any conflict with MP2. MP2 must not schedule any transmission in the same symbols, and if it schedules any receptions in the same symbols, such receptions should not occur in the same frequency resource or antenna panel as the CSI-RS transmissions received from the upstream RF node. Using pipelining upstream RF node MP1 schedules aperiodic CSI-RS transmissions on their fronthaul/backhaul links with a delay using DCI, and the downstream RF node MP2 avoids scheduling any conflicting transmissions in the same time resources. Subsequently, the upstream node MP1 sends another DCI to MP2, this time triggering an SRS transmission by MP2. UE can be configured with an SRS resource set with M SRS resources that use the M CSI-RS resources as a spatial reference. The upstream RF node MP1 can include a reference to this SRS resource set in the DCI that triggers the transmission of M SRS resources in the same slot. Alternatively, an aperiodic measurement report can be configured, and the DCI that is used to trigger the aperiodic CSI-RS transmission can be used to also trigger a measurement report on the uplink shared data channel PUSCH. In this case, the DCI trigger for SRS is not necessary.

In full-duplex mesh networks, when RF nodes can transmit and receive CSI-RS at the same time, it is possible to use periodic CSI-RS and SRS transmissions also on fronthaul/backhaul links. This may reduce the extra overhead of dynamically scheduled CSI-RS and SRS transmissions.

In the SRS-based methods, the RF node/antenna panel that transmitted the CSI-RS resource measures the power of the received SRS transmission and reports the received power level to the MNC. This process is repeated until the MNC receives the measurement reports for all M SRS transmissions.

The MNC then feeds the measurement results to the NNPE, which uses the new results and the past history to compute with a statistical recommendation (guidance) to the MNC indicating a likelihood for each of the candidate beams. More details on the operation of the NNPE are provided below. MNC uses the guidance received from the NNPE to update all RRC configurations related to beam management. This includes the CSI-RS and SRS resources used for beam management. The spatial reference tables for PDSCH, PDCCH and PUCCH transmissions. MNC also determines when to initiate a change in the serving RF node in a UE or MP handover. It may also signal to the serving RF node how to rank its candidate Tx beam. Serving RF node uses this information to select the Tx beam to use when sending a DCI to the UE over PDCCH and also when sending data to the UE over PDSCH.

Scheduling in the Mesh Network

We now describe an example of how data and reference signal transmissions are scheduled in the mesh network. To simplify the description that follows, we assume a 5G NR system with a 240 kHz OFDM subcarrier spacing for all channels. The technologies described in this example can be readily applied to mixed numerology systems that use a different subcarrier spacing for different channels. For example, data channels may use a subcarrier spacing of 120 kHz. At 240 kHz subcarrier spacing, a 10 ms radio frame consists of 160 slots with a slot duration of 62.5 microseconds. Each slot consists of 14 OFDM symbols. In this example, the MNC configures the RF nodes with a semi-static super frame structure. A super frame consists of $N_{SF}$ radio frames. When $N_{SF}$=16, the duration of a super frame is 160 ms. In every half radio frame certain symbol positions are dedicated to access links as described in more detail below. These symbols are used by RF nodes for periodic SSB, CSI-RS, SRS and PUCCH transmissions on the access links. The 2560 slots in a super frame are then divided into three groups: even-hop, odd-hop and flexible. Symbols in the "even-hop" slots, excluding the symbols dedicated for use on access links, are assigned to even-hop RF nodes, MN-RN and MP2. Only the schedulers in MN-RN and MP2 are allowed to schedule (DL or UL) transmissions in these slots. Symbols in the "odd-hop" slots, excluding the symbols dedicated for use on access links, are assigned to odd-hop RF node MP1. Only the scheduler in MP1 is allowed to schedule (DL or UL) transmissions in these slots. Symbols in the "flexible" slots are set aside for pipelined scheduling and can be used by any of the RF nodes, subject to the pipelining rules that are described further below. Finally, the MN-RN is given the additional flexibility to schedule transmissions on its access link in any slot. In one special case of the technology described here, all slots in a super frame are designated as flexible. In this case, pipelined scheduled is used in every slot. In another special case of the technology, no slots in a super frame are designated as flexible. The MNC controls the super-frame format and communicates it to RF nodes as described earlier. Especially, when the percentage of slots that are configured as flexible is small, it becomes more critical for the MNC to correctly predict the data demand and set the super frame structure accordingly. As in the case of beam management, MNC again uses assistance from the NNPE to better predict the data demand based on past measurements. Later we will describe an example where the NNPE uses a neural network for demand estimation.

In a non-standalone mesh network, the SSB period can be chosen to be long (e.g., 160 ms). In every super frame, up to 64 SSBs can be transmitted by all RF nodes in symbol positions {8, 12, 16, 20, 32, 36, 40, 44}+56xn, where n=0, 1, 2, ..., 7. All RF nodes are also configured with 64 periodic 1-symbol 1-port CSI-RS resources for beam management with a period of 5 ms. They occur in symbol positions {2-5} in slots n=48-59. The same symbol positions can also be used to configure 2-port CSI-RS for CSI reporting by the UEs; e,g, for the UE to report CQI/PMI/RI. So CSI-RS may occupy up to 4 symbol positions in 16 out of every 80 slots in every 5 ms half-frame. Approximately, 5.7% of all symbol positions are set aside for CSI-RS transmissions on access links. As we discussed earlier, an RF node does not transmit CSI-RS when no UE is configured to use it. In addition, symbol positions {10-13} in the last 16 slots of every 80-slot 5 ms half-frame are set aside for RF nodes to receive SRS transmissions from the UEs. Again, when no UE is served by an RF node configured for an SRS transmission in any one of these symbols, they can be used by the RF node for other UL transmissions on the access links. The same symbol positions {10-13} in the last 16 slots of every 5 ms half-frame are also available for PUCCH transmissions by UEs. For example, a UE may be configured with multiple periodic PUCCH resources that can be used by the UE to send scheduling requests (SR) and CSI reports that carry CQI/PMI/RI information.

MNC allocates all slots to be flexible, except slots 32-34 in every 80-slot half frame are dedicated to even-hop schedulers in MN-RN and MP2 and slot 35 is dedicated to the odd-hop scheduler in MP. MNC configures all UEs and MPs with 1-symbol CORESETs. CORESET monitoring period is chosen as 1 slot for all UEs and MPs.

Now we describe how the RF nodes schedule transmissions. First, all RF nodes can schedule DL or UL transmissions on their access links on any of the symbols dedicated to access link transmissions. Further, the MN-RN can schedule access link transmissions on any symbol as long as it does not schedule any backhaul transmissions to MP1 in the same symbol. All even-hop (odd-hop) RF nodes can schedule DL or UL transmissions in any slot that is assigned to them. Finally, all RF nodes can utilize the available OFDM symbols in "flexible" slots using pipelined scheduling, as described in further detail below.

Figure 96:
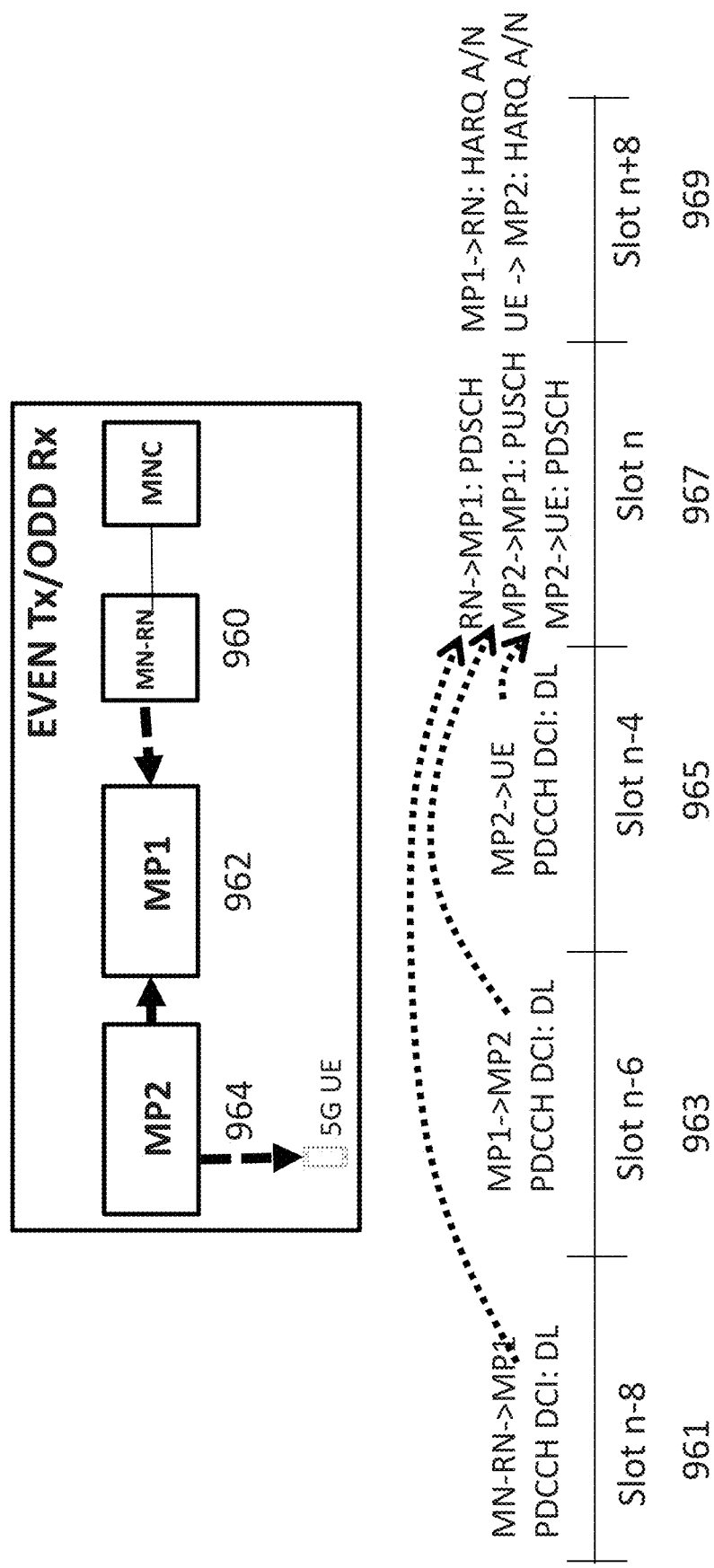
Figure 97:
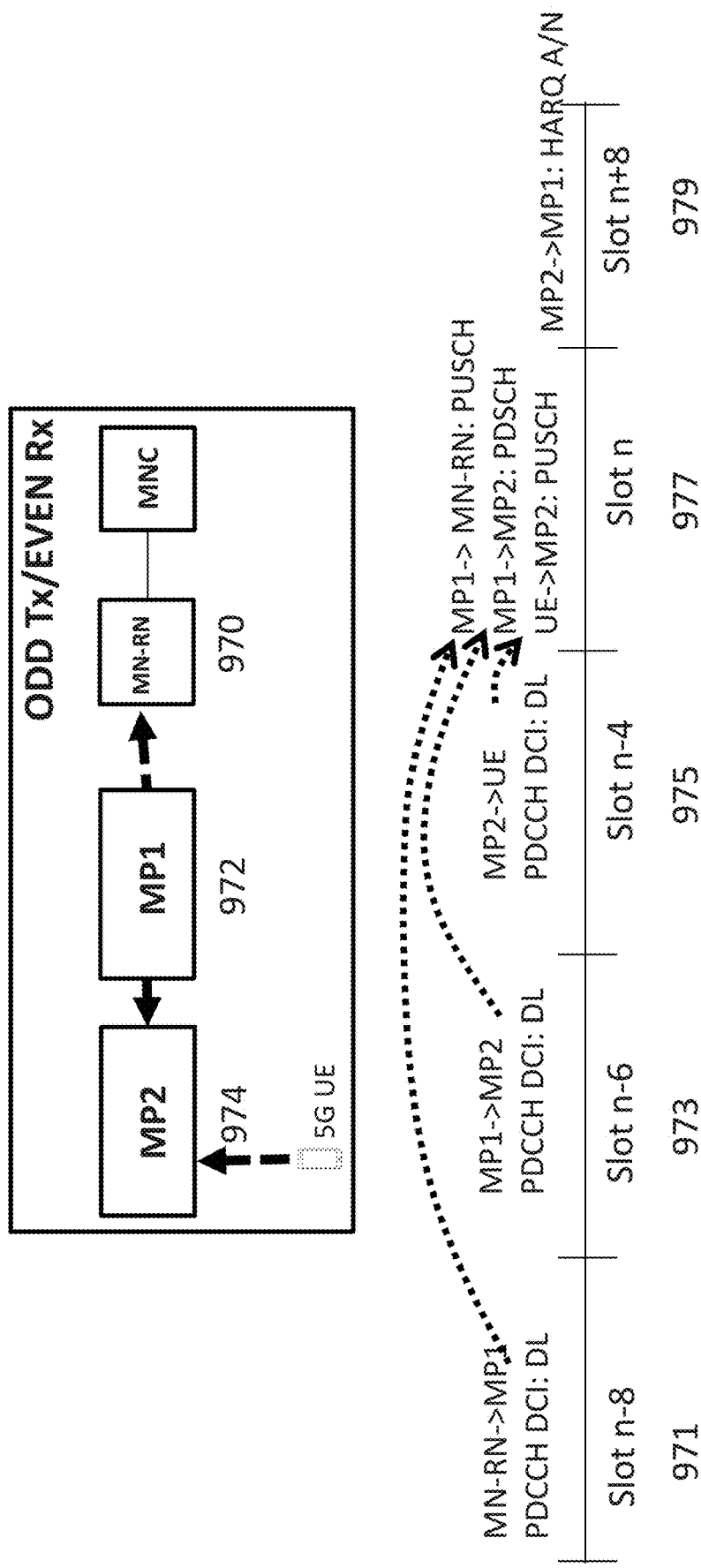

As shown in FIGS. 96 and 97, in pipelined scheduling all RF nodes may schedule transmissions on the same OFDM symbols. Pipelined scheduling introduces a small latency to allow nodes to indicate the transmission direction to downstream nodes. In the description that follows, a UE or an MP that receives a DCI for a DL transmission in time slot $k-k0_{DL}$ can demodulate the corresponding PDSCH transmission in time slot k. Similarly, a UE or an MP that receives a DCI with an UL grant for an UL transmission in time slot $k-k0_{UL}$ can transmit the corresponding PUSCH in time slot k. In this example, we will assume that $k0_{DL}=1$ and $k0_{UL}=4$. When an MP receives a DCI from its upstream RF node in time slot $n-\Delta_{DCI}$, it can schedule a DL/UL transmission by sending a DCI in time slot n. In this example, we assume that $\Delta_{DCI}=2$. Finally, when an MP receives a DL transmission from its upstream RF node, it is scheduled to send a HARQ feedback $k1_{DL}$ slots later. In this example, we assume $k1_{DL}=8$ slots. Based on the diagram shown in FIG. 96, to schedule a DL transmission on its backhaul link to MP1 962 in a flexible time slot n 967, the MN-RN 960 sends a DCI to MP1 in time slot n−8 961. To schedule an UL transmission on its backhaul link to MP2 964 in the same time slot n, MP1 sends a DCI in time slot n−6 963. Since MP does not receive a DCI for an UL backhaul transmission from MN-RN in time slot n−8, it can schedule the UL backhaul and access link transmissions in time slot n by sending a DCI to MP2 in time slot n−6. Since MP2 does not receive a DCI for an UL transmission from MP in time slot n−6, it schedules a DL transmission in time slot n by sending a DCI to the UE in time slot n−4.

Based on the diagram shown in FIG. 97, to schedule an UL transmission on its backhaul link to MP1 972 in a flexible time slot n 977, the MN-RN 970 sends a DCI to MP1 in time slot n−8 971. To schedule a DL transmission on its backhaul link to MP2 974 in the same time slot n, MP1 sends a DCI to MP2 in time slot n−6 973. Since MP1 does not receive a DCI for a DL backhaul transmission from MN-RN in time slot n−8, it can schedule the DL backhaul and access link transmissions in time slot n by sending a DCI to MP2 in time slot n−6. Since MP2 does not receive a DCI for a DL transmission from MP1 in time slot n−6, it can schedule an UL transmission in time slot n by sending a DCI to the UE in time slot n−4. In pipelined scheduling, downstream RF nodes can take into account the airlink resources allocated by the upstream RF nodes. When scheduling an UL (DL) transmission, they use different RBs or different (isolated) Rx (Tx) beams.

As shown in the example above, pipelined scheduling adds a 4 (7) slot delay in MN-RN for UL (DL) transmissions from (to) MP1. MN-RN can schedule transmissions on its access link without any delay. Pipelined scheduling also adds 2 (5) slot delay in MP1 for UL (DL) transmissions on its access and backhaul links. Pipelined scheduling does not add any delay in MP2. For a DL transmission from MN-RN to a UE served by MP2, the additional scheduling delay is 10 slots, or 1.25 ms.

Pipelined scheduling is very dynamic and spectrally efficient, because downstream MPs, such as MP1 and MP2 can schedule UL (DL) transmissions even when they are receiving on the DL (UL) from their upstream RF nodes.

In the example above, when MP is transmitting on the DL and MN-RN is receiving on the UL, cross-link interference may occur, as we discussed earlier. In order to reduce the complexity of the implementation, in this example, we did not use any cross-link interference mitigation techniques, like the ones we discussed earlier. The narrow beams used in this example naturally provide protection against cross-link interference. The cross-link interference protection techniques described earlier in the specification can be readily incorporated into this example. For example, instead of allocating slots 32-34 to schedulers in even hop distance RF nodes and slot 35 to odd-hop distance RF nodes, the symbols in 8 slots 32-39 can be grouped together to form 4 TDM symbol groups as we described earlier, such that cross-link interference and same-link interference between RF nodes with a hop distance of 0 or 1 between them are avoided. Later we will describe additional methods for avoiding cross-link interference in mesh networks.

In the example above, when an MP can schedule transmissions versus receptions in flexible slots is ultimately determined by the MN-RN, the RF node at the top of the tree. MN-RN has full flexibility in determining how available symbols are divided between DL and UL. Since the backhaul link between MN-RN and MP1 is naturally the most loaded link, having MN-RN determine the DL/UL allocations dynamically won't result in suboptimum performance most of the time. It is however possible for downstream MPs, in particular MP1, to provide buffer status on its access and downstream links to MN-RN to assist MN-RN. Such buffer status information can be used by the MN-RN to adapt the DL/UL partitioning based also on the relative DL versus. UL demand seen by downstream MPs.

In another example of scheduling in the mesh network, the semi-static TDM frame structure shown in FIG. 92 can be used without any flexible resources 928. The even-hop and odd-hop RF node time resources are further split semi-statically into DL and UL time resources, where DL and UL transmissions are scheduled on designated time resources, and DL time resources for even-hop RF nodes are combined with UL time resources of odd-hop RF nodes to create two symbol groups as shown in the table below. In this method, DL transmissions scheduled by even-hop RF nodes and UL transmissions scheduled by odd-hop RF nodes occur in time resources in symbol group 0, and UL transmissions scheduled by even-hop RF nodes and DL transmissions scheduled by even-hop RF nodes occur in symbol group 1. Pipelined scheduling is used to allow MPs transmit (or receive) on DL and UL on the same symbol. Even-hop RF nodes schedule DL (UL) transmissions to (from) their served MPs by sending them DCIs carried on PDCCH on time resources in symbol group 0 and odd-hop RF nodes schedule DL (UL) transmissions to (from) their served MPs by sending them DCIs carried on PDCCH on time resources in symbol group 1. The RF nodes sending the DCI ensure that there is sufficient delay between the time the scheduling DCI is transmitted and the time when the transmission occurs such that the served MPs can schedule their own transmissions.

|  | Symbol Group 0 | Symbol Group 1 |
| --- | --- | --- |
| RF node n = 0 | DL Tx (BH) | UL Rx (BH) |
| RF node n = 1 | DL Rx (BH) + UL Rx (BH) | DL Tx (BH) + UL Tx (BH) |
| RF node n = 2 | DL Tx (BH) + UL Tx (BH) | DL Rx (BH) + UL Rx (BH) |
| RF node n = 3 | DL Rx (BH) | UL Tx (BH) |

In another example, as shown in the table below, a TDM frame structure using three symbol groups 0, 1 and 2 may be used. According to the table shown below, MN-RNs may use the OFDM symbols in symbol group 0 to schedule DL backhaul transmissions and use OFDM symbols in symbol group 1 to schedule UL backhaul transmissions by the MPs they serve. MPs with hop distance n=1 may use OFDM symbols in symbol group 1 to transmit on the UL backhaul link based on a Downlink Control Indication (DCI) received from their serving RF node and also transmit on their DL backhaul link at the same time. Simultaneous transmission on upstream and downstream links by MPs with hop distance n=1 can be achieved with no extra delay. MPs with hop distance n=1 will receive UL transmissions from their served MPs with hop distance n=2 in symbol group 2. These transmissions will be scheduled by a DCI transmission in symbol group 1.

|  | Symbol Group 0 | Symbol Group 1 | Symbol Group 2 |
| --- | --- | --- | --- |
| MN-RN | DL Tx (BH) | UL Rx (BH) | — |
| MP n = 1 | DL Rx (BH) | DL Tx (BH) + UL Tx (BH) | UL Rx (BH) |
| MP n = 2 | UL Rx (BH) | DL Rx (BH) | DL Tx (BH) + UL Tx (BH) |
| MP n = 3 | UL Tx (BH) | — | DL Rx (BH) |

As we saw earlier, in some implementations the DL transmissions of all RF nodes in the mesh network are aligned, but the DL receptions of MPs may not be aligned with their UL receptions. In the example shown above, MPs receive on the DL and UL on different OFDM symbols. However, when the difference between the propagation delays on upstream and downstream backhaul links is smaller than the cyclic prefix length, it is possible for these transmissions to occur on the same symbol. In this case, it is possible for MPs to use pipelined scheduling according to the TDM frame structure with 2 symbol groups.

In the examples shown above, access link transmissions, not shown in the tables, can also occur in the shown symbol groups. In some implementations additional symbol groups dedicated to access link transmissions can be used.

In the technology of this specification, when the TDM frame structure forces the serving RF node to receive (or transmit) on a symbol k, a served MP may independently schedule a DL (or UL) transmission on the same symbol and still avoid causing interference. For example, in the three-symbol group TDM frame structure shown above, an MP, MP1 with hop distance 1 may schedule a DL transmission in a symbol k in symbol group 1 on a set of RBs, independent of any UL scheduling by its serving RF node, MP0, for the same symbol k, provided MP1 schedules the DL transmission on a Tx beam that will not cause strong interference to UL reception by MP0, as further described below.

When MP0 schedules an UL reception from an MP (for example MP) or a UE on a symbol k, and MP1 schedules a DL transmission on the same overlapping symbol k on overlapping RBs, the signal-to-interference ratio (SIR) at MP0's receiver can be written as $$SIR_0 = a_{UL}(j_0, i_0) / b_{DL}(j_1, i_0).$$

Here, $a_{UL}(j_0, i_0)$ represents the strength of the desired UL signal transmitted by the served UE or MP on Tx beam with index $j_0$ and received by MP0 on Rx beam with index $i_0$. Similarly, $b_{DL}(j_1, i_0)$ represents the strength of the interfering DL signal transmitted by MP1 on beam index $j_1$ and received by MP0 on the same Rx beam with index $i_0$. MP0 will learn an estimate of the quantity $a_{UL}(j_0, i_0)$ based on CSI reports or SRS transmissions received from their served MP or UE. The quantity $b_{DL}(j_1, i_0)$ can be estimated by MP using channel reciprocity. MP0 can configure MP to measure SSB or NZP-CSI-RS with Tx beam index $i_0$ at MP0, and MP1 will measure the reference signal using its Rx beam $j_1$, where $j_1$ corresponds to the index of the DL Tx beam MP1 will use to serve its MP or UE. MP0 may configure MP1 to send values representative of $b_{DL}(j_1, i_0)$ to MP0. Using $a_{UL}(j_0, i_0)$ and $b_{DL}(j_1, i_0)$, MP0 can determine $SIR_0$. Such measurements and reporting need to be configured for each Rx beam $i_0$ on which MP0 will receive an UL transmission and for each Tx beam $j_1$ on which MP will transmit on the DL. When MP0 determines that SIR is high for an UL reception from a served MP or UE, for all possible DL transmissions by MP1, it may schedule the UL reception with a low delay between the scheduling DCI and the actual UL transmission. In this case, MP1 may schedule a DL transmission without waiting for control signaling from MP0, and MP0 can still reliably receive the UL transmission from its served MP or UE. When MP0 determines that $SIR_0$ is low for an UL reception for at least one of the possible DL transmissions of MP1, it may schedule the UL reception with longer delay. MP1 will then avoid scheduling a DL transmission on overlapping time and frequency resources. When MP1 receives a DCI indicating that MP0 will be receiving an UL transmission that may be subject to high interference from a DL transmission by MP1, MP1 will not schedule that DL transmission on overlapping resources.

In another example, in the two-symbol group TDM frame structure shown above, an MP, MP with hop distance 1 may schedule an UL reception in a symbol k in the symbol group 0 on a set of RBs, independent of the real-time DL scheduling decisions of its serving RF node, MP0, provided MP1 schedules the UL reception on an Rx beam that will not be subject to interference from a DL transmission of MP0, as further described here. When MP1 schedules an UL reception on an Rx beam $j_1$ on a set of RBs on a designated symbol k, MP0 may be transmitting on the DL to MP1 and/or other MPs or UEs on a Tx beam with index $i_0$ on overlapping RBs on the same symbol k. In this case, MP1 can successfully receive the UL transmission if SIR given by $$SIR_1 = a_{UL}(i_2, j_1)/b_{DL}(i_0, j_1)$$

is greater than a threshold. Here, $a_{UL}(i_2, j_1)$ represents the strength of the desired UL signal transmitted to MP1 by its served UE or MP on a Tx beam with index $i_2$ and received by MP on the Rx beam with index $j_1$. Similarly, $b_{DL}(i_0, j_1)$ represents the strength of the interfering DL signal transmitted by MP0 on Tx beam with index $i_0$ and received by MP1 on the Rx beam with index $j_1$. MP1 will generally know the quantity $a_{UL}(i_2, j_1)$ based on CSI reports or SRS transmissions received from its served MP or UE. The quantity $b_{DL}(i_0, j_1)$ can be estimated by MP1 using channel reciprocity. MP0 will configure MP1 to measure SSB or NZP-CSI-RS with beam index $i_0$ that corresponds to a beam index that MP0 will use for a DL transmission, and MP1 will measure the reference signal using its Rx beam index $j_1$, which corresponds to the Rx beam it will use to receive an UL transmission from a served UE or MP. Based on these measurements, MP1 can estimate $SIR_1$.

When MP0 schedules the DL transmission to MP1, then MP1 also needs to evaluate the SIR given by $$SIR_2 = a_{DL}(i_0, j_0)/b_{UL}(i_1, j_0).$$

Here $a_{DL}(i_0, j_0)$ represents the strength of the desired DL signal transmitted by MP0 on Tx beam $i_0$ and received by MP1 on Rx beam $j_0$. The quantity $b_{UL}(i_1, j_0)$ represents the strength of the interfering signal transmitted by a served UE or MP on Tx beam $i_1$ and received by MP1 on Rx beam $j_0$. MP1 will generally know the quantity $a_{DL}(i_0, j_0)$ based on CSI measurements it performs for its serving RF node MP0. MP1 can learn the quantity $b_{UL}(i_1, j_0)$ by configuring its served UE or MP either for SRS transmissions or for CSI reporting. Based on these measurements, MP1 can learn $SIR_2$, and this can be repeated for all candidate UL transmissions to be scheduled by MP1. When $SIR_1$ and $SIR_2$ are above a threshold for all configured measurements, MP determines that it can receive DL transmissions from MP0 when it is also receiving UL transmissions from its served MPs and/or UEs. Both SIR conditions described above need to be satisfied for MP1 to schedule its UL receptions independent from the DL scheduling of MP0. Otherwise, either pipelined scheduling will be used, or the DL and UL receptions must occur on different airlink resources. To trigger the pipelined scheduling, MP1 can send an UL buffer status report to MP0 indicating the amount of data it has to serve on the UL using either pipelined scheduling or designated time/frequency resources.

In some implementations, in order to simplify the beam coordination procedure described above, the designated symbol group may exclude access link transmissions. In this case, only backhaul transmissions need to be considered in SIR measurements. In some other implementations, the designated symbol group may be configured only for backhaul transmissions between MP0 and MP1 and between MP1 and its downstream MP MP2. In this case, SIR measurements can be performed using beam measurements that are anyway needed for reliable backhaul communications and it is not necessary to configure any additional beam measurements to support the simultaneous DL/UL transmission (or reception) by MP1.

In the description that follows, the timing phases of simultaneous DL and UL transmissions (or receptions) of MP1 are assumed to be aligned. However, the methods described here can also be used in implementations where the timing phases of DL and UL transmissions (or receptions) are allowed to be misaligned. For example, MP1 may transmit on the DL on one antenna panel and transmit on the UL on another antenna panel using slightly different timing phases.

For beam management on the backhaul links, the RF nodes use dynamically scheduled CSI-RS and SRS transmissions as we described earlier. The MN-RN sends a DCI to MP1 to indicate the transmission of a previously configured CSI-RS resource set. MN-RN also sends a DCI to MP1 to request the transmission of a previously configured SRS resource set. MN-RN may send the DCI in multiple symbols using different Tx beams in order to increase the probability of reception. If MN-RN does not receive the SRS in the indicated slot, it may resend the DCI this time using different Tx beams. Similarly, MP1 sends a DCI to MP2 to indicate the transmission of a previously configured CSI-RS resource set, followed by a DCI to schedule the transmission of SRS. As in pipelined scheduling described above, MP1 schedules the transmission of the CSI-RS (SRS), only when it determines that it won't be receiving a DL (an UL) transmission from MN-RN in the same OFDM symbol.

Pipelined scheduling can also be used when MPs are attached to multiple upstream RF nodes. However, in this case it will be beneficial for MN-RNs to coordinate their scheduling to avoid conflicts. For example, if an MP is attached to two MN-RNs, and one MN-RN schedules a DL transmission on the backhaul link to the MP and the other MN-RN schedules an UL transmission on its backhaul link to the same MP, conflicts will arise. To avoid such conflicts, MNC can coordinate the DL versus UL transmissions by MN-RNs and semi-dynamically allocate the DL/UL split, which in turn specifies the DL versus UL transmissions for the entire mesh network.

Further Methods for Cross-Link Interference Avoidance

As described earlier, cross-link interference occurs when an RF node A is receiving from a UE A or an MP A on the UL when a neighboring RF node is transmitting to a UE B or MP B on the DL. When it occurs, cross-link interference can be severe because the signal transmitted by the aggressor (an RF node or UE) may be received by the victim node (another RF node or another UE) more strongly than the desired signal. Earlier, we described a method for avoiding crosslink interference between RF nodes that have a backhaul link between them using pipelined scheduling. However, in the mesh network of this specification cross-link interference may also occur between RF nodes that don't have a backhaul link. For example, two neighboring MPs may be attached to two different MN-RNs, yet they or the UEs they serve may cause cross-link interference to each other. Techniques such as listen-before-talk (LBT) and real-time coordinated scheduling have been suggested to reduce the effects of cross-link interference in traditional small cell networks. Introducing LBT into mesh networks would increase latency and it may lead to poor network performance under heavy load. Also coordinating scheduling across all network nodes in a mesh network in real time, either centrally by the MNC or in a distributed manner among the RF nodes, can significantly increase system complexity. In the technology of this specification, a robust probabilistic method is used for RF nodes to avoid cross-link interference without any real-time coordination.

In the mesh network, cross-link interference does not occur when RF nodes are either all transmitting on the DL or all are receiving on the UL. In half-duplex mesh networks, where MPs cannot transmit and receive at the same time, cross-link interference is avoided, when RF nodes may transmit only on the DL (or receive only on the UL) and only on their access links, or when only even-hop RF nodes may transmit (or receive) and only on the DL (or UL) on their access and backhaul links, or when only odd-hop RF nodes may transmit (or receive) and only on the DL (or UL) on their access and backhaul links and the MN-RNs may only transmit on the DL (or receive on the UL) and only on their access links. In multi-panel full-duplex mesh networks, which will be described later in this specification, cross-link interference can also be avoided, when RF nodes may transmit only on the DL (or receive only on the UL) but on different antenna panels. In full-duplex mesh networks, cross-link interference can be further avoided, when all RF nodes may only transmit only on the DL (or receive only on the UL).

In the frame structure used in the mesh network of this specification, certain time resources (e.g., OFDM symbols or slots) are designated for cross-link interference free communications. For example, in half-duplex mesh networks, certain time resources are designated for DL transmissions on the access links and certain other time resources are designated for UL transmissions on the access links. For example, in certain slots only access link transmissions may be allowed, and first few symbols in the slot may be designated as DL symbols and the last few symbols may be designated as UL symbols, with the remaining symbols in the middle left as flexible. In some applications, certain time resources are designated for DL transmissions by even-hop RF nodes on their access and backhaul links, and some other time resources are set aside for UL receptions by even-hop RF nodes on their access and backhaul links. In addition, certain time resources are designated for DL transmission by odd-hop MPs on their access and backhaul links and for MN-RNs on their access links, and certain other time resources are designated for UL receptions by odd-hop MPs on their access and backhaul links and by MN-RNs on their access links. In all these time resources, cross-link interference does not occur, since DL and UL transmissions do not occur at the same time. For example, in certain slots only odd-hop RF nodes may be allowed to schedule transmissions, and the first few symbols in the slot may be designated for DL transmissions and the last few symbols in the slot may be designated for UL transmissions and the remaining symbols may be left as flexible. Such partitioning of time resources can also be done across multiple slots. Cross-link interference will not occur in symbols designated exclusively for DL or UL transmissions.

In another example, in multi-panel full-duplex mesh networks where RF nodes can transmit and receive on different antenna panels at the same time, certain time resources are designated for DL transmissions and receptions by all RF nodes on their backhaul and access links, except for DL transmissions from the antenna panel used to receive backhaul transmissions from an upstream RF node. Further certain other time resources are designated for UL transmissions and receptions by all RF nodes on their backhaul and access links, except for UL receptions on the antenna panel used for backhaul transmissions to an upstream RF node. In addition, certain time resources are designated for DL transmissions (or UL receptions) by MPs on their access links. Again, in such time resources, cross-link interference is avoided, since DL and UL transmissions do not occur at the same time.

Figure 98:
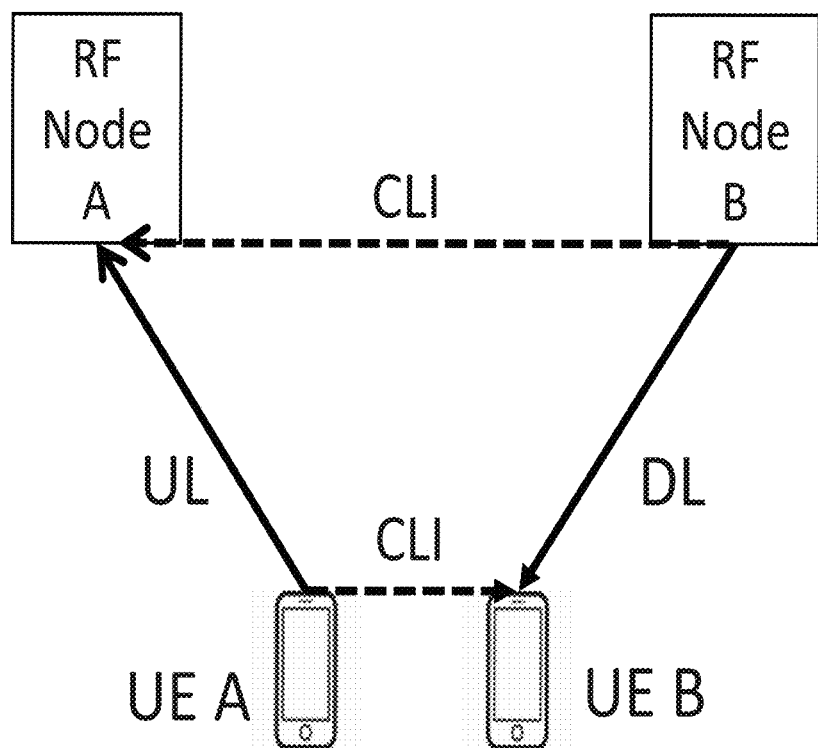

We now describe how RF nodes use available time resources that are free of cross-link interference probabilistically to avoid cross-link interference. As shown in FIG. 98, RF Node-to-RF Node cross-link interference may affect the quality of UL reception at RF node A 981 from a UE A (or MP A) 982 on an Rx beam A, when a DL transmission by RF node B 983 to a UE B (or MP B) 984 on a Tx Beam B is received strongly by RF node A on the same Rx beam A. Such cross-link interference may cause the data packet sent by UE A (or MP A) to RF node A to be received in error forcing a HARQ retransmission. When the information is retransmitted, same cross-link interference may cause additional HARQ retransmissions. In the same configuration, UE-to-UE cross-link interference may also occur when UE B 984 is receiving a DL transmission from RF node B 983, and the UL transmission from UE A 982 to RF node A 981 is received by UE B strongly on the Rx beam it is using to receive the DL transmission from RF node B. For cross-link interference to occur, RF nodes A and B must use different directions of transmission (DL and UL) on the same time and frequency resources. Further, cross-link interference occurs only when the RF nodes or the UEs are using a Tx-Rx beam pair that produces a strong interfering signal. In other words, the Tx beam of the aggressor must produce a strong signal when received by the Rx beam of the victim.

Figure 99:
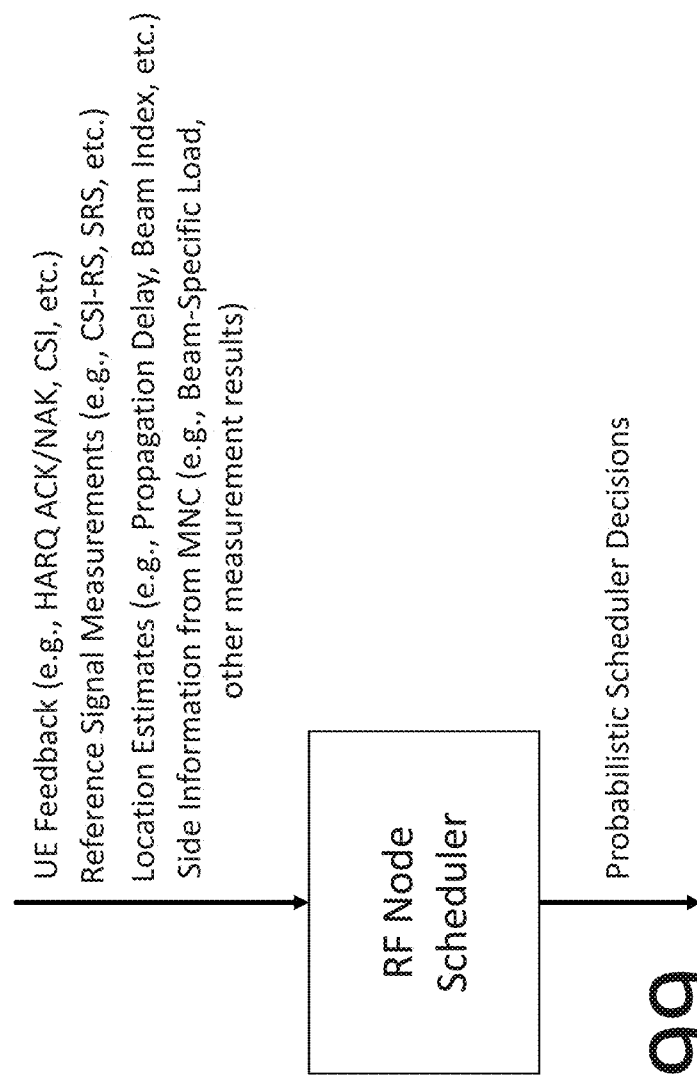

In order to keep the system complexity low, in one embodiment of the technology of this specification, the schedulers in RF nodes A and B avoid cross-link interference without coordinating their scheduling in real-time, as shown in FIG. 99. RF nodes A and B avoid cross-link interference, by computing for each scheduled UE (or MP) a probability $p_c$ for cross-link interference free transmission on designated time resources that are free of cross-link interference. In what follows, we use the term "cross-link interference-free transmission" to indicate a transmission that occurs on designated time resources that are free of cross-link interference. When the RF node has high confidence that cross-link interference is to occur, the probability $p_c$ will be high, and the RF node will select a cross-link interference free transmission with high probability. In the technology of this specification, RF nodes A and B compute the probability of cross-link interference free transmission p, as the sum of two probabilities, a probability $p_{c1}$ for RF Node-to-RF Node cross-link interference and another probability $p_{c2}$ for UE-to-UE cross-link interference. To determine $p_{c1}$, RF nodes A and B rely on beam measurements and measurement reports. Using the beam measurement procedure used between RF nodes as described earlier in this specification, RF nodes A and B can determine the strongest Rx beams that they can receive from each other based on CSI-RS and SRS reference signal transmissions. Reference signal transmissions are RRC configured by the MNC, and in the case of an MP, such configuration may be performed via the mesh network or via other means of communication between an MP and MNC (e.g., via the LTE network, as in the case of a dual-connected MP). An RF node that is scheduling an UL transmission may also use HARQ ACK/NAK determinations made by the RF node itself for past UL receptions from the same UE in computing the probability $p_{c1}$. In general, a NAK will increase the probability $p_{c1}$ for a cross-link interference-free transmission.

In computing the probability $p_{c2}$ for cross-link interference free transmission, RF nodes A and B consider the cross-link interference between their served UEs (or MPs). When UEs (or MPs) are capable of performing beam measurements to detect cross-link interference from neighboring UEs (or MPs), for example using SRS measurements, and report it to their serving RF node, RF nodes can use this information in determining the probability for cross-link interference free transmissions. To facilitate UE-to-UE cross-link interference measurements, all UEs and MPs served by an RF node, may transmit SRS on the same time-frequency resource, using the Tx beam they are currently using to transmit to their serving RF node, and all neighboring RF nodes may measure the total received power from these transmissions and report it to their serving RF nodes. For example, when a UE (or MP) reports that it is subject to cross-link interference from a neighboring UE when receiving from its serving RF node, the RF node will increase the probability for cross-link interference-free transmission when scheduling resources for a DL transmission to (or UL reception from) that UE. In the technology of this specification, it is not necessary for the victim UEs to identify the aggressor UEs served by neighboring RF nodes. Because of reciprocity, a UE that is a victim of cross-link interference when receiving on the DL may become an aggressor when transmitting on the UL. It is sufficient for each RF node to identify the UEs they serve that are likely victims or aggressors and take action to reduce the probability of cross-link interference when transmitting on the DL or on the UL.

In general, requiring all UEs to perform cross-link interference measurements and reporting can significantly increase the system complexity. Therefore, it is critical to support cross-link interference avoidance even when UEs (or MPs) are not capable of measuring and reporting cross-link interference from their neighbor UEs (or MPs). In this case, RF nodes may estimate the likelihood of UE-to-UE cross-link interference, for example, by estimating the position of their UEs (or MPs) within their coverage area. An RF node may estimate the position of a served UE (or MP) based on the propagation delay between itself and the UE (or MP), for example based on the timing advance, and the Tx/Rx beam index the RF node is using to serve the UE (or MP). When an RF node determines that its served UE is located away from neighboring RF nodes, it decreases the probability of cross-link interference-free transmission. An RF node that is scheduling a DL transmission may also use HARQ and CSI feedback received from the served UE (or MP) in computing the probability $p_{c2}$ for cross-link interference-free scheduling. In general, RF nodes will increase the probability of cross-link interference-free scheduling following the reception of HARQ NAKs for a previous DL transmission to the same UE (or MP).

Machine learning techniques like the ones described in other parts of this specification can also be used to produce the probabilities $p_{c1}$ and $p_{c2}$ based on the various inputs and measurements shown in FIG. 99. Machine learning algorithms may be trained offline and can be used to produce a mapping between the scheduler inputs and the probabilities in real time.

Once the scheduler has computed the probability $p_c = p_{c1} + p_{c2}$ for cross-link interference free transmission, it schedules the transmission on designated time resources for cross-link interference-free transmission with probability $p_c$. Otherwise, the transmission is scheduled on time resources where cross-link interference may occur. Given the probability $p_c$, the scheduler may select a pseudo-random number x in the interval [0, 1], and when $x < p_c$, it proceeds to schedule a cross-link interference free transmission.

Computing the probabilities $p_{c1}$ and $p_{c2}$ separately also allows the RF node to apply more precise power control to reduce the probability of cross-link interference when the transmission cannot be scheduled on designated cross-link interference-free time resources. When $p_{c2}$ is high and $p_{c1}$ is low, RF node will increase the transmit power of the UE in an UL transmission and reduce the applied power of the RF node in a DL transmission. When $p_{c1}$ is high and $p_{c2}$ is low, RF node will decrease the transmit power of the UE in an UL transmission and increase the applied power of the RF node in a DL transmission. Such precise power control based on the estimated likelihood of cross-link interference will help optimize overall system performance.

As we saw above, when a transmission is scheduled on a flexible time resource, cross-link interference can occur only if a neighboring RF node schedules a transmission in the opposite direction on the same time/frequency resource. In the technology of this specification, to reduce the probability of cross-link interference, N consecutive OFDM symbols in an interval are divided into $N_{DL}$ symbols at the beginning of the interval designated for DL transmissions and $N_{UL}$ symbols at the end of the interval designated for UL transmissions and $N - N_{DL} - N_{UL}$ flexible symbols in between, which can be used for DL and UL transmissions. RF nodes scheduling DL transmissions first utilize the symbols in the beginning of the interval and allocate UEs with highest values of $p_c$ frequency resources from the earliest symbols in the interval. Once the symbols designated for DL transmissions are all utilized, the RF nodes use the flexible symbols starting with the earliest symbol and working forward. No symbol designated for an UL transmission is used for a DL transmission. Similarly, RF nodes scheduling UL transmissions first utilize the symbols at the end of the interval again prioritizing UEs with high values of $p_c$ and utilize the flexible symbols when needed starting with the last flexible symbol and working backwards. No symbol designated for DL transmission is used to schedule an UL transmission. In this approach DL and UL transmissions can be scheduled by different RF nodes on the same flexible time resource when the total demand for DL and UL transmissions cannot be met with N symbols, or when the DL demand exceeds $N-N_{UL}$ symbols, or when the UL demand exceeds $N-N_{DL}$ symbols. This helps avoid cross-link interference when two neighboring RF nodes are lightly loaded.

Another condition for cross-link interference to occur is for two RF nodes to schedule transmissions in opposite directions (DL/UL) on the same frequency resource (or RBs). In some applications, when an RF scheduler allocates RBs to a UE (or MP) on flexible OFDM symbols that may be subject to cross-link interference, additional steps are taken to further reduce the probability of cross-link interference. In the method described above, an RF node may transmit on a flexible OFDM symbol only on the DL or the UL, but not both. Here on flexible OFDM symbols, RF nodes can schedule DL and/or UL transmissions. Available frequency resources (or RBs) are split into two non-overlapping subsets, one for DL and another for UL transmissions. When an RF node schedules DL transmissions on a flexible symbol, it allocates RBs from the DL set to UEs or MPs who are most likely to be subject to cross-link interference and uses RBs from the UL set only when it cannot meet the DL demand using the RBs in the DL set. Similarly, when an RF node schedules UL transmissions on a flexible OFDM symbol, it allocates RBs from the UL set to UEs or MPs who are most likely to be subject to cross-link interference and uses RBs from the DL set only when it cannot meet the UL demand using the RBs in the UL set. To allow for frequency diversity, the DL and UL sets can be formed by interlacing; for example, even-numbered RBs may be assigned to the DL set, and odd-numbered RBs may be assigned to the UL set. The number of RBs in the DL and UL sets can be chosen based on the expected DL and UL resource demands.

The two methods described above can be combined. In an N-symbol interval, the frequency resources in the $N-N_{DL}-N_{UL}$ flexible symbols in the middle of the interval can be partitioned into a DL set and an UL set, but this time different size sets can be used in each symbol. For example, the number of DL resources which cover all RBs in the symbols designated for DL transmission can be gradually reduced reaching zero at the first symbol designated for UL transmission.

To determine which UEs are most likely to be subject to cross-link interference, the RF node scheduler may use the probability of cross-link interference-free transmission ($p_A$), which is computed as we described earlier. In pipelined scheduling, when an RF node is scheduling both DL and UL transmissions in the same OFDM symbol, it will allocate the RBs in the DL set first to the UE (or MP) who among all UEs (or MPs) that are scheduled for a DL transmission have the highest $p_A$ value, and it will allocate the RBs in the UL set first to the UE (or MP) who among all UEs (or MPs) that are scheduled for a UL transmission have the highest $p_A$ value. This RB allocation method is repeated until all UEs are scheduled.

Cross-link interference avoidance can also be used in conjunction with pipelined scheduling, where an MP receives on the DL from an upstream RF node and at the same time receives on the UL from a UE or a downstream RF node without any interference. However, when scheduling the UL transmission from the UE or the downstream RF node, the MP may apply the cross-link interference avoidance method described above, by avoiding (probabilistically) the scheduling of a UE or downstream MP that is likely to be subject to cross-link interference.

Deep Learning Using a Neural Network Processing Engine (NNPE)

In the mesh network we described above, the MNC has critical responsibilities in beam management and scheduler coordination. MNC uses the services of an NNPE to improve its performance in these areas. Other components of the system that we are describing may also make use of deep learning techniques to improve the efficiency and other operational characteristics of the system. In making use of such deep learning techniques these components may rely on a separate NNPE or may have the deep learning capabilities embedded within the components or can acquire the deep learning assistance in other ways.

Deep Learning in Beam Management

First it is critical for the MNC to reliably select the M best candidate Tx beams on the mesh network for each UE and MP and configure their reference signals accordingly. If the M candidate Tx beams selected by the MNC don't include the best Tx beams, RF link quality will deteriorate, user experience will degrade and even connectivity may be lost. In the procedure described above, the MNC can observe the quality of M Tx beams based on measurements received from the RF node(s). But in mobile mm wave communications, the quality of Tx beams can change suddenly. Therefore, in each time interval, the MNC needs to predict, based on past and current observations, which Tx beams are most likely to be needed in the next time interval. This is a difficult problem that cannot be readily solved using traditional linear prediction techniques. In the technology of this specification, we use nonlinear deep learning to help the MNC predict the best candidate Tx beams for each UE or MP. In the example described below, we use the SRS-based beam management, but the technology can also be readily applied to beam management based on PUCCH reports.

Figure 100:
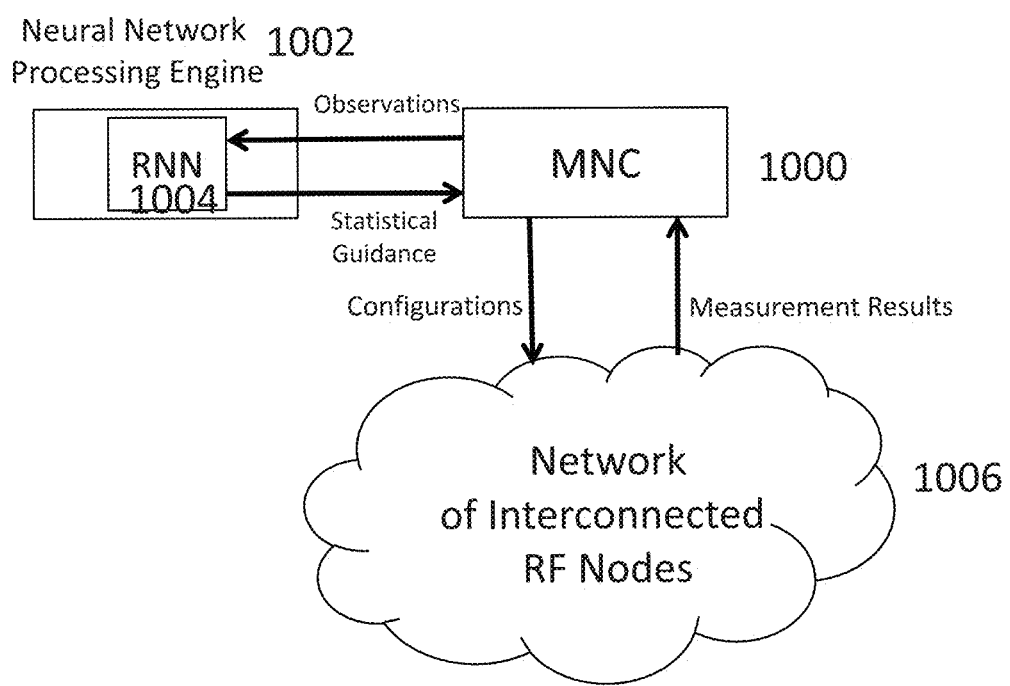

Let $z(t)$ be an unknown sequence of $N \times 1$ (e.g., $64 \times 1$) sparse vectors that represent the signal quality of N candidate transmit (Tx) beams, where $t=0, 1, 2, \ldots$ is a discrete time index. Each time instant t corresponds to $M \leq N$ (e.g., $M=6$) SRS measurements received from the RF nodes for the M Tx beams currently configured for the UE or MP. Let T be the beam configuration update period (e.g., $T=128$) and $t=nT$ represent the beam configuration update instants, where $n=0, 1, 2, \ldots$. At every time instant t, the MNC 1000, shown in FIG. 100, provides the NNPE 1002 a new set of M measurements. The Recurrent Neural Network (RNN) 1004 in the NNPE processes each new set of M measurements as they arrive and produce a statistical guidance (a probability vector) to the MNC at time instants nT. At times $t=nT$, based on the statistical guidance received from the NNPE, the MNC selects a new set of M Tx beam indices $A(n)=\{i_1(n), i_2(n) \ldots, i_M(n)\}$, where $1 \leq i_k(n) \leq N$, for use during the next time interval $nT < t \leq (n+1)T$. When $A(n)$ is different from the previous value $A(n-1)$, MNC updates the reference signal configurations in the mesh network RF nodes 1006 and/or UEs (not shown in FIG. 100) based on the newly selected Tx beam indices. For good performance, we want the M selected Tx beams to capture the largest entries of z(t) in the next time interval.

The new observation x(t) used by RNN at time instant t is an N×1 vector with M non-zero values that correspond to the measured values of z(t) on the M Tx beams configured for the previous interval (n−1)T<t≤nT. In matrix formulation, we can write $$x(t)=B(n)z(t), (n-1)T<t\leq nT,$$

where B(n) is an N×N diagonal beam selection matrix with diagonal elements $$b_{jj}(n) = 1, \; j = i_k(n)$$
$$= 0, \text{ elsewhere.}$$

Here i(n) is the k'th element of the set A(n).

At each iteration at time instant t, we use the RNN to estimate an N×1 probability vector p(n), which statistically represents the "goodness" of the N candidate Tx beams in the next interval nT<t≤(n+1)T. The probability vector is then used to select M beams for use in the next update interval. Performance (loss function) of the RNN in the nth interval is defined as $$L(n)=\Sigma_{nT<t\leq(n+1)T}(z(t)-x(t))^2.$$

Alternatively, the following maximum-likelihood cross-entropy loss function may be used.

$$L(n)=-\Sigma_{1\leq i\leq N}\Sigma_{nT<t\leq(n+1)T}(y_i(t)\log p_i(n)+(1-y_i(t))\log(1-p_i(n))),$$

where $y_i(t)=1$, if beam i is in the top M beams, and $y_i(t)=0$, otherwise.

To illustrate the operation of the RNN in an example, the forward propagation rules of an RNN are provided below.

At each time instant t, using the N×1 observation vector x(t) observed in the current time instant t, RNN updates the RNN hidden state as follows:

$$a(t)=b+W\,h(t-1)+U\,x(t),$$

$$h(t)=\tan h[a(t)]$$

where b, W and U are RNN parameters (to be learned during training), and h(n) is a hidden state matrix.

At time instants t=nT, RNN obtains the N×1 probability vector p(n) as follows:

$$o(n)=c+V\,h(nT)$$

$$p(n)=\text{softmax } o(n),$$

where c and V are additional RNN parameters to be learned during training. The N×1 vector o(n) represents an unnormalized log probability distribution and the N×1 vector p(n) represents a true normalized probability distribution and the k'th element $p_k(n)$ of p(n) is an estimate of the probability that the k'th Tx beam is the best beam to use in the next interval, given all past observations {x(0), x(1), . . . , x(t−1)}.

The NNPE forwards the probability vector p(n) it computes for each connected UE and/or MP to the MNC. Using the N×1 probability vector p(n), the NNPE forms the ordered index set A(n+1)={$i_1(n+1)$, $i_2(n+1)$ . . . , $i_M(n+1)$}, using the indices of the M largest entries of p(n), and forwards p(n) and A(n+1) to the MNC. Based on the statistical guidance received from the NNPE, MNC may update the reference signal configurations for the UE and/or MP. In the next interval, the RF nodes provide the MNC with a new set of M measurements in every time instant nT<t≤(n+1)T. MNC forwards these measurements to the NNPE and process that we described above repeats.

The parameters of the RNN are pre-trained using simulation models and then trained in the field after the mesh network is deployed. During training, the MNC configures the UEs and/or MPs with reference signals to measure all N candidate beams. The SRS measurement results received from the RF nodes for all N beams are fed by the MNC into the NNPE to train the RNN. During training, RNN selects at times t=nT the Tx beam set A(n) to optimize the loss function defined above. RNN determines the best set of parameters U, W, V, b and c that would produce the best estimate for Tx beams for use in the next interval using a gradient method.

In the example described above, we used a basic RNN forward propagation cell. In practice, other RNN cells may be used. For example, RNN structures that use Long-Short-Term Memory cells can be utilized. An RNN using an LSTM cell can be specified by defining: (1) the format of the input x(t) to the LSTM cell, (2) the format of the output p(n) of the LSTM cell, and (3) the loss function L(n). As in the case of a basic RNN cell, the parameters of an LSTM cell are learned using training data z(t). A wide variety of approaches to deep learning for the RNN and for other deep learning components of the system may be used for beam management, demand estimation, and other purposes.

Deep Learning in Demand Estimation

In the scheduling method described above, in order to correctly determine the TDM super frame format, the MNC needs to predict the data demand in future time intervals. When the predicted demand differs significantly from the actual demand, system performance will suffer in heavy load scenarios as RF nodes will be unable to meet the demand. In order to improve the accuracy of such demand prediction, in the technology described in this specification, the MNC uses the NNPE, or other deep learning structures.

As an example, the MNC 980 continually observes the DL demand on the access links of each RF node in every 10 ms radio frame and sends this information to NNPE at the end of each radio frame instant t=0, 1, . . . , . NNPE 982 in return provides a statistical guidance to the MNC once every T radio frames at time instants t=nT. MNC uses this information to update its demand estimate to use in the next K radio frames and after receiving from NNPE similar demand estimates for all RF nodes, it may update the TDM super frame format used in the mesh network based on the new demand estimates. The DL demand vector x(t) is a scalar value that represents the measured demand in radio frame t. A special form of an Recurrent Neural Network (RNN) 984 that uses Long-Short Term Memory (LSTM) cells is used to estimate a quantized version x'(t) of x(t) at times t=nT using the following model equations. In the equations that follow, c(t) represents the long-term memory and h(t) represents the hidden state of an LSTM cell.

$$c(t)=\sigma(W_1 x_k(t)+U_1 h(t-1))+\sigma(W_2 x_k(t)+U_2 h(t-1))\tan h(W_3\,x_k(t)+U_3\,h(t-1));$$

$$h(t)=\sigma(W_4 x_k(t)+U_4 h(t-1))\times\tan h(c(t)).$$

The RNN output is computed at times t=nT as follows:

$$p(n)=\text{softmax}(U_5 h(nT)).$$

Here σ(x) is the sigmoid logistic function and softmax is a function that maps a vector of arbitrary real values to a Q-dimensional probability vector of real values in the range (0, 1) that add up to 1. The dimension Q of the probability vector corresponds to the number of pre-selected quantized demand values. To simplify the notation, we left out any bias terms that may be added to the formulas above. The dimensions of the long-term memory vector c(t) and the hidden state vector h(t) are determined through experimentation.

The demand estimate is determined as the expected value of the quantized demand values using the probability vector p(n). The various matrices used in the LSTM cell and the RNN are learned in an off-line training procedure using backpropagation algorithm. The following loss function is minimized during training:

$$L(n) = -\Sigma_{nT \leq t \leq (n+1)T}(y_i(t)\log p_i(n) + (1-y_i(t))\log(1-p_i(n))),$$

where $y_i(t)=1$, if $x(t) \in Q_i$, where $Q_i$ is the quantization region of the i'th quantized demand value $x_i'$, and $y_i(t)=0$, otherwise.

Multi-Attached MPs

Figure 101:
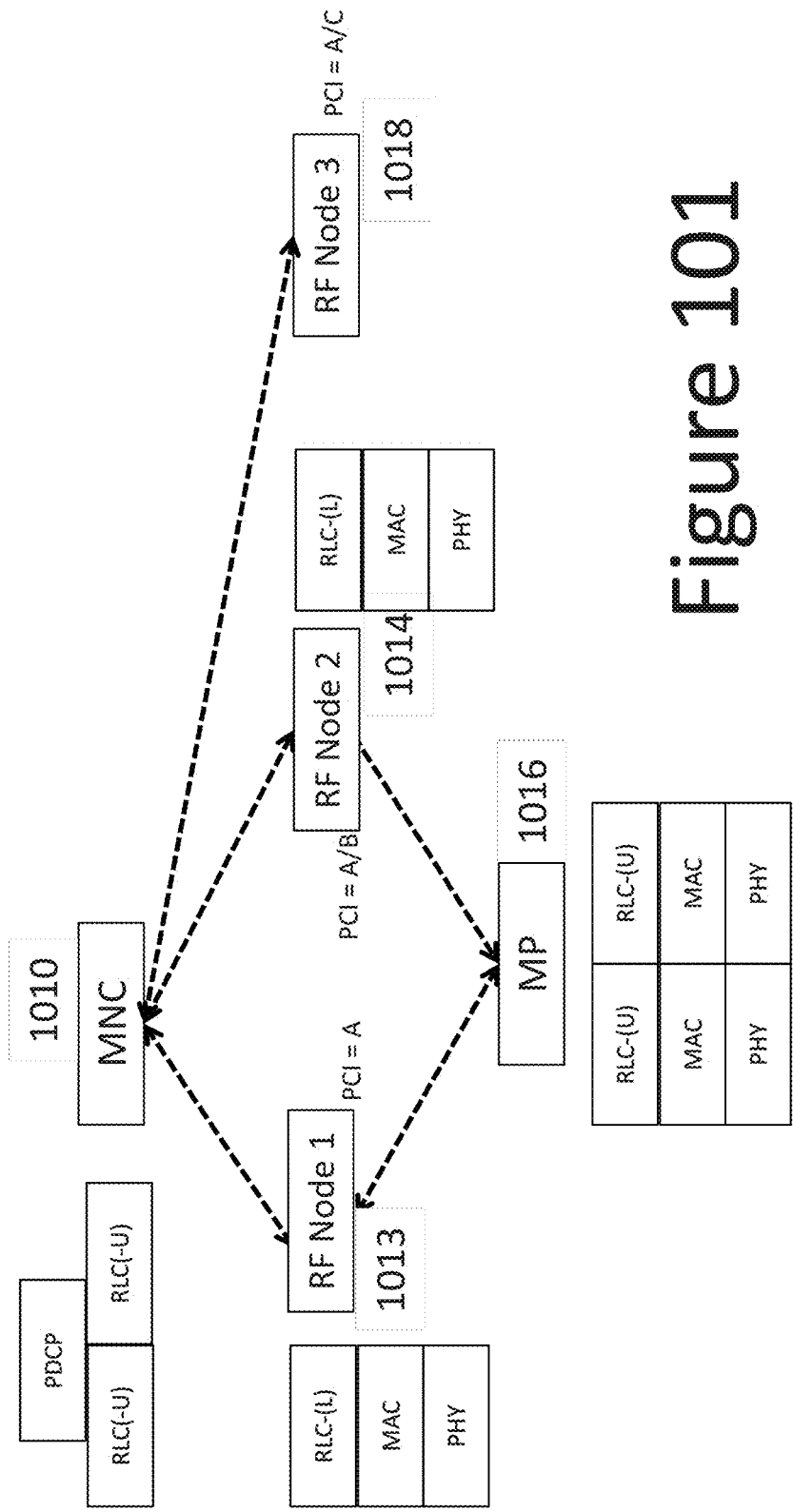
Figure 102:
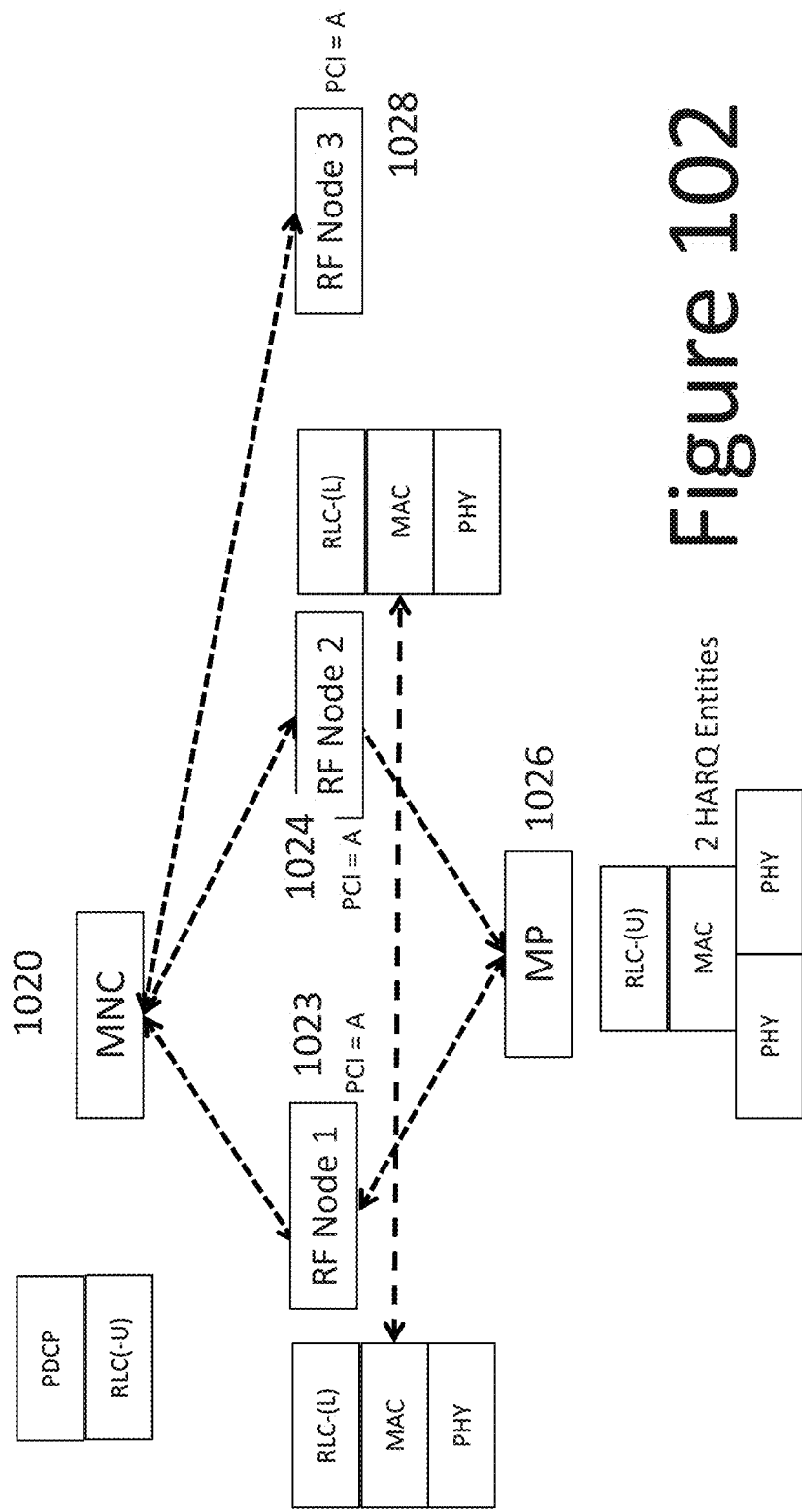

In the single-cell network, it is also possible for an MP to communicate with two upstream RF nodes at the same time as illustrated in FIGS. 101 and 102. In the method shown in FIG. 101, the MP is equipped with two MAC entities, where one MAC entity communicates with one upstream RF node and the other MAC entity communicates with the other upstream RF node. The upstream RF nodes schedule transmissions independently, except here the MNC coordinates the use of Tx beams so as to minimize interference at the MP. For example, MNC may ensure that the transmissions from the two RF nodes on two different Tx beams can be reliably received by the MP simultaneously on different Rx beams that are sufficiently isolated from each other. When such spatial isolation is not possible, MNC may split available frequency resources (RBs) between the two RF nodes and ensure that they don't transmit to the MP simultaneously on overlapping RBs. Alternatively, MNC may allow only one RF node to transmit to the MP at one time. Based on CSI-RS measurement reports received from the MP or SRS measurement reports obtained from the upstream RF nodes, the MNC can select the best RF node to transmit to the MP. Dual connectivity of the MP provides a rapid recovery mechanism in case the performance of a beam pair between the MP and one of its upstream RF nodes deteriorates quickly, for example due to blockage, as it allows the other RF node to take over. When the MP moves away from one of the upstream RF nodes (RF Node 1) into the coverage area of a third RF node (RF Node 3), the MAC entity of RF Node 1 can be fully flushed and restarted in RF Node 3. MP will then be attached to RF Nodes 2 and 3.

In parts of this specification, for simplicity, we assumed a tree-structured mesh network, where each MP is attached to only one upstream MP. However, in the technology described this specification, an MP may attach to multiple upstream MPs. Multi-attachment allows an MP to share its load with multiple MN-RNs (or MP-GWs). This provides a form of load balancing. In addition, multi-attachment can also be useful for improving reliability, especially in a mm wave system where RF conditions can deteriorate rapidly due to blockage. With multi-attachment, MPs can rapidly switch connectivity to other upstream MPs or MN-RNs (MP-GWs) and thereby minimize loss of data. When an MP can receive from two or more MPs or MN-RN (MP-GWs) with similar signal strength, by attaching to them at the same, it may be able to control interference from these upstream RF nodes more efficiently.

Dual attachment can be implemented using intra-mesh network dual connectivity. In the multi-cell mesh network architecture, intra-mesh network dual connectivity can be achieved by adding a $2^{nd}$ MP or MN-RN (or MP-GW) as a second cell. In dual connectivity, MP will maintain separate RLC/MAC layers for each attached upstream MP or MN-RN (or MP-GW). On the DL, the PDCP layer in the MNC can decide which way to route packets and can make this decision on a packet-by-packet basis. The PDCP receive entity in the UE can reorder any out-of-order received PDCP PDUs. A multi-attached MP can receive DL transmissions from two RF nodes simultaneously as long as these transmissions are received on different non-interfering Rx beams. Similarly, a multi-attached MP can transmit to two different RF nodes simultaneously as long as these transmissions occur on different isolated Tx beams.

Figure 103:
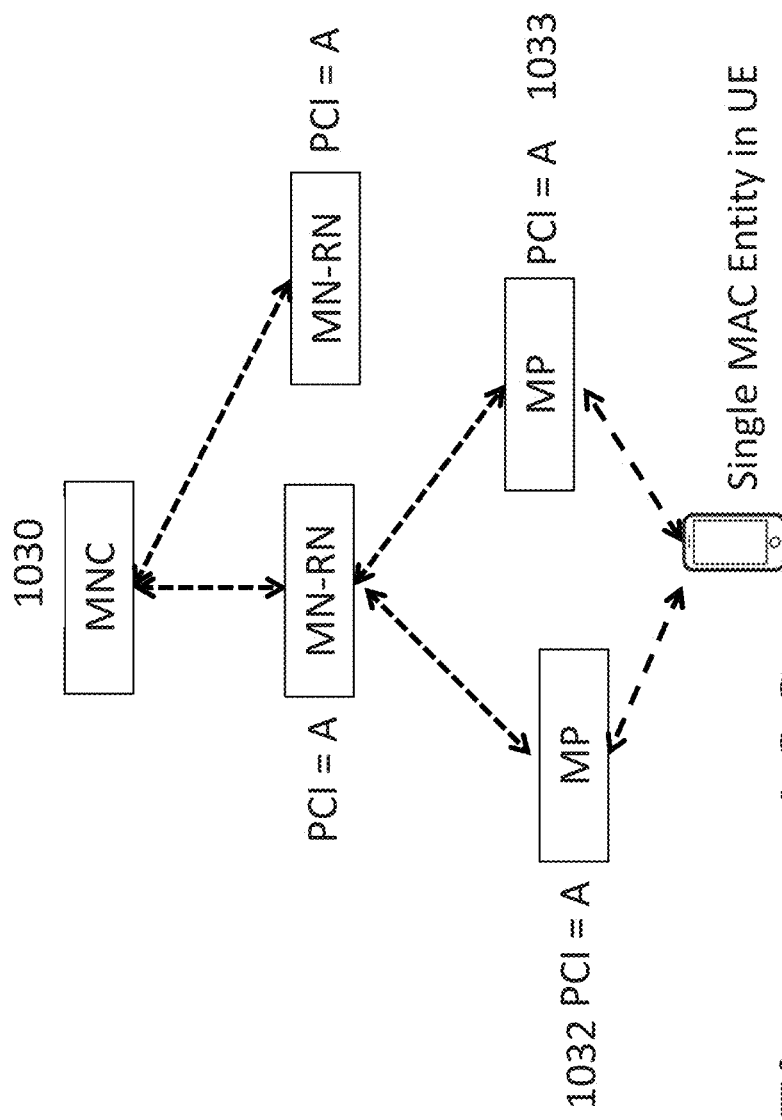

In the single-cell network, it is also possible to configure the UEs with two cells. RF nodes in the mesh network then advertise both cells by transmitting two SSBs and UE may connect to both cells as in dual connectivity, which was described earlier. Alternatively, using signaling mechanisms developed to support carrier aggregation, or with extension, UE may be served by two identical cells, that operate on the same frequency channel. This approach can be used to serve the UE from two or more RF nodes in the mesh network. In this case, the UE can transmit and receive different data from different RF nodes that share the same PCI simultaneously, but on different Rx beams. Each node may transmit data that corresponds to a different bearer, or as in dual connectivity a split bearer may be used, where the data can be split at the MNC on a per packet basis. This approach is illustrated in FIG. 103.

We now describe further details of multi-attachment for mesh networks that use Architecture B with a central controller, first for the case when the RF nodes advertise different PCIs, and then for the case when they advertise the same PCI. Many of the methods described here can be also be used in mesh networks that use Architecture A.

When RF nodes in the mesh network advertise different PCIs, an MP can separately attach to two or more upstream RF nodes. In this case, there is a single PDCP link between the MP and the MNC, but there are multiple RLC/MAC/PHY layers in the MP, each terminating in a different upstream RF node. So, there are multiple paths between the MP and the MNC. PDCP packets may be split between these paths at the MNC (DL) and at the MP (UL) at a DRB level, such that packets associated with different DRBs travel over different paths, or alternatively, PDCP packets may be split at the packet level, where different PDCP PDUs may travel over different paths. There exists an F1-U tunnel for the MP between the MNC and each one of the upstream RF nodes. Similarly, SRB (signaling) packets that carry RRC/NAS messages can be carried between the MP and the MNC over any one of the paths using user-associated signaling over F1-C links between the MNC and the upstream MPs. MP handovers are handled as in the case when the MP is attached to a single upstream RF node, except here, since the MP maintains multiple RLC/MAC/PHY entities, MNC will trigger a handover from one of the upstream RF nodes to a new upstream RF node or from multiple upstream RF nodes to one or more new upstream RF nodes.

When MPs are multi-attached, coordinating scheduling among RF nodes can become more complex. In the technology described in this specification, scheduler coordination complexity is reduced by forcing a structured mesh network topology, where RF nodes have a single hop distance (i.e., they are attached to upstream RF nodes that have the same hop distance). However, an additional layer of coordination is still required in structured mesh networks to ensure that the DL or UL transmissions scheduled by upstream RF nodes do not create conflicts or interference. In TDM scheduling, the division of slots between even-hop and odd-hop RF nodes naturally ensures that Tx/Rx conflicts are avoided. However, to avoid interference between simultaneous transmissions from/to multiple upstream RF nodes, transmissions need to be separated either spatially (i.e., using different (isolated) beams) or in the frequency domain. It is the responsibility of the MNC to provide such coordination. In pipelined scheduling, MNC needs to prevent upstream RF nodes from scheduling backhaul/fronthaul transmissions to/from a half-duplex MP in opposite directions (DL/UL). This implies that when multi-attached MPs are supported in pipelined scheduling, the super frame structure determined by the MNC also needs to indicate the direction of transmission in slots that are set aside for pipelined scheduling.

In mesh networks where MPs can attach to multiple upstream RF nodes, to enable efficient scheduler coordination, the RF nodes that an MP is attached to should have the same unique hop distance. In a deployment where MPs are static, this condition can be met at deployment and maintained during operation. In mesh networks where the MPs are mobile, the MNC ensures that this condition is satisfied during handovers. For example, when an MP that is attached to two 1-hop MPs moves in the coverage area of an MN-RN (0-hop RF node), the MNC would perform a handover from both 1-hop MPs to the MN-RN, only if it determines that a single connection to the MN-RN is better than two connections to 1-hop MPs.

In mesh networks where all RF nodes advertise the same PCI, multi-attachment can be performed in a similar manner. When the RLC-U sublayer is implemented in the MNC, multiple RLC-U entities are present, one for each upstream RF node. In this case, handovers can be performed based on CSI reports and SRS transmissions, and the handovers can be performed without explicitly involving the UE. The scheduling coordination requirements that were described earlier also apply to the single-PCI case. In order to link the RLC/MAC entities in the MP to the corresponding entities in the upstream RF nodes, an association is established between the RF nodes and a spatial reference, such as a CSI-RS resource. This association is established at the time the MP is configured for the spatial reference, i.e., CSI-RS. When an MP is scheduled to receive a DL transmission from an upstream RF node identified by a specific CSI-RS, the MP will know the associated RLC/MAC entity that the transmission belongs to. The DCI sent by the upstream node will include an indicator of the spatial reference. Likewise, when the MP is scheduled to transmit on the UL, the resource grant received from the upstream RF node will include a spatial reference that will indicate the MAC entity that the MP will use.

When the RF nodes in the mesh network use a single PCI, it is also possible to serve the MP by multiple upstream RF nodes using a single RLC/MAC entity. As in carrier aggregation, multiple HARQ entities are used in a single MAC to allow the MP to communicate with multiple RF nodes using an independent HARQ operation for each upstream RF node. In order for a single MAC entity in the MP to communicate with two separate MAC entities in the upstream RF nodes, these two MAC entities need to be synchronized so that they appear to the MP as if they were a single MAC entity. This is further illustrated in FIG. 80 in the special case of two upstream RF nodes. When an MP is attached to multiple upstream RF nodes at the same time, it is also possible to use PDCP duplication, where the MNC transmits PDCP PDUs destined for the MP via both of its upstream RF nodes. This can improve reliability and may allow the disabling of RLC retransmissions and thereby reduce latency.

When an MP that is attached to multiple upstream RF nodes needs an UL resource grant, it may send a Scheduling Request (SR). The MNC will configure the UE with an SR resource for each MAC logical channel or DRB. The MP is configured with multiple SR resources that are associated with spatial references that are tied to different upstream RF nodes. Likewise, MP can be configured to send different Buffer Status Reports to different upstream RF nodes. MP may also use different UL timing advance values when transmitting to different upstream RF nodes using different transceivers that drive different antenna panels.

Many of the methods described above for an MP attached to multiple upstream RF nodes can also be used for a UE attached to multiple RF nodes. This is shown in FIG. 81.

Full-Duplex MPs Using Multi-Panel Antennas

Figure 104:
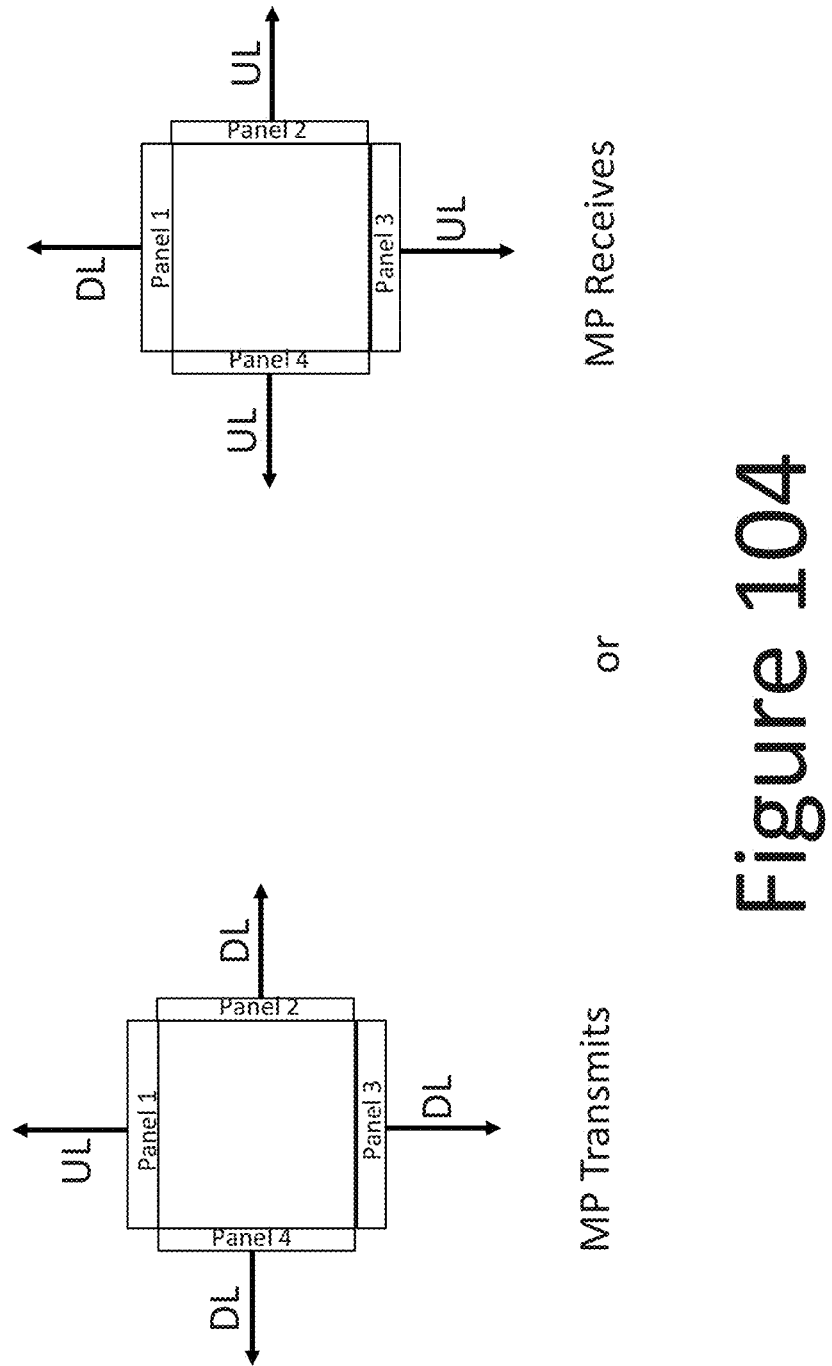
Figure 105:
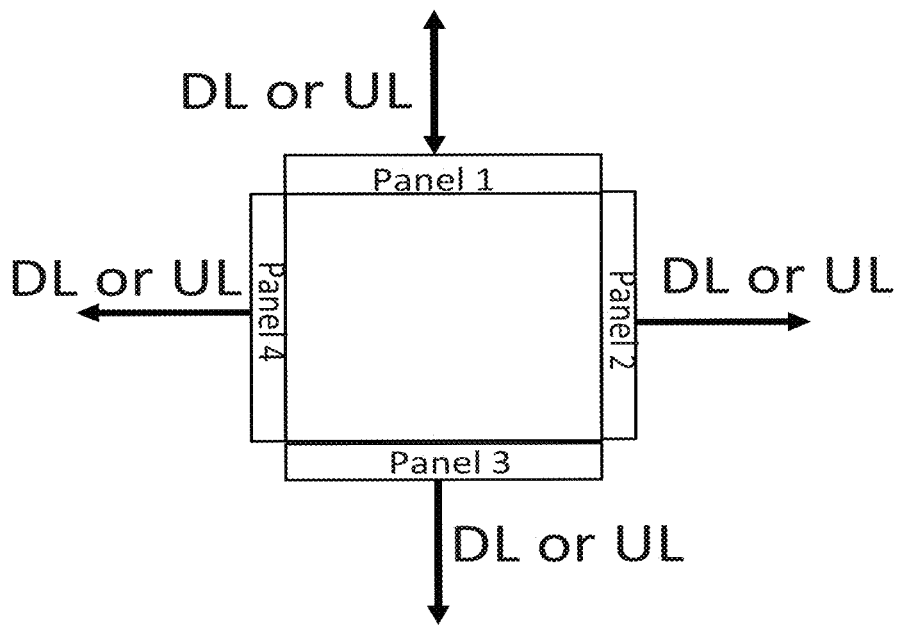

In mm-wave systems like the ones described in this specification, full-duplex communications where an RF node can transmit and receive at the same time using the same antenna is difficult to implement, because the large number of antenna elements used in these systems require a complex analog self-interference cancellation circuitry. In the technology of this specification, when MPs use multiple antenna panels as shown in FIG. 82, they can be configured to transmit and receive at the same time on different antenna panels, without using any complex analog self-interference cancellation circuitry. In contrast to full-fledged full-duplex communications, in multi-panel full-duplex communications, an MP is not able to transmit and receive at the same time on the same antenna panel, as this would greatly increase the analog self-interference cancellation requirement. A multi-panel full-duplex MP is able to transmit to an RF node or a UE on one antenna panel and receive from an RF node or a UE on another antenna panel at the same time. A half-duplex MP, shown in FIG. 104 may transmit on any one of its panels, or receive on any one of its panels, but it cannot do both at the same time, whereas a multi-panel full-duplex MP may transmit on one or more of its antenna panels and at the same time receive on one or more of its other antenna panels, as shown in FIG. 105. This provides additional scheduling flexibility in a mesh network, as we will describe below.

When an MP is receiving on one of its antenna panels, self-interference will occur when the MP is also transmitting on another antenna panel at the same time. Such self-interference may be caused by a direct line-of-sight (LoS) RF path between the antenna panels on their back side. Self-interference may also be caused by a non-line of sight (NLoS) RF path caused by RF reflections near the transmitting antenna panel that travel back to the receiving panel. In general, LoS self-interference can be significantly suppressed by introducing physical isolation between the antenna panels using an RF blocking material. NLoS self-interference can typically be mitigated by the Rx beam of the receiving panel, but when the reflections of the self-interference are directly aligned with the Rx beam of the desired signal arriving from another RF node or UE, significant interfering energy may pass through the analog transceiver, especially when the reflections are strong.

Figure 106:
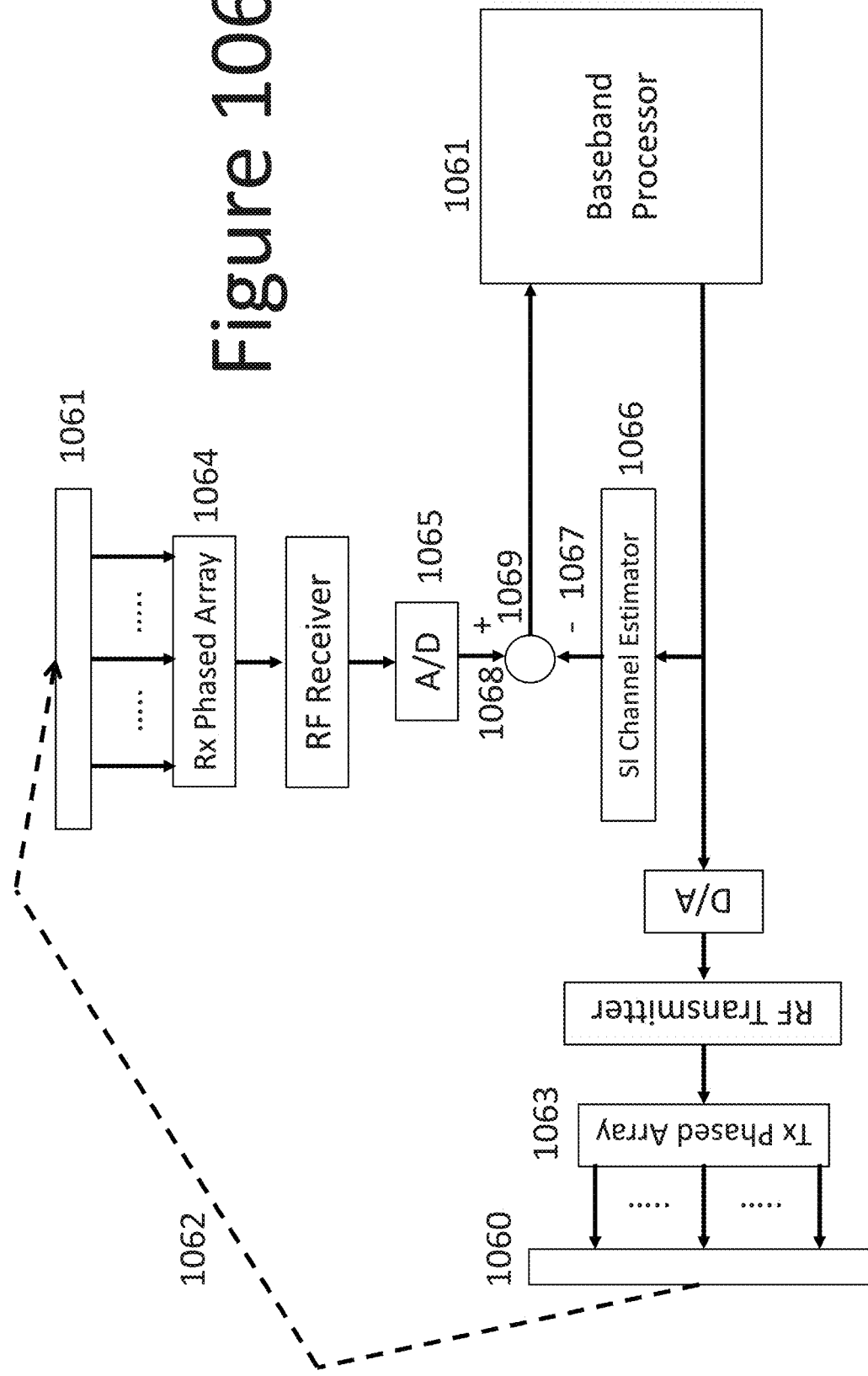

In single-panel full-duplex communication systems, hybrid analog/digital cancellation techniques are often necessary to suppress the self-interference. Analog cancellation is required because large analog self-interference can cause the Analog Gain Control (AGC) to lower the level of the received signal, thereby causing the quantization noise of the A/D converter to reduce of the overall signal-to-noise ratio and thereby degrade overall system performance. For example, when an MP transmits to a UE or to an RF node a signal on one of the antenna panels at a transmit power level of 20 dBm, the A/D converter has 10 effective bits, and the receiver thermal noise power level is −87 dBm, the minimum required analog cancellation is approximately equal to SI=20+87−10×6=47 dB. In other words, the signal transmitted by an antenna panel must be attenuated by at least 47 dB as it travels from the transmit array to the reflector nearby and arrives back at the receive antenna panel and goes through the combining circuit of the receiver array. When sufficient (e.g., of the order of 50 dB) attenuation is achieved through path loss and spatial filtering in the receive array, required levels of self-interference cancellation can be achieved through digital cancellation in the baseband processor and no additional analog cancellation would be required. Such a system, illustrated in FIG. 106, can be readily commercialized without the cost and complexity of analog cancellation. In this figure, the MP is transmitting on one antenna panel 1060 and receiving on another antenna panel 1061 at the same time. The transmission on panel 1060 generates self-interference 1062 for the reception on the other panel 1061. The spatial filtering in the transmit array 1063 and the receive array 1064 together keep the self-interference seen at the output of the A/D converter 1065 low. The MP cancels any remaining self-interference digitally by estimating the channel traversed by the self-interference in a channel estimator 1066 and by generating a close replica 1067 of the self-interference seen at the output of the A/D converter. The estimate of the self-interference 1067 is then subtracted 1068 from the received signal 1069. Once the self-interference has been removed, the baseband processor 1061 can demodulate the received signal as usual.

The method described above will work well most of the time, but in certain channel conditions and especially when certain combinations of Tx and Rx beams are in use, the analog self-interference at the input of the A/D converter may be too high and cause an overall performance degradation. In order to utilize multi-panel full-duplex communications in an MP in the mesh network, the technology described in this specification uses an adaptive technique, where full-duplex communication is not used for certain Tx and Rx beam pairs for which the analog self-interference is estimated to be above a certain threshold. MP maintains a table of "prohibited" beam pairs for which half-duplex operation is enforced. MP does not schedule transmission and reception on the prohibited beam pairs at the same time.

To determine the level of self-interference for each beam pair, an MP transmits on one of L (e.g., L=4) panels using one of the N (e.g., N=64) Tx beams, and measures the self-interference on the other L−1 (e.g., 3) panels using at least one of the N (e.g., 64) Rx beams on each panel. This procedure can be repeated until self-interference measurements are taken for all L(L−1)/2×N² possible Tx/Rx beam pairs. Beam pairs that produce self-interference that falls above a certain threshold are stored in table.

The MP can measure the self-interference when it is transmitting on only one of the antenna panels and the other panels are idle. When the MP and its surrounding environment are stationary, self-interference measurement can be performed off-line at the time of installation. In most applications, it is not necessary for the MP to measure all possible beam combinations. For most beam pairs between panels, significant self-interference may not occur regardless of any expected RF channel condition around the MP. So, the set of beam pairs that need to be measured can be significantly compressed by using a priori knowledge of the relative position of the panels and the beam directions. When MP is mobile or when its surrounding RF environment is changing due to mobility of other objects nearby, then the self-interference measurements may need to be performed in real time, for example, by taking advantage of occasional idle intervals when the MP is transmitting on only one panel. MP may intentionally apply certain constraints in its scheduler to facilitate the self-interference measurements. Since strong self-interference can be easily measured at the input of the digital receiver, the high self-interference condition can be readily determined, even when MP is operating in multi-panel full-duplex mode. When a certain beam pair that consists of a Tx beam i transmitted on panel n and an Rx beam j received on panel m is determined to have high self-interference, MP stores an identifier of the beam pair in a table and ceases from using multi-panel full-duplex communication on that beam pair. In other words, MP will stop scheduling a transmission on beam i on panel n, when receiving on beam j in panel m. Similarly, MP will not schedule a reception on beam i in panel n, when transmitting on beam j in panel m. When a beam pair becomes "prohibited," and especially when there is significant data demand for full-duplex operation for that beam pair, the MP scheduler can apply a scheduler constraint for a few symbols, where only the Tx beam of the beam pair is used and the panel of the Rx beam is kept idle to facilitate self-interference measurement. When RF conditions change and the self-interference measurements indicate that the beam pair is again eligible for multi-panel full-duplex operation, it can be removed from the table of prohibited beam pairs.

Figure 107:
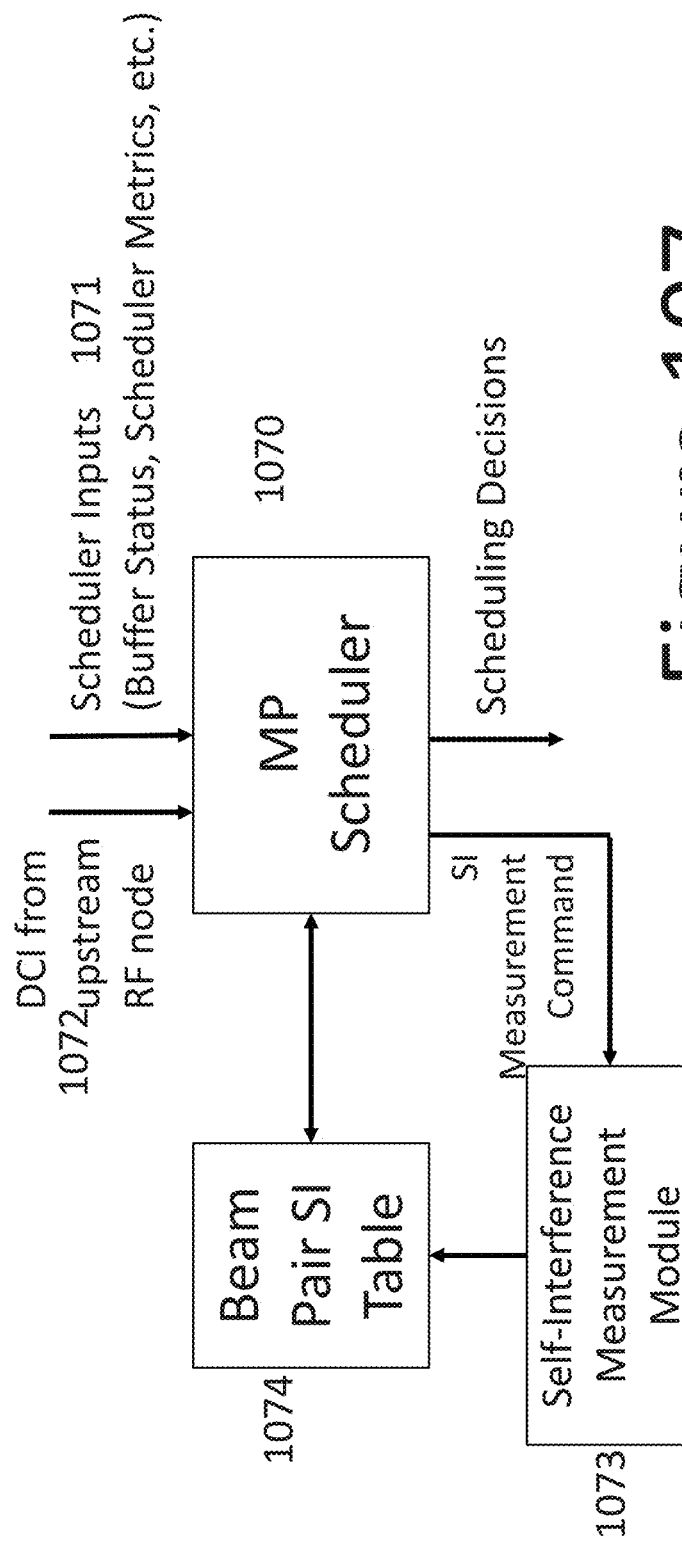

FIG. 107 describes the adaptive selection procedure. The scheduler 1070 receives various inputs 1071, such as buffer sizes, QoS scheduler metrics, etc., in addition to any scheduling decisions 1072 received in DCI from the upstream RF node in pipelined scheduling and makes a preliminary scheduling decision taking advantage of multi-panel full-duplex communications, and then checks the table 1074 of prohibited beam pairs to see if any self-interference condition is violated. When any of the selected beam pairs are found in the table, the scheduler modifies its decision, for example by removing or replacing a certain transmission or reception. The scheduler also triggers self-interference measurement by the self-interference measurement module when a transmission is scheduled on only one antenna panel. Self-interference measurement may use an Rx beam on the other antenna panels that is either determined by other scheduling decisions or may be chosen by the scheduler. The scheduler may trigger self-interference measurement based on actual or expected data demand or based on a staleness condition of an entry in the self-interference table. The self-interference measurement module updates 1073 the self-interference table 1074 based on the measurement results.

The TDM and pipelined scheduling methods described earlier for half-duplex MPs are also utilized for scheduling in full-duplex MPs. For example, in a TDM scheme, in time slots or symbol intervals allocated to its scheduler, a multi-panel full-duplex MP may schedule any combination of DL and UL transmissions to/from its served UEs or downstream MPs in the same OFDM symbol, provided these transmissions are scheduled on different antenna panels using beam pairs that do not produce excessive analog self-interference, as determined by the self-interference table. The scheduler always checks the self-interference table to avoid beam pairs that may cause excessive self-interference. For example, MP may schedule DL transmissions to two different UEs on panels 1 and 2, and schedule UL transmissions from an MP and a UE on panels 3 and 4, on the same OFDM symbols. In multi-panel half-duplex MPs, on symbols that are designated as flexible, it is not possible to schedule transmissions or receptions until the MP receives a DCI from its upstream RF node. When the upstream RF node schedules a DL (or UL) transmission to (from) the MP, a half-duplex MP can only schedule UL (or DL) transmission from (to) its downstream MP in the same time resources. On the other hand, a multi-panel full-duplex MP can schedule DL (or UL) transmissions to downstream MPs, independent of the scheduling decisions of its upstream RF node, as long as these transmissions and receptions occur on different panels. The MP can also take advantage of multi-panel full-duplex communications in pipelined scheduling, but only to schedule transmissions or receptions on the antenna panel used to communicate with the upstream RF node. On that panel, on symbols designated to be flexible, MP will schedule a DL (or UL) transmission, only when it receives a DCI from the upstream RF node that indicates an UL (or DL) transmission. Another advantage of pipelined scheduling in multi-panel full-duplex MPs is that the MP can maintain the same direction of transmission (e.g., DL or UL) in order to avoid potential cross-link interference. For example, when an MP is scheduled to receive a DL transmission from its upstream RF node in antenna panel 1, it can schedule DL transmissions from the other antenna panels (e.g., panels 2,3 and 4) to its UEs or to its downstream MPs in the same symbols. Since all transmissions are in the same direction (in this case DL), MP can utilize a time resource designated for DL transmission without any cross-link interference.

Dynamic Mesh Network Management

In traditional wireless networks, access points or base stations are deployed using extensive RF planning and professional installers. This greatly increases the cost of network deployment. In the technology that we describe here, mesh networks can be deployed with minimal RF planning and professional installation. In some embodiments, the MN-RNs (or MP-GWs) are deployed using RF planning and professional installers, but the MPs are deployed without significant RF planning and in some cases by an IT technician of a business or by the owner of the property (e.g., a building owner, a car owner, a home owner, etc.). Such ad-hoc deployment of MPs sometimes results in poor placement of neighboring MPs creating excessive interference that degrades system performance. Also, when MPs are deployed in mobile environments (e.g., inside a car, bus or train), the RF coverage can change drastically in short periods of time requiring mesh links to disconnect, sometimes causing UEs to lose connectivity. Therefore, there is a need to manage and coordinate the transmissions of MPs to minimize interference and handle rapid changes in link quality, for example due to mobility.

In massive MIMO systems, MN-RN (or MP-GW) and MPs have the freedom to activate or de-activate the use of individual beams for data transmissions. For example, an MN-RN (or MP-GW) or MP may de-activate the use of certain beams for data transmission when it is determined that overall network performance will improve when these beams are not used. Such deactivation of beams is beneficial when a beam causes interference to another MP or MN-RN (or MP-GW) and yet does not appreciably improve coverage, because the same area is already covered by the neighboring MP or MN-RN (or MP-GW). MPs may continue to transmit SS/PBCH blocks in order to allow neighboring nodes to track them. This will allow MPs establish associations with neighboring nodes to support handovers.

In mm wave deployments, fast beam switching is also often necessary when quality of the serving beam changes rapidly. Signal blockage is a major problem in mm wave bands, and when a UE loses connectivity due to blockage and cannot switch to another beam of the same MP, sometimes one can serve the same user from another MP. Creating such link redundancy is important for the successful deployment of mm wave systems for mobile users. In this part of the technology described below, we present a method where a Mesh Network Manager (MNM), located in the cloud or in the operator radio network, with assistance from the mesh network nodes (MN-RNs (or MP-GWs) and MPs), optimizes the RF performance of the mesh network by activating/deactivating individual beams on MN-RNs (or MP-GW) and MPs and by adjusting their power levels. This helps avoid interference and provides link redundancy in the presence of changing RF conditions, for example due to mobility. In mesh networks with a central controller such as an MNC, the functionality of the MNM may be integrated into the MNC.

Figure 108:
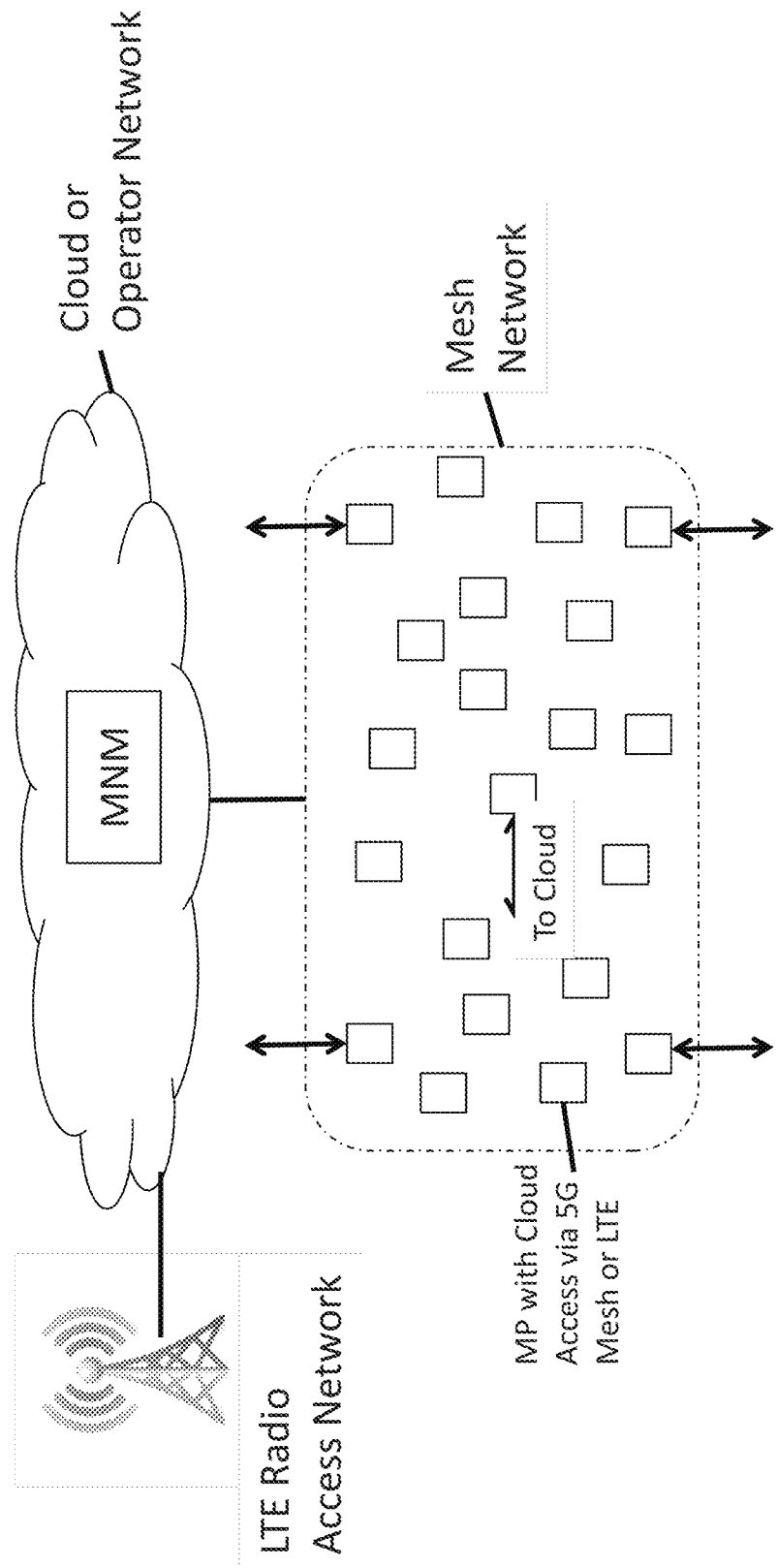
Figure 109:
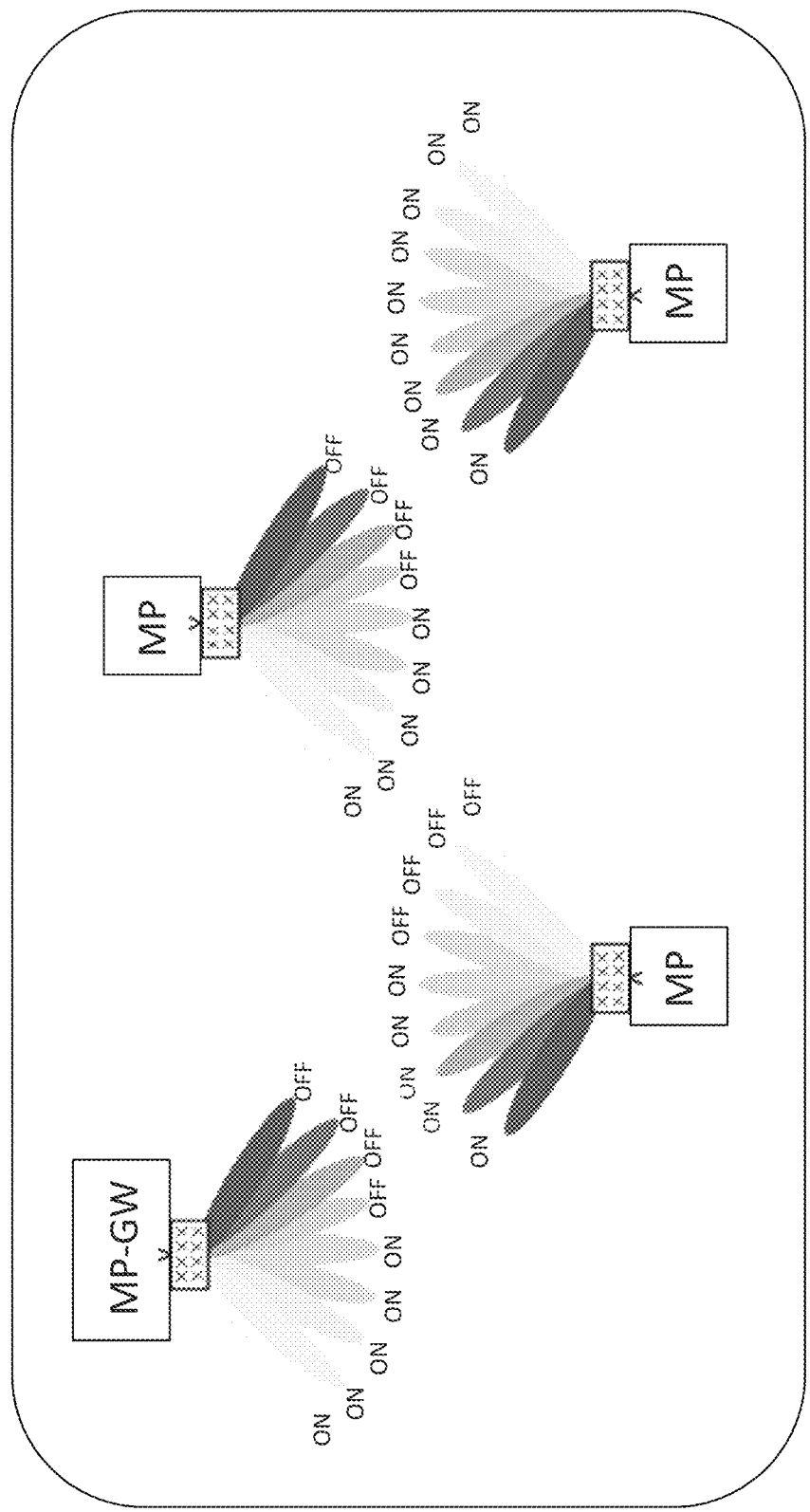

FIG. 108 shows the mesh network with an MNM, a functionality that can be integrated into the MNC. FIG. 109 shows how activating/deactivating individual beams reduces interference between MPs.

In a managed mesh network, MPs need to be able to communicate wirelessly with the MNM, even when they are not attached to the mesh network. This is achieved by equipping all MPs with a standard cellular network client (e.g., 3G/4G network client). As we saw earlier, this is already provided to support locally connected UEs using dual connectivity or when the MP itself uses LTE+5G NR dual-connectivity to attach to an LTE eNodeB to establish a primary connection and uses a secondary connection to attach to the mesh network. When an MP is not actively providing service in the mesh network, but it is within the coverage area of the mesh network, it can access the mesh network as a standard 5G NR UE or as an LTE+_5G NR dual connectivity, and communicate with the MNM either via the mesh network or via the LTE network. When an MP is not actively participating in the mesh network and is outside the coverage of the mesh network, it can communicate with the MNM using 4G LTE or even 3G.

When an MP is actively participating in the mesh network, it can communicate with the MNM using the mesh network or the LTE network. MP can also use the UE emulator described earlier, to communicate with the MNM.

To assist the mesh network manager, MPs will continually send information to the MNM and receive instructions from the MNM. Dynamic information sent by the MPs include: a) MP GPS coordinates, b) MP Speed and Direction (if mobile), c) MP Loading, d) Neighbor MP RF Measurements, e) UE Measurements, f) Multi-attached MP Demand, etc. Such dynamic information is sent in addition to static information, such as MP capabilities and configuration.

Neighbor MP RF measurements include measurements collected by an MP on MPs with whom it has a mesh connection (backhaul link) and on MPs with whom it does not have a mesh connection. Neighbor MP RF measurements are collected based on SS/PBCH Block transmissions from neighbor MPs and MN-RNs (or MP-GW) and covers all beams transmitted by the measured MP. In some implementations, neighbor MP RF measurements are also based on CSI-RS transmissions from neighbor MPs and MN-RN (or MP-GW). To support such measurements, MPs can be configured to transmit cell-specific CSI-RS, known to all other MPs. CSI-RS based measurements can provide a more accurate assessment of the link quality between the reporting and the measured MP.

UE measurements are also important to detect and remove coverage holes and to identify and remedy UE-to-UE cross-link interference conditions. 3GPP has defined self-optimizing network (SON) procedures, sometimes referred to as Minimizing Drive Tests (MDT), for UEs to report measurements and their locations to the radio access network. UEs can collect and log MDT measurements even when they are not connected, but they need to connect to the radio network to report the logged measurements. In this technology, the MNM retrieves MDT reports from the MN-RNs and MPs in the mesh network. In dual connectivity, MNM retrieves MDT reports from UEs on the 5G NR mesh network via the cloud. As soon as a UE connects to the Internet cloud via cellular, WiFi or any other Internet access technology, it reports its logged measurements to the MNM. Using SRS, UEs also measure interference from nearby UEs that are causing cross-link interference to them. They report an identifier of the aggressor UE and the strength of interference to their serving MP, which in turn forwards the result to MNM.

By reporting their speed and direction, mobile MPs also assist MNM in predicting their position in the future to further optimize the mesh network operation in the presence of moving MPs installed in vehicles, especially autonomous vehicles. Mobile MPs use a combination of navigation and sensor data to predict their future position, and report this information to the MNM.

MPs also report their loading to further help MNM manage the network. This helps MNM optimize mesh network topology and avoid bottlenecks.

MNM will continually collect the above-mentioned information from all MPs (idle or active) and use machine learning/artificial intelligence algorithms and techniques to continually determine the best operating parameters for the mesh network. For example, MNM will determine for each MP, whether it is active or idle, and if active, which of its beams are turned on vs. off, separately for SS/PBCH sweep and for data transmission (see FIG. 108). MNM may impose limits on transmit power individually on each beam. MNM may also divide available airlink resources (e.g., RBs, OFDM symbols and beams) among neighboring MPs and MN-RNs. For example, where MPs have two or more upstream MPs, a TDM and/or FDM method can be used to divide available resources between the upstream MPs. In one embodiment, MPs and MN-RNs who have a backhaul link to a downstream multi-attached MP, report the DL and UL demand on these links to MNM, and MNM in turn allocates airlink resources to the MPs. For example, MNM may indicate which OFDM symbol(s) an MP may use in a period of time to serve downstream MPs that are multi-attached. MNM may also allocate MPs airlink resources to support sidelink communication between neighboring MPs during handovers. MPs use sidelink communications for the X2/Xn interface to neighbor MPs.

MNM also coordinates its operation with MPs and MN-RNs (or MP-GWs) in the mesh network. Where it is more efficient to do so, MNM allows MPs and MN-RNs (or MP-GW) to make certain decisions locally, based on their own observations and measurements. For example, MPs attach/detach to neighboring MPs based on their own RF measurements and based on information received from the MNM.

The mesh network described in this specification can be deployed at any location that requires cellular capacity or coverage. This includes high-density areas, such as major cities, downtown areas, and hot spots, among others. It also includes locations where seamless RF coverage is difficult to achieve, such as in rural and large suburban areas. Mesh networks are especially beneficial in those applications where it is expensive to bring fixed-line backhaul to every AP location. The mesh network described in this specification can also be deployed in fixed wireless applications, for example to deliver broadband Internet to homes. In this application, the MPs may reside on the side of or on top of residential homes, and used to extend coverage to neighboring homes that don't have direct RF coverage from an MN-RN (or MP-GW). The mesh network of this specification can also be used to deliver broadband wireless services to vehicles, including to autonomous, self-driving, electrical cars. By deploying MPs inside such vehicles, extremely dense coverage and high capacity can be achieved in areas with heavy car traffic. It is also feasible to integrate the functionality of an MP inside a smartphone or other battery-powered device carried by an end-user.

Even though in the description we used 5G NR to illustrate the operation of the system, many of the technologies described in this specification can be applied in conjunction with any other existing or future air interface protocol. Also, even though parts of the description focused on high-frequency (>6 GHz) and mm wave deployments, the technologies described here can also be applied to mesh networks that are deployed in lower-frequency (<6 GHz) bands. In the examples we used in the description, the MPs and MN-RNs (or MP-GWs) were assumed to be single-sector nodes. In practice, it is possible for MPs and/or MN-RNs (or MP-GWs) to be multi-sector with 2, 3, 4 or more sectors, each serving a different angular segment and this extension would be straightforward to implement. The backhaul/fronthaul links between MPs and MN-RNs (or MP-GWs) can also be implemented using dual connectivity. In this case, the MPs just like UEs using dual connectivity will first attach to an LTE eNodeB, which will then add the mesh network or a mesh network node as a secondary node based on Measurement Reports sent by the MP.

The principal elements of the cellular mesh network described in this specification, namely the MP-GW, the MN-RN, the MP and the MNM, can be implemented using electronic components that are either commercially available today or are expected to be available in the near future. The components used in an MN-RN (or MP-GW) and MP will be similar to the components that will be used to build a 5G NR BS or AP. Such components include System-on-Chips (SoCs) with integrated hardware acceleration blocks to perform certain processing-intensive functions of the 5G NR standard and processor cores (e.g., ARM cores, DSP cores) to run the software and firmware. SoCs may also include Field Programmable Gate Array (FPGA) blocks to implement physical layer functions described in the specification in firmware. At lower RF frequencies (e.g., below 3 GHz), SoCs may also include Analog-to-Digital and Digital-to-Analog Converters (ADCs and DACs). Other components that may be used to implement an MN-RN (or MP-GW) or MP include Radio Frequency (RF) transceivers, phased array chips, power amplifiers, low-noise amplifiers, antennas, etc. The antennas may be reconfigurable antennas, whose properties, such as element pattern and polarization can be modified dynamically. One or more of these components can be integrated at the board level or at the chip level. Higher level of integration is achievable at lower RF frequencies (e.g., below 6 GHz), where RF sampling can be used to implement the ADCs and DACs. An MP or MN-RN (or MP-GW) can be powered from a standard electrical outlet. It can also be powered over a cable, as in Power over Ethernet. In some applications, an MP can be battery-powered. For example, in applications where the MP is installed inside an electric car, MP can be powered using the battery of the car. The software will run on embedded processors and will control the operation of the MN-RN (or MP-GW) or MP. Airlink scheduling and all other higher-layer functions described in the specification (e.g., MAC, RLC, PDCP, GTP, F1-AP, SING-AP, X2/Xn-AP, etc.) can be implemented in software that will run on embedded processor cores that are integrated into an SoC or in standalone processor(s) that reside on hardware boards. MN-RNs (or MP-GWs) and MPs will be designed for flexible mounting options, including mounting on a street pole or on the side of a building or at the top of a building or home. The MNM can be implemented entirely in software using off-the-shelf server platforms.

Other implementations are also within the scope of the following claims.

For example, implementations of the technology that we have described may be based on assumptions that we have identified. The discussions based on these assumptions can be readily generalized to other situations.

The invention claimed is:

1. A wireless mesh network comprising
a mesh network controller connected to a core network, a radio node linked to the controller, a first mesh node wirelessly linked to the radio node, and a second mesh node wirelessly linked to the first mesh node,
the controller, the radio node and the mesh nodes comprising processors and storage for instructions executable by the processors to establish:
airlink protocol layers executed by a user device and by the mesh network for communication on a wireless access link, the airlink protocol layers being processed partially in the second mesh node and partially in the controller,
the airlink protocol layers partially processed by the second mesh node include the physical layer and the medium access control layer, and
the airlink protocol layers partially processed by the controller include the packet data convergence protocol,
tunneling facilities to carry partially processed data of the user device in user data tunnel packets between the controller and the second mesh node,
routing facilities in the first mesh node to route the user data tunnel packets to the second mesh node.

2. The wireless mesh network of claim 1, in which the tunneling facilities between the second mesh node and the controller use the GTP/UDP/IP protocol and a tunnel end-point identifier in the user data tunnel packet header identifies the user device.

3. The wireless mesh network of claim 2, in which sequence numbers are used by the mesh network to control the flow of user data tunnel packets sent by the controller to the second mesh node.

4. The wireless mesh network of claim 2, in which ciphering is applied on user data payload only in the user device and in the controller.

5. The wireless mesh network of claim 4, in which ciphering is applied on a user data tunnel packet header only in the second mesh node and in the controller.

6. The wireless mesh network of claim 2, in which the tunneling facilities include header compression to reduce the user data tunnel packet header overhead.

7. The wireless mesh network of claim 1, in which the lower sublayer of the radio link control protocol of the user device is processed in the second mesh node and the upper sublayer of the radio link control protocol of the user device is processed in the controller.

8. The wireless mesh network of claim 7, in which the upper sublayer of the radio link control protocol includes the automatic repeat request function and the lower sublayer of the radio link control protocol includes the packet segmentation function.

9. The wireless mesh network of claim 8, in which the controller retransmits user data payload in the radio link control protocol based on status reports sent by the user device.

10. The wireless mesh network of claim 9, in which the airlink protocol layers executed by the first mesh node and the radio node to carry user data tunnel packets include the physical layer, the medium access layer and the radio link control protocol, and the radio link control protocol operates in the unacknowledged mode.

11. The wireless mesh network of claim 1, in which all wireless links operate on the same frequency channel.

12. The wireless mesh network of claim 1, in which the routing facilities in the first mesh node route the user data tunnel packets received from the radio node to the second mesh node based on an address of the second mesh node.

13. The wireless mesh network of claim 12, in which the address is an IP address.

14. The wireless mesh network of claim 12, in which the address is a GTP terminal end-point identifier.

15. The wireless mesh network of claim 12, in which the second mesh node maintains an end-to-end control link to the mesh network controller to control the operation of the mesh node as a Distributed Unit (DU).

16. The wireless mesh network of claim 15, in which the control link is based on the 3GPP F1-AP protocol.

17. The wireless mesh network of claim 15, in which the second mesh node maintains the end-to-end control link even when the wireless link between the second mesh node and the first mesh node is not operational.

18. The wireless mesh network of claim 15, in which the second mesh node performs a handover to a third mesh node and the end-to-end control link between the second mesh node and the mesh network controller is maintained during the handover.

19. The wireless mesh network of claim 18, in which the third mesh node has a wireless link to the radio node, and the radio node has routing facilities to route the user data tunnel packets to the second mesh node, and during the handover the routing of downlink packets is switched from the first mesh node to the third mesh node.

* * * * *